US012509498B2

(12) United States Patent
James et al.

(10) Patent No.: US 12,509,498 B2
(45) Date of Patent: *Dec. 30, 2025

(54) LEUCINE ZIPPER-BASED COMPOSITIONS AND METHODS OF USE

(71) Applicant: MEMORIAL SLOAN-KETTERING CANCER CENTER, New York, NY (US)

(72) Inventors: Scott E. James, New York, NY (US); Marcel R. M. Van Den Brink, New York, NY (US); Lorenz Jahn, Brooklyn, NY (US)

(73) Assignee: MEMORIAL SLOAN-KETTERING CANCER CENTER, New York, NY (US)

( * ) Notice: Subject to any disclaimer, the term of this patent is extended or adjusted under 35 U.S.C. 154(b) by 1138 days.

This patent is subject to a terminal disclaimer.

(21) Appl. No.: 17/176,533

(22) Filed: Feb. 16, 2021

(65) Prior Publication Data

US 2021/0171601 A1 Jun. 10, 2021

Related U.S. Application Data

(63) Continuation of application No. PCT/US2019/046758, filed on Aug. 16, 2019.
(Continued)

(51) Int. Cl.
| C07K 14/725 | (2006.01) |
| A61K 40/11 | (2025.01) |
| A61K 40/31 | (2025.01) |
| A61K 40/36 | (2025.01) |
| A61K 40/42 | (2025.01) |
| A61P 37/06 | (2006.01) |
| C07K 14/54 | (2006.01) |
| C07K 14/705 | (2006.01) |
| C07K 16/28 | (2006.01) |

(Continued)

(52) U.S. Cl.
CPC .......... *C07K 14/7051* (2013.01); *A61K 40/11* (2025.01); *A61K 40/31* (2025.01); *A61K 40/36* (2025.01); *A61K 40/4211* (2025.01); *A61K 40/4221* (2025.01); *A61P 37/06* (2018.01); *C07K 14/54* (2013.01); *C07K 14/5403* (2013.01); *C07K 14/5443* (2013.01); *C07K 14/70517* (2013.01); *C07K 14/70521* (2013.01); *C07K 16/2803* (2013.01); *C07K 16/2827* (2013.01); *C07K 16/2887* (2013.01); *C12N 9/6472* (2013.01); *C12Y 304/22062* (2013.01); *A61K 38/00* (2013.01); *A61K 2239/13* (2023.05); *C07K 14/705* (2013.01); *C07K 14/70596* (2013.01); *C07K 16/28* (2013.01); *C07K 2317/53* (2013.01); *C07K 2317/622* (2013.01); *C07K 2319/03* (2013.01); *C07K 2319/20* (2013.01); *C07K 2319/21* (2013.01); *C07K 2319/22* (2013.01); *C07K 2319/30* (2013.01); *C07K 2319/33* (2013.01); *C07K 2319/41* (2013.01); *C07K 2319/42* (2013.01); *C07K 2319/43* (2013.01); *C07K 2319/73* (2013.01)

(58) Field of Classification Search
CPC .......... C07K 14/7051; C07K 14/54; C07K 14/5403; C07K 14/5443; C07K 14/70517; C07K 14/70521; C07K 16/2803; C07K 16/2827; C07K 16/2887; C07K 2317/53; C07K 2317/622; C07K 2319/03; C07K 2319/20; C07K 2319/21; C07K 2319/22; C07K 2319/30; C07K 2319/33; C07K 2319/41; C07K 2319/42; C07K 2319/43; C07K 2319/73; C07K 14/7155; C07K 14/705; C07K 14/70507; C07K 14/70514; C07K 14/70578; C07K 14/70596; C07K 16/28; A61K 39/4611; A61K 39/4631; A61K 39/4636; A61K 39/464412; A61K 39/464424; A61K 2239/13; A61K 38/00; A61K 48/005; A61P 37/06; C12N 9/6472; C12Y 304/22062

See application file for complete search history.

(56) References Cited

U.S. PATENT DOCUMENTS

| 5,399,346 A | 3/1995 | Anderson et al. |
| 5,837,816 A | 11/1998 | Ciardelli et al. |

(Continued)

FOREIGN PATENT DOCUMENTS

| WO | WO 2007/062466 A1 | 6/2007 |
| WO | WO 2016/124930 A1 | 8/2016 |

(Continued)

OTHER PUBLICATIONS

Thompson KE, Bashor CJ, Lim WA, Keating AE. SYNZIP protein interaction toolbox: in vitro and in vivo specifications of heterospecific coiled-coil interaction domains. ACS Synth Biol. Apr. 20, 2012;1(4):118-29. doi: 10.1021/sb200015u. PMID: 22558529 ; PMCID: PMC3339576. (Year: 2012).*

(Continued)

*Primary Examiner* — Hong Sang
*Assistant Examiner* — Carol Ann Chase
(74) *Attorney, Agent, or Firm* — Baker Botts L.L.P.

(57) ABSTRACT

The presently disclosed subject matter provides compositions and systems for cell-based immunotherapy. In certain non-limiting embodiments, the system comprises a membrane-bound polypeptide and at least one soluble polypeptide that is capable of dimerizing with the membrane-bound polypeptide.

28 Claims, 27 Drawing Sheets

Specification includes a Sequence Listing.

Related U.S. Application Data

(60) Provisional application No. 62/798,168, filed on Jan. 29, 2019, provisional application No. 62/765,058, filed on Aug. 16, 2018.

(51) Int. Cl.
*C12N 9/64* (2006.01)
*A61K 38/00* (2006.01)

(56) References Cited

U.S. PATENT DOCUMENTS

| | | |
|---|---|---|
| 7,446,190 B2 | 11/2008 | Sadelain et al. |
| 9,670,281 B2 | 6/2017 | Lim et al. |
| 2003/0017979 A1 | 1/2003 | Mack et al. |
| 2017/0002054 A1 | 1/2017 | Gurney et al. |
| 2018/0050065 A1 | 2/2018 | Pulé et al. |

FOREIGN PATENT DOCUMENTS

| | | | |
|---|---|---|---|
| WO | WO 2016/151315 A1 | 9/2016 | |
| WO | WO 2017/040945 A1 | 3/2017 | |
| WO | WO 2017/093410 A1 | 6/2017 | |
| WO | WO 2017/100428 A1 | 6/2017 | |
| WO | WO-2017091546 A1 * | 6/2017 | ............. A61K 35/17 |
| WO | WO 2018/058002 A1 | 3/2018 | |

OTHER PUBLICATIONS

Van der Weyden CA, Pileri SA, Feldman AL, Whisstock J, Prince HM. Understanding CD30 biology and therapeutic targeting: a historical perspective providing insight into future directions. Blood Cancer J. Sep. 8, 2017;7(9):e603. doi: 10.1038/bcj.2017.85. PMID: 28885612; PMCID: PMC5709754. (Year: 2017).*
Pettitt D, Arshad Z, Smith J, Stanic T, Hollander G, Brindley D. CAR-T Cells: A Systematic Review and Mixed Methods Analysis of the Clinical Trial Landscape. Mol Ther. Feb. 7, 2018;26(2):342-353. doi: 10.1016/j.ymthe.2017.10.019. Epub Nov. 2, 2017. PMID: 29248427; PMCID: PMC5835018. (Year: 2017).*
Won EY, Cha K, Byun JS, Kim DU, Shin S, Ahn B, Kim YH, Rice AJ, Walz T, Kwon BS, Cho HS. The structure of the trimer of human 4-1BB ligand is unique among members of the tumor necrosis factor superfamily. J Biol Chem. Mar. 19, 2010;285(12):9202-10. doi: 10.1074/jbc.M109.084442. Epub Dec. 23, 2009. (Year: 2010).*
Bettini ML, Chou PC, Guy CS, Lee T, Vignali KM, Vignali DAA. Cutting Edge: CD3 Itam Diversity is Required for Optimal TCR Signaling and Thymocyte Development. J Immunol. Sep. 1, 2017;199(5):1555-1560. doi: 10.4049/jimmunol.1700069. Epub Jul. 21, 2017. PMID: 28733484; PMCID: PMC5568475. (Year: 2017).*
Jang Hwan Cho, et al, "Universal Chimeric Antigen Receptors for Multiplexed and Logical Control of T Cell Responses", Cell, 173:1426-1438 (2018).
Wen-Yu Pan, et al, "Cancer Immunotherapy Using a Membrane-bound Interleukin-12 With B7-1 Transmembrane and Cytoplasmic Domains", Molecular Therapy, 20(5):927-937 (2012).
U.S. Appl. No. 17/176,388 (2021/0179686), filed Feb. 16, 2021 (Jun. 17, 2021).
Altschul et al., "Basic Local Alignment Search Tool," J. Mol. Biol. 215:403-410 (1990).
Altschul et al., "Gapped BLAST and PSI-BLAST: a new generation of protein database search programs," Nucleic Acids Res. 25(17):3389-3402 (1997).
Anderson, "Prospects for Human Gene Therapy," Science 226(4673):401-409 (1984).
Blömer et al., "Highly Efficient and Sustained Gene Transfer in Adult Neurons with a Lentivirus Vector," Journal of Virology 71(9):6641-6649 (1997).
Bregni et al., "Human Peripheral Blood Hematopoietic Progenitors are Optimal Targets of Retroviral-Mediated Gene Transfer," Blood 80(6):1418-1422 (1992).
Brigham et al., "Rapid Communication: In vivo Transfection of Murine Lungs with a Functioning Prokaryotic Gene Using a Liposome Vehicle," Am. J. Med. Sci. 298:278 (1989).
Cayouette et al., "Adenovirus-Mediated Gene Transfer of Ciliary Neurotrophic Factor Can Prevent Photoreceptor Degeneration in the Retinal Degeneration (rd) Mouse," Human Gene Therapy 8:423-430 (1997).
Cornetta et al., "Gene Transfer into Primates and Prospects for Gene Therapy in Humans," Progress in Nucleic Acid Research and Molecular Biology 36:311-322 (1987).
Danos et al., "Safe and efficient generation of recombinant retroviruses with amphotropic and ecotropic host ranges," PNAS USA 85:6460-6464 (1988).
Dupont et al., "Artificial Antigen-Presenting Cells Transduced with Telomerase Efficiently Expand Epitope-Specific, Human Leukocyte Antigen-Restricted Cytotoxic T Cells," Cancer Res 65:5417-5427 (2005).
Eglitis et al., "Retroviral Vectors for Introduction of Genes into Mammalian Cells," BioTechniques 6(7):608-614 (1988).
Felgner et al., "Lipofection: A highly efficient, lipid-mediated DNA-transfection procedure," PNAS USA 84:7413-7417 (1987).
Friedmann, "Progress toward Human Gene Therapy," Science 244(4910):1275-1281 (1989).
Grigoryan et al., "Design of protein-interaction specificity gives selective bZIP-binding peptides," *Nature*. 458, 859-864 (2009).
Hughes et al., "Retroviral Gene Transfer to Primitive Normal and Leukemic Hematopoietic Cells Using Clinically Applicable Procedures," J. Clin. Invest. 89:1817-1824 (1992).
International Search Report dated Jan. 17, 2020 in corresponding International Patent Application No. PCT/US2019/046764.
International Search Report dated Nov. 21, 2019 in corresponding International Patent Application No. PCT/US2019/046758.
Johnson, "Gene Therapy for Cystic Fibrosis," Chest 107:77S-83S (1995).
Kido et al., "Use of a retroviral vector with an internal opsin promoter to direct gene expression to retinal photoreceptor cells," Current Eye Research 15:833-844 (1996).
Kohler et al., "Kinetic Studies of Fos•Jun•DNA Complex Formation: DNA Binding Prior to Dimerization," Biochemistry, 40, 130-142 (2001).
Le Gal La Salle et al., "An Adenovirus Vector for Gene Transfer into Neurons and Glia in the Brain," Science 259(5097):988-990 (1993).
Meyers et al., "Optimal alignments in linear space," Comput. Appl. Biosci., 4:11-17 (1988).
Miller et al., "Generation of Helper-Free Amphotropic Retroviruses That Transduce a Dominant-Acting, Methotrexate-Resistant Dihydrofolate Reductase Gene," Mol. Cell. Biol. 5(3):431-437 (1985).
Miller et al., "Redesign of Retrovirus Packaging Cell Lines to Avoid Recombination Leading to Helper Virus Production," Mol. Cell. Biol. 6(8):2895-2902 (1986).
Miller et al., "Improved Retroviral Vectors for Gene Transfer and Expression," Biotechniques 7(9):980-990 (1989).
Miller, "Retrovirus Packaging Cells," Human Gene Therapy 1:5-14 (1990).
Miyoshi et al., "Stable and efficient gene transfer into the retina using an HIV-based lentiviral vector," PNAS USA 94:10319-10323 (1997).
Moen, "Directions in Gene Therapy," Blood Cells 17:407-416 (1991).
Morgan et al., "Cancer Regression in Patients After Transfer of Genetically Engineered Lymphocytes," *Science* 314:126-129 (2006).
Morsut et al., "Engineering Customized Cell Sensing and Response Behaviors Using Synthetic Notch Receptors," Cell, 164, 780-791 (2016).
Naldini et al., "In Vivo Gene Delivery and Stable Transduction of Nondividing Cells by a Lentiviral Vector," Science 272(5259):263-267 (1996).
Needleman et al., "A General Method Applicable to the Search for Similarities in the Amino Acid Sequence of Two Proteins," J. Mol. Biol. 48:443-453 (1970).

(56) References Cited

OTHER PUBLICATIONS

Ono et al., "Plasmid DNAs directly injected into mouse brain with lipofectin can be incorporated and expressed by brain cells," Neuroscience Letters, 117:259-263 (1990).
Panelli et al., "A Tumor-Infiltrating Lymphocyte from a Melanoma Metastasis with Decreased Expression of Melanoma Differentiation Antigens Recognizes MAGE-12," J Immunol 164:4382-4392 (2000).
Panelli et al., "Expansion of Tumor-T Cell Pairs from Fine Needle Aspirates of Melanoma Metastases," J Immunol 164:495-504 (2000).
Papanicolaou et al., "Rapid expansion of cytomegalovirus-specific cytotoxic T lymphocytes by artificial antigen-presenting cells expressing a single HLA allele," Blood 102:2498-2505 (2003).
Ransone et al., "Fos-Jun interaction: mutational analysis of the leucine zipper domain of both proteins," Genes & Dev. 770-781 (1989).
Reinke et al., "A synthetic coiled-coil interactome provides heterospecific modules for molecular engineering," J Am Chem Soc. 132, 6025-6031 (2010).
Rosenberg et al., "Gene Transfer into Humans," N. Engl. J. Med 323(9):570-578 (1990).
Sadelain et al., "Targeting Tumours With Genetically Enhanced T Lymphocytes," Nat Rev Cancer 3:35-45 (2003).
Sambrook et al., "Molecular Cloning: A Laboratory Manual," second edition, Cold Spring Harbor Laboratory Press, New York (1989).
Sharp, "Gene Therapy," The Lancet 337:1277-1278 (1991).
Singleton et al., Dictionary of Microbiology and Molecular Biology (2nd ed. 1994).
Straubinger et al., "Liposomes as Carriers for Intracellular Delivery of Nucleic Acids," Methods in Enzymology, 101:512-527 (1983).
The Polymerase Chain Reaction. Mullis (1994).
Tolstoshev et al., "Gene expression using retroviral vectors," Current Opinion in Biotechnology 1:55-61 (1990).
Tsutsumi et al., "Fluorogenically Active Leucine Zipper Peptides as Tag-Probe Pairs for Protein Imaging in Living Cells," Angew. Chem. Int. Ed., No. 48, pp. 9164-9166 (2009).
Wahl et al., "Improved Radioimaging and Tumor Localization with Monoclonal F(ab')2," J. Nucl. Med. 24:316-325 (1983).
Wolff et al., "Direct Gene Transfer into Mouse Muscle in Vivo," Science 247(4949):1465-1468 (1990).
Wu et al., "Receptor-mediated Gene Delivery and Expression in Vivo," Journal of Biological Chemistry, 263(29):14621-14624 (1988).
Wu et al., "Targeting Genes: Delivery and Persistent Expression of a Foreign Gene Driven by Mammalian Regulatory Elements in Vivo," Journal of Biological Chemistry 264(29):16985-16987 (1989).
Xu et al., "Correction of the enzyme deficiency in hematopoietic cells of Gaucher patients using a clinically acceptable retroviral supernatant transduction protocol," Exp. Hemat. 22:223-230 (1994).

\* cited by examiner

FIG. 5

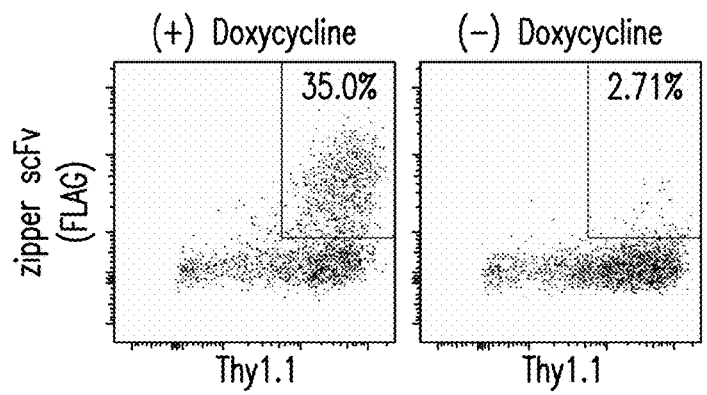
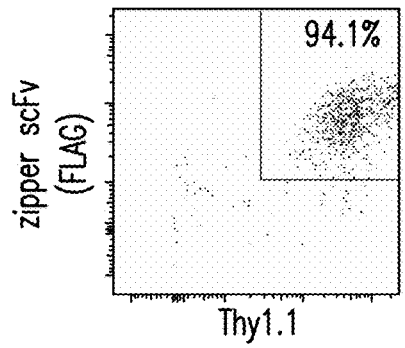
FIG. 25A  FIG. 25B
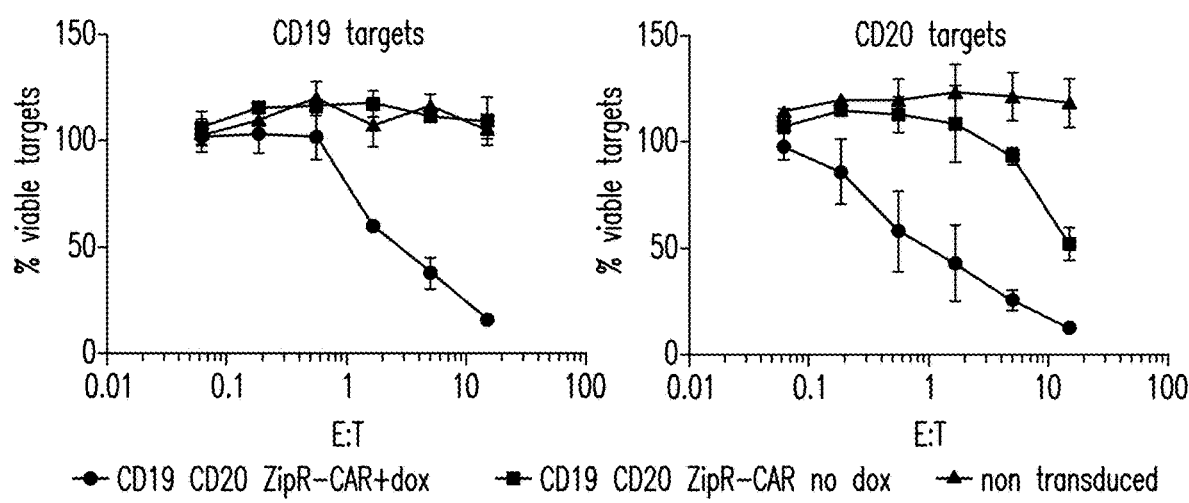
FIG. 25C

LEUCINE ZIPPER-BASED COMPOSITIONS AND METHODS OF USE

CROSS-REFERENCE TO RELATED APPLICATIONS

This application is a Continuation of International Patent Application No. PCT/US19/46758, filed Aug. 16, 2019, which claims priority to U.S. Provisional Application No. 62/765,058, filed on Aug. 16, 2018, and U.S. Provisional Application No. 62/798,168, filed Jan. 29, 2019, the contents of each of which are incorporated by reference in their entirety, and to each of which priority is claimed.

SEQUENCE LISTING

The present specification makes reference to a Sequence Listing (submitted electronically as a txt file named "072734_1205_SL.txt" on Feb. 16, 2021). The 072734_1205_SL.txt file was generated on Feb. 16, 2021, and is 138,031 bytes in size. The entire contents of the Sequence Listing are hereby incorporated by reference.

INTRODUCTION

The presently disclosed subject matter provides compositions and systems for cell-based immunotherapy. It relates to systems comprising a membrane-bound polypeptide and a soluble polypeptide, and methods of using the same.

BACKGROUND OF THE INVENTION

Cell-based immunotherapy or adoptive cell therapy is a therapy with curative potential for the treatment of cancer. T cells and other immune cells may be modified to target tumor antigens through the introduction of Chimeric Antigen Receptors (CARs) specific to selected antigens. Targeted T cell therapy using CARs has shown recent clinical success in treating hematologic malignancies. To ensure potent cancer eradication with minimal toxicity, CAR-based therapy may require targeting multiple tumor antigens, and that generally requires putting larger recombinant constructs into T cells and other immune cells. However, it is difficult to stably integrate large amounts of genetic information into primary T cells with the needed efficiency; this is a technical limitation of current cellular engineering. Both retroviruses and lentiviruses exhibit a significant decrease in viral titer as the viral vector insert approaches and exceeds the packaging limit of the virus (about 6-8 kb for retroviruses and about 10-12 kb for lentiviruses). Low viral titers result in low transduction efficiency and low copy number integrations per cell, leading to inferior levels of gene construct expression. Accordingly, there is a need for novel genetic engineering strategies to express larger CAR constructs targeting multiple antigens, and for therapeutic strategies capable of inducing potent cancer eradication with minimal toxicity and off-target activity.

SUMMARY OF THE INVENTION

The presently disclosed subject matter provides a system, comprising: a) a membrane-bound polypeptide comprising: i) a transmembrane domain, ii) an intracellular domain, and iii) an extracellular domain that comprises a first dimerization domain and a blocking spacer, and b) a soluble polypeptide comprising i) a second dimerization domain, and ii) an antigen binding domain that binds to an antigen. In certain embodiments, each of the first dimerization domain and the second dimerization domain comprises a leucine zipper domain, and the blocking spacer prevents dimerization of the membrane-bound polypeptide with the soluble polypeptide when the membrane-bound polypeptide and the soluble polypeptide are not expressed from the same cell.

In certain embodiments, the blocking spacer has a length of no more than about 25 amino acids. In certain embodiments, the blocking spacer has a length of between about 5 amino acids and about 25 amino acids. In certain embodiments, the blocking spacer is a truncated CD28 spacer or an IgG1 hinge.

The presently disclosed subject matter provides a system, comprising: a) a membrane-bound polypeptide comprising: i) a transmembrane domain, ii) an intracellular domain, and iii) an extracellular domain that comprises a first dimerization domain and a second dimerization domain that is capable of dimerizing with the first dimerization domain, and b) a soluble polypeptide comprising i) a third dimerization domain that is capable of dimerizing with the first dimerization domain, and ii) an antigen binding domain that binds to an antigen. In certain embodiments, each of the first dimerization domain and the second dimerization domain comprises a leucine zipper domain.

In certain embodiments, the antigen is selected from the group consisting of tumor antigens, pathogen antigens, immune checkpoint molecules, activating receptors, and biomarkers of a hematopoietic lineage cell. In certain embodiments, the antigen is a tumor antigen. In certain embodiments, the tumor antigen is selected from the group consisting of CD2, CD3, CD4, CD5, CD7, CD8, CD19, CD20, CD22, VpreB, CD30, CD33, CD38, CD40, CD44v6, CD70, CD79a, CD79b, CLL-1/CLEC12A, CD123, IL-3R complex, TIM-3, BCMA, TACI, SLAMF7, CD244, Epcam, E-cadherin, B7-H3 (also known as "CD276"), B7-H4, and combinations thereof.

In certain embodiments, the antigen is an activating receptor. In certain embodiments, the binding of the antigen binding domain to the activating receptor is capable of activating an antigen presenting cell (APC). In certain embodiments, the APC is a professional APC. In certain embodiments, the professional APC is selected from the group consisting of dendritic cells, macrophages, B cells, and combinations thereof. In certain embodiments, the APC is a non-professional APC. In certain embodiments, the APC is a cell of the myeloid lineage. In certain embodiments, the cell of myeloid lineage is selected from the group consisting of dendritic cells, macrophages, monocytes and combinations thereof. In certain embodiments, the activating receptor is selected from the group consisting of CD40, Toll Like Receptors (TLRs), FLT3, RANK, GM-CSF receptor, and combinations thereof.

In certain embodiments, the antigen is an immune checkpoint molecule. In certain embodiments, binding of the antigen binding domain to the immune checkpoint molecule is capable of blocking an immune checkpoint signal in an immunoresponsive cell. In certain embodiments, the immune checkpoint molecule is selected from the group consisting of PD-L1, CD200, B7-H3, B7-H4, HVEM, Galectin9, PD-1, CTLA-4, CD200R, TIM-3, Lag-3, TIGIT, and combinations thereof.

In certain embodiments, the antigen is a biomarker of a hematopoietic lineage cell. In certain embodiments, the biomarker of a hematopoietic lineage cell is selected from the group consisting of CD3, CD16, CD33, c-Kit, CD161, CD19, CD20, VpreB, luteinizing hormone receptor (LHCGR), CD123, IL-3R complex, CLEC12A/CLL-1, and combinations thereof. In certain embodiments, the system comprises at least four soluble polypeptides, wherein the antigen binding domain of each soluble polypeptide binds to a different biomarker of a hematopoietic lineage cell. In certain embodiments, each of the at least four soluble polypeptides comprises a dimerization domain that comprises a leucine zipper domain. In certain embodiments, the system comprises a first soluble polypeptide that binds to CD3, a second soluble polypeptide that binds to CD19, a third soluble polypeptide that binds to CD161 and a fourth soluble polypeptide that binds to c-Kit.

In certain embodiments, the system further comprises c) a chimeric antigen receptor (CAR) comprising a second antigen binding domain that binds to a second antigen, a transmembrane domain, and an intracellular activating domain. In certain embodiments, the system further comprises d) an inhibitory receptor comprising a leucine zipper domain, wherein the inhibitory receptor binds to a third antigen. In certain embodiments, the inhibitory receptor is a tyrosine phosphatase-based inhibitory receptor. In certain embodiments, the tyrosine phosphatase is selected from the group consisting of PTPRJ, PTPRC, PTPN22, and PTPN6. In certain embodiments, the inhibitory receptor constitutively inhibits and/or deactivates the CAR in the absence of the third antigen. In certain embodiments, binding of the inhibitory receptor to the third antigen prevents the inhibition and/or deactivation of the CAR by the inhibitory receptor.

The presently disclosed subject matter provides a system, comprising: a) a membrane-bound polypeptide comprising a transmembrane domain, an intracellular domain and an extracellular domain that comprises a first dimerization domain, and b) a soluble polypeptide comprising a second dimerization domain that is capable of dimerizing with the first dimerization domain, and a cytokine or a chemokine. In certain embodiments, each of the first dimerization domain and the second dimerization domain comprises a leucine zipper domain.

In certain embodiments, the cytokine is selected from the group consisting of IL-1, IL-2, IL-3, IL-7, IL-10, IL-12, IL-15, IL-17, IL-18, IL-21, IL-22, IL-36, and combinations thereof.

In certain embodiments, the chemokine is selected from the group consisting of CCL1, CCL8, CCL16, CCL17, CCL18, CCL22, and combinations thereof.

In certain embodiments, the extracellular domain of the membrane-bound polypeptide further comprises a third dimerization domain, and wherein the second dimerization domain is capable of dimerizing with the first dimerization domain prior to dimerization between the first dimerization domain and the third dimerization domain.

For any systems disclosed herewith, in certain embodiments, the extracellular domain of the membrane-bound polypeptide further comprises a linker between the first dimerization domain and the second dimerization domain. In certain embodiments, the linker comprises the amino acid sequence set forth in SEQ ID NO: 3.

For any systems disclosed herewith, in certain embodiments, the membrane-bound polypeptide and/or the soluble polypeptide further comprises a tag. In certain embodiments, the tag comprises an epitope tag that is recognized by a first antibody. In certain embodiments, the epitope tag is selected from the group consisting of a Myc-tag, a HA-tag, a Flag-tag, a V5-tag, a T7-tag, and combinations thereof. In certain embodiments, the tag comprises an affinity tag that binds to a substrate. In certain embodiments, the affinity tag is selected from the group consisting of a His-tag, a Strep-tag, an E-tag, a streptavidin binding protein tag (SBP-tag), and combinations thereof. In certain embodiments, the membrane-bound polypeptide and/or the soluble polypeptide further comprises a mimotope recognized by an antibody, wherein binding of the antibody to the mimotope mediates depletion of a cell comprising the membrane-bound polypeptide. In certain embodiments, the mimotope is CD20.

For any systems disclosed herewith, in certain embodiments, the intracellular domain of the membrane-bound polypeptide comprises one or more immune activating molecules. In certain embodiments, the intracellular domain does not comprise one or more immune activating molecules.

For any systems disclosed herewith, in certain embodiments, the first dimerization domain comprises the amino acid sequence set forth in SEQ ID NO: 1, SEQ ID NO: 2, or SEQ ID NO: 67, and each of the second and third dimerization domains comprise the amino acid sequence set forth in SEQ ID NO: 2, SEQ ID NO: 1, or SEQ ID NO: 67. In certain embodiments, the soluble polypeptide and the membrane-bound polypeptide are capable of forming a dimer when expressed from the same cell. In certain embodiments, the soluble polypeptide and the membrane-bound polypeptide are not capable of forming a dimer when expressed from different cells due to the dimerization between the first dimerization domain and the second dimerization domain of the membrane-bound polypeptide.

For any systems disclosed herewith, in certain embodiments, the intracellular domain of the membrane-bound polypeptide comprises a CD3ζ domain, a costimulatory domain, or a fragment or a combination thereof.

For any systems disclosed herewith, in certain embodiments, the system further comprises a suicide module. In certain embodiments, the suicide module is an inducible Caspase 9 polypeptide (iCasp9).

For any systems disclosed herewith, in certain embodiments, the extracellular domain of the membrane-bound polypeptide further comprises a spacer/hinge domain between the first dimerization domain and the transmembrane domain. In certain embodiments, the spacer/hinge domain comprises an epitope recognized by an antibody, wherein binding of the antibody to the epitope mediates depletion of a cell comprising the membrane-bound polypeptide. In certain embodiments, the spacer/hinge domain comprises a Thy1.1 molecule, a circular CD20 mimotope, or a truncated EGFR molecule (EGFRt).

For any systems disclosed herewith, in certain embodiments, the antigen binding domain of the soluble polypeptide comprises a single-chain variable fragment (scFv), a soluble ligand, a cytokine, a non-scFv-based antigen recognition motif, or a fragment or a combination thereof.

For any systems disclosed herewith, in certain embodiments, the membrane-bound polypeptide is expressed from a first vector. In certain embodiments, the soluble polypeptide is expressed from a second vector. In certain embodiments, the first vector and/or the second vector is a viral vector or a transposon-based vector.

For any systems disclosed herewith, in certain embodiments, the leucine zippers are orthogonal zippers.

For any systems disclosed herewith, in certain embodiments, the extracellular domain of the membrane-bound polypeptide further comprises a co-stimulatory ligand or a fragment thereof. In certain embodiments, the co-stimulatory ligand is selected from the group consisting of tumor necrosis factor (TNF) family members, immunoglobulin (Ig) superfamily members, and combinations thereof.

In certain embodiments, the TNF family member is selected from the group consisting of 4-1BBL, OX40L, CD70, GITRL, CD40L, CD30L, and combinations thereof. In certain embodiments, the co-stimulatory ligand is CD30L.

In certain embodiments, the Ig superfamily member is selected from the group consisting of CD80, CD86, ICOSLG, and combinations thereof.

In certain embodiments, the extracellular domain further comprises a dominant negative form of a molecule a fragment thereof. In certain embodiments, the molecule is selected from the group consisting of inhibitors of immune checkpoint molecules, tumor necrosis factor receptor superfamily (TNFRSF) members, Transforming growth factor beta (TGFβ) receptors, and combinations thereof. In certain embodiment, the immune checkpoint molecule is selected from the group consisting of PD-1, CTLA-4, B7-H3, B7-H4, BTLA, TIM-3, LAG-3, TIGIT, LAIR1, CD200, CD200R, HVEM, 2B4, CD160, Galectin9, and combination thereof. In certain embodiments, the immune checkpoint molecule is PD-1. In certain embodiments, the TNFRSF member is selected from the group consisting of Fas, a Tumor necrosis factor receptor, OX40, CD40, CD27, CD30, 4-1BB (also known as "CD137"), and combinations thereof. In certain embodiments, the dominant negative receptor comprises an extracellular domain of TGFβRII or a fragment thereof.

The presently disclosed subject matter provides cells comprising a system disclosed herein. In certain embodiments, the cell is an immunoresponsive cell. In certain embodiments, the cell is a cell of the lymphoid lineage or a cell of the myeloid lineage. In certain embodiments, the cell is selected from the group consisting of a T cell, a Natural Killer (NK) cell, and a stem cell from which lymphoid cells may be differentiated. In certain embodiments, the stem cell is a pluripotent stem cell. In certain embodiments, the pluripotent stem cell is an embryonic stem cell or an induced pluripotent stem cell.

In certain embodiments, the cell is a T cell. In certain embodiments, the T cell is selected from the group consisting of a cytotoxic T lymphocytes (CTL), a regulatory T cell, a and Natural Killer T (NKT) cell. In certain embodiments, the cell is a regulatory T cell. In certain embodiments, the cell is autologous. In certain embodiments, the cell is allogeneic.

The presently disclosed subject matter provides pharmaceutical compositions comprising the cell disclosed herein and one or more pharmaceutically acceptable excipients.

The presently disclosed subject matter provides methods for increasing an immune activity of an immunoresponsive cell, comprising introducing to an effective amount of the cells or a system disclosed herein to the immunoresponsive cell.

The presently disclosed subject matter provides a method for reducing tumor burden in a subject, comprising administering to a subject an effective amount of the cells or the pharmaceutical compositions disclosed herein. In certain embodiments, the method reduces the number of tumor cells, reduces tumor size, and/or eradicates the tumor in the subject.

The presently disclosed subject matter provides a method for treating and/or preventing a neoplasm in a subject, comprising administering to the subject an effective amount of the cells or the pharmaceutical compositions disclosed herein.

The presently disclosed subject matter provides a method for activating an antigen presenting cell (APC) in a subject, comprising administering to the subject an effective amount of the cells or the pharmaceutical compositions disclosed herein.

The presently disclosed subject matter provides a nucleic acid composition comprising (a) a first polynucleotide encoding a membrane-bound polypeptide comprising: i) a transmembrane domain, ii) an intracellular domain, and iii) an extracellular domain that comprises a first dimerization domain and a blocking spacer, and (b) a second polynucleotide encoding a soluble polypeptide comprising i) a second dimerization domain, and ii) an antigen binding domain that binds to an antigen. In certain embodiments, each of the first dimerization domain and the second dimerization domain comprises a leucine zipper domain, and the blocking spacer prevents the dimerization of the membrane-bound polypeptide with the soluble polypeptide when the membrane-bound polypeptide and the soluble polypeptide are not expressed from the same cell.

The presently disclosed subject matter provides a nucleic acid composition comprising (a) a first polynucleotide encoding a membrane-bound polypeptide comprising: i) a transmembrane domain, ii) an intracellular domain, and iii) an extracellular domain that comprises a first dimerization domain and a second dimerization domain that is capable of dimerizing with the first dimerization domain, and (b) a second polynucleotide encoding a soluble polypeptide comprising i) a third dimerization domain that is capable of dimerizing with the first dimerization domain, and ii) an antigen binding domain that binds to an antigen. In certain embodiments, each of the first dimerization domain and the second dimerization domain comprises a leucine zipper domain.

The presently disclosed subject matter provides a nucleic acid composition comprising (a) a first polynucleotide encoding a membrane-bound polypeptide comprising a transmembrane domain and an extracellular domain comprising a first dimerization domain, and (b) a second polynucleotide encoding a soluble polypeptide comprising a second dimerization domain that is capable of dimerizing with the first dimerization domain, and a cytokine or chemokine. In certain embodiments, each of the first dimerization domain and the second dimerization domain comprises a leucine zipper domain.

In certain embodiments, the first polynucleotide is encoded by a first vector, and the second polynucleotide is encoded by a second vector. In certain embodiments, the first vector and/or the second vector is a viral vector. In certain embodiments, the viral vector is a retroviral vector. In certain embodiments, the retroviral vector is a lentiviral vector. In certain embodiments, the first vector and/or the second vector is a transposon-based vector. In certain embodiments, the first vector is the same as the second vector. In certain embodiments, the first vector is the same as the second vector, for example, the vector backbone for the first and the second vectors can be the same, while the polypeptide or protein encoded/expressed by the first and second vectors can be different.

The presently disclosed subject matter also provides a combination of vectors comprising any nucleic acid composition disclosed herein.

BRIEF DESCRIPTION OF THE FIGURES

The following Detailed Description, given by way of example but not intended to limit the invention to specific embodiments described, may be understood in conjunction with the accompanying drawings.

FIG. 5 depicts the differences of "painting" of ZipR-CAR CD8 alpha hinge and IgG1 hinge.

FIGS. 25A-25C depict activity of leucine zipper-based constructs in accordance with certain embodiments of the presently disclosed subject matter. FIGS. 25A and 25B show expression ZipR-CAR. FIG. 25C shows cell killing activity of ZipR-CAR.

FIG. 26A depicts systems comprising chemokine-appended RR12EE345L leucine zipper and EE12RR345L 28z leucine zipper-based ZipR-CAR. CCL17 and CCL22 interact with CCR4; and CCL1 interacts with CCR8. FIG. 26B shows lysis of EL4 expressing CCR4 or CCR8 by the systems.

DETAILED DESCRIPTION OF THE INVENTION

Figure 1:
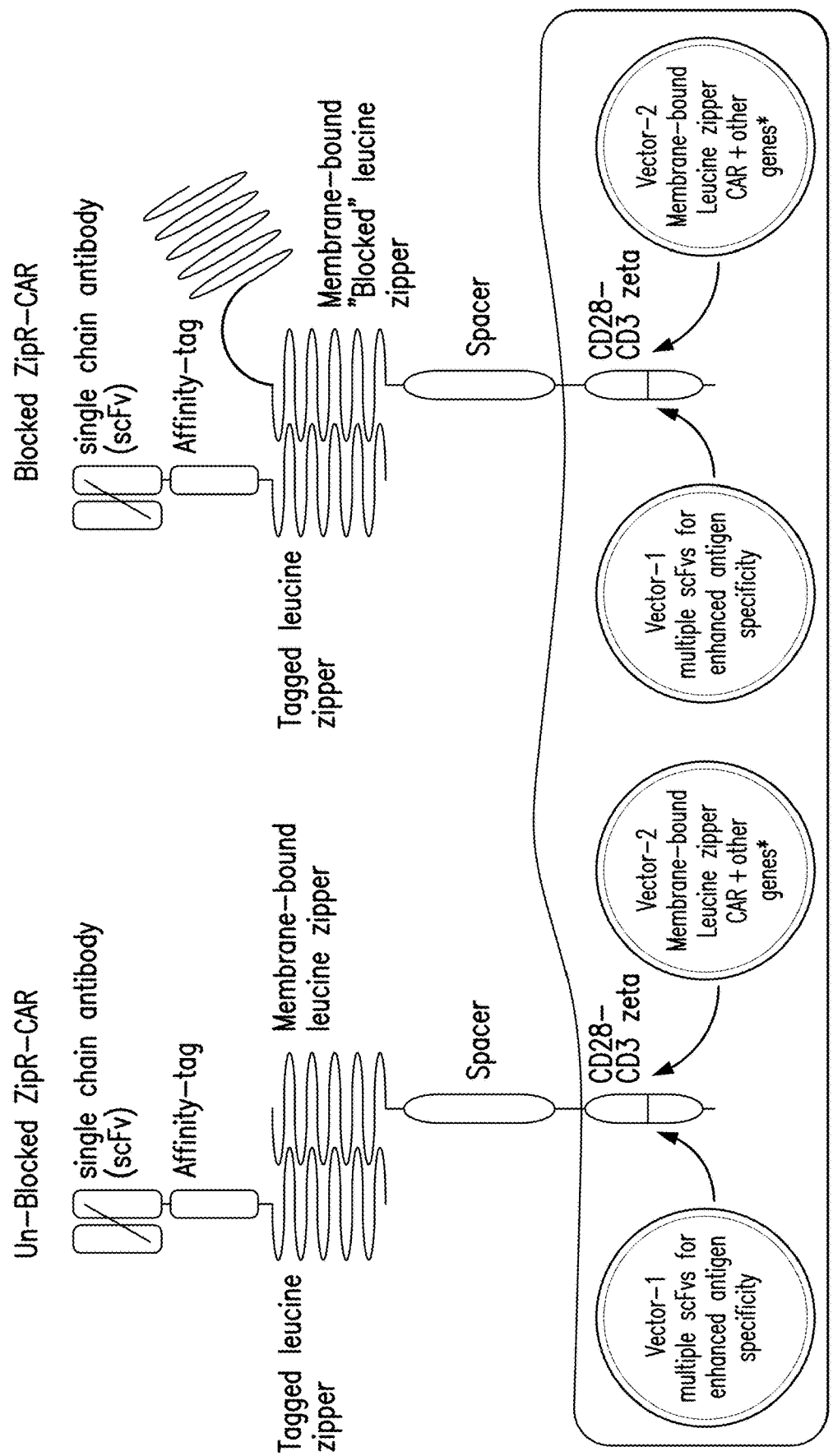
FIG. 1 depicts leucine zipper-based constructs in accordance with certain embodiments of the presently disclosed subject matter.

The presently disclosed subject matter provides systems and use of the systems for immunotherapy. The systems comprise a membrane-bound polypeptide and a soluble polypeptide, wherein the soluble polypeptide is capable of dimerizing with the membrane-bound polypeptide. The systems can enhance immune activity of an immunoresponsive cell.

1. Definition

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, the term "antibody" means not only intact antibody molecules, but also fragments of antibody molecules that retain immunogen-binding ability. Such fragments are also well known in the art and are regularly employed both in vitro and in vivo. Accordingly, as used herein, the term "antibody" means not only intact immunoglobulin molecules but also the well-known active fragments F(ab')$_2$, and Fab. F(ab')$_2$, and Fab fragments that lack the Fc fragment of intact antibody, clear more rapidly from the circulation, and may have less non-specific tissue binding of an intact antibody (Wahl et al., *J. Nucl. Med.* 24:316-325 (1983)). The antibodies of the invention comprise whole native antibodies, bispecific antibodies; chimeric antibodies; Fab, Fab', single chain V region fragments (scFv), fusion polypeptides, and unconventional antibodies. In certain embodiments, an antibody is a glycoprotein comprising at least two heavy (H) chains and two light (L) chains interconnected by disulfide bonds. Each heavy chain is comprised of a heavy chain variable region (abbreviated herein as $V_H$) and a heavy chain constant ($C_H$) region. The heavy chain constant region is comprised of three domains, CH1, CH2 and CH3. Each light chain is comprised of a light chain variable region (abbreviated herein as $V_L$) and a light chain constant $C_L$ region. The light chain constant region is comprised of one domain, $C_L$. The $V_H$ and $V_L$ regions can be further sub-divided into regions of hypervariability, termed complementarity determining regions (CDR), interspersed with regions that are more conserved, termed framework regions (FR). Each $V_H$ and $V_L$ is composed of three CDRs and four FRs arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1q) of the classical complement system.

As used herein, the term "single-chain variable fragment" or "scFv" is a fusion protein of the variable regions of the heavy ($V_H$) and light chains ($V_L$) of an immunoglobulin (e.g., mouse or human) covalently linked to form a $V_H$::$V_L$ heterodimer. The heavy ($V_H$) and light chains ($V_L$) are either joined directly or joined by a peptide-encoding linker (e.g., about 10, 15, 20, 25 amino acids), which connects the N-terminus of the $V_H$ with the C-terminus of the $V_L$, or the C-terminus of the $V_H$ with the N-terminus of the VL.

As used herein, a "linker" refers to a functional group (e.g., chemical or polypeptide) that covalently attaches two or more polypeptides or nucleic acids so that they are connected to one another. In certain embodiments, the linker comprises one or more amino acids used to couple two proteins together (e.g., to couple $V_H$ and $V_L$ domains or to couple two dimerization domains). The linker can be usually rich in glycine for flexibility, as well as serine or threonine for solubility.

As used herein, the term "vector" refers to any genetic element, such as a plasmid, phage, transposon, cosmid, chromosome, virus, virion, etc., which is capable of replication when associated with the proper control elements and which can transfer gene sequences into cells. Thus, the term includes cloning and expression vectors, including viral vectors and plasmid vectors.

As used herein, the term "expression vector" refers to a recombinant nucleic acid sequence, e.g., a recombinant DNA molecule, containing a desired coding sequence operably linked to appropriate nucleic acid sequences necessary for the expression of the coding sequence in a particular host organism. Nucleic acid sequences necessary for expression in prokaryotes usually include a promoter, an operator (optional), and a ribosome binding site, often along with other sequences. Nucleic acid sequences necessary for expression in eukaryotic cells can include, but are not limited to.

In certain embodiments, nucleic acid molecules useful in the presently disclosed subject matter include nucleic acid molecules that encode an antibody or an antigen-binding fragment thereof. Such nucleic acid molecules need not be 100% identical with an endogenous nucleic acid sequence, but will typically exhibit substantial identity. Polynucleotides having "substantial homology" or "substantial identity" to an endogenous sequence are typically capable of hybridizing with at least one strand of a double-stranded nucleic acid molecule.

As used herein, the term "disease" refers to any condition or disorder that damages or interferes with the normal function of a cell, tissue, or organ. Examples of diseases include neoplasia or pathogenic infection of a cell, tissue, or organ.

An "effective amount" (or "therapeutically effective amount") is an amount sufficient to effect a beneficial or desired clinical result upon treatment. An effective amount can be administered to a subject in one or more doses. In terms of treatment, an effective amount is an amount that is sufficient to palliate, ameliorate, stabilize, reverse or slow the progression of the disease (e.g., a neoplasia), or otherwise reduce the pathological consequences of the disease (e.g., a neoplasia). The dose comprising an effective amount is generally determined by the physician on a case-by-case basis and making such a determination is within the level of ordinary skill in the art. Several factors are typically taken into account when determining an appropriate dosage to achieve an effective amount. These factors include age, sex and weight of the subject, the condition being treated, the severity of the condition and the form and effective concentration of the cells (e.g., engineered immune cells) administered.

As used herein, the term "neoplasm" refers to a disease characterized by the pathological proliferation of a cell or tissue and its subsequent migration to or invasion of other tissues or organs. Neoplasia growth is typically uncontrolled and progressive, and occurs under conditions that would not elicit, or would cause cessation of, multiplication of normal cells. Neoplasia can affect a variety of cell types, tissues, or organs, including but not limited to an organ selected from the group consisting of skin, bladder, colon, bone, brain, breast, cartilage, glia, esophagus, fallopian tube, gallbladder, heart, intestines, kidney, liver, lung, lymph node, nervous tissue, ovaries, pleura, pancreas, prostate, skeletal muscle, spinal cord, spleen, stomach, testes, thymus, thyroid, trachea, urogenital tract, ureter, urethra, uterus, and vagina, or a tissue or cell type thereof. Neoplasia include cancers, such as melanoma, sarcomas, carcinomas, or plasmacytomas (malignant tumor of the plasma cells).

As used herein, the term "immunoresponsive cell" refers to a cell that functions in an immune response, and includes a progenitor of such cell, or a progeny of such cell.

As used herein, the term "isolated cell" refers to a cell that is separated from the molecular and/or cellular components that naturally accompany the cell.

As used herein, the term "isolated," "purified," or "biologically pure" refers to material that is free to varying degrees from components which normally accompany it as found in its native state. "Isolate" denotes a degree of separation from original source or surroundings. "Purify" denotes a degree of separation that is higher than isolation. A "purified" or "biologically pure" protein is sufficiently free of other materials such that any impurities do not materially affect the biological properties of the protein or cause other adverse consequences. That is, a nucleic acid or polypeptide of the presently disclosed subject matter is purified if it is substantially free of cellular material, viral material, or culture medium when produced by recombinant DNA techniques, or chemical precursors or other chemicals when chemically synthesized. Purity and homogeneity are typically determined using analytical chemistry techniques, for example, polyacrylamide gel electrophoresis or high performance liquid chromatography. The term "purified"

can denote that a nucleic acid or protein gives rise to essentially one band in an electrophoretic gel. For a protein that can be subjected to modifications, for example, phosphorylation or glycosylation, different modifications may give rise to different isolated proteins, which can be separately purified.

As used herein, the term "secreted" refers to a polypeptide that is released from a cell via the secretory pathway through the endoplasmic reticulum, Golgi apparatus, and as a vesicle that transiently fuses at the cell plasma membrane, releasing the proteins outside of the cell.

As used herein, the term "treating" or "treatment" refers to clinical intervention in an attempt to alter the disease course of the individual or cell being treated, and can be performed either for prophylaxis or during the course of clinical pathology. Therapeutic effects of treatment include, without limitation, preventing occurrence or recurrence of disease, alleviation of symptoms, diminishment of any direct or indirect pathological consequences of the disease, preventing metastases, decreasing the rate of disease progression, amelioration or palliation of the disease state, and remission or improved prognosis. By preventing progression of a disease or disorder, a treatment can prevent deterioration due to a disorder in an affected or diagnosed subject or a subject suspected of having the disorder, but also a treatment may prevent the onset of the disorder or a symptom of the disorder in a subject at risk for the disorder or suspected of having the disorder.

As used herein, the term "subject" refers to any animal (e.g., a mammal), including, but not limited to, humans, non-human primates, rodents, and the like (e.g., which is to be the recipient of a particular treatment).

The term "chimeric antigen receptor" or "CAR" as used herein refers to a molecule comprising an extracellular antigen-binding domain that is fused to an intracellular signaling domain that is capable of activating or stimulating an immunoresponsive cell, and a transmembrane domain. In certain embodiments, the extracellular antigen-binding domain of a CAR comprises a scFv. The scFv can be derived from fusing the variable heavy and light regions of an antibody. Alternatively or additionally, the scFv may be derived from Fab's (instead of from an antibody, e.g., obtained from Fab libraries). In certain embodiments, the scFv is fused to the transmembrane domain and then to the intracellular signaling domain. In certain embodiments, the CAR is selected to have high binding affinity or avidity for the antigen.

In certain non-limiting embodiments, an intracellular signaling domain of a CAR or a ZipR-CAR comprises a CD3ζ polypeptide, which can activate or stimulate a cell (e.g., a cell of the lymphoid lineage, e.g., a T cell). CD3ζ comprises 3 immunoreceptor tyrosine-based activation motifs (ITAMs), and transmits an activation signal to the cell (e.g., a cell of the lymphoid lineage, e.g., a T cell) after antigen is bound. The intracellular signaling domain of the CD3ζ-chain is the primary transmitter of signals from endogenous TCRs.

In certain non-limiting embodiments, a CAR or a ZipR-CAR can also comprise a spacer/hinge region that links the extracellular antigen-binding domain to the transmembrane domain. The spacer region can be flexible enough to allow the antigen binding domain to orient in different directions to facilitate antigen recognition. The spacer region can be the hinge region from IgG1, or the $CH_2CH_3$ region of immunoglobulin and fragments of CD3, a fragment of a CD28 polypeptide, a fragment of a CD8 polypeptide, a variant thereof, or a synthetic spacer sequence.

As used herein, "costimulatory molecules" refer to cell surface molecules other than antigen receptors or their ligands that are required for a response of lymphocytes to antigen. The at least one co-stimulatory signaling region can include a CD28 polypeptide (e.g., intracellular domain of CD28 or a fragment thereof), a 4-1BB polypeptide (e.g., intracellular domain of 4-1BB or a fragment thereof), an OX40 polypeptide (e.g., intracellular domain of OX40 or a fragment thereof), an ICOS polypeptide (e.g., intracellular domain of ICOS or a fragment thereof), a DAP-10 polypeptide (e.g., intracellular domain of DAP-10 or a fragment thereof), or a combination thereof. As used herein, the term a "co-stimulatory ligand" refers to a protein expressed on cell surface that upon binding to its receptor produces a co-stimulatory response, i.e., an intracellular response that effects the stimulation provided by an activating signaling domain (e.g., a CD3ζ signaling domain). Non-limiting examples of co-stimulatory ligands include tumor necrosis factor (TNF) family members, immunoglobulin (Ig) superfamily members, or combination thereof the co-stimulatory ligand is selected from the group consisting of tumor necrosis factor (TNF) family members, immunoglobulin (Ig) superfamily members, and combinations thereof. Non-limiting examples of TNF family member include 4-1BBL, OX40L, CD70, GITRL, CD40L, and CD30L. Non-limiting examples of Ig superfamily member include CD80, CD86, and ICOSLG. For example, 4-1BBL may bind to 4-1BB for providing an intracellular signal that in combination with a CAR signal induces an effector cell function of the CAR$^+$ T cell. CARs comprising an intracellular signaling domain that comprises a co-stimulatory signaling region comprising a 4-1BB, ICOS or DAP-10 co-stimulatory signaling domain are disclosed in U.S. Pat. No. 7,446,190, which is herein incorporated by reference in its entirety.

As used herein, the term "multimerization" refers to the formation of multimers (including dimers). Multimerization includes dimerization.

As used herein, the term "a conservative sequence modification" refers to an amino acid modification that does not significantly affect or alter the binding characteristics of the presently disclosed polypeptide (e.g., the extracellular antigen-binding domain of the polypeptide) comprising the amino acid sequence. Conservative modifications can include amino acid substitutions, additions and deletions. Modifications can be introduced into the human scFv of the presently disclosed polypeptide by standard techniques known in the art, such as site-directed mutagenesis and PCR-mediated mutagenesis. Amino acids can be classified into groups according to their physicochemical properties such as charge and polarity. Conservative amino acid substitutions are ones in which the amino acid residue is replaced with an amino acid within the same group. For example, amino acids can be classified by charge: positively-charged amino acids include lysine, arginine, histidine, negatively-charged amino acids include aspartic acid, glutamic acid, neutral charge amino acids include alanine, asparagine, cysteine, glutamine, glycine, isoleucine, leucine, methionine, phenylalanine, proline, serine, threonine, tryptophan, tyrosine, and valine. In addition, amino acids can be classified by polarity: polar amino acids include arginine (basic polar), asparagine, aspartic acid (acidic polar), glutamic acid (acidic polar), glutamine, histidine (basic polar), lysine (basic polar), serine, threonine, and tyrosine; nonpolar amino acids include alanine, cysteine, glycine, isoleucine, leucine, methionine, phenylalanine, proline, tryptophan, and valine. Thus, one or more amino acid residues within a CDR region can be replaced with other amino acid residues from the same group and the altered antibody can be tested for retained function (i.e., the functions set forth in (c) through (l) above) using the functional assays described herein. In certain embodiments, no more than one, no more than two, no more than three, no more than four, no more than five residues within a specified sequence or a CDR region are altered.

As used herein, the percent homology between two amino acid sequences is equivalent to the percent identity between the two sequences. The percent identity between the two sequences is a function of the number of identical positions shared by the sequences (i.e., % homology=#of identical positions/total #of positions×100), taking into account the number of gaps, and the length of each gap, which need to be introduced for optimal alignment of the two sequences. The comparison of sequences and determination of percent identity between two sequences can be accomplished using a mathematical algorithm.

The percent homology between two amino acid sequences can be determined using the algorithm of E. Meyers and W. Miller (Comput. Appl. Biosci., 4:11-17 (1988)) which has been incorporated into the ALIGN program (version 2.0), using a PAM120 weight residue table, a gap length penalty of 12 and a gap penalty of 4. In addition, the percent homology between two amino acid sequences can be determined using the Needleman and Wunsch (J. Mol. Biol. 48:444-453 (1970)) algorithm which has been incorporated into the GAP program in the GCG software package (available at www.gcg.com), using either a Blossum 62 matrix or a PAM250 matrix, and a gap weight of 16, 14, 12, 10, 8, 6, or 4 and a length weight of 1, 2, 3, 4, 5, or 6.

Additionally or alternatively, the amino acids sequences of the presently disclosed subject matter can further be used as a "query sequence" to perform a search against public databases to, for example, identify related sequences. Such searches can be performed using the XBLAST program (version 2.0) of Altschul, et al. (1990) J. Mol. Biol. 215: 403-10. BLAST protein searches can be performed with the XBLAST program, score=50, wordlength=3 to obtain amino acid sequences homologous to the specified sequences (e.g., heavy and light chain variable region sequences of scFv m903, m904, m905, m906, and m900) disclosed herein. To obtain gapped alignments for comparison purposes, Gapped BLAST can be utilized as described in Altschul et al., (1997) Nucleic Acids Res. 25(17):3389-3402. When utilizing BLAST and Gapped BLAST programs, the default parameters of the respective programs (e.g., XBLAST and NBLAST) can be used.

2. Membrane-Bound Polypeptide and Soluble Polypeptides

The presently disclosed subject matter provides systems and methods comprising a membrane-bound polypeptide and a soluble polypeptide, wherein the soluble polypeptide is capable of dimerizing with the membrane-bound polypeptide.

2.1 Membrane-Bound Polypeptide

In certain embodiments, the membrane-bound polypeptide comprises a transmembrane domain and an extracellular domain. In certain embodiments, the membrane-bound polypeptide further comprises a hinge/spacer domain and/or an intracellular domain.

2.1.1. Extracellular Domain

In certain embodiments, the extracellular domain of the membrane-bound polypeptide comprises a dimerization domain. The dimerization domain comprises a leucine zipper domain. In certain embodiments, the dimerization domain is capable of dimerizing with one or more dimerization domain comprised in the membrane-bound polypeptide. In certain embodiments, the dimerization domain is capable of dimerizing with one or more dimerization domain comprised in a soluble polypeptide disclosed herein.

In certain embodiments, the extracellular domain of the membrane-bound polypeptide comprises a first dimerization domain and a second dimerization domain that is capable of dimerizing with the first dimerization domain at a cell surface. In certain embodiments, the first dimerization domain comprises a first leucine zipper domain. In certain embodiments, the second dimerization domain comprises a second leucine zipper domain.

In certain embodiments, the leucine zipper domain comprises a dimerization domain of the Basic-region leucine zipper (bZIP) class of eukaryotic transcription factors. In certain embodiments, the leucine zipper domain comprises a specific alpha helix monomer that can dimerize with anther alpha helix monomer. In certain embodiments, the leucine zipper domain comprises an EE domain that comprises one or more acidic amino acids, e.g., glutamic acid (E). In certain embodiments, the leucine zipper domain comprises an RR domain that comprises one or more basic amino acids, e.g., arginine (R). In certain embodiments, the first leucine zipper domain comprises an RR domain and the second leucine zipper domain comprises an EE domain.

In certain embodiments, the RR domain comprises an amino acid sequence that is at least about 80%, at least about 85%, at least about 90%, at least about 95%, at least about 96%, at least about 97%, at least about 98%, at least about 99% or at least about 100% homologous or identical to the amino acid sequence set forth in SEQ ID NO: 1 or a fragment thereof. In certain embodiments, the RR domain comprises a modification of SEQ ID NO: 1 or a fragment thereof. In certain embodiments, the modification comprises up to one, up to two, or up to three amino acid substitutions. SEQ ID NO: 1 is provided below.

```
                                               [SEQ ID NO: 1]
LEIRAAFLRQRNTALRTEVAELEQEVQRLENEVSQYETRYGPL GGGK
```

An exemplary nucleotide sequence encoding the amino acid sequence of SEQ ID NO: 1 is set forth in SEQ ID NO: 58, which is provided below.

```
                                              [SEQ ID NO: 58]
CTGGAGATCCGCGCTGCATTTTTGCGACAAAGAAATACCGCTTTGCGAAC

CGAAGTGGCCGAGTTGGAGCAGGAAGTACAACGCCTGGAAAATGAAGTCA

GCCAATACGAAACTCGATATGGACCTCTCGGAGGTGGAAAG
```

In certain embodiments, the RR domain comprises a modification of SEQ ID NO: 1, wherein the modification consists of or has one amino acid substitution. In certain embodiments, the RR domain comprises the amino acid sequence set forth in SEQ ID NO: 59 or SEQ ID NO: 60. SEQ ID NO: 59 and SEQ ID NO: 60 are provided below.

```
                                              [SEQ ID NO: 59]
LEIEAAFLRQRNTALRTEVAELEQEVQRLENEVSQYETRYGPLGGGK

[SEQ ID NO: 60]
LEIRAAFLRQRNTALRTRVAELEQEVQRLENEVSQYETRYGPLGGGK
```

An exemplary nucleotide sequence encoding the amino acid sequence of SEQ ID NO: 59 is set forth in SEQ ID NO: 61, which is provided below.

[SEQ ID NO: 61]
CTGGAGATCGAAGCTGCATTTTTGCGACAAAGAAATACCGCTTTGCGAAC

CGAAGTGGCCGAGTTGGAGCAGGAAGTACAACGCCTGGAAAATGAAGTCA

GCCAATACGAAACTCGATATGGACCTCTCGGAGGTGGAAAG

An exemplary nucleotide sequence encoding the amino acid sequence of SEQ ID NO: 60 is set forth in SEQ ID NO: 62, which is provided below.

[SEQ ID NO: 62]
CTGGAGATCCGCGCTGCATTTTTGCGACAAAGAAATACCGCTTTGCGAAC

CCGCGTGGCCGAGTTGGAGCAGGAAGTACAACGCCTGGAAAATGAAGTCA

GCCAATACGAAACTCGATATGGACCTCTCGGAGGTGGAAAG

In certain embodiments, the RR domain comprises a modification of SEQ ID NO: 1, wherein the modification consists of or has two amino acid substitutions. In certain embodiments, the RR domain comprises the amino acid sequence set forth in SEQ ID NO: 63 or SEQ ID NO: 64. SEQ ID NO: 63 and SEQ ID NO: 64 are provided below.

[SEQ ID NO: 63]
LEIEAAFLRQENTALRTEVAELEQEVQRLENEVSQYETRYGPLGGGK

[SEQ ID NO: 64]
LEIRAAFLRQRNTALRTRVAELEQRVQRLENEVSQYETRYGPLGGGK

An exemplary nucleotide sequence encoding the amino acid sequence of SEQ ID NO: 63 is set forth in SEQ ID NO: 65, which is provided below.

[SEQ ID NO: 65]
CTGGAGATCGAAGCTGCATTTTTGCGACAAGAAAATACCG

CTTTGCGAACCGAAGTGGCCGAGTTGGAGCAGGAAGTACA

ACGCCTGGAAAATGAAGTCAGCCAATACGAAACTCGATAT

GGACCTCTCGGAGGTGGAAAG

An exemplary nucleotide sequence encoding the amino acid sequence of SEQ ID NO: 64 is set forth in SEQ ID NO: 66, which is provided below.

[SEQ ID NO: 66]
CTGGAGATCCGCGCTGCATTTTTGCGACAAAGAAATACCG

CTTTGCGAACCCGCGTGGCCGAGTTGGAGCAGCGCGTACA

ACGCCTGGAAAATGAAGTCAGCCAATACGAAACTCGATAT

GGACCTCTCGGAGGTGGAAAG

In certain embodiments, the RR domain comprises a modification of SEQ ID NO: 1, wherein the modification consists of or has three amino acid substitutions. In certain embodiments, the RR domain comprises the amino acid sequence set forth in SEQ ID NO: 67 or SEQ ID NO: 68. SEQ ID NO: 67 and SEQ ID NO: 68 are provided below.

[SEQ ID NO: 67]
LEIEAAFLRQENTALRTRVAELEQEVQRLENEVSQYETRYGPLGGGK

[SEQ ID NO: 68]
LEIRAAFLRQRNTALRTRVAELEQRVQRLENRVSQYETRYGPLGGGK

An exemplary nucleotide sequence encoding the amino acid sequence of SEQ ID NO: 67 is set forth in SEQ ID NO: 69, which is provided below.

[SEQ ID NO: 69]
CTGGAGATCGAAGCTGCATTTTTGCGACAAGAAAATACCGCTTTGCG

AACCCGAGTGGCCGAGTTGGAGCAGGAAGTACAACGCCTGGAAAATG

AAGTCAGCCAATACGAAACTCGATATGGACCTCTCGGAGGTGGAAAG

An exemplary nucleotide sequence encoding the amino acid sequence of SEQ ID NO: 68 is set forth in SEQ ID NO: 70, which is provided below.

[SEQ ID NO: 70]
CTGGAGATCCGCGCTGCATTTTTGCGACAAAGAAATACCGCTTTGCGA

ACCCGAGTGGCCGAGTTGGAGCAGCGAGTACAACGCCTGGAAAATCGA

GTCAGCCAATACGAAACTCGATATGGACCTCTCGGAGGTGGAAAG

In certain embodiment, the modification is positioned in the "g" residues of the RR domain of the leucine zipper. In certain embodiment, the modification reduces heterodimerization affinity between the membrane-bound polypeptide and a linked soluble polypeptide.

In certain embodiments, the EE domain comprises an amino acid sequence that is at least about 80%, at least about 85%, at least about 90%, at least about 95%, at least about 96%, at least about 97%, at least about 98%, at least about 99% or at least about 100% homologous or identical to the amino acid sequence set forth in SEQ ID NO: 2 or a fragment thereof. In certain embodiments, the EE domain comprises a modification of SEQ ID NO: 2 or a fragment thereof. In certain embodiments, the modification comprises up to one, up to two, or up to three amino acid substitutions. SEQ ID NO: 2 is provided below.

[SEQ ID NO: 2]
LEIEAAFLERENTALETRVAELRQRVQRLRNRVSQYRTRYGPL GGGK

An exemplary nucleotide sequence encoding the amino acid sequence of SEQ ID NO: 2 is set forth in SEQ ID NO: 71, which is provided below.

[SEQ ID NO: 71]
CTGGAGATTGAGGCTGCATTTCTTGAAAGAGAAAACACTGCTCTTGAG

ACAAGAGTCGCCGAACTGAGGCAGCGCGTTCAGCGCCTGCGGAACCGA

GTATCTCAATACAGGACTCGGTACGGACCACTGGGGGGCGGTAAG

In certain embodiments, the extracellular domain further comprises a linker between the first dimerization domain and the second dimerization domain. In certain embodiments, the linker comprises the amino acid sequence set forth in SEQ ID NO: 3 or SEQ ID NO: 20. SEQ ID Nos: 3 and 20 are provided below.

```
                                                    [SEQ ID NO: 3]
              GGGGSGGGGSGGGGSGGGS

[SEQ ID NO: 20]
              GGGGSGGGGSGGGGS
```

In certain embodiments, a dimerization domain comprises an orthogonal zipper. Orthogonal zippers are coiled coil domains that form heterodimers with their specific partner only and not with other zipper domains. In certain embodiments, orthogonality refers to sets of molecules (e.g., leucine zippers) that are non-cross-reactive, i.e., "orthogonal", to other sets of molecules. For example, A+B=AB and C+D=CD, but neither A nor B bind to C or D, and vice versa.

In certain embodiments, the first and second leucine zipper domains of the membrane-bound polypeptide are a pair of orthogonal zippers i.e., the first and the second leucine zipper domains are the specific partners for each other to form heterodimers. Orthogonal zippers include, but are not limited to, RR/EE zippers, Fos/Jun zippers and Fos/synZip zippers. Fos/Jun zippers are previously disclosed in Ransone et al., *Genes Dev.* 1989 June; 3(6):770-81; Kohler et al., Biochemistry. (2001 January); 9; 40(1):130-42, which are incorporated by reference herein. Fos/synZip zippers are previously disclosed in Grigoryan et al., *Nature*. (2009); 458, 859-864; Reinke et al., *J Am Chem Soc*. (2010); 132, 6025-6031, which are incorporated by reference herein.

In certain embodiments, the orthogonal zippers comprise an amino acid sequence that is at least about 80%, at least about 85%, at least about 90%, at least about 95%, at least about 96%, at least about 97%, at least about 98%, at least about 99% or at least about 100% homologous or identical to RR/EE zippers, Fos/Jun zippers or Fos/synZip zippers, or a fragment thereof, and/or may optionally comprise up to one or up to two or up to three conservative amino acid substitutions.

Examples of synZip-9, Fos and Jun zippers are set forth in SEQ ID NOs: 4, 5 and 6, respectively.

```
                                                    [SEQ ID NO: 4]
              GSQKVESLKQKIEEL KQRKAQLKNDIANLEKEIAYAET

[SEQ ID NO: 5]
              GSELTDTLQAETDQLEDEKSALQTEIANLLKEKEKLEFILAAHR

[SEQ ID NO: 6]
              ERISRLEEKVKTLKSQNTELASTASLLREQVAQLKQKVLSHVLE
```

In certain embodiments, the extracellular domain of the membrane-bound polypeptide further comprises a spacer/hinge domain between a dimerization domain and a transmembrane domain.

In certain embodiments, the spacer/hinge domain is flexible enough to allow the dimerization domain to orient in different directions to facilitate antigen recognition after dimerizing with the soluble polypeptide disclosed herein. The spacer region can be the hinge region from IgG1, or the $CH_2CH_3$ region of immunoglobulin and fragments of CD3, a fragment of a CD28 polypeptide, a fragment of a CD8 polypeptide, a variation of any of the foregoing that is at least about 80%, at least about 85%, at least about 90%, at least about 95%, at least about 96%, at least about 97%, at least about 98%, at least about 99% or at least about 100% identical thereto, or a synthetic spacer sequence.

In certain embodiments, the spacer/hinge domain comprises an epitope recognized by an antibody. In certain embodiments, binding of the antibody to the epitope mediates a deletion of a cell comprising the membrane-bound polypeptide. In certain embodiments, the spacer/hinge domain comprises a Thy1.1 molecule, a truncated EGFR molecule (EGFRt), CD22 immunoglobulin-like domain epitope, an IgG/Fc domain (can be a Fc from any IgG), CD2, CD20 cyclic mimotope, CD30, CD52, or HER2.

In certain embodiments, the Thy1.1 molecule comprises or has the amino acid sequence set forth in SEQ ID NO: 95.

```
                                                    [SEQ ID NO: 95]
   QKVTSLTACLVDQSLRLDCRHENTSSSPIQYEFSLTRETKKHVL

FGTVGVPEHTYRSRTNFTSKYNMKVLYLSAFTSKDEGTYTCALH

HSGHSPPISSQNVTVLRDKLVKC
```

In certain embodiments, the EGFRt comprises or has the amino acid sequence set forth in SEQ ID NO: 96.

```
                                                    [SEQ ID NO: 96]
   RKVCNGIGIGEFKDSLSINATNIKHFKNCTSISGDLHILPVAFRG

DSFTHIPPLDPQELDILKTVKEITGFLLIQAWPENRIDLHAFENL

EIIRGRIKQHGQFSLAVVSLNITSLGLRSLKEISDGDVIISGNKN

LCYANTINWKKLFGTSGQKTKIISNRGENSCKATGQVCHALCSPE

GCWGPEPRDCVSCRNVSRGRECVDKCNLLEGEPREFVENSECIQC

HPECLPQAMNITCTGRGPDNCIQCAHYIDGPHCVKTCPAGVMGEN

NTLVWKYADAGHVCHLCHPNCTYGCTGPGLEGCPINGPKIPS
```

In certain embodiments, the membrane-bound polypeptide further comprises a blocking spacer, wherein the blocking spacer is capable of preventing dimerization of the membrane-bound polypeptide with a soluble polypeptide when the membrane-bound polypeptide and the soluble polypeptide are not expressed from the same cell. In certain embodiments, the blocking spacer comprises a minimum spacer of no more than about 20 to about 30 amino acid residues. In certain embodiments, the blocking spacer comprises no more than about 25 amino acid residues. In certain embodiments, the blocking spacer comprises about 1, about 2, about 3, about 4, about 5, about 6, about 7, about 8, about 9 about 10, about 11, about 12, about 13, about 14, about 15, about 16, about 17, about 18, about 19 or about 20 amino acid residues. In certain embodiments, the blocking spacer comprises between about 5 amino acid residues and about 25 amino acid residues, between about 5 amino acid residues and about 20 amino acid residues, between about 10 amino acid residues and about 25 amino acid residues or between about 10 amino acid residues and about 20 amino acid residues.

In certain embodiments, the blocking spacer comprises an amino acid sequence that is at least about 80%, at least about 85%, at least about 90%, at least about 95%, at least about 96%, at least about 97%, at least about 98%, at least about 99% or at least about 100% homologous or identical to a truncated CD28 spacer set forth in SEQ ID NO: 7 or 21, or a fragment thereof. In certain embodiments, the blocking spacer comprises an amino acid sequence that is at least about 80%, at least about 85%, at least about 90%, at least about 95%, at least about 96%, at least about 97%, at least about 98%, at least about 99% or at least about 100% homologous to an IgG1 hinge set forth in SEQ ID NO: 8 or SEQ ID NO: 22, or a fragment thereof. In certain embodiments, the blocking spacer comprises a modification of SEQ ID NO: 7, SEQ ID NO: 8, SEQ ID NO: 21, and SEQ ID NO:

22, wherein the modification comprises up to one, up to two, or up to three amino acid substitutions.

[SEQ ID NO: 7]
CHTQSSPKL

[SEQ ID NO: 8]
VPRDCGCKPCICT

[SEQ ID NO: 21]
CPSPLFPGPSKP

[SEQ ID NO: 22]
EPKSCDKTHTCPPC

In certain embodiments, the blocking spacer has a length of no more than about 25 amino acids. In certain embodiments, the blocking spacer has a length of between about 5 amino acids and about 25 amino acids. In certain embodiments, the blocking spacer is a truncated CD28 spacer or an IgG1 hinge.

In certain non-limiting embodiments, the extracellular domain of the membrane-bound polypeptide comprises at least one co-stimulatory ligand or a fragment thereof.

Non-limiting examples of co-stimulatory ligands include tumor necrosis factor (TNF) family members, immunoglobulin (Ig) superfamily members, and a combination thereof. In certain embodiments, the co-stimulatory ligand is selected from the group consisting of tumor necrosis factor (TNF) family members, immunoglobulin (Ig) superfamily members, and combinations thereof. In certain embodiments, the TNF family member is selected from the group consisting of 4-1BBL, OX40L, CD70, GITRL, CD40L, and CD30L.

In certain embodiments, the co-stimulatory ligand is CD30L. CD30L-expressing systems can target CD30 on T cell lymphoma and Hodgkin lymphoma.

In certain embodiments, the Ig superfamily member is selected from the group consisting of CD80, CD86, and ICOSLG.

In certain embodiments, the co-stimulatory ligand is CD80. In certain embodiments, the CD80 is a mouse CD80. In certain embodiments, the CD80 comprises the amino acid sequence set forth in SEQ ID NO: 72. In certain embodiments, the CD80 is a human CD80. In certain embodiments, the CD80 comprises the amino acid sequence set forth in SEQ ID NO: 73. SEQ ID Nos: 72 and 73 are provided below.

[SEQ ID NO: 72]
VDEQLSKSVKDKVLLPCRYNSPHEDESEDRIYWQKHDKVV

LSVIAGKLKVWPEYKNRTLYDNTTYSLIILGLVLSDRGTY

SCVVQKKERGTYEVKHLALVKLSIKADFSTPNITESGNPS

ADTKRITCFASGGFPKPRFSWLENGRELPGINTTISQDPE

SELYTISSQLDFNTTRNHTIKCLIKYGDAHVSEDFTWEKP

PEDPPDSKNTLVLFGAGFGAVITVVVIVVIIKCFCKHRSC

FRRNEASRETNNSLTFGPEEALAEQTVFL

[SEQ ID NO: 73]
VIHVTKEVKEVATLSCGHNVSVEELAQTRIYWQKEKKMVL

TMMSGDMNIWPEYKNRTIFDITNNLSIVILALRPSDEGTY

ECVVLKYEKDAFKREHLAEVTLSVKADEPTPSISDFEIPT

SNIRRIICSTSGGFPEPHLSWLENGEELNAINTTVSQDPE

TELYAVSSKLDFNMTTNHSFMCLIKYGHLRVNQTENWNTT

KQEHFPDNLLPSWAITLISVNGIFVICCLTYCFAPRCRER

RRNERLRRESVRPV

In certain embodiments, the co-stimulatory ligand is 4-1BBL. In certain embodiments, the 4-1BBL is a mouse 4-1BBL. In certain embodiments, the 4-1BBL comprises the amino acid sequence set forth in SEQ ID NO: 74. In certain embodiments, the 4-1BBL is a human 4-1BBL. In certain embodiments, the 4-1BBL comprises the amino acid sequence set forth in SEQ ID NO: 75. SEQ ID Nos: 74 and 75 are provided below.

[SEQ ID NO: 74]
MDQHTLDVEDTADARHPAGTSCPSDAALLRDTGLLADAAL

LSDTVRPTNAALPTDAAYPAVNVRDREAAWPPALNFCSRH

PKLYGLVALVLLLLIAACVPIFTRTEPRPALTITTSPNLG

TRENNADQVTPVSHIGCPNTTQQGSPVFAKLLAKNQASLC

NTTLNWHSQDGAGSSYLSQGLRYEEDKKELVVDSPGLYYV

FLELKLSPTFTNTGHKVQGWVSLVLQAKPQVDDFDNLALT

VELFPCSMENKLVDRSWSQLLLLKAGHRLSVGLRAYLHGA

QDAYRDWELSYPNTTSFGLFLVKPDNPWE

[SEQ ID NO: 75]
MEYASDASLDPEAPWPPAPRARACRVLPWALVAGLLLLLL

LAAACAVFLACPWAVSGARASPGSAASPRLREGPELSPDD

PAGLLDLRQGMFAQLVAQNVLLIDGPLSWYSDPGLAGVSL

TGGLSYKEDTKELVVAKAGVYYVFFQLELRRVVAGEGSGS

VSLALHLQPLRSAAGAAALALTVDLPPASSEARNSAFGFQ

GRLLHLSAGQRLGVHLHTEARARHAWQLTQGATVLGLFRV

TPEIPAGLPSPRSE

In certain non-limiting embodiments, the extracellular domain of the membrane-bound polypeptide further comprises a dominant negative molecule or a fragment thereof. In certain embodiments, the dominant negative molecule is selected from the group consisting of inhibitors of immune checkpoint molecules, tumor necrosis factor receptor superfamily (TNFRSF) members, and TGFβ receptors. In certain embodiment, the immune checkpoint molecule is selected from the group consisting of PD-1, CTLA-4, B7-H3, B7-H4, BTLA, TIM-3, LAG-3, TIGIT, LAIR1, CD200, CD200R, HVEM, 2B4, CD160, Galectin9, and combinations thereof. In certain embodiments, the immune checkpoint molecule is PD-1. In certain embodiments, the TNFRSF member is selected from the group consisting of Fas, a Tumor necrosis factor receptor, OX40, CD40, CD27, CD30, 4-1BB, and combinations thereof. In certain embodiments, the dominant negative receptor comprises an extracellular domain of TGFβRII or a fragment thereof.

In certain non-limiting embodiments, the dominant genitive molecule is an inhibitor of an immune checkpoint molecule. Details of dominant negative (DN) forms of inhibitors of an immune checkpoint molecule are disclosed in WO2017/040945 and WO2017/100428, the contents of each of which are incorporated by reference herein in their entireties. In certain embodiments, the extracellular domain of the membrane-bound polypeptide further comprises a dominant negative form of an immune checkpoint inhibitor disclosed in WO2017/040945. In certain embodiments, the extracellular domain of the membrane-bound polypeptide further comprises a dominant negative form of an immune checkpoint inhibitor disclosed in WO2017/100428.

In certain embodiments, the dominant negative molecule is a PD-1 dominant negative (i.e., PD-1 DN) molecule. In certain embodiments, the PD-1 DN comprises (a) at least a fragment of an extracellular domain of PD-1 comprising a ligand binding region, and (b) a transmembrane domain.

In certain embodiments, the PD-1 DN is a mouse PD-1 DN. In certain embodiments, the PD-1 DN comprises or has the amino acid sequence set forth in SEQ ID NO: 76, which is provided below.

[SEQ ID NO: 76]
LEVPNGPWRSLTFYPAWLTVSEGANATFTCSLSNWSEDLM

LNWNRLSPSNQTEKQAAFCNGLSQPVQDARFQIIQLPNRH

DFHMNILDTRRNDSGIYLCGAISLHPKAKIEESPGAELVV

TERILETSTRYPSPSPKPEGRFQGM

In certain embodiments, the extracellular domain of the membrane-bound polypeptide further comprises a tag. In certain embodiments, the tag comprises an epitope tag recognized by a first antibody. Non-limiting examples of epitope tags include Myc-tag, a HA-tag, a Flag-tag, a V5-tag, and a T7-tag.

In certain embodiments, the tag comprises an affinity tag that binds to a substrate. Non-limiting examples of affinity tags include a His-tag, a Strep-tag, an E-tag, and a streptavidin binding protein tag (SBP-tag).

Furthermore, the extracellular domain of the membrane-bound polypeptide can further comprise a mimotope recognized by a second antibody. Binding of the second antibody to the mimotope can mediates depletion of a cell comprising the membrane-bound polypeptide. In certain embodiments, the mimotope is a CD20 mimotope recognized by an anti-CD20 antibody. In certain embodiments, the anti-CD20 antibody is Rituxumab. In certain embodiments, the CD20 mimotope is a circular CD20 mimotope.

In certain embodiments, the CD20 mimotope comprises or has the amino acid sequence set forth in SEQ ID NO: 77, which is provided below.

[SEQ ID NO: 77]
CPYSNPSLC 2.1.2. Transmembrane Domain

Different transmembrane domains can result in different receptor stabilities. In accordance with the presently disclosed subject matter, the transmembrane domain can comprise a CD8 polypeptide (e.g., the transmembrane domain of CD8 or a fragment thereof), a CD28 polypeptide (e.g., the transmembrane domain of CD28 or a fragment thereof), a CD3ζ polypeptide (e.g., the transmembrane domain of CD3ζ or a fragment thereof), a CD4 polypeptide (e.g., the transmembrane domain of CD4 or a fragment thereof), a 4-1BB polypeptide (e.g., the transmembrane domain of 4-1BB or a fragment thereof), an OX40 polypeptide (e.g., the transmembrane domain of OX40 or a fragment thereof), an ICOS polypeptide (e.g., the transmembrane domain of ICOS or a fragment thereof), a CD2 polypeptide (e.g., the transmembrane domain of CD2 or a fragment thereof), a synthetic peptide (not based on a protein associated with the immune response), or a combination thereof.

In certain embodiments, the transmembrane domain of the membrane-bound polypeptide comprises a CD8 polypeptide (e.g., the transmembrane domain of CD8 or a fragment thereof). In certain embodiments, the CD8 polypeptide comprises or has an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_001139345.1 (SEQ ID NO: 9) or a fragment thereof, and/or may optionally comprise up to one or up to two or up to three conservative amino acid substitutions. In certain embodiments, the CD8 polypeptide comprises or has an amino acid sequence that is a consecutive fragment of SEQ ID NO: 9 which is at least 20, or at least 30, or at least 40, or at least 50, and up to 235 amino acids in length. Alternatively or additionally, in non-limiting various embodiments, the CD8 polypeptide comprises or has an amino acid sequence of amino acids 1 to 235, 1 to 50, 50 to 100, 100 to 150, 150 to 200, 183 to 203, or 200 to 235 of SEQ ID NO: 9. In certain embodiments, the transmembrane domain of the membrane-bound polypeptide comprises a CD8 polypeptide comprising or having an amino acid sequence of amino acids 183 to 203 of SEQ ID NO: 9. SEQ ID NO: 9 is provided below.

[SEQ ID NO: 9]
MALPVTALLLPLALLLHAARPSQFRVSPLDRTWNLGETVE

LKCQVLLSNPTSGCSWLFQPRGAAASPTFLLYLSQNKPKA

AEGLDTQRFSGKRLGDTFVLTLSDFRRENEGYYFCSALSN

SIMYFSHFVPVFLPAKPTTTPAPRPPTPAPTIASQPLSLR

PEACRPAAGGAVHTRGLDFACDIYIWAPLAGTCGVLLLSL

VITLYCNHRNRRRVCKCPRPVVKSGDKPSLSARYV

In certain embodiments, the CD8 polypeptide comprises or has an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: AAA92533.1 (SEQ ID NO: 10) or a fragment thereof, and/or may optionally comprise up to one or up to two or up to three conservative amino acid substitutions. In certain embodiments, the CD8 polypeptide comprises or has an amino acid sequence that is a consecutive fragment of SEQ ID NO: 10 which is at least about 20, or at least about 30, or at least about 40, or at least about 50, or at least about 60, or at least about 70, or at least about 100, or at least about 200, and up to 247 amino acids in length. Alternatively or additionally, in non-limiting various embodiments, the CD8 polypeptide comprises or has an amino acid sequence of amino acids 1 to 247, 1 to 50, 50 to 100, 100 to 150, 150 to 200, or 200 to 247 of SEQ ID NO: 10. SEQ ID NO: 10 is provided below.

[SEQ ID NO: 10]
MASPLTRFLSLNLLLMGESIILGSGEAKPQ

APELRIFPKKMDAELGQKVDLVCEVLGSVS

QGCSWLFQNSSSKLPQPTFVVYMASSHNKI

```
TWDEKLNSSKLFSAVRDTNNKYVLTLNKFS

KENEGYYFCSVISNSVMYFSSVVPVLQKVN

STTTKPVLRTPSPVHPTGTSQPQRPEDCRP

RGSVKGTGLDFACDIYIWAPLAGICVAPLL

SLIITLICYHRSRKRVCKCPRPLVRQEGKP

RPSEKIV
```

In certain embodiments, the CD8 polypeptide comprises or has the amino acid sequence set forth in SEQ ID NO: 11, which is provided below:

```
                                      [SEQ ID NO: 11:]
            IYIWAPLAGICVALLLSLIITLICY
```

In certain embodiments, the CD8 polypeptide comprises or has the amino acid sequence set forth in SEQ ID NO: 12, which is provided below:

```
                                      [SEQ ID NO: 12:]
            IYIWAPLAGTCGVLLLSLVIT
```

In certain embodiments, the transmembrane domain of the membrane-bound polypeptide comprises a CD28 polypeptide (e.g., the transmembrane domain of CD28 or a fragment thereof). The CD28 polypeptide can have an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: P10747 or NP_006130 (SEQ ID No: 14), or a fragment thereof, and/or may optionally comprise up to one or up to two or up to three conservative amino acid substitutions. In certain embodiments, the CD28 polypeptide comprises or has an amino acid sequence that is a consecutive fragment of SEQ ID NO: 14 which is at least 20, or at least 30, or at least 40, or at least 50, and up to 220 amino acids in length. Alternatively or additionally, in non-limiting various embodiments, the CD28 polypeptide comprises or has an amino acid sequence of amino acids 1 to 220, 1 to 50, 50 to 100, 100 to 150, 114 to 220, 150 to 200, 153 to 179, or 200 to 220 of SEQ ID NO: 14. In certain embodiments, the transmembrane domain of a presently disclosed membrane-bound polypeptide comprises a CD28 polypeptide comprising or having an amino acid sequence of amino acids 153 to 179 of SEQ ID NO: 14. SEQ ID NO: 14 is provided below:

```
                                      [SEQ ID NO: 14]
            MLRLLLALNLFPSIQVTGNKILVKQSPMLV

AYDNAVNLSCKYSYNLFSREFRASLHKGLD

SAVEVCVVYGNYSQQLQVYSKTGFNCDGKL

GNESVTFYLQNLYVNQTDIYFCKIEVMYPP

PYLDNEKSNGTIIHVKGKHLCPSPLFPGPS

KPFWVLVVVGGVLACYSLLVTVAFIIFWVR

SKRSRLLHSDYMNMTPRRPGPTRKHYQPYA

PPRDFAAYRS
```

In certain embodiments, the transmembrane domain of a membrane-bound polypeptide comprises a CD28 polypeptide comprising or having the amino acid sequence set forth in SEQ ID NO: 98 as provided below.

```
                                      [SEQ ID NO: 98]
            FWVLVVVGGVLACYSLLVTVAFIIFWV
```

In certain embodiments, the transmembrane domain of a membrane-bound polypeptide comprises a CD28 polypeptide comprising or having the amino acid sequence set forth in SEQ ID NO: 23 as provided below.

```
                                      [SEQ ID NO: 23]
            FWALVVVAGVLFCYGLLVTVALCVIWT
```

In certain embodiments, the transmembrane domain of the membrane-bound polypeptide comprises a CD4 polypeptide (e.g., the transmembrane domain of CD4 or a fragment thereof). The CD4 polypeptide can have an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_038516.1 (SEQ ID NO: 78) or a fragment thereof, and/or may optionally comprise up to one or up to two or up to three conservative amino acid substitutions. In certain embodiments, the CD4 polypeptide comprises or has an amino acid sequence that is a consecutive fragment of SEQ ID NO: 78 which is at least 20, or at least 30, or at least 40, or at least 50, and up to 457 amino acids in length. Alternatively or additionally, in non-limiting various embodiments, the CD4 polypeptide comprises or has an amino acid sequence of amino acids 1 to 457, 1 to 50, 50 to 100, 100 to 150, 150 to 200, 200 to 250, 250 to 300, 300 to 350, 350 to 400, 395 to 417, or 400 to 457 of SEQ ID NO: 78. In certain embodiments, the transmembrane domain of the membrane-bound polypeptide comprises a CD4 polypeptide comprising or having amino acids 395 to 417 of SEQ ID NO: 78. SEQ ID NO: 78 is provided below:

```
                                      [SEQ ID NO: 78]
            MCRAISLRRLLLLLLQLSQLLAVTQGKTLVLGKEGESAEL

PCESSSQKKITVETWKESDQRKILGQHGKGVLIRGGSPSQF

DRFDSKKGAWEKGSFPLIINKLKMEDSQTYICELENRKEE

VELWVFKVTFSPGTSLLQGQSLTLTLDSNSKVSNPLTECK

HKKGKVVSGSKVLSMSNLRVQDSDFWNCTVTLDQKKNWFG

MTLSVLGFQSTAITAYKSEGESAEFSFPLNFAEENGWGEL

MWKAEKDSFFQPWISFSIKNKEVSVQKSTKDLKLQLKETL

PLTLKIPQVSLQFAGSGNLTLTLDKGTLHQEVNLVVMKVA

QLNNTLTCEVMGPTSPKMRLTLKQENQEARVSEEQKVVQV

VAPETGLWQCLLSEGDKVKMDSRIQVLSRGVNQTVFLACV

LGGSFGFLGFLGLCILCCVRCRHQQRQAARMSQIKRLLSE

KKTCQCPHRMQKSHNLI
```

In certain embodiments, the transmembrane domain of the membrane-bound polypeptide comprises a CD4 polypeptide (e.g., the transmembrane domain of CD4 or a fragment thereof). The CD4 polypeptide can have an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_000607.1 (SEQ ID No: 79) or a fragment thereof, and/or may optionally comprise up to one or up to two or up to three conservative amino acid substitutions. In certain embodiments, the CD4 polypeptide comprises or has an amino acid sequence that is a consecutive fragment of SEQ ID NO: 79 which is at least 20, or at least 30, or at least 40, or at least 50, and up to 458 amino acids in length. Alternatively or additionally, in non-limiting various embodiments, the CD4 polypeptide comprises or has an amino acid sequence of amino acids 1 to 457, 1 to 50, 50 to 100, 100 to 150, 150 to 200, 200 to 250, 250 to 300, 300 to 350, 350 to 400, 397 to 418, or 400 to 457 of SEQ ID NO: 79. In certain embodiments, the transmembrane domain of the membrane-bound polypeptide comprises a CD4 polypeptide comprising or having amino acids 397 to 418 of SEQ ID NO: 79. SEQ ID NO: 79 is provided below:

[SEQ ID NO: 79]
MNRGVPFRHLLLVLQLALLPAATQGKKVVLGKKGDTVELT

CTASQKKSIQFHWKNSNQIKILGNQGSFLTKGPSKLNDRA

DSRRSLWDQGNFPLIIKNLKIEDSDTYICEVEDQKEEVQL

LVEGLTANSDTHLLQGQSLTLTLESPPGSSPSVQCRSPRG

KNIQGGKTLSVSQLELQDSGTWTCTVLQNQKKVEFKIDIV

VLAFQKASSIVYKKEGEQVEFSFPLAFTVEKLTGSGELWW

QAERASSSKSWITFDLKNKEVSVKRVTQDPKLQMGKKLPL

HLTLPQALPQYAGSGNLTLALEAKTGKLHQEVNLVVMRAT

QLQKNLTCEVWGPTSPKLMLSLKLENKEAKVSKREKAVWV

LNPEAGMWQCLLSDSGQVLLESNIKVLPTWSTPVQPMALI

VLGGVAGLLLFIGLGIFFCVRCRHRRRQAERMSQIKRLLS

EKKTCQCPHRFQKTCSPI 2.1.3. Intracellular Domain

In certain non-limiting embodiments, the membrane-bound polypeptide further comprises an intracellular domain. In certain non-limiting embodiments, the intracellular domain provides an activation signal to a cell (e.g., a cell of the lymphoid lineage, e.g., a T cell). In certain embodiments, the intracellular domain of the membrane-bound polypeptides comprises an immune activating molecule. In certain embodiments, the immune activating molecule is a CD3ζ polypeptide.

In certain non-limiting embodiments, the intracellular domain of the membrane-bound polypeptide comprises a CD3ζ polypeptide or a fragment thereof. CD3ζ can activate or stimulate a cell. CD3ζ comprises 3 ITAMs, and transmits an activation signal to the cell (e.g., a cell of the lymphoid lineage, e.g., a T cell) after antigen is bound. The intracellular signaling domain of the CD3ζ-chain is the primary transmitter of signals from endogenous TCRs. In certain embodiments, the CD3ζ polypeptide comprises or has an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_932170 (SEQ ID No: 15), or a fragment thereof, and/or may optionally comprise up to one or up to two or up to three conservative amino acid substitutions. In certain non-limiting embodiments, the CD3ζ polypeptide comprises or has an amino acid sequence that is a consecutive fragment of SEQ ID NO: 15, which is at least 20, or at least 30, or at least 40, or at least 50, and up to 164 amino acids in length. Alternatively or additionally, in non-limiting various embodiments, the CD3ζ polypeptide comprises or has an amino acid sequence of amino acids 1 to 164, 1 to 50, 50 to 100, 52 to 164, 100 to 150, or 150 to 164 of SEQ ID NO: 15. In certain embodiments, the CD3ζ polypeptide comprises or has an amino acid sequence of amino acids 52 to 164 of SEQ ID NO: 15. SEQ ID NO: 15 is provided below:

[SEQ ID NO: 15]
MKWKALFTAAILQAQLPITEAQSFGLLDPKLCYLLDGILFI

YGVILTALFLRVKFSRSADAPAYQQGQNQLYNELNLGRREE

YDVLDKRRGRDPEMGGKPQRRKNPQEGLYNELQKDKMAEAY

SEIGMKGERRRGKGHDGLYQGLSTATKDTYDALHMQALPPR

In certain embodiments, the CD3ζ polypeptide comprises or has an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_001106864.2 (SEQ ID No: 13) or a fragment thereof, and/or may optionally comprise up to one or up to two or up to three conservative amino acid substitutions. In certain non-limiting embodiments, the CD3ζ polypeptide comprises or has an amino acid sequence that is a consecutive fragment of SEQ ID NO: 13, which is at least about 20, or at least about 30, or at least about 40, or at least about 50, or at least about 90, or at least about 100, and up to 188 amino acids in length. Alternatively or additionally, in non-limiting various embodiments, the CD3ζ polypeptide comprises or has an amino acid sequence of amino acids 1 to 164, 1 to 50, 50 to 100, 100 to 150, or 150 to 188 of SEQ ID NO: 13. SEQ ID NO: 13 is provided below:

[SEQ ID NO: 13]
MKWKVSVLACILHVRFPGAEAQSFGLLDPKLCYLLDGILF

IYGVIITALYLRAKFSRSAETAANLQDPNQLYNELNLGRR

EEYDVLEKKRARDPEMGGKQRRRNPQEGVYNALQKDKMAE

AYSEIGTKGERRRGKGHDGLYQDSHFQAVQFGNRREREGS

ELTRILGLRARPKACRHKKPLSLPAAVS

In certain embodiments, the CD3ζ polypeptide comprises or has an amino acid sequence set forth in SEQ ID NO: 17 as provided below.

[SEQ ID NO: 17]
RAKESRSAETAANLQDPNQLYNELNLGRREEYDVLEKKRA

RDPEMGGKQQRRRNPQEGVYNALQKDKMAEAYSEIGTKGE

RRRGKGHDGLYQGLSTATKDTYDALHMQTLAPR

In certain embodiments, the intracellular domain of the membrane-bound polypeptide comprises a murine CD3ζ polypeptide.

In certain embodiments, the intracellular domain of the membrane-bound polypeptide comprises a human CD3ζ polypeptide.

In certain non-limiting embodiments, the intracellular domain of the membrane-bound polypeptide provides an activation signal and a stimulation signal to a cell. In certain embodiments, the intracellular of the membrane-bound polypeptide domain comprises at least one costimulatory molecule or a fragment thereof.

In certain embodiments, the at least one co-stimulatory signaling region comprises a CD28 polypeptide (e.g., the intracellular domain of CD28 or a fragment thereof), a 4-1BB polypeptide (e.g., the intracellular domain of 4-1BB or a fragment thereof), an OX40 polypeptide (e.g., the intracellular domain of OX40 or a fragment thereof), an ICOS polypeptide (e.g., the intracellular domain of ICOS or a fragment thereof), a DAP-10 polypeptide (e.g., the intracellular domain of DAP-10 or a fragment thereof), or a combination thereof. In certain embodiments, the at least one co-stimulatory signaling region comprises a CD28 polypeptide. In certain embodiments, the at least one co-stimulatory signaling region comprises an intracellular domain of CD28 or a fragment thereof.

In certain embodiments, the costimulatory molecule is a CD28 polypeptide (e.g., the intracellular domain of CD28 or a fragment thereof). The CD28 polypeptide can comprise or have an amino acid sequence that is at least about 80%, at least about 85%, at least about 90%, at least about 95%, at least about 96%, at least about 97%, at least about 98%, at least about 99% or at least 100% homologous or identical to the sequence having a NCBI Reference No: P10747 or NP_006130 (SEQ ID NO: 14) or a fragment thereof, and/or may optionally comprise up to one or up to two or up to three conservative amino acid substitutions. In certain embodiments, the CD28 polypeptide comprises or has an amino acid sequence that is a consecutive fragment of SEQ ID NO: 14 which is at least 20, or at least 30, or at least 40, or at least 50, and up to 220 amino acids in length. Alternatively or additionally, in non-limiting various embodiments, the CD28 polypeptide comprises or has an amino acid sequence of amino acids 1 to 220, 1 to 50, 50 to 100, 100 to 150, 150 to 200, or 200 to 220 of SEQ ID NO: 14. In certain embodiments, the CD28 polypeptide comprises or has an amino acid sequence of amino acids 181 to 220 of SEQ ID NO: 14.

In certain embodiments, the CD28 polypeptide comprises or has an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_031668.3 (SEQ ID NO: 16) or a fragment thereof, and/or may optionally comprise up to one or up to two or up to three conservative amino acid substitutions. In certain embodiments, the CD28 polypeptide comprises or has an amino acid sequence that is a consecutive fragment of SEQ ID NO: 16 which is at least about 20, or at least about 30, or at least about 40, or at least about 50, and up to 218 amino acids in length. Alternatively or additionally, in non-limiting various embodiments, the CD28 polypeptide comprises or has an amino acid sequence of amino acids 1 to 218, 1 to 50, 50 to 100, 100 to 150, 150 to 200, or 200 to 218 of SEQ ID NO: 16.

In certain embodiments, the CD28 polypeptide comprises or has an amino acid sequence of amino acids 178 to 218 of SEQ ID NO: 16. SEQ ID NO: 16 is provided below:

[SEQ ID NO: 16]
MTLRLLFLALNFFSVQVTENKILVKQSPLLVVDSNEVSLS

CRYSYNLLAKEFRASLYKGVNSDVEVCVGNGNFTYQPQFR

SNAEFNCDGDFDNETVTFRLWNLHVNHTDIYFCKIEFMYP

PPYLDNERSNGTIIHIKEKHLCHTQSSPKLFWALVVVAGV

LFCYGLLVTVALCVIWTNSRRNRLLQSDYMNMTPRRPGLT

RKPYQPYAPARDFAAYRP

In certain embodiments, the costimulatory molecule is a mouse CD28 polypeptide. In certain embodiments, the costimulatory molecule is a human CD28 polypeptide.

In certain embodiments, the intracellular domain of the membrane-bound polypeptide comprises two costimulatory molecules, e.g., CD28 and 4-1BB or CD28 and OX40.

In certain embodiments, the at least one co-stimulatory signaling region comprises a 4-1BB polypeptide. In certain embodiments, the at least one co-stimulatory signaling region comprises an intracellular domain of 4-1BB or a fragment thereof.

In certain embodiments, the costimulatory molecule is a 4-1BB polypeptide (e.g., the intracellular domain of 4-1BB or a fragment thereof). 4-1BB can act as a tumor necrosis factor (TNF) ligand and have stimulatory activity. The 4-1BB polypeptide can comprise or have an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: P41273 or NP_001552 (SEQ ID NO: 97) or a fragment thereof, and/or may optionally comprise up to one or up to two or up to three conservative amino acid substitutions. SEQ ID NO: 97 is provided below:

[SEQ ID NO: 97]
MGNSCYNIVATLLLVLNFERTRSLQDPCSN

CPAGTFCDNNRNQICSPCPPNSFSSAGGQR

TCDICRQCKGVFRTRKECSSTSNAECDCTP

GFHCLGAGCSMCEQDCKQGQELTKKGCKDC

CFGTFNDQKRGICRPWTNCSLDGKSVLVNG

TKERDVVCGPSPADLSPGASSVTPPAPARE

PGHSPQIISFFLALTSTALLFLLFFLTLRF

SVVKRGRKKLLYIFKQPFMRPVQTTQEEDG

CSCRFPEEEEGGCEL

In accordance with the presently disclosed subject matter, a "4-1BB nucleic acid molecule" refers to a polynucleotide encoding a 4-1BB polypeptide.

In certain embodiments, the at least one co-stimulatory signaling region comprises an OX40 polypeptide. In certain embodiments, the at least one co-stimulatory signaling region comprises an intracellular domain of OX40 or a fragment thereof.

In certain embodiments, the costimulatory molecule is an OX40 polypeptide (e.g., the intracellular domain of OX40 or a fragment thereof). The OX40 polypeptide can comprise or have an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: P43489 or NP_003318 (SEQ ID NO: 18) or a fragment thereof, and/or may optionally comprise up to one or up to two or up to three conservative amino acid substitutions. SEQ ID NO: 18 is provided below:

[SEQ ID NO: 18]
MCVGARRLGRGPCAALLLLGLGLSTVTGLHCVGDTYPSNDRCCHE

CRPGNGMVSRCSRSQNTVCRPCGPGFYNDVVSSKPCKPCTWCNLR

SGSERKQLCTATQDTVCRCRAGTQPLDSYKPGVDCAPCPPGHFSP

GDNQACKPWTNCTLAGKHTLQPASNSSDAICEDRDPPATQPQETQ

GPPARPITVQPTEAWPRTSQGPSTRPVEVPGGRAVAAILGLGLVL

GLLGPLAILLALYLLRRDQRLPPDAHKPPGGGSFRTPIQEEQADA

HSTLAKI

In accordance with the presently disclosed subject matter, an "OX40 nucleic acid molecule" refers to a polynucleotide encoding an OX40 polypeptide.

In certain embodiments, the at least one co-stimulatory signaling region comprises an ICOS polypeptide. In certain embodiments, the at least one co-stimulatory signaling region comprises an intracellular domain of ICOS or a fragment thereof.

In certain embodiments, the costimulatory molecule is an ICOS polypeptide (e.g., the intracellular domain of ICOS or a fragment thereof). The ICOS polypeptide can comprise or have an amino acid sequence that is at least about 80%, at least about 85%, at least about 90%, at least about 95%, at least about 96%, at least about 97%, at least about 98%, at least about 99% or at least about 100% homologous or identical to the sequence having a NCBI Reference No: NP_036224 (SEQ ID NO: 19) or a fragment thereof, and/or may optionally comprise up to one or up to two or up to three conservative amino acid substitutions. SEQ ID NO: 19 is provided below:

[SEQ ID NO: 19]
MKSGLWYFFLFCLRIKVLIGEINGSANYEMFIFHNGGVQILCKYP

DIVQQFKMQLLKGGQILCDLIKTKGSGNIVSIKSLKFCHSQLSNNS

VSFFLYNLDHSHANYYFCNLSIFDPPPFKVTLIGGYLHIYESQLCC

QLKFWLPIGCAAFVVVCILGCILICWLIKKKYSSSVHDPNGEYMFM

RAVNTAKKSRLTDVTL

In accordance with the presently disclosed subject matter, an "ICOS nucleic acid molecule" refers to a polynucleotide encoding an ICOS polypeptide.

In certain embodiments, the at least one co-stimulatory signaling region comprises two costimulatory molecules or fragments thereof. In certain embodiments, the at least one co-stimulatory signaling region comprises a CD28 polypeptide (e.g., an intracellular domain of CD28 or a fragment thereof) and a 4-1BB polypeptide (e.g., an intracellular domain of 4-1BB or a fragment thereof).

In certain non-limiting embodiments, the intracellular domain of the membrane-bound polypeptide alone does not provide an activation signal to a cell. In certain embodiments, the intracellular domain of the membrane-bound polypeptide does not comprise a costimulatory molecule. In certain embodiments, the intracellular domain of the membrane-bound polypeptide does not comprise a CD3zeta polypeptide.

In certain embodiments, the intracellular domain of the membrane-bound polypeptide further comprises a suicide gene. Suitable suicide genes include, but are not limited to, Herpes simplex virus thymidine kinase (hsv-tk), and inducible Caspase 9 Suicide gene (iCasp-9). In certain embodiments, the intracellular domain of the membrane-bound polypeptide further comprises a truncated human epidermal growth factor receptor (EGFRt) polypeptide. A truncated EGFRt polypeptide can enable T cell elimination by administering anti-EGFR monoclonal antibody (e.g., cetuximab).

In certain embodiments, the membrane-bound polypeptide comprises a synNotch module. SynNotch modules are disclosed in U.S. Pat. No. 9,670,281 and Morsut et al, Cell, 164, 780-791, 2016, each of which is incorporated by reference in its entirety.

2.2. Soluble Polypeptide

In certain embodiments, the soluble polypeptide comprises a dimerization domain that is capable of dimerizing with a dimerization domain comprised in a membrane-bound polypeptide disclosed herein. In certain embodiments, the membrane-bound polypeptide is a membrane-bound polypeptide disclosed herein, e.g., in Section 2.1. In certain embodiments, the dimerization domain comprises a leucin zipper domain. The dimerization domain can be any of the dimerization domains disclosed in Section 2.1.1.

In certain embodiments, the soluble polypeptide comprises a dimerization domain and an antigen-binding domain that is capable of binding to an antigen.

In certain embodiments, the soluble polypeptide comprises a dimerization domain and a cytokine or a chemokine. In certain embodiments, the soluble polypeptide further comprises a tag.

In certain embodiments, the leucine zipper domain of the membrane-bound polypeptide and the leucine zipper domain of the soluble polypeptide are a pair of orthogonal zippers, i.e., they are the specific partners for each other to form heterodimers.

2.2.1. Cytokine/Chemokine

In certain embodiments, the cytokine/chemokine is capable of enhancing the immune response of an immuno-responsive cell and/or cause cell death of a malignant or infected cell. In certain embodiments, the cytokine/chemokine is an anti-tumor cytokine/chemokine. In certain embodiments, the cytokine or the chemokine comprises or has an amino acid sequence that is at least about 80%, at least about 85%, at least about 90%, at least about 95%, at least about 96%, at least about 97%, at least about 98%, at least about 99% or at least about 100% homologous or identical to a cytokine/chemokine, or fragments thereof, and/or may optionally comprise up to one or up to two or up to three conservative amino acid substitutions. Non-limiting example of cytokine include IL-1, IL-2, IL-3, IL-7, IL-10, IL-12, IL-15, IL-17, IL-18, IL-21, IL-22, granulocyte macrophage colony-stimulating factor (GM-CSF), IFN-γ, CXCL1, IL-23, and CXCL10. Non-limiting examples of chemokine include CCL1, CCL17, CCL8, CCL16, CCL18, and CCL22.

CCL1/CCL8/CCL16/CCL18 ligands can interact or pair with CCR8. CCL17/CCL22 ligands can interact or pair with CCR4. These receptors are targets for regulatory T cells, and subsets of T and B cell lymphomas making them possible therapeutic targets.

In certain embodiments, the chemokine is CCL1. In certain embodiments, the CCL1 is mouse CCL1. In certain embodiments, the mouse CCL1 comprises the amino acid sequence set forth in SEQ ID NO: 80. In certain embodiments, the CCL1 is human CCL1. In certain embodiments, the human CCL1 comprises the amino acid sequence set forth in SEQ ID NO: 81. SEQ ID Nos: 80 and 81 are provided below.

[SEQ ID NO: 80]
KSMLTVSNSCCLNTLKKELPLKFIQCYRKMGSSC

PDPPAWFRLNKGRESCASTNKTWVQNHLKKVNPC

[SEQ ID NO: 81]
KSMQVPFSRCCFSFAEQEIPLRAILCYRNTSSIC

SNEGLIFKLKRGKEACALDTVGWVQRHRKMLRHC

PSKRK

In certain embodiments, the chemokine is CCL17. In certain embodiments, the CCL17 is mouse CCL17. In certain embodiments, the mouse CCL17 comprises the amino acid sequence set forth in SEQ ID NO: 82. In certain embodiments, the CCL17 is human CCL17. In certain embodiments, the human CCL17 comprises the amino acid sequence set forth in SEQ ID NO: 83. SEQ ID Nos: 82 and 83 are provided below.

[SEQ ID NO: 82]
ARATNVGRECCLDYFKGAIPIRKLVSWYKTSVECS

RDAIVFLTVQGKLICADPKDKHVKKAIRLVKNPRP

[SEQ ID NO: 83]
ARGTNVGRECCLEYFKGAIPLRKLKTWYQTSEDCS

RDAIVFVTVQGRAICSDPNNKRVKNAVKYLQSLER

S

In certain embodiments, the chemokine is CCL18. In certain embodiments, the CCL18 is human CCL18. In certain embodiments, the human CCL18 comprises the amino acid sequence set forth in SEQ ID NO: 84. SEQ ID No: 84 is provided below.

[SEQ ID NO: 84]
AQVGINKELCCLVYTSWQIPQKFIVDYSETSPQCP

KPGVILLTKRGRQICADPNKKWVQKYISDLKLNA

In certain embodiments, the chemokine is CCL22. In certain embodiments, the CCL22 is mouse CCL22. In certain embodiments, the mouse CCL22 chemokine comprises the amino acid sequence set forth in SEQ ID NO: 85. In certain embodiments, the CCL22 is human CCL22. In certain embodiments, the human CCL22 comprises the amino acid sequence set forth in SEQ ID NO: 86. SEQ ID Nos: 85 and 86 are provided below.

[SEQ ID NO: 85]
GPYGANVEDSICCQDYIRHPLPSRLVKEFFWTSKS

CRKPGVVLITVKNRDICADPRQVWVKKLLHKLS

[SEQ ID NO: 86]
GPYGANMEDSVCCRDYVRYRLPLRVVKHEYWTSDS

CPRPGVVLLTERDKEICADPRVPWVKMILNKLSQ 2.2.2. Antigen Binding Domain

In certain embodiments, the antigen binding domain of the soluble polypeptide comprises a single-chain variable fragment (scFv), a soluble ligand, a cytokine, or a non-scFv-based antigen recognition motif, or a combination thereof.

In certain non-limiting embodiments, the antigen binding domain of the soluble polypeptide (embodied, for example, an scFv or an analog thereof) binds to an antigen with a dissociation constant ($K_d$) of about $2\times10^{-7}$ M or less. In certain embodiments, the $K_d$ is about $2\times10^{-7}$ M or less, about $1\times10^{-7}$ M or less, about $9\times10^{-8}$ M or less, about $1\times10^{-8}$ M or less, about $9\times10^{-9}$ M or less, about $5\times10^{-9}$ M or less, about $4\times10^{-9}$ M or less, about $3\times10^{-9}$ M or less, about $2\times10^{-9}$ M or less, or about $1\times10^{-9}$ M or less. In certain non-limiting embodiments, the $K_d$ is about $3\times10^{-9}$ M or less. In certain non-limiting embodiments, the $K_d$ is from about $1\times10^{-9}$ M to about $3\times10^{-7}$ M. In certain non-limiting embodiments, the $K_d$ is from about $1.5\times10^{-9}$ M to about $3\times10^{-7}$ M.

Binding of the antigen binding domain (for example, in an scFv or an analog thereof) can be confirmed by, for example, enzyme-linked immunosorbent assay (ELISA), radioimmunoassay (RIA), FACS analysis, bioassay (e.g., growth inhibition), or Western Blot assay. Each of these assays generally detect the presence of protein-antibody complexes of particular interest by employing a labeled reagent (e.g., an antibody, or an scFv) specific for the complex of interest. For example, the scFv can be radioactively labeled and used in a radioimmunoassay (RIA) (see, for example, Weintraub, B., Principles of Radioimmunoassays, Seventh Training Course on Radioligand Assay Techniques, The Endocrine Society, March 1986, which is incorporated by reference herein). The radioactive isotope can be detected by such means as the use of a γ counter or a scintillation counter or by autoradiography. In certain embodiments, the antigen binding domain is labeled with a fluorescent marker. Non-limiting examples of fluorescent markers include green fluorescent protein (GFP), blue fluorescent protein (e.g., EBFP, EBFP2, Azurite, and mKalama1), cyan fluorescent protein (e.g., ECFP, Cerulean, and CyPet), and yellow fluorescent protein (e.g., YFP, Citrine, Venus, and YPet).

In certain embodiments, the antigen binding domain of the soluble polypeptide specifically binds to an antigen. In certain embodiments, the antigen binding domain is an scFv. In certain embodiments, the scFv is a human scFv. In certain embodiments, the scFv is a humanized scFv. In certain embodiments, the scFv is a murine scFv. In certain embodiments, the extracellular antigen-binding domain is a Fab, which is optionally crosslinked. In certain embodiments, the extracellular antigen-binding domain is a F(ab)$_2$. In certain embodiments, any of the foregoing molecules may be comprised in a fusion protein with a heterologous sequence to form the extracellular antigen-binding domain. In certain embodiments, the scFv is identified by screening scFv phage library with an antigen-Fc fusion protein. In certain embodiments, the antigen is a tumor antigen. In certain embodiments, the antigen is a pathogen antigen.

2.2.3. Antigens

In certain embodiments, the antigen binding domain of the soluble polypeptide binds to a tumor antigen. Any tumor antigen can be used in the tumor-related embodiments described herein. The antigen can be expressed as a peptide or as an intact protein or fragment thereof. The intact protein or a fragment thereof can be native or mutagenized. Non-limiting examples of tumor antigens include CD2, CD3, CD4, CD5, CD7, CD8, CD19, CD20, CD22, VpreB, CD30, CD33, CD38, CD40, CD44v6, CD70, CD79a, CD70b, CLL-1/CLEC12A, CD123, IL-3R complex, TIM-3, BCMA, TACI, SLAMF7, CD244, E-cadherin, B7-H3, B7-H4, carbonic anhydrase IX (CAIX), carcinoembryonic antigen (CEA), CD10, CD34, CD38, CD41, CD44, CD49f, CD56, CD74, CD133, CD138, an antigen of a cytomegalovirus (CMV) infected cell (e.g., a cell surface antigen), epithelial glycoprotein-2 (EGP-2), epithelial glycoprotein-40 (EGP-40), epithelial cell adhesion molecule (EpCAM), receptor tyrosine-protein kinases erb-B2,3,4 (erb-B2,3,4), folate-binding protein (FBP), fetal acetylcholine receptor (AChR), folate receptor-α, Ganglioside G2 (GD2), Ganglioside G3 (GD3), human Epidermal Growth Factor Receptor 2 (HER-2), human telomerase reverse transcriptase (hTERT), Interleukin-13 receptor subunit alpha-2 (IL-13Rα2), κ-light chain, kinase insert domain receptor (KDR), Lewis Y (LeY), L1 cell adhesion molecule (L1CAM), melanoma antigen family A, 1 (MAGE-A1), Mucin 16 (MUC16), Mucin 1 (MUC1), Mesothelin (MSLN), ERBB2, MAGEA3, p53, MART1, GP100, Proteinase3 (PR1), Tyrosinase, Survivin, hTERT, EphA2, NKG2D ligands, cancer-testis antigen NY-ESO-1, oncofetal antigen (h5T4), prostate stem cell antigen (PSCA), prostate-specific membrane antigen (PSMA), ROR1, tumor-associated glycoprotein 72 (TAG-72), vascular endothelial growth factor R2 (VEGF-R2), and Wilms tumor protein (WT-1), BCMA, NKCS1, EGF1R, EGFR-VIII, CD99, ADGRE2, CCR1, LILRB2, PRAME and ERBB.

In certain embodiments, the antigen binding domain of the soluble polypeptide binds to a human CD19 polypeptide. In certain embodiments, the antigen binding domain of the soluble polypeptide binds to the extracellular domain of a human CD19 protein.

In certain embodiments, the antigen binding domain of the soluble polypeptide binds to an immune checkpoint molecule. Non-limiting example of immune checkpoint molecules include PD-L1, CD200, B7-H3, B7-H4, HVEM, Galectin9, PD-1, CTLA-4, CD200R, TIM-3, Lag-3 and TIGIT.

In certain embodiments, the antigen binding domain of the soluble polypeptide binds to an activating receptor, wherein the binding of the antigen binding domain to the activating receptor is capable of activating an antigen presenting cell (APC). Non-limiting example of immune checkpoint molecules include CD40, Toll Like Receptors (TLRs), FLT3, RANK, and GM-CSF receptor.

In certain embodiments, the antigen binding domain of the soluble polypeptide binds to a biomarker of a hematopoietic lineage cell. Non-limiting example of immune checkpoint molecules include CD3, CD16, CD33, c-Kit, CD161, CD19, CD20, VpPreB, luteinizing hormone receptor (LHCGR), CD123, IL-3R complex, CLEC12A/CLL-1.

In certain embodiments, the antigen binding domain of the soluble polypeptide binds to a pathogen antigen, e.g., for use in treating and/or preventing a pathogen infection or other infectious disease, for example, in an immunocompromised subject. Non-limiting examples of pathogens include a virus, bacteria, fungi, parasite and protozoa capable of causing disease.

Non-limiting examples of viruses include, Retroviridae (e.g. human immunodeficiency viruses, such as HIV-1 (also referred to as HDTV-III, LAVE or HTLV-III/LAV, or HIV-III; and other isolates, such as HIV-LP; Picornaviridae (e.g. polio viruses, hepatitis A virus; enteroviruses, human Coxsackie viruses, rhinoviruses, echoviruses); Calciviridae (e.g. strains that cause gastroenteritis); Togaviridae (e.g. equine encephalitis viruses, rubella viruses); Flaviridae (e.g. dengue viruses, encephalitis viruses, yellow fever viruses); Coronoviridae (e.g. coronaviruses); Rhabdoviridae (e.g. vesicular stomatitis viruses, rabies viruses); Filoviridae (e.g. ebola viruses); Paramyxoviridae (e.g. parainfluenza viruses, mumps virus, measles virus, respiratory syncytial virus); Orthomyxoviridae (e.g. influenza viruses); Bungaviridae (e.g. Hantaan viruses, bunga viruses, phleboviruses and Naira viruses); Arena viridae (hemorrhagic fever viruses); Reoviridae (e.g. reoviruses, orbiviurses and rotaviruses); Birnaviridae; Hepadnaviridae (Hepatitis B virus); Parvo-virida (parvoviruses); Papovaviridae (papilloma viruses, polyoma viruses); Adenoviridae (most adenoviruses); Herpesviridae (herpes simplex virus (HSV) 1 and 2, varicella zoster virus, cytomegalovirus (CMV), herpes virus; Poxviridae (variola viruses, vaccinia viruses, pox viruses); and Iridoviridae (e.g. African swine fever virus); and unclassified viruses (e.g. the agent of delta hepatitis (thought to be a defective satellite of hepatitis B virus), the agents of non-A, non-B hepatitis (class 1=internally transmitted; class 2=parenterally transmitted (i.e. Hepatitis C); Norwalk and related viruses, and astroviruses).

Non-limiting examples of bacteria and/or fungi include *Pasteurella, Staphylococci, Streptococcus, Escherichia coli, Pseudomonas species*, and *Salmonella* species. Specific examples of infectious bacteria include but are not limited to, *Helicobacter pyloris, Borelia burgdorferi, Legionella pneumophilia, Mycobacteria* sps (e.g. *M. tuberculosis, M. avium, M. intracellulare, M. kansaii, M. gordonae), Staphylococcus aureus, Neisseria gonorrhoeae, Neisseria meningitidis, Listeria monocytogenes, Streptococcus pyogenes* (Group A *Streptococcus*), *Streptococcus agalactiae* (Group B *Streptococcus*), *Streptococcus* (*viridans* group), *Streptococcus faecalis, Streptococcus bovis, Streptococcus* (*anaerobic* sps.), *Streptococcus pneumoniae*, pathogenic *Campylobacter* sp., *Enterococcus* sp., *Haemophilus influenzae, Bacillus anthracis, Corynebacterium diphtheriae, corynebacterium* sp., *Erysipelothrix rhusiopathiae, Clostridium perfringerns, Clostridium tetani, Enterobacter aerogenes, Klebsiella pneumoniae, Pasteurella multocida, Bacteroides* sp., *Fusobacterium nucleatum, Streptobacillus moniliformis, Treponema pallidium, Treponema pertenue, Leptospira, Rickettsia, Aspergillus* species and *Actinomyces israelli*.

2.2.4. Tags

In certain embodiments, the soluble polypeptide further comprises a tag. In certain embodiments, the tag comprises an epitope tag, which comprises an epitope recognized by an antibody. In certain embodiments, the epitope tag is selected from the group consisting of a Myc-tag, a HA-tag, a Flag-tag, a V5-tag, a T7 tag, and combinations thereof. In certain embodiments, the tag comprises an affinity tag that binds to a substrate. In certain embodiments, the affinity tag is selected from the group consisting of a His-tag, a Strep-tag, an E-tag, a streptavidin binding protein tag (SBP-tag), and combinations thereof.

Furthermore, the soluble polypeptide can further comprise a mimotope recognized by a second antibody. Binding of the second antibody to the mimotope can mediates depletion of a cell comprising the membrane-bound polypeptide. In certain embodiments, the mimotope is a CD20 mimotope recognized by an anti-CD20 antibody. In certain embodiments, the anti-CD20 antibody is Rituxumab. In certain embodiments, the CD20 mimotope is a circular CD20 mimotope.

In certain embodiments, the CD20 mimotope comprises or has the amino acid sequence set forth in SEQ ID NO: 77, which is provided below.

CPYSNPSLC  [SEQ ID NO: 77]

3. Systems

The presently disclosed subject matter provides systems for immunotherapy. In certain embodiments, the system comprises a membrane-bound polypeptide disclosed herein and a soluble polypeptide disclosed herein.

3.1. Functional Sorting Zip Construct with a Blocking Spacer

The presently disclosed subject matter provides a system, comprising: a) a membrane-bound polypeptide disclosed herein (e.g., a membrane-bound polypeptide comprising: i) a transmembrane domain, ii) an intracellular domain, and iii) an extracellular domain that comprises a first dimerization domain and a blocking spacer), and b) a soluble polypeptide disclosed herein (e.g., a soluble polypeptide comprising i) a second dimerization domain that is capable of dimerizing with the first dimerization domain, and ii) an antigen binding domain that binds to an antigen). In certain embodiments, each of the first dimerization domain and the second dimerization domain comprises a leucine zipper domain, and the blocking spacer prevents dimerization of the membrane-bound polypeptide with the soluble polypeptide when the membrane-bound polypeptide and the soluble polypeptide are not expressed from the same cell.

In certain embodiments, the blocking spacer has a length of no more than about 25 amino acids. In certain embodiments, the blocking spacer has a length of between about 5 amino acids and about 25 amino acids. In certain embodiments, the blocking spacer is a truncated CD28 spacer or an IgG1 hinge.

3.2. Functional Sorting Zip Construct with a Self-Blocking Feature

The presently disclosed subject matter provides a system, comprising: a) a membrane-bound polypeptide disclosed herein (e.g., a membrane-bound polypeptide comprising: i) a transmembrane domain, ii) an intracellular domain, and iii) an extracellular domain that comprises a first dimerization domain and a second dimerization domain that is capable of dimerizing with the first dimerization domain), and b) a soluble polypeptide disclosed herein (e.g., a soluble polypeptide comprising i) a third dimerization domain that is capable of dimerizing with the first dimerization domain, and ii) an antigen binding domain that binds to an antigen). In certain embodiments, each of the first dimerization domain and the second dimerization domain comprises a leucine zipper domain.

In certain embodiments, the antigen is selected from the group consisting of tumor antigens, pathogen antigens, immune checkpoint molecules, activating receptors, and biomarkers of a hematopoietic lineage cell.

3.2.1. Functional Sorting Zip Construct Targeting Tumor Antigens

The presently disclosed subject matter provides systems for targeting tumor antigens comprising any membrane-bound polypeptide and/or any soluble polypeptide discloses herein, or any system disclosed herein. In certain embodiments, the antigen of the antigen binding domain of the soluble polypeptide disclosed herein, optionally comprised in any system discloses herein, is a tumor antigen. In certain embodiments, the tumor antigen is selected from the group consisting of CD2, CD3, CD4, CD5, CD7, CD8, CD19, CD20, CD22, VpreB, CD79a, CD79b, CD30, CD33, CD38, CD40, CD44v6, CD70, CLL-1/CLEC12A, CD123, IL-3R complex, TIM-3, BCMA, TACI, SLAMF7, CD244, Epcam, E-cadherin, B7-H3, B7-H4, and fragments or combinations thereof.

3.2.2. Functional Sorting Zip Construct for Activating APCs

The presently disclosed subject matter provides systems for activating APCs comprising any membrane-bound polypeptide and/or any soluble polypeptide discloses herein, or any system disclosed herein. In certain embodiments, the antigen of the antigen binding domain of the soluble polypeptide, optionally comprised in any system discloses herein, is an activating receptor. In certain embodiments, the binding of the antigen binding domain to the activating receptor is capable of activating an antigen presenting cell (APC). In certain embodiments, the APC is a professional APC. In certain embodiments, the professional APC is selected from the group consisting of dendritic cells, macrophages, B cells, and combinations thereof. In certain embodiments, the APC is a non-professional APC. In certain embodiments, the APC is a cell of the myeloid lineage. In certain embodiments, the cell of myeloid lineage is selected from the group consisting of dendritic cells, macrophages, monocytes and combinations thereof. In certain embodiments, the activating receptor is selected from the group consisting of CD40, Toll Like Receptors (TLRs), FLT3, RANK, GM-CSF receptor, and fragments or combinations thereof.

3.2.3. Functional Sorting Zip Construct Targeting Immune Checkpoint Blockers The presently disclosed subject matter provides systems for targeting immune checkpoint blockers comprising any membrane-bound polypeptide and/or any soluble polypeptide discloses herein, or any system disclosed herein. In certain embodiments, the antigen of the antigen binding domain of the soluble polypeptide disclosed herein, optionally comprised in any system discloses herein, is an immune checkpoint molecule. In certain embodiments, binding of the antigen binding domain to the immune checkpoint molecule is capable of blocking an immune checkpoint signal in an immunoresponsive cell. In certain embodiments, the immune checkpoint molecule is selected from the group consisting of PD-L1, CD200, B7-H3, B7-H4, HVEM, Galectin9, PD-1, CTLA-4, CD200R, TIM-3, Lag-3, TIGIT, and fragments or combinations thereof.

3.2.4. Functional Sorting Zip Construct for Conditioning Regimen for Hematopoietic Stem Cell Transplantation The presently disclosed subject matter provides systems for conditioning regimen for hematopoietic stem cell transplantation, comprising any membrane-bound polypeptide and/or any soluble polypeptide discloses herein, or any system disclosed herein. In certain embodiments, the antigen of the antigen binding domain of the soluble polypeptide disclosed herein, optionally comprised in any system discloses herein, is a biomarker of a hematopoietic lineage cell. In certain embodiments, the biomarker of a hematopoietic lineage cell is selected from the group consisting of CD3, CD16, CD33, c-Kit, CD161, CD19, CD20, vPreB/CD179a (preB cell receptor), luteinizing hormone receptor (LHCGR), CD123, IL-3R complex, CLEC12A/CLL-1, and combinations thereof. In certain embodiments, the system comprises at least four soluble polypeptides, wherein the antigen binding domain of each soluble polypeptide binds to a different biomarker of a hematopoietic lineage cell. In certain embodiments, each of the at least four soluble polypeptides comprises a dimerization domain that comprises a leucine zipper domain. In certain embodiments, the system comprises a first soluble polypeptide that binds to CD3, a second soluble polypeptide that binds to CD19, a third soluble polypeptide that binds to CD161 and a fourth soluble polypeptide that binds to c-Kit.

In certain embodiments, the dimerization domain that interacts with the membrane-bound polypeptide (also referred to as "capture leucine zipper" or "transmembrane capture leucine zipper") is the appended heterodimerizing leucine zipper of the soluble polypeptide (also referred to as "secreted leucine zippers" or "secreted molecules"), which also comprise an affinity tag and an antigen-binding domain (e.g., a scFv or ligand) that binds to a target antigen. See e.g., FIG. 1, the system on the left. The membrane-bound polypeptide and soluble polypeptides may have the same heterodimerizing leucine zipper domain (e.g., RR12EE345L) if interacting with the same heterodimerizing leucine zipper domain (e.g., EE12RR345L). In certain embodiments, the leucine zipper of the multiple soluble polypeptides (e.g., four soluble polypeptides) and the leucine zipper of the membrane-bound polypeptide are non-orthogonal zippers, i.e., degenerate zippers, which allow all the antigens to be targeted by a membrane-bound polypeptide (a CD3ζ comprising ZipR-CAR), which can result in killing of that component of the hematopoietic system by the effector cells.

3.2.5. Functional Sorting Zip Construct with AND-CAR

The presently disclosed subject matter provides systems for conditioning regimen for hematopoietic stem cell transplantation, comprising any membrane-bound polypeptide and/or any soluble polypeptide discloses herein, or any system disclosed herein. In certain embodiments, the system further comprises c) a chimeric antigen receptor (CAR) comprising a second antigen binding domain (e.g., one t binds to a second antigen), a transmembrane domain, and an intracellular activating domain. The CAR can activate an immunoresponsive cell, e.g., a T cell. In certain embodiments, the system further comprises an inhibitory receptor comprising a leucine zipper domain, wherein the inhibitory receptor binds to a third antigen, e.g., the inhibitory receptor comprising a third antigen binding domain that binds to a third antigen. The inhibitory receptor can be membrane-bound. The inhibitory receptor can be a tyrosine phosphatase-based inhibitory receptor. In certain embodiments, the tyrosine phosphatase is selected from the group consisting of PTPRJ, PTPRC, PTPN22, and PTPN6. In the absence of the third antigen, the inhibitory receptor constitutively inhibits and/or deactivates the CAR, e.g., by dephosphorylation. Binding of the inhibitory receptor to the third antigen prevents the inhibition and/or deactivation of the CAR by the inhibitory receptor, e.g., upon binding of the inhibitory receptor, the inhibitory receptor does not inhibit the CAR. In summary, the inhibitory receptor is constitutively inhibitory, but can be "turned off" in the presence of the third antigen (e.g., the CAR inhibitory capacity of the inhibitory receptor is turned off).

3.3. Zip Construct with Membrane Bound Cytokines and/or Chemokines

The presently disclosed subject matter provides a system, comprising: a) a membrane-bound polypeptide disclosed herein (e.g., a membrane-bound polypeptide comprising a transmembrane domain, an intracellular domain and an extracellular domain that comprises a first dimerization domain), and b) a soluble polypeptide (e.g., a soluble polypeptide comprising a second dimerization domain that is capable of dimerizing with the first dimerization domain, and a cytokine or a chemokine). In certain embodiments, each of the first dimerization domain and the second dimerization domain comprises a leucine zipper domain.

In certain embodiments, the cytokine is selected from the group consisting of IL-1, IL-2, IL-3, IL-7, IL-10, IL-12, IL-15, IL-17, IL-18, IL-21, IL-22, and combinations thereof.

In certain embodiments, the chemokine is selected from the group consisting of CCL1, CCL17, CCL8, CCL16, CCL18, CCL22, and combinations thereof.

In certain embodiments, the extracellular domain of the membrane-bound polypeptide further comprises a third dimerization domain, and wherein the second dimerization domain is capable of dimerizing with the first dimerization domain prior to dimerization between the first dimerization domain and the third dimerization domain.

3.4. Common Features of Systems Disclosed Herein

Any features of the membrane-bound polypeptides or soluble polypeptides disclosed herein can be applied to the systems disclosed herein, e.g., the systems disclosed in Sections 3.1, 3.2, and 3.3. The following exemplary features are applicable to any systems disclosed herein, e.g., the systems disclosed in Sections 3.1, 3.2, and 3.3.

In certain embodiments, the extracellular domain of the membrane-bound polypeptide further comprises a linker between the first dimerization domain and the second dimerization domain. In certain embodiments, the linker comprises the amino acid sequence set forth in SEQ ID NO: 3.

In certain embodiments, the first dimerization domain comprises the amino acid sequence set forth in SEQ ID NO: 1, SEQ ID NO: 2, or SEQ ID NO: 67, and each of the second and third dimerization domains comprises the amino acid sequence set forth in SEQ ID NO: 2, SEQ ID NO: 1, or SEQ ID NO: 67. In certain embodiments, the soluble polypeptide and the membrane-bound polypeptide are capable of forming a dimer when expressed from the same cell. In certain embodiments, the soluble polypeptide and the membrane-bound polypeptide are not capable of forming a dimer when expressed from different cells due to the dimerization between the first dimerization domain and the second dimerization domain of the membrane-bound polypeptide.

In certain embodiments, the intracellular domain of the membrane-bound polypeptide comprises a CD3-ζ domain, a costimulatory domain, or a combination thereof.

In certain embodiments, the system further comprises a suicide module. In certain embodiments, the suicide module is an inducible Caspase 9 polypeptide (iCasp9).

In certain embodiments, the extracellular domain further comprises a spacer/hinge domain between the first dimerization domain and the transmembrane domain. In certain embodiments, the spacer/hinge domain comprises an epitope of a first antibody, wherein binding of the antibody to the epitope mediates depletion of a cell comprising the membrane-bound polypeptide. In certain embodiments, the spacer/hinge domain comprises a Thy1.1 molecule, circular CD20 mimotope, or a truncated EGFR molecule (EGFRt)

In certain embodiments, the antigen binding domain of the soluble polypeptide comprises a single-chain variable fragment (scFv), a soluble ligand, a cytokine, a non-scFv-based antigen recognition motif, or a combination thereof.

In certain embodiments, the membrane-bound polypeptide is expressed from a first vector. In certain embodiments, the soluble polypeptide is expressed from a second vector. In certain embodiments, the first vector and/or second vector is a viral vector or a transposon-based vector. In certain embodiments, the first vector is the same as the second vector.

In certain embodiments, the leucine zipper domains are orthogonal zippers.

In certain embodiments, the membrane-bound polypeptide and/or the soluble polypeptide further comprises a tag. In certain embodiments, the tag comprises an epitope tag that is recognized by a first antibody. In certain embodiments, the epitope tag is selected from the group consisting of a Myc-tag, a HA-tag, a Flag-tag, a V5-tag, a T7-tag, and combinations thereof. In certain embodiments, the tag comprises an affinity tag that binds to a substrate. In certain embodiments, the affinity tag is selected from the group consisting of a His-tag, a Strep-tag, an E-tag, a streptavidin binding protein tag (SBP-tag), and combinations thereof.

In certain embodiments, the membrane-bound polypeptide and/or the soluble polypeptide further comprises a mimotope recognized by an antibody, wherein binding of the antibody to the mimotope mediates depletion of a cell comprising the membrane-bound polypeptide. In certain embodiments, the mimotope is CD20.

3.5. Exemplary Systems

In certain embodiments, the membrane-bound polypeptide comprises an EE12RR345L leucine zipper, a myc tag, a CD28 costimulatory domain, a CD3ζ polypeptide, an E2A peptide, and a Thy1.1 polypeptide. (No spacer; only a short linker: AAASGSL [SEQ ID NO: 94]; no myc staining). In certain embodiments, the membrane-bound polypeptide comprises SEQ ID NO: 24.

```
                                            [SEQ ID NO: 24]
METDTLLLWVLLLWVPGSTGLEIEAAFLERENTALETRVA

ELRQRVQRLRNRVSQYRTRYGPLGGGKGSGEQKLISEEDL

AAASGSLIYIWAPLAGICVALLLSLIITLICYNSRRNRLL

QSDYMNMTPRRPGLTRKPYQPYAPARDFAAYRPRAKFSRS

AETAANLQDPNQLYNELNLGRREEYDVLEKKRARDPEMGG

KQQRRRNPQEGVYNALQDKMAEAYSEIGTKGERRRGKGH

DGLYQGLSTATKDTYDALHMQTLAPRGTGQCTNYALLKLA

GDVESNPGPGSMNPAISVALLLSVLQVSRGQKVTSLTACL

VNQNLRLDCRHENNTKDNSIQHEFSLTREKRKHVLSGTLG

IPEHTYRSRVTLSNQPYIKVLTLANFTTKDEGDYFCELRV

SGANPMSSNKSISVYRDKLVKCGGISLLVQNTSWMLLLLL

SLSLLQALDFISL
```

In certain embodiments, the membrane-bound polypeptide comprises an EE12RR345L leucine zipper, a myc tag, a CD28EC-9C hinge, a CD28 costimulatory domain, a CD3ζ polypeptide, an E2A peptide, and a Thy1.1 polypeptide. (CD28-hinge nine amino acid spacer; no myc staining). In certain embodiments, the membrane-bound polypeptide comprises SEQ ID NO: 25.

```
                                            [SEQ ID NO: 25]
METDTLLLWVLLLWVPGSTGLEIEAAFLERENTALETRVA

ELRQRVQRLRNRVSQYRTRYGPLGGGKGSGEQKLISEEDL

AAACHTQSSPKLGSLIYIWAPLAGICVALLLSLIITLICY

NSRRNRLLQSDYMNMTPRRPGLTRKPYQPYAPARDFAAYR

PRAKFSRSAETAANLQDPNQLYNELNLGRREEYDVLEKKR

ARDPEMGGKQQRRRNPQEGVYNALQDKMAEAYSEIGTKG
```

```
-continued
ERRRGKGHDGLYQGLSTATKDTYDALHMQTLAPRGTGQCT

NYALLKLAGDVESNPGPGSMNPAISVALLLSVLQVSRGQK

VTSLTACLVNQNLRLDCRHENNTKDNSIQHEFSLTREKRK

HVLSGTLGIPEHTYRSRVTLSNQPYIKVLTLANFTTKDEG

DYFCELRVSGANPMSSNKSISVYRDKLVKCGGISLLVQNT

SWMLLLLLSLSLLQALDFISL
```

In certain embodiments, the membrane-bound polypeptide comprises a V5 tag, an EE12RR345L leucine zipper, a IgG1 hinge, a CD28 costimulatory domain, a CD3ζ polypeptide, an E2A peptide, and a Thy1.1 polypeptide. (IgG1 hinge spacer. V5 tag staining identifies the membrane-bound polypeptide surface expression). In certain embodiments, the membrane-bound polypeptide comprises SEQ ID NO: 26.

```
                                            [SEQ ID NO: 26]
METDTLLLWVLLLWVPGSTGGSGGKPIPNPLLGLDSTGGG

GSGGGSLEIEAAFLERENTALETRVAELRQRVQRLRNRVS

QYRTRYGPLGGGKAAAVPRDCGCKPCICTGSLIYIWAPLA

GICVALLLSLIITLICYNSRRNRLLQSDYMNMTPRRPGLT

RKPYQPYAPARDFAAYRPRAKFSRSAETAANLQDPNQLYN

ELNLGRREEYDVLEKKRARDPEMGGKQQRRRNPQEGVYNA

LQKDKMAEAYSEIGTKGERRRGKGHDGLYQGLSTATKDTY

DALHMQTLAPRGTGQCTNYALLKLAGDVESNPGPGSMNPA

ISVALLLSVLQVSRGQKVTSLTACLVNQNLRLDCRHENNT

KDNSIQHEFSLTREKRKHVLSGTLGIPEHTYRSRVTLSNQ

PYIKVLTLANFTTKDEGDYFCELRVSGANPMSSNKSISVY

RDKLVKCGGISLLVQNTSWMLLLLLSLSLLQALDFISL
```

In certain embodiments, the membrane-bound polypeptide comprises a reverse tetracycline-controlled transactivator 3 (rtTA3), a P2A peptide, a V5 tag, an EE12RR345L leucine zipper, a IgG1 hinge, a CD28 costimulatory domain, a CD3ζ polypeptide, an E2A peptide, and a Thy1.1 polypeptide. (Tetracycline inducible ZipR-CAR with IgG1 hinge spacer; contains rtTA3 tetracycline inducible transactivator; ZipR scFv vector contains tetracycline response element tre3g sequence in self-inactivating retrovirus. V5 tag staining identifies the membrane-bound polypeptide surface expression). In certain embodiments, the membrane-bound polypeptide comprises SEQ ID NO: 27.

```
                                            [SEQ ID NO: 27]
MSRLDKSKVINGALELLNGVGIEGLTTRKLAQKLGVEQPT

LYWHVKNKRALLDALPIEMLDRHHTHFCPLEGESWQDFLR

NNAKSYRCALLSHRDGAKVHLGTRPTEKQYETLENQLAFL

CQQGFSLENALYALSAVGHFTLGCVLEEQEHQVAKEERET

PTTDSMPPLLRQAIELFDRQGAEPAFLFGLELIICGLEKQ

LKCESGGPTDALDDFDLDMLPADALDDFDLDMLPGGSGAT
```

```
                    -continued
NFSLLKQAGDVEENPGPEFTMETDTLLLWVLLLWVPGSTG

GSGGKPIPNPLLGLDSTGGGGSGGGSLEIEAAFLERENTA

LETRVAELRQRVQRLRNRVSQYRTRYGPLGGGKAAAVPRD

CGCKPCICTGSLIYIWAPLAGICVALLLSLIITLICYNSR

RNRLLQSDYMNMTPRRPGLTRKPYQPYAPARDFAAYRPRA

KFSRSAETAANLQDPNQLYNELNLGRREEYDVLEKKRARD

PEMGGKQQRRRNPQEGVYNALQKDKMAEAYSEIGTKGERR

RGKGHDGLYQGLSTATKDTYDALHMQTLAPRGTGQCTNYA

LLKLAGDVESNPGPGSMNPAISVALLLSVLQVSRGQKVTS

LTACLVNQNLRLDCRHENNTKDNSIQHEFSLTREKRKHVL

SGTLGIPEHTYRSRVTLSNQPYIKVLTLANFTTKDEGDYF

CELRVSGANPMSSNKSISVYRDKLVKCGGISLLVQNTSWM

LLLLLSLSLLQALDFISL
```

In certain embodiments, the membrane-bound polypeptide comprises an EE12RR345L leucine zipper, a myc tag, an CD8EC hinge, a CD28 costimulatory domain, a CD3ζ polypeptide, an E2A peptide, and a Thy1.1 polypeptide. (CD8 spacer; positive myc staining). In certain embodiments, the membrane-bound polypeptide comprises SEQ ID NO: 28.

```
                                        [SEQ ID NO: 28]
METDTLLLWVLLLWVPGSTGLETEAAFLERENTALETRVA

ELRQRVQRLRNRVSQYRTRYGPLGGGKGSGEQKLISEEDL

AAASTTTKPVLRTPSPVHPTGTSQPQRPEDCRPRGSVKGT

GLDFACDIYIWAPLAGICVALLLSLIITLICYNSRRNRLL

QSDYMNMTPRRPGLTRKPYQPYAPARDFAAYRPRAKFSRS

AETAANLQDPNQLYNELNLGRREEYDVLEKKRARDPEMGG

KQQRRRNPQEGVYNALQKDKMAEAYSEIGTKGERRRGKGH

DGLYQGLSTATKDTYDALHMQTLAPRGTGQCTNYALLKLA

GDVESNPGPGSMNPAISVALLLSVLQVSRGQKVTSLTACL

VNQNLRLDCRHENNTKDNSIQHEFSLTREKRKHVLSGTLG

IPEHTYRSRVTLSNQPYIKVLTLANFTTKDEGDYFCELRV

SGANPMSSNKSISVYRDKLVKCGGISLLVQNTSWMLLLLL

SLSLLQALDFISL
```

In certain embodiments, the soluble polypeptide comprises a CD19 scFv, a FLAG tag, a RR12EE345L leucine zipper, a T2A peptide, and a blue fluorescent protein (BFP). In certain embodiments, the soluble polypeptide comprises SEQ ID NO: 29.

```
                                        [SEQ ID NO: 29]
EFTDYKDDDDKLEIRAAFLRQRNTALRTEVAELEQEVQRL

ENEVSQYETRYGPLGGGKGSGRAKRATNFSLLKQAGDVEE

NPGPTRTGLESMSELIKENMHMKLYMEGTVDNHHFKCTSE

GEGKPYEGTQTMRIKVVEGGPLPFAFDILATSFLYGSKTF

INHTQGIPDFFKQSFPEGFTWERVTTYEDGGVLTATQDTS

LQDGCLIYNVKIRGVNFTSNGPVMQKKTLGWEAFTETLYP

ADGGLEGRNDMALKLVGGSHLIANIKTTYRSKKPAKNLKM

PGVYYVDYRLERIKEANNETYVEQHEVAVARYCDLPSKLG

HKLN
```

In certain embodiments, the system comprises a CD19 scFv, a FLAG tag, a RR12EE345L leucine zipper, a P2A peptide, a CD20 scFv, a second FLAG tag, a second RR12EE345L leucine zipper, a T2A peptide, and a blue fluorescent protein (BFP). In certain embodiments, the system comprises SEQ ID NO: 30 and 31.

```
                                        [SEQ ID NO: 30]
EFTDYKDDDDKLEIRAAFLRQRNTALRTEVAELEQEVQRL

ENEVSQYETRYGPLGGGKGSGRAKRATNFSLLKQAGDVE

ENPGPTRT
                                        [SEQ ID NO: 31]
RSGDYKDDDDKLEIRAAFLRQRNTALRTEVAELEQEVQR

LENEVSQYETRYGPLGGGKGSGGSGRAKRQCTNYALLKL

AGDVESNPGPGSLGSGLESMSELIKENMHMKLYMEGTVD

NHHFKCTSEGEGKPYEGTQTMRIKVVEGGPLPFAFDILA

TSFLYGSKTFINHTQGIPDFFKQSFPEGFTWERVTTYED

GGVLTATQDTSLQDGCLIYNVKIRGVNFTSNGPVMQKKT

LGWEAFTETLYPADGGLEGRNDMALKLVGGSHLIANIKT

TYRSKKPAKNLKMPGVYYVDYRLERIKEANNETYVEQHE

VAVARYCDLPSKLGHKLN
```

In certain embodiments, the system comprises a CD19 scFv, a FLAG tag, a RR12EE345L leucine zipper, a P2A peptide, a CD20 scFv, a second FLAG tag, a second RR12EE345L leucine zipper, an E2A peptide, an IL-3 polypeptide, a third FLAG tag, a third RR12EE345L leucine zipper, a T2A peptide, and a blue fluorescent protein (BFP). In certain embodiments, the system comprises SEQ ID NO: 32 and 33.

```
                                        [SEQ ID NO: 32]
EFTDYKDDDDKLEIRAAFLRQRNTALRTEVAELEQEVQRL

ENEVSQYETRYGPLGGGKGSGRAKRATNFSLLKQAGDVEE

NPGPTRT
                                        [SEQ ID NO: 33]
RSGDYKDDDDKLEIRAAFLRQRNTALRTEVAELEQEVQRL

ENEVSQYETRYGPLGGGKGSGGSGRAKRQCTNYALLKLAG

DVESNPGPGSLMVLASSTTSIHTMLLLLLMLFHLGLQASI

SGRDTHRLTRTLNCSSIVKETIGKLPEPELKTDDEGPSLR

NKSFRRVNLSKFVESQGEVDPEDRYVIKSNLQKLNCCLPT

SANDSALPGVFIRDLDDERKKLRFYMVHLNDLETVLTSRP

PQPASGSVSPNRGTVECGSGDYKDDDDKLEIRAAFLRQRN
```

-continued
TALRTEVAELEQEVQRLENEVSQYETRYGPLGGGKGSGRA

KREGRGSLLTCGDVEENPGPLESMSELIKENMHMKLYMEG

TVDNHHEKCTSEGEGKPYEGTQTMRIKVVEGGPLPFAFDI

LATSFLYGSKTFINHTQGIPDFFKQSFPEGFTWERVTTYE

DGGVLTATQDTSLQDGCLIYNVKIRGVNFTSNGPVMQKKT

LGWEAFTETLYPADGGLEGRNDMALKLVGGSHLIANIKTT

YRSKKPAKNLKMPGVYYVDYRLERIKEANNETYVEQHEVA

VARYCDLPSKLGHKLN

In certain embodiments, the soluble polypeptide comprises a mouse IL-7 polypeptide fused to FLAG-tagged RR12EE345L leucine zipper, an E2A peptide, and a blue fluorescent protein (BFP). In certain embodiments, the soluble polypeptide comprises SEQ ID NO: 34.

[SEQ ID NO: 34]
MFHVSFRYIFGIPPLILVLLPVTSSECHIKDKEGKAYESV

LMISIDELDKMTGTDSNCPNNEPNFFRKHVCDDTKEAAFL

NRAARKLKQFLKMNISEEFNVHLLTVSQGTQTLVNCTSKE

EKNVKEQKKNDACFLKRLLREIKTCWNKILKGSIEFTDYK

DDDDKLEIRAAFLRQRNTALRTEVAELEQEVQRLENEVSQ

YETRYGPLGGGKGSGRAKRATNFSLLKQAGDVEENPGPTR

TGLESMSELIKENMHMKLYMEGTVDNHHFKCTSEGEGKPY

EGTQTMRIKVVEGGPLPFAFDILATSFLYGSKTFINHTQG

IPDFFKQSFPEGFTWERVTTYEDGGVLTATQDTSLQDGCL

IYNVKIRGVNFTSNGPVMQKKTLGWEAFTETLYPADGGLE

GRNDMALKLVGGSHLIANIKTTYRSKKPAKNLKMPGVYYV

DYRLERIKEANNETYVEQHEVAVARYCDLPSKLGHKLN

In certain embodiments, the soluble polypeptide comprises a mouse IL-15 polypeptide, fused to FLAG-tagged RR12EE345L leucine zipper, an E2A peptide, and a blue fluorescent protein (BFP), and comprises a mouse IL-2 signal peptide. In certain embodiments, the soluble polypeptide comprises SEQ ID NO: 35.

[SEQ ID NO: 35]
MYSMQLASCVTLTLVLLVNSNWIDVRYDLEKIESLIQSIH

IDTTLYTDSDFHPSCKVTAMNCFLLELQVILHEYSNMTLN

ETVRNVLYLANSTLSSNKNVAESGCKECEELEEKTFTEFL

QSFIRIVQMFINTSRSGDYKDDDDKLEIRAAFLRQRNTAL

RTEVAELEQEVQRLENEVSQYETRYGPLGGGKGSGGSGRA

KRQCTNYALLKLAGDVESNPGPGSLGSGLESMSELIKENM

HMKLYMEGTVDNHHFKCTSEGEGKPYEGTQTMRIKVVEGG

PLPFAFDILATSFLYGSKTFINHTQGIPDFFKQSFPEGFT

WERVTTYEDGGVLTATQDTSLQDGCLIYNVKIRGVNFTSN

GPVMQKKTLGWEAFTETLYPADGGLEGRNDMALKLVGGSH

-continued
LIANIKTTYRSKKPAKNLKMPGVYYVDYRLERIKEANNET

YVEQHEVAVARYCDLPSKLGHKLN

In certain embodiments, the soluble polypeptide comprises a mouse IL-21 polypeptide fused to FLAG-tagged RR12EE345L leucine zipper, an E2A peptide, and a blue fluorescent protein (BFP). In certain embodiments, the soluble polypeptide comprises SEQ ID NO: 36.

[SEQ ID NO: 36]
MERTLVCLVVIFLGTVAHKSSPQGPBRLLIRLRHLIDIVE

QLKIYENBLBPELLSAPQBVKGHCEHAAFACFQKAKLKPS

NPGNNKTFIIDLVAQLRRRLPARRGGKKQKHIAKCPSCDS

YEKRTPKEFLERLKWLLQKMIHQHLSEFTDYKDDDDKLEI

RAAFLRQRNTALRTEVAELEQEVQRLENEVSQYETRYGPL

GGGKGSGRAKRATNFSLLKQAGDVEENPGPTRTGLESMSE

LIKENMHMKLYMEGTVDNHHFKCTSEGEGKPYEGTQTMRI

KVVEGGPLPFAFDILATSFLYGSKTFINHTQGIPDFFKQS

FPEGFTWERVTTYEDGGVLTATQDTSLQDGCLIYNVKIRG

VNFTSNGPVMQKKTLGWEAFTETLYPADGGLEGRNDMALK

LVGGSHLIANIKTTYRSKKPAKNLKMPGVYYVDYRLERIK

EANNETYVEQHEVAVARYCDLPSKLGHKLN

In certain embodiments, the soluble polypeptide comprises a mouse IL-21 polypeptide fused to FLAG-tagged RR12EE345L leucine zipper, an E2A peptide, and a blue fluorescent protein (BFP), and comprises a mouse IL-2 signal peptide. In certain embodiments, the soluble polypeptide comprises SEQ ID NO: 37.

[SEQ ID NO: 37]
MYSMQLASCVTLTLVLLVNSHKSSPQGPDRLLIRLRHLID

IVEQLKIYENDLDPELLSAPQDVKGHCEHAAFACFQKAKL

KPSNPGNNKTFIIDLVAQLRRRLPARRGGKKQKHIAKCPS

CDSYEKRTPKEFLERLKWLLQKMIHQHLSGGGGSGGGSEF

TDYKDDDDKLEIRAAFLRQRNTALRTEVAELEQEVQRLEN

EVSQYETRYGPLGGGKGSGRAKRATNFSLLKQAGDVEENP

GPTRTGLESMSELIKENMHMKLYMEGTVDNHHFKCTSEGE

GKPYEGTQTMRIKVVEGGPLPFAFDILATSFLYGSKTFIN

HTQGIPDFFKQSFPEGFTWERVTTYEDGGVLTATQDTSLQ

DGCLIYNVKIRGVNFTSNGPVMQKKTLGWEAFTETLYPAD

GGLEGRNDMALKLVGGSHLIANIKTTYRSKKPAKNLKMPG

VYYVDYRLERIKEANNETYVEQHEVAVARYCDLPSKLGHK

LN

In certain embodiments, the system comprises a mouse IL-7 polypeptide, a RR12EE345L leucine zipper, a FLAG tag, a P2A peptide, an sIL-15 polypeptide, a second FLAG tag, a second RR12EE345L leucine zipper, an E2A peptide, and a blue fluorescent protein (BFP). In certain embodiments, the system comprises SEQ ID NO: 38.

[SEQ ID NO: 38]
MFHVSFRYIFGIPPLILVLLPVTSSECHIKDKEGKAYESV

LMISIDELDKMTGTDSNCPNNEPNFFRKHVCDDTKEAAFL

NRAARKLKQFLKMNISEEFNVHLLLTVSQGTQTLVNCTSKE

EKNVKEQKKNDACFLKRLLREIKTCWNKILKGSIEFTDYK

DDDDKLEIRAAFLRQRNTALRTEVAELEQEVQRLENEVSQ

YETRYGPLGGGKGSGRAKRATNFSLLKQAGDVEENPGPTR

TMYSMQLASCVTLTLVLLVNSNWIDVRYDLEKIESLIQSI

HIDTTLYTDSDFHPSCKVTAMNCFLLELQVILHEYSNMTL

NETVRNVLYLANSTLSSNKNVAESGCKECEELEEKTFTEF

LQSFIRIVQMFINTSRSGDYKDDDDKLEIRAAFLRQRNTA

LRTEVAELEQEVQRLENEVSQYETRYGPLGGGKGSGGSGR

AKRQCTNYALLKLAGDVESNPGPGSLGSGLESMSELIKEN

MHMKLYMEGTVDNHHFKCTSEGEGKPYEGTQTMRIKVVEG

GPLPFAFDILATSFLYGSKTFINHTQGIPDFFKQSFPEGF

TWERVTTYEDGGVLTATQDTSLQDGCLIYNVKIRGVNFTS

NGPVMQKKTLGWEAFTETLYPADGGLEGRNDMALKLVGGS

HLIANIKTTYRSKKPAKNLKMPGVYYVDYRLERIKEANNE

TYVEQHEVAVARYCDLPSKLGHKLN

In certain embodiments, the soluble polypeptide comprises a CCL1 polypeptide fused to a FLAG-tagged RR12EE345L leucine zipper. In certain embodiments, the soluble polypeptide comprises SEQ ID NO: 87.

[SEQ ID NO: 87]
MASPLTRELSLNLLLLGESTILGSGEAKSMLTVSNSCCLN

TLKKELPLKFIQCYRKMGSSCPDPPAVVERLNKGRESCAS

TNKTWVQNHLKKVNPCSGGGGSDPEFTDYKDDDDKLEIRA

AFLRQRNTALRTEVAELEQEVQRLENEVSQYETRYGPLGG

GK

An exemplary nucleotide sequence encoding the amino acid sequence of SEQ ID NO: 87 is set forth in SEQ ID NO: 88, which is provided below.

[SEQ ID NO: 88]
ATGGCCTCACCGTTGACCCGCTTTCTGTCGCTGAACCTGC

TGCTGCTGGGTGAGTCGATTATCCTGGGGAGTGGAGAAGC

TAAGAGCATGCTTACGGTCTCCAATAGCTGCTGCTTGAAC

ACCTTGAAGAAAGAGCTTCCCCTGAAGTTTATCCAGTGTT

ACAGAAAGATGGGCTCCTCCTGTCCTGATCCCCCAGCTGT

GGTATTCAGGCTGAACAAAGGTAGAGAAAGCTGCGCCTCA

ACTAACAAAACGTGGGTTCAAAATCACCTGAAGAAGGTGA

ACCCCTGCAGCGGCGGGGTGGCAGCGACCCCGAATTCAC

CGATTACAAGGACGACGATGACAAGCTGGAGATCCGCGCT

GCATTTTTGCGACAAAGAAATACCGCTTTGCGAACCGAAG

TGGCCGAGTTGGAGCAGGAAGTACAACGCCTGGAAAATGA

AGTCAGCCAATACGAAACTCGATATGGACCTCTCGGAGGT

GGAAAG

In certain embodiments, the soluble polypeptide comprises a CCL17 polypeptide fused to a FLAG-tagged RR12EE345L leucine zipper. In certain embodiments, the soluble polypeptide comprises SEQ ID NO: 89.

[SEQ ID NO: 89]
MASPLTRFLSLNLLLLGESIILGSGEAARATNVGRECCLD

YFKGAIPIRKLVSWYKTSVECSRDAIVFLTVQGKLICADP

KDKHVKKAIRLVKNPRPSGGGGSDPEFTDYKDDDDKLEIR

AAFLRQRNTALRTEVAELEQEVQRLENEVSQYETRYGPLG

GGK

An exemplary nucleotide sequence encoding the amino acid sequence of SEQ ID NO: 89 is set forth in SEQ ID NO: 90, which is provided below.

[SEQ ID NO: 90]
ATGGCCTCACCGTTGACCCGCTTTCTGTCGCTGAACCTGC

TGCTGCTGGGTGAGTCGATTATCCTGGGGAGTGGAGAAGC

CGCCCGAGCCACCAATGTAGGCCGAGAGTGCTGCCTGGAT

TACTTCAAAGGGGCCATTCCTATCAGGAAGTTGGTGAGCT

GGTATAAGACCTCAGTGGAGTGTTCCAGGGATGCCATCGT

GTTTCTGACTGTCCAGGGCAAGCTCATCTGTGCAGACCCC

AAAGACAAACATGTGAAGAAGGCCATCAGATTGGTGAAAA

ACCCAAGGCCAAGCGGCGGGGGTGGCAGCGACCCCGAATT

CACCGATTACAAGGACGACGATGACAAGCTGGAGATCCGC

GCTGCATTTTTGCGACAAAGAAATACCGCTTTGCGAACCG

AAGTGGCCGAGTTGGAGCAGGAAGTACAACGCCTGGAAAA

TGAAGTCAGCCAATACGAAACTCGATATGGACCTCTCGGA

GGTGGAAAG

In certain embodiments, the soluble polypeptide comprises a CCL22 polypeptide fused to a FLAG-tagged RR12EE345L leucine zipper. In certain embodiments, the soluble polypeptide comprises SEQ ID NO: 91.

[SEQ ID NO: 91]
MASPLTRFLSLNLLLLGESIILGSGEAGPYGANVEDSICC

QDYIRHPLPSRLVKEFFWISKSCRKPGVVLITVKNRDICA

DPRQVWVKKLLHKLSSGGGGSDPEFTDYKDDDDKLEIRAA

FLRQRNTALRIEVAELEQEVQRLENEVSQYETRYGPLGGG

K

An exemplary nucleotide sequence encoding the amino acid sequence of SEQ ID NO: 91 is set forth in SEQ ID NO: 92, which is provided below.

```
                                                      [SEQ ID NO: 92]
ATGGCCTCACCGTTGACCCGCTTTCTGTCGCTGAACCTGC

TGCTGCTGGGTGAGTCGATTATCCTGGGGAGTGGAGAAGC

CGGTCCCTATGGTGCCAATGTGGAAGACAGTATCTGCTGC

CAGGACTACATCCGTCACCCTCTGCCATCACGTTTAGTGA

AGGAGTTCTTCTGGACCTCAAAATCCTGCCGCAAGCCTGG

CGTTGTTTTGATAACCGTCAAGAACCGAGATATCTGTGCC

GATCCCAGGCAGGTCTGGGTGAAGAAGCTACTCCATAAAC

TGTCCAGCGGCGGGGGTGGCAGCGACCCCGAATTCACCGA

TTACAAGGACGACGATGACAAGCTGGAGATCCGCGCTGCA

TTTTTGCGACAAAGAAATACCGCTTTGCGAACCGAAGTGG

CCGAGTTGGAGCAGGAAGTACAACGCCTGGAAAATGAAGT

CAGCCAATACGAAACTCGATATGGACCTCTCGGAGGTGGA

AAG
```

Exemplary sequences of the elements comprised in a leucine zipper construct are as follows.

Interchain linker: SGGGGSDPEFT [SEQ ID NO: 93]

2A Peptide Sequences:

```
E2A    QCTNYALLKLAGDVESNPGP
       [SEQ ID NO: 39]

F2A    VKQTLNFDLLKLAGDVESNPGP
       [SEQ ID NO: 40]

P2A    ATNFSLLKQAGDVEENPGP
       [SEQ ID NO: 41]

T2A    EGRGSLLTCGDVEENPGP
       [SEQ ID NO: 42]
```

Tag Sequences:

```
FLAG                   DYKDDDDK
                       [SEQ ID NO: 43]

Myc                    EQKLISEEDL
                       [SEQ ID NO: 44]

V5                     GKPIPNPLLGLDSTGGGGSGGGS
(additional            [SEQ ID NO: 45]
linker
underlined)
```

Signal Peptide Sequences:

```
Mouse kappa      METDTLLLWVLLLWVPGSTG
leader           [SEQ ID NO: 46]

Mouse CD8        MASPLTRFLSLNLLLLGESIILGSGEA
alpha            [SEQ ID NO: 47]

Mouse IL-2       MYSMQLASCVTLTLVLLVNS
                 [SEQ ID NO: 48]

Mouse IL-3       MVLASSITSIHTMLLLLLMLFHLGLQ
                 [SEQ ID NO: 49]
```

```
Mouse IL-7       MFHVSFRYIFGIPPLILVLLPVISS
                 [SEQ ID NO: 50]

Mouse IL-21      MERTLVCLVVIFLGTVA
                 [SEQ ID NO: 51]
```

Additional Sequences:

```
tagBFP           MSELIKENMHMKLYMEGTVDNHHFKCTSEGEGKPY
(Addgene         EGTQTMRIKVVEGGPLPFAFDILATSFLYGSKTFI
11240)           NHTQGIPDFFKQSFPEGFTWERVTTYEDGGVLTAT
                 QDTSLQDGCLIYNVKIRGVNFTSNGPVMQKKTLGW
                 EAFTETLYPADGGLEGRNDMALKLVGGSHLIANIK
                 TTYRSKKPAKNLKMPGVYYVDYRLERIKEANNETY
                 VEQHEVAVARYCDLPSKLGHKLN
                 [SEQ ID NO: 52]

rtTA3            MSRLDKSKVINGALELLNGVGIEGLTTRKLAQKLG
(Addgene         VEQPTLYWHVKNKRALLDALPIEMLDRHHTHFCPL
68449)           EGESWQDFLRNNAKSYRCALLSHRDGAKVHLGTRP
                 TEKQYETLENQLAFLCQQGFSLENALYALSAVGHF
                 TLGCVLEEQEHQVAKEERETPTTDSMPPLLRQATE
                 LFDRQGAEPAELFGLELIICGLEKQLKCESGGPTD
                 ALDDFDLDMLPADALDDFDLDMLPG
                 [SEQ ID NO: 53]

Mouse IL-3       MVLASSTTSIHTMLLLLLMLFHLGLQASISGRDTH
(mature          RLTRTLNCSSIVKETIGKLPEPELKTDDEGPSLRN
peptide          KSFRRVNLSKFVESQGEVDPEDRYVIKSNLQKLNC
underlined,      CLPTSANDSALPGVFIRDLDDERKKLRFYMVHLND
Uniprot          LETVLTSRPPQPASGSVSPNRGTVEC
P01586)          [SEQ ID NO: 54]

Mouse IL-7       MFHVSFRYIEGIPPLILVLLPVTSSECHIKDKEGK
(mature          AYESVLMISIDELDKMTGTDSNCPNNEPNFERKHV
peptide          CDDTKEAAFLNRAARKLKULKMNISEEENVHLLTV
underlined,      SQGTQTLVNCTSKEEKNVKEQKKNDACFLKRLLRE
Uniprot          IKTCWNKILKGSI
P10168)          [SEQ ID NO: 55]

Mouse IL-15      MKILKPYMRNTSISCYLCFLLNSHFLTEAGIHVFI
(mature          LGCVSVGLPKTEANWIDVRYDLEKIESLIQSIHID
peptide          TTLYTDSDFHPSCKVTAMNCELLELQVILHEYSNM
underlined,      ILNETVRNVLYLANSTLSSNKNVAESGCKECEELE
Uniprot          EKTFTEFLQSFIRIVQMFINTS
P48346)          [SEQ ID NO: 56]

Mouse IL-21      MERTLVCLVVIFLGTVAHKSSPQGPDRLLIRLRHL
(mature          IDIVEQLKIYENDLDPELLSAPQDVKGHCEHAAFA
peptide          CFQKAKLKPSNPGNNKTFIIDLVAQLRRRLPARRG
underlined,      GKKQKHIAKCPSCDSYEKRTPKEFLERLKWLLQKM
Uniprot          IHQHLS
Q9ES17)          [SEQ ID NO: 57]
```

4. Cells

The presently disclosed subject matter provides cells comprising a membrane-bound polypeptide, a soluble polypeptide and/or a system disclosed herein. In certain embodiments, the polypeptides and/or the system are capable of activating or inhibiting an immunoresponsive cell. In certain embodiments, the polypeptides and/or the system are capable of promoting an anti-tumor effect of an immunoresponsive cell. The cells can be transduced with the polypeptides and/or the systems such that the cells co-express the polypeptides and/or the system. In certain embodiments, the cell is an immunoresponsive cell. The cell can be a cell of the lymphoid lineage or a myeloid lineage.

Cells of the lymphoid lineage can produce antibodies, regulate the cellular immune system, detect foreign agents in the blood, and detect cells foreign to the host, and the like. Non-limiting examples of cells of the lymphoid lineage include T cells, B cells, dendric cells, Natural Killer (NK) cells, cells from which lymphoid cells may be differentiated. In certain embodiments, the stem cell is a pluripotent stem cell. In certain embodiments, the pluripotent stem cell is an embryonic stem cell or an induced pluripotent stem cell.

In certain embodiments, the cell is a T cell. T cells can be lymphocytes that mature in the thymus and are chiefly responsible for cell-mediated immunity. T cells are involved in the adaptive immune system. The T cells of the presently disclosed subject matter can be any type of T cells, including, but not limited to, helper T cells, cytotoxic T cells, memory T cells (including central memory T cells, stem-cell-like memory T cells (or stem-like memory T cells), and two types of effector memory T cells: e.g., $T_{EM}$ cells and $T_{EMRA}$ cells, Regulatory T cells (also known as suppressor T cells), Natural killer T cells, Mucosal associated invariant T cells, and γδ T cells. Cytotoxic T cells (CTL or killer T cells) are a subset of T lymphocytes capable of inducing the death of infected somatic or tumor cells. A patient's own T cells may be genetically modified to target specific antigens through the introduction of any polypeptide or system disclosed herein. The T cell can be a $CD4^+$ T cell or a $CD8^+$ T cell. In certain embodiments, the T cell is a $CD4^+$ T cell. In certain embodiments, the T cell is a $CD8^+$ T cell.

In certain embodiments, the cell is a Natural killer cell. Natural killer (NK) cells can be lymphocytes that are part of cell-mediated immunity and act during the innate immune response. NK cells do not require prior activation in order to perform their cytotoxic effect on target cells.

In certain embodiments, the cells are human lymphocytes. In certain embodiments, the human lymphocytes comprise without limitation, peripheral donor lymphocytes, e.g., those disclosed in Sadelain, M., et al. 2003 *Nat Rev Cancer* 3:35-45 (disclosing peripheral donor lymphocytes genetically modified to express CARs), in Morgan, R. A., et al. 2006 *Science* 314:126-129 (disclosing peripheral donor lymphocytes genetically modified to express a full-length tumor antigen-recognizing T cell receptor complex comprising the α and β heterodimer), in Panelli, M. C., et al. 2000 *J Immunol* 164:495-504; Panelli, M. C., et al. 2000 *J Immunol* 164:4382-4392 (disclosing lymphocyte cultures derived from tumor infiltrating lymphocytes (TILs) in tumor biopsies), and in Dupont, J., et al. 2005 *Cancer Res* 65:5417-5427; Papanicolaou, G. A., et al. 2003 *Blood* 102:2498-2505 (disclosing selectively in vitro-expanded antigen-specific peripheral blood leukocytes employing artificial antigen-presenting cells (AAPCs) or pulsed dendritic cells). The cells (e.g., T cells) can be autologous, non-autologous (e.g., allogeneic), or derived in vitro from engineered progenitor or stem cells.

In certain embodiments, the cells of are cells of the myeloid lineage. In certain embodiments, the cells of the myeloid lineage comprise, without limitation, monocytes, macrophages, basophils, neutrophils, eosinophils, mast cell, erythrocyte, and thrombocytes.

The presently disclosed cells are capable of modulating the tumor microenvironment. Tumors have a microenvironment that suppresses the host immune response using any of a series of mechanisms by malignant cells to protect themselves from immune surveillance, recognition and elimination. Immune suppressive factors include, but are not limited to infiltrating regulatory $CD4^+$ T cells (Tregs), myeloid derived suppressor cells (MDSCs), tumor associated macrophages (TAMs), immune suppressive cytokines including TGF-β, and expression of ligands targeted to immune suppressive receptors expressed by activated T cells (CTLA-4 and PD-1). These mechanisms of immune suppression play a role in the maintenance of tolerance and suppressing inappropriate immune responses, however within the tumor microenvironment these mechanisms prevent an effective anti-tumor immune response. Collectively these immune suppressive factors can induce either marked anergy or apoptosis of adoptively transferred modified T cells (e.g., CAR T cells) upon encounter with targeted tumor cells.

In certain embodiments, the presently disclosed cells have increased cell persistence. In certain embodiments, the presently disclosed cells have decreased apoptosis and/or anergy.

The unpurified source of CTLs may be any known in the art, such as the bone marrow, fetal, neonate or adult or other hematopoietic cell source, e.g., fetal liver, peripheral blood or umbilical cord blood. Various techniques can be employed to separate the cells. For instance, negative selection methods can remove non-CTLs initially. Monoclonal antibodies (mAbs) are particularly useful for identifying markers associated with particular cell lineages and/or stages of differentiation for both positive and negative selections.

A large proportion of terminally differentiated cells can be initially removed by a relatively crude separation. For example, magnetic bead separations can be used initially to remove large numbers of irrelevant cells. In certain embodiments, at least about 80%, usually at least 70% of the total hematopoietic cells will be removed prior to cell isolation.

Procedures for separation include, but are not limited to, density gradient centrifugation; resetting; coupling to particles that modify cell density; magnetic separation with antibody-coated magnetic beads; affinity chromatography; cytotoxic agents joined to or used in conjunction with a mAb, including, but not limited to, complement and cytotoxins; and panning with antibody attached to a solid matrix, e.g. plate, chip, elutriation or any other convenient technique.

Techniques for separation and analysis include, but are not limited to, flow cytometry, which can have varying degrees of sophistication, e.g., a plurality of color channels, low angle and obtuse light scattering detecting channels, impedance channels.

The cells can be distinguished from dead cells, by employing dyes associated with dead cells such as propidium iodide (PI). In certain embodiments, the cells are collected in a medium comprising 2% fetal calf serum (FCS) or 0.2% bovine serum albumin (BSA) or any other suitable, e.g., sterile, isotonic medium.

5. Nucleic Acid Compositions and Vectors

The present discloses subject matter provides nucleic acid compositions comprising a first polynucleotide encoding a membrane-bound polypeptide disclosed herein (e.g., disclosed in Section 1) and a second polynucleotide encoding a solute polypeptide disclosed herein (e.g., disclosed in Section 2). Also provided are cells comprising such nucleic acid compositions.

In certain embodiments, the membrane-bound polypeptide encoded by the first polynucleotide comprises: i) a transmembrane domain, ii) an intracellular domain, and iii) an extracellular domain that comprises a first dimerization domain and a blocking spacer, and the soluble polypeptide encoded by the second polynucleotide comprises i) a second dimerization domain, and ii) an antigen binding domain that binds to an antigen. In certain embodiments, each of the first dimerization domain and the second dimerization domain comprises a leucine zipper domain, and the blocking spacer prevents the dimerization of the membrane-bound polypeptide with the soluble polypeptide when the membrane-bound polypeptide and the soluble polypeptide are not expressed from the same cell.

In certain embodiments, the membrane-bound polypeptide encoded by the first polynucleotide comprises: i) a transmembrane domain, ii) an intracellular domain, and iii) an extracellular domain that comprises a first dimerization domain and a second dimerization domain that is capable of dimerizing with the first dimerization domain, and the soluble polypeptide encoded by the second polynucleotide comprises i) a third dimerization domain that is capable of dimerizing with the first dimerization domain, and ii) an antigen binding domain that binds to an antigen. In certain embodiments, each of the first dimerization domain and the second dimerization domain comprises a leucine zipper domain.

In certain embodiments, the membrane-bound polypeptide encoded by the first polynucleotide comprises a transmembrane domain and an extracellular domain comprising a first dimerization domain, and the soluble polypeptide encoded by the second polynucleotide comprising a second dimerization domain that is capable of dimerizing with the first dimerization domain, and a cytokine or chemokine. In certain embodiments, each of the first dimerization domain and the second dimerization domain comprises a leucine zipper domain.

In certain embodiments, the first polynucleotide is comprised in a first vector, and the second polynucleotide is comprised in a second vector. In certain embodiments, the first vector and/or the second vector is a viral vector or a transposon-based vector. In certain embodiments, the viral vector is a retroviral vector. In certain embodiments, the retroviral vector is a lentiviral vector. The first vector can the same as the second vector, or different from the second vector. In certain embodiments, the first vector is the same as the second vector, for example, the vector backbone for the first and the second vectors can be the same, while the polypeptide or protein encoded/expressed by the first and second vectors can be different.

Genetic modification of a cell (e.g., a T cell) can be accomplished by transducing a substantially homogeneous cell composition with a recombinant DNA construct. In certain embodiments, a retroviral vector is employed for the introduction of the DNA construct into the cell. For example, a polynucleotide encoding any polypeptide or system disclosed herein can be cloned into a retroviral vector and expression can be driven from its endogenous promoter, from the retroviral long terminal repeat, or from a promoter specific for a target cell type of interest. In certain embodiments, the retroviral vector is a gamma-retroviral vector. In certain embodiments, the retroviral vector is a lentiviral vector. Non-viral vectors may be used as well.

For initial genetic modification of a cell to include a polypeptide and/or a system disclosed herein, a retroviral vector is generally employed for transduction, however any other suitable viral vector or non-viral delivery system can be used. The polypeptides and/or the system can be constructed in a single, multicistronic expression cassette, in multiple expression cassettes of a single vector, or in multiple vectors. Examples of elements that create polycistronic expression cassette include, but is not limited to, various viral and non-viral Internal Ribosome Entry Sites (IRES, e.g., FGF-1 IRES, FGF-2 IRES, VEGF IRES, IGF-II IRES, NF-κB IRES, RUNX1 IRES, p53 IRES, hepatitis A IRES, hepatitis C IRES, pestivirus IRES, aphthovirus IRES, picornavirus IRES, poliovirus IRES and encephalomyocarditis virus IRES) and cleavable linkers (e.g., 2A peptides, e.g., P2A, T2A, E2A and F2A peptides). Combinations of retroviral vector and an appropriate packaging line are also suitable, where the capsid proteins will be functional for infecting human cells. Various amphotropic virus-producing cell lines are known, including, but not limited to, PA12 (Miller, et al. (1985) *Mol. Cell. Biol.* 5:431-437); PA317 (Miller, et al. (1986) *Mol. Cell. Biol.* 6:2895-2902); and CRIP (Danos, et al. (1988) *Proc. Natl. Acad. Sci.* USA 85:6460-6464). Non-amphotropic particles are suitable too, e.g., particles pseudotyped with VSVG, RD 114 or GALV envelope and any other known in the art.

Possible methods of transduction also include direct co-culture of the cells with producer cells, e.g., by the method of Bregni, et al. (1992) *Blood* 80:1418-1422, or culturing with viral supernatant alone or concentrated vector stocks with or without appropriate growth factors and polycations, e.g., by the method of Xu, et al. (1994) *Exp. Hemat.* 22:223-230; and Hughes, et al. (1992) *J. Clin. Invest.* 89:1817.

Other transducing viral vectors can be used to modify a cell. In certain embodiments, the chosen vector exhibits a high efficiency of infection, stable integration into the host cell genome, and durable expression of the recombinant gene product(s) (see, e.g., Cayouette et al., Human Gene Therapy 8:423-430, 1997; Kido et al., Current Eye Research 15:833-844, 1996; Bloomer et al., Journal of Virology 71:6641-6649, 1997; Naldini et al., Science 272:263-267, 1996; and Miyoshi et al., Proc. Natl. Acad. Sci. U.S.A. 94:10319, 1997). Other viral vectors that can be used include, for example, adenoviral, lentiviral, and adeno-associated viral vectors, vaccinia virus, a bovine papilloma virus, or a herpes virus, such as Epstein-Barr Virus (also see, for example, the vectors of Miller, Human Gene Therapy 15-14, 1990; Friedman, Science 244:1275-1281, 1989; Eglitis et al., BioTechniques 6:608-614, 1988; Tolstoshev et al., Current Opinion in Biotechnology 1:55-61, 1990; Sharp, The Lancet 337:1277-1278, 1991; Cornetta et al., Nucleic Acid Research and Molecular Biology 36:311-322, 1987; Anderson, Science 226:401-409, 1984; Moen, Blood Cells 17:407-416, 1991; Miller et al., Biotechnology 7:980-990, 1989; LeGal La Salle et al., Science 259:988-990, 1993; and Johnson, Chest 107:77S-83S, 1995). Retroviral vectors are particularly well developed and have been used in clinical settings (Rosenberg et al., N. Engl. J. Med 323:370, 1990; Anderson et al., U.S. Pat. No. 5,399,346).

Non-viral approaches can also be employed for genetic modification of a cell. For example, a nucleic acid molecule can be introduced into a cell by administering the nucleic acid in the presence of lipofection (Feigner et al., Proc. Natl. Acad. Sci. U.S.A. 84:7413, 1987; Ono et al., Neuroscience Letters 17:259, 1990; Brigham et al., Am. J. Med. Sci. 298:278, 1989; Staubinger et al., Methods in Enzymology 101:512, 1983), asialoorosomucoid-polylysine conjugation (Wu et al., Journal of Biological Chemistry 263:14621, 1988; Wu et al., Journal of Biological Chemistry 264:16985, 1989), or by micro-injection under surgical conditions (Wolff et al., Science 247:1465, 1990). Other non-viral means for gene transfer include transfection in vitro using calcium phosphate, DEAE dextran, electroporation, and protoplast fusion. Liposomes can also be potentially beneficial for delivery of DNA into a cell. Transplantation of normal genes into the affected tissues of a subject can also be accomplished by transferring a normal nucleic acid into a cultivatable cell type ex vivo (e.g., an autologous or heterologous primary cell or progeny thereof), after which the cell (or its descendants) are injected into a targeted tissue or are injected systemically. Recombinant receptors can also be derived or obtained using transposases or targeted nucleases (e.g. Zinc finger nucleases, meganucleases, or TALENs nucleases, CRISPR). Transient expression may be obtained by RNA electroporation. In certain embodiments, recombinant receptors can be introduced by a transposon-based vector. In certain embodiments, the transposon-based vector comprises a transposon (a.k.a. a transposable element). In certain embodiments, the transposon can be recognized by a transposase. In certain embodiments, the transposase is a Sleeping Beauty transposase.

The resulting cells can be grown under conditions similar to those for unmodified cells, whereby the modified cells can be expanded and used for a variety of purposes.

6. Polypeptides and Analogs

Also included in the presently disclosed subject matter are CD28, CD8, CD80, 4-1BBL, and CD3ζ polypeptides, the membrane-bound polypeptide disclosed herein, and the soluble polypeptide disclosed herein or fragments thereof that are modified in ways that enhance their therapeutic efficacy when expressed in a cell. The presently disclosed subject matter provides methods for optimizing an amino acid sequence or nucleic acid sequence by producing an alteration in the sequence. Such alterations may include certain mutations, deletions, insertions, or post-translational modifications. The presently disclosed subject matter further includes analogs of any naturally-occurring polypeptide disclosed herein (including, but not limited to, CD8, CD28, CD80, 4-1BBL, and CD3ζ). Analogs can differ from a naturally-occurring polypeptide disclosed herein by amino acid sequence differences, by post-translational modifications, or by both. Analogs can exhibit at least about 80%, at least about 85%, at least about 90%, at least about 95%, at least about 96%, at least about 97%, at least about 98%, at least about 99% or at least about 100% homologous to all or part of a naturally-occurring amino, acid sequence of the presently disclosed subject matter. The length of sequence comparison is at least 5, 10, 15 or 20 amino acid residues, e.g., at least 25, 50, or 75 amino acid residues, or more than 100 amino acid residues. Again, in an exemplary approach to determining the degree of identity, a BLAST program may be used, with a probability score between $e^{-3}$ and $e^{-100}$ indicating a closely related sequence. Modifications include in vivo and in vitro chemical derivatization of polypeptides, e.g., acetylation, carboxylation, phosphorylation, or glycosylation; such modifications may occur during polypeptide synthesis or processing or following treatment with isolated modifying enzymes. Analogs can also differ from the naturally-occurring polypeptides by alterations in primary sequence. These include genetic variants, both natural and induced (for example, resulting from random mutagenesis by irradiation or exposure to ethanemethylsulfate or by site-specific mutagenesis as described in Sambrook, Fritsch and Maniatis, Molecular Cloning: A Laboratory Manual (2d ed.), CSH Press, 1989, or Ausubel et al., supra). Also included are cyclized peptides, molecules, and analogs which contain residues other than L-amino acids, e.g., D-amino acids or non-naturally occurring or synthetic amino acids, e.g., β or γ amino acids.

In addition to full-length polypeptides, the presently disclosed subject matter also provides fragments of any one of the polypeptides or peptide domains disclosed herein. As used herein, the term "a fragment" means at least 5, 10, 13, or 15 amino acids. In certain embodiments, a fragment comprises at least 20 contiguous amino acids, at least 30 contiguous amino acids, or at least 50 contiguous amino acids. In certain embodiments, a fragment comprises at least 60 to 80, 100, 200, 300 or more contiguous amino acids. Fragments can be generated by methods known to those skilled in the art or may result from normal protein processing (e.g., removal of amino acids from the nascent polypeptide that are not required for biological activity or removal of amino acids by alternative mRNA splicing or alternative protein processing events).

Non-protein analogs have a chemical structure designed to mimic the functional activity of a protein/peptide disclosed herein. Such analogs may exceed the physiological activity of the original polypeptide. Methods of analog design are well known in the art, and synthesis of analogs can be carried out according to such methods by modifying the chemical structures such that the resultant analogs increase the anti-neoplastic activity of the original polypeptide when expressed in a cell. These chemical modifications include, but are not limited to, substituting alternative R groups and varying the degree of saturation at specific carbon atoms of a reference polypeptide. In certain embodiments, the protein analogs are relatively resistant to in vivo degradation, resulting in a more prolonged therapeutic effect upon administration. Assays for measuring functional activity include, but are not limited to, those described in the Examples below.

7. Administration

Compositions comprising the presently disclosed cells can be provided systemically or directly to a subject for inducing and/or enhancing an immune response to an antigen and/or treating and/or preventing a neoplasia, pathogen infection, or infectious disease. In certain embodiments, the presently disclosed cells or compositions comprising thereof are directly injected into an organ of interest (e.g., an organ affected by a neoplasia). Alternatively, the presently disclosed cells or compositions comprising thereof are provided indirectly to the organ of interest, for example, by administration into the circulatory system (e.g., the tumor vasculature). Expansion and differentiation agents can be provided prior to, during or after administration of the cells or compositions to increase production of T cells, NK cells, or CTL cells in vitro or in vivo.

The presently disclosed cells can be administered in any physiologically acceptable vehicle, normally intravascularly, although they may also be introduced into bone or other convenient site where the cells may find an appropriate site for regeneration and differentiation (e.g., thymus). Usually, at least about $1 \times 10^5$ cells will be administered, eventually reaching about $1 \times 10^{10}$ or more. The presently disclosed cells can comprise a purified population of cells. Those skilled in the art can readily determine the percentage of the presently disclosed cells in a population using various well-known methods, such as fluorescence activated cell sorting (FACS). Suitable ranges of purity in populations comprising the presently disclosed cells are about 50% to about 55%, about 5% to about 60%, and about 65% to about 70%. In certain embodiments, the purity is about 70% to about 75%, about 75% to about 80%, or about 80% to about 85%. In certain embodiments, the purity is about 85% to about 90%, about 90% to about 95%, and about 95% to about 100%. Dosages can be readily adjusted by those skilled in the art (e.g., a decrease in purity may require an increase in dosage). The cells can be introduced by injection, catheter, or the like.

The presently disclosed compositions can be pharmaceutical compositions comprising the presently disclosed cells and a pharmaceutically acceptable carrier. Administration can be autologous or heterologous. For example, cells can be obtained from one subject, and administered to the same subject or a different, compatible subject. Peripheral blood derived cells or their progeny (e.g., in vivo, ex vivo or in vitro derived) can be administered via localized injection, including catheter administration, systemic injection, localized injection, intravenous injection, or parenteral administration. When administering a therapeutic composition of the presently disclosed subject matter (e.g., a pharmaceutical composition comprising a presently disclosed cell), it can be formulated in a unit dosage injectable form (solution, suspension, emulsion).

8. Formulations

Compositions comprising the presently disclosed cells can be conveniently provided as sterile liquid preparations, e.g., isotonic aqueous solutions, suspensions, emulsions, dispersions, or viscous compositions, which may be buffered to a selected pH. Liquid preparations are normally easier to prepare than gels, other viscous compositions, and solid compositions. Additionally, liquid compositions are somewhat more convenient to administer, especially by injection. Viscous compositions, on the other hand, can be formulated within the appropriate viscosity range to provide longer contact periods with specific tissues. Liquid or viscous compositions can comprise carriers, which can be a solvent or dispersing medium containing, for example, water, saline, phosphate buffered saline, polyol (for example, glycerol, propylene glycol, liquid polyethylene glycol, and the like) and suitable mixtures thereof.

Sterile injectable solutions can be prepared by incorporating the cells in the required amount of the appropriate solvent with various amounts of the other ingredients, as desired. Such compositions may be in admixture with a suitable carrier, diluent, or excipient such as sterile water, physiological saline, glucose, dextrose, or the like. The compositions can also be lyophilized. The compositions can contain auxiliary substances such as wetting, dispersing, or emulsifying agents (e.g., methylcellulose), pH buffering agents, gelling or viscosity enhancing additives, preservatives, flavoring agents, colors, and the like, depending upon the route of administration and the preparation desired. Standard texts, such as "REMINGTON'S PHARMACEUTICAL SCIENCE", 17th edition, 1985, incorporated herein by reference, may be consulted to prepare suitable preparations, without undue experimentation.

Various additives which enhance the stability and sterility of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, sorbic acid, and the like. Prolonged absorption of the injectable pharmaceutical form can be brought about by the use of agents delaying absorption, for example, aluminum monostearate and gelatin. According to the presently disclosed subject matter, however, any vehicle, diluent, or additive used would have to be compatible with the cells or their progenitors.

The compositions can be isotonic, i.e., they can have the same osmotic pressure as blood and lacrimal fluid. The desired isotonicity of the compositions may be accomplished using sodium chloride, or other pharmaceutically acceptable agents such as dextrose, boric acid, sodium tartrate, propylene glycol or other inorganic or organic solutes. Sodium chloride can be particularly for buffers containing sodium ions.

Viscosity of the compositions, if desired, can be maintained at the selected level using a pharmaceutically acceptable thickening agent. For example, methylcellulose is readily and economically available and is easy to work with. Other suitable thickening agents include, for example, xanthan gum, carboxymethyl cellulose, hydroxypropyl cellulose, carbomer, and the like. The concentration of the thickener can depend upon the agent selected. The important point is to use an amount that will achieve the selected viscosity. Obviously, the choice of suitable carriers and other additives will depend on the exact route of administration and the nature of the particular dosage form, e.g., liquid dosage form (e.g., whether the composition is to be formulated into a solution, a suspension, gel or another liquid form, such as a time release form or liquid-filled form).

The quantity of cells to be administered will vary for the subject being treated. In a one embodiment, between about $10^4$ and about $10^{10}$, between about $10^5$ and about $10^9$, or between about $10^6$ and about $10^8$ of the presently disclosed cells are administered to a human subject. More effective cells may be administered in even smaller numbers. In certain embodiments, at least about $1 \times 10^8$, about $2 \times 10^8$, about $3 \times 10^8$, about $4 \times 10^8$, or about $5 \times 10^8$ of the presently disclosed cells are administered to a human subject. The precise determination of what would be considered an effective dose may be based on factors individual to each subject, including their size, age, sex, weight, and condition of the particular subject. Dosages can be readily ascertained by those skilled in the art from this disclosure and the knowledge in the art.

The skilled artisan can readily determine the amount of cells and optional additives, vehicles, and/or carrier in compositions and to be administered in methods. Typically, any additives (in addition to the active cell(s) and/or agent(s)) are present in an amount of 0.001 to 50% (weight) solution in phosphate buffered saline, and the active ingredient is present in the order of micrograms to milligrams, such as about 0.0001 to about 5 wt %, about 0.0001 to about 1 wt %, about 0.0001 to about 0.05 wt % or about 0.001 to about 20 wt %, about 0.01 to about 10 wt %, or about 0.05 to about 5 wt %. For any composition to be administered to an animal or human, the followings can be determined: toxicity such as by determining the lethal dose (LD) and LD50 in a suitable animal model e.g., rodent such as mouse; the dosage of the composition(s), concentration of components therein and timing of administering the composition(s), which elicit a suitable response. Such determinations do not require undue experimentation from the knowledge of the skilled artisan, this disclosure and the documents cited herein. And, the time for sequential administrations can be ascertained without undue experimentation.

9. Methods of Treatment

The presently disclosed subject matter provides methods for inducing and/or increasing an immune response in a subject in need thereof. In certain embodiments, the method comprises administering to a subject an effective amount of the cells disclosed herein or a pharmaceutical composition comprising such cells. The presently disclosed cells and compositions comprising thereof can be used for treating and/or preventing neoplasia in a subject. The presently disclosed cells and compositions comprising thereof can be used for prolonging the survival of a subject suffering from a neoplasm. The presently disclosed cells and compositions comprising thereof can also be used for treating and/or preventing a pathogen infection or other infectious disease in a subject, such as an immunocompromised human subject. Such methods comprise administering an amount effective the presently disclosed cells or a composition (e.g., a pharmaceutical composition) comprising such cells to achieve the desired effect, be it palliation of an existing condition or prevention of recurrence. For treatment, the amount administered is an amount effective in producing the desired effect. An effective amount can be provided in one or a series of administrations. An effective amount can be provided in a bolus or by continuous perfusion.

An "effective amount" (or, "therapeutically effective amount") is an amount sufficient to effect a beneficial or desired clinical result upon treatment. An effective amount can be administered to a subject in one or more doses. In terms of treatment, an effective amount is an amount that is sufficient to palliate, ameliorate, stabilize, reverse or slow the progression of the disease, or otherwise reduce the pathological consequences of the disease. The effective amount is generally determined by the physician on a case-by-case basis and is within the skill of one in the art. Several factors are typically taken into account when determining an appropriate dosage to achieve an effective amount. These factors include age, sex and weight of the subject, the condition being treated, the severity of the condition and the form and effective concentration of the cells administered.

For adoptive immunotherapy using antigen-specific T cells, cell doses in the range of about $10^6$-$10^{10}$ (e.g., about $10^9$) are typically infused. Upon administration of the presently disclosed cells into the host and subsequent differentiation, T cells are induced that are specifically directed against the specific antigen. The modified cells can be administered by any method known in the art including, but not limited to, intravenous, subcutaneous, intranodal, intratumoral, intrathecal, intrapleural, intraperitoneal and directly to the thymus.

The presently disclosed subject matter provides methods for treating and/or preventing a neoplasia in a subject. The method can comprise administering an effective amount of the presently disclosed cells or a composition (e.g., a pharmaceutical composition) comprising such cells to a subject having a neoplasia.

Non-limiting examples of neoplasia include blood cancers (e.g. leukemias, lymphomas, and myelomas), ovarian cancer, breast cancer, bladder cancer, brain cancer, colon cancer, intestinal cancer, liver cancer, lung cancer, pancreatic cancer, prostate cancer, skin cancer, stomach cancer, glioblastoma, throat cancer, melanoma, neuroblastoma, adenocarcinoma, glioma, soft tissue sarcoma, and various carcinomas (including prostate and small cell lung cancer). Other carcinomas that may be treated with cells comprising the systems disclosed herein include any known in the field of oncology, including, but not limited to, astrocytoma, fibrosarcoma, myxosarcoma, liposarcoma, oligodendroglioma, ependymoma, medulloblastoma, primitive neural ectodermal tumor (PNET), chondrosarcoma, osteogenic sarcoma, pancreatic ductal adenocarcinoma, small and large cell lung adenocarcinomas, chordoma, angiosarcoma, endotheliosarcoma, squamous cell carcinoma, bronchoalveolarcarcinoma, epithelial adenocarcinoma, and liver metastases thereof, lymphangiosarcoma, lymphangioendotheliosarcoma, hepatoma, cholangiocarcinoma, synovioma, mesothelioma, Ewing's tumor, rhabdomyosarcoma, colon carcinoma, basal cell carcinoma, sweat gland carcinoma, papillary carcinoma, sebaceous gland carcinoma, papillary adenocarcinoma, cystadenocarcinoma, medullary carcinoma, bronchogenic carcinoma, renal cell carcinoma, bile duct carcinoma, choriocarcinoma, seminoma, embryonal carcinoma, Wilms' tumor, testicular tumor, medulloblastoma, craniopharyngioma, ependymoma, pinealoma, hemangioblastoma, acoustic neuroma, oligodendroglioma, meningioma, neuroblastoma, retinoblastoma, leukemia, multiple myeloma, Waldenstrom's macroglobulinemia, and heavy chain disease, breast tumors such as ductal and lobular adenocarcinoma, squamous and adenocarcinomas of the uterine cervix, uterine and ovarian epithelial carcinomas, prostatic adenocarcinomas, transitional squamous cell carcinoma of the bladder, B and T cell lymphomas (nodular and diffuse) plasmacytoma, acute and chronic leukemias, malignant melanoma, soft tissue sarcomas and leiomyosarcomas. In certain embodiments, the neoplasia is selected from the group consisting of blood cancers (e.g. leukemias, lymphomas, and myelomas), ovarian cancer, prostate cancer, breast cancer, bladder cancer, brain cancer, colon cancer, intestinal cancer, liver cancer, lung cancer, pancreatic cancer, prostate cancer, skin cancer, stomach cancer, glioblastoma, and throat cancer. In certain embodiments, the presently disclosed cells and compositions comprising thereof can be used for treating and/or preventing blood cancers (e.g., leukemias, lymphomas, and myelomas) or ovarian cancer, which are not amenable to conventional therapeutic interventions.

The subjects can have an advanced form of disease, in which case the treatment objective can include mitigation or reversal of disease progression, and/or amelioration of side effects. The subjects can have a history of the condition, for which they have already been treated, in which case the therapeutic objective will typically include a decrease or delay in the risk of recurrence.

Suitable human subjects for therapy typically comprise two treatment groups that can be distinguished by clinical criteria. Subjects with "advanced disease" or "high tumor burden" are those who bear a clinically measurable tumor. A clinically measurable tumor is one that can be detected on the basis of tumor mass (e.g., by palpation, CAT scan, sonogram, mammogram or X-ray; positive biochemical or histopathologic markers on their own are insufficient to identify this population). A pharmaceutical composition is administered to these subjects to elicit an anti-tumor response, with the objective of palliating their condition. Ideally, reduction in tumor mass occurs as a result, but any clinical improvement constitutes a benefit. Clinical improvement includes decreased risk or rate of progression or reduction in pathological consequences of the tumor.

A second group of suitable subjects is known in the art as the "adjuvant group." These are individuals who have had a history of neoplasia, but have been responsive to another mode of therapy. The prior therapy can have included, but is not restricted to, surgical resection, radiotherapy, and traditional chemotherapy. As a result, these individuals have no clinically measurable tumor. However, they are suspected of being at risk for progression of the disease, either near the original tumor site, or by metastases. This group can be further subdivided into high-risk and low-risk individuals. The subdivision is made on the basis of features observed before or after the initial treatment. These features are known in the clinical arts, and are suitably defined for each different neoplasia. Features typical of high-risk subgroups are those in which the tumor has invaded neighboring tissues, or who show involvement of lymph nodes.

Another group have a genetic predisposition to neoplasia but have not yet evidenced clinical signs of neoplasia. For instance, women testing positive for a genetic mutation associated with breast cancer, but still of childbearing age, can wish to receive one or more of the cells described herein in treatment prophylactically to prevent the occurrence of neoplasia until it is suitable to perform preventive surgery.

Additionally, the presently disclosed subject matter provides methods for treating and/or preventing a pathogen infection (e.g., viral infection, bacterial infection, fungal infection, parasite infection, or protozoal infection) in a subject, e.g., in an immunocompromised subject. The method can comprise administering an effective amount of the presently disclosed cells or a composition (e.g., a pharmaceutical composition) comprising such cells to a subject having a pathogen infection. Exemplary viral infections susceptible to treatment include, but are not limited to, Cytomegalovirus (CMV), Epstein Barr Virus (EBV), Human Immunodeficiency Virus (HIV), and influenza virus infections.

The presently disclosed subject matter further provides methods for increasing an immune activity of an immunoresponsive cell. In certain embodiments, the method comprises introducing to the immunoresponsive cell a system disclosed herein to the immunoresponsive cell.

The presently disclosed subject matter provides methods for activating an antigen presenting cell (APC) in a subject. In certain embodiments, the method comprises administering to the subject an effective amount of the cells or a composition (e.g., a pharmaceutical composition) comprising such cells.

The presently disclosed subject matter provides methods for conditioning a subject for bone marrow transplant. In certain embodiments, the method comprises administering to the subject an effective amount of the cells or a composition (e.g., a pharmaceutical composition) comprising such cells.

Further modification can be introduced to the presently disclosed cells (e.g., T cells) to avert or minimize the risks of immunological complications (known as "malignant T-cell transformation"), e.g., graft versus-host disease (GvHD), or when healthy tissues express the same target antigens as the tumor cells, leading to outcomes similar to GvHD. A potential solution to this problem is engineering a suicide gene into the presently disclosed cells. Suitable suicide genes include, but are not limited to, Herpes simplex virus thymidine kinase (hsv-tk), and inducible Caspase 9 Suicide gene (iCasp-9). In certain embodiments, the cells include a truncated human epidermal growth factor receptor (EGFRt) polypeptide. The EGFRt polypeptide can enable T cell elimination by administering anti-EGFR monoclonal antibody (e.g., cetuximab). EGFRt can be covalently joined to the upstream of any polypeptide disclosed herein. The suicide gene can be included within the vector comprising nucleic acids encoding any polypeptide disclosed herein. In this way, administration of a prodrug designed to activate the suicide gene (e.g., a prodrug (e.g., AP1903 that can activate iCasp-9) during malignant T-cell transformation (e.g., GVHD) triggers apoptosis in the suicide gene-activated T cells comprising any polypeptide or system disclosed herein. The incorporation of a suicide gene or EDFRt into the presently disclosed polypeptide or system gives an added level of safety with the ability to eliminate the majority of the engineered T cells within a very short time period. A presently disclosed cell (e.g., a T cell) incorporated with a suicide gene can be pre-emptively eliminated at a given timepoint post engineered T cell infusion, or eradicated at the earliest signs of toxicity.

EXAMPLES

The practice of the present disclosure employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", second edition (Sambrook, 1989); "Oligonucleotide Synthesis" (Gait, 1984); "Animal Cell Culture" (Freshney, 1987); "Methods in Enzymology" "Handbook of Experimental Immunology" (Weir, 1996); "Gene Transfer Vectors for Mammalian Cells" (Miller and Calos, 1987); "Current Protocols in Molecular Biology" (Ausubel, 1987); "PCR: The Polymerase Chain Reaction", (Mullis, 1994); "Current Protocols in Immunology" (Coligan, 1991). These techniques are applicable to the production of the polynucleotides and polypeptides of the invention, and, as such, may be considered in making and practicing the invention. Particularly useful techniques for particular embodiments will be discussed in the sections that follow.

The following examples are put forth so as to provide those of ordinary skill in the art with a complete disclosure and description of how to make and use the systems and methods of the present disclosure, and are not intended to limit the scope of what the inventors regard as their invention.

Example 1—Chimeric Antigen Receptors with scFv Leucine Zipper Sorting Affinity Tags a binary, leucine zipper-based, affinity tag system was developed to allow selective sorting of cells with simultaneous co-transduction with two viral vectors to allow transfer of larger amounts of genetic information without exceeding packaging limits of the viruses. In this system, one viral vector encoded a leucine zipper (e.g., RR12EE345L) with a linked affinity tag (e.g. FLAG, streptag, myc, etc.) (FIG. 1). The second viral vector encoded a membrane-bound leucine zipper (e.g., EE12RR345L) with high predilection to form a heterodimer with the RR12EE345L-affinity tag leucine zipper. When co-transduced into the same target cell, surface capture of the RR12EE345L-affinity tag by the membrane-bound EE12RR345L leucine zipper occurred, allowing surface detection of the affinity tag by flow cytometry and immuno-magnetic selection using magnetic beads conjugated to antibodies specific for the affinity tag.

Figure 2:
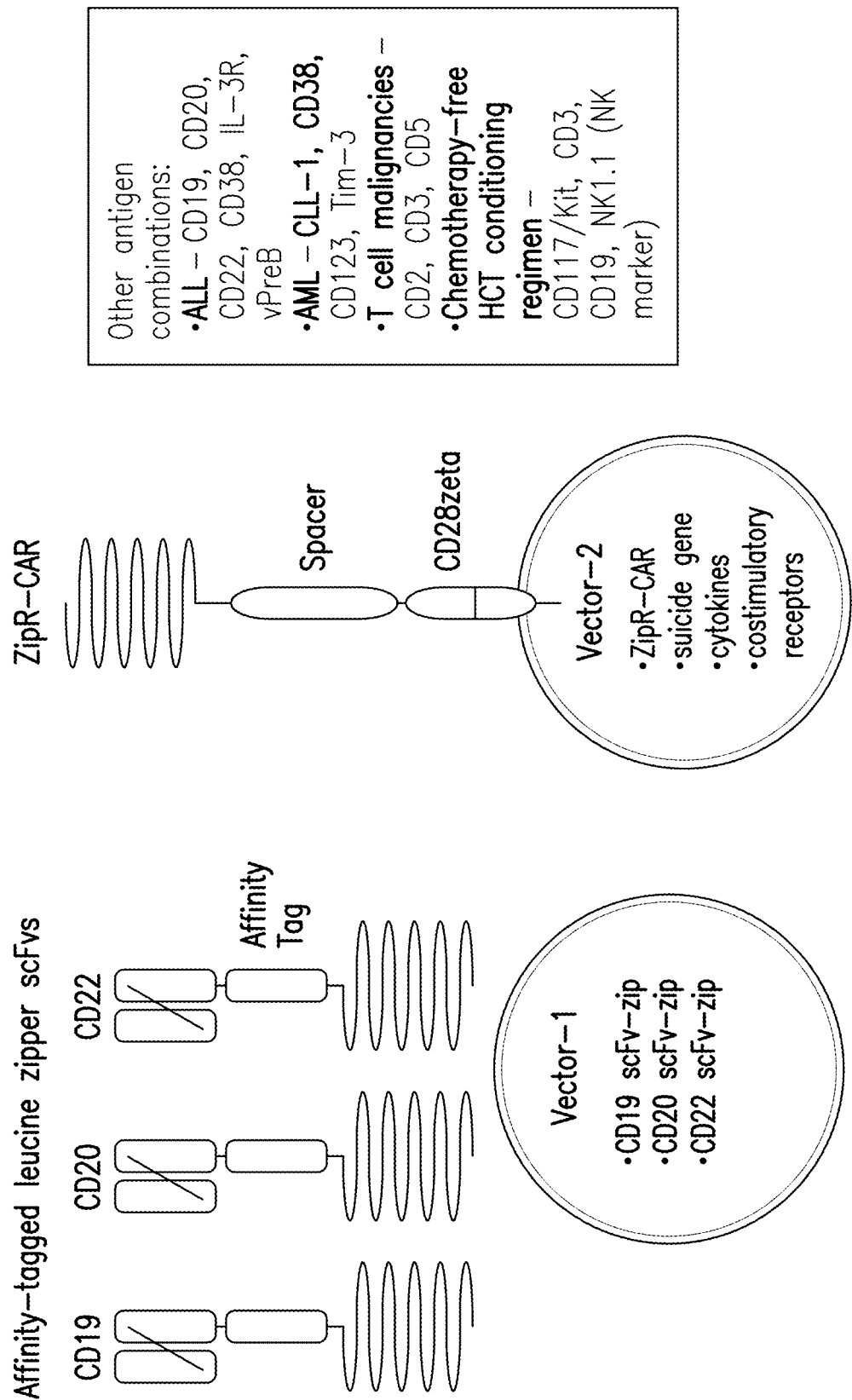
FIG. 2 depicts leucine zipper-based constructs in accordance with certain embodiments of the presently disclosed subject matter.
Figure 3:
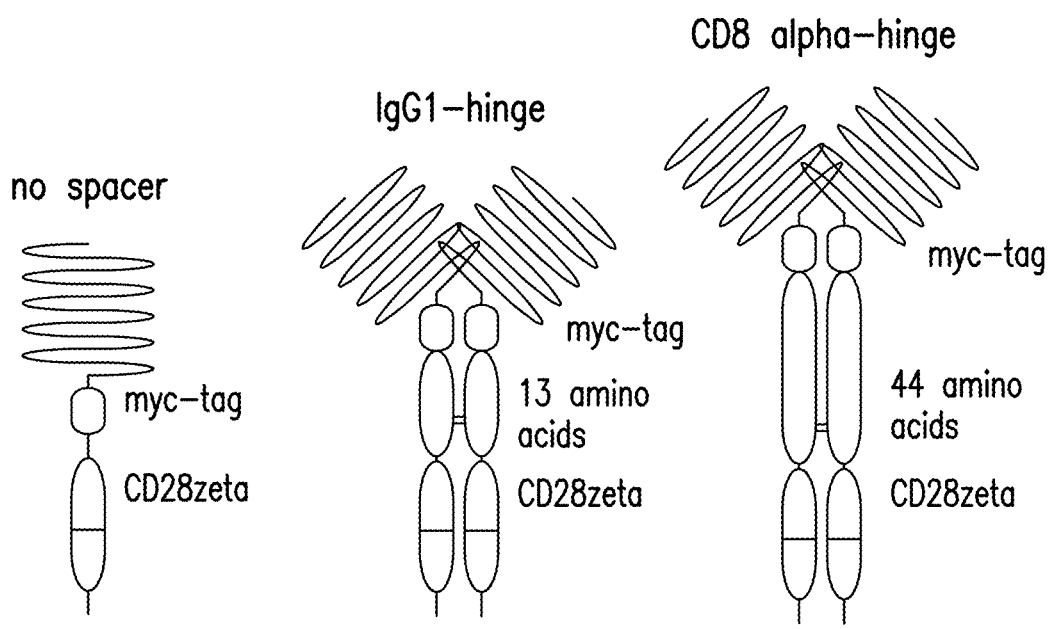
FIG. 3 depicts "painting" behavior of leucine zipper-based constructs in accordance with certain embodiments of the presently disclosed subject matter.
Figure 6:
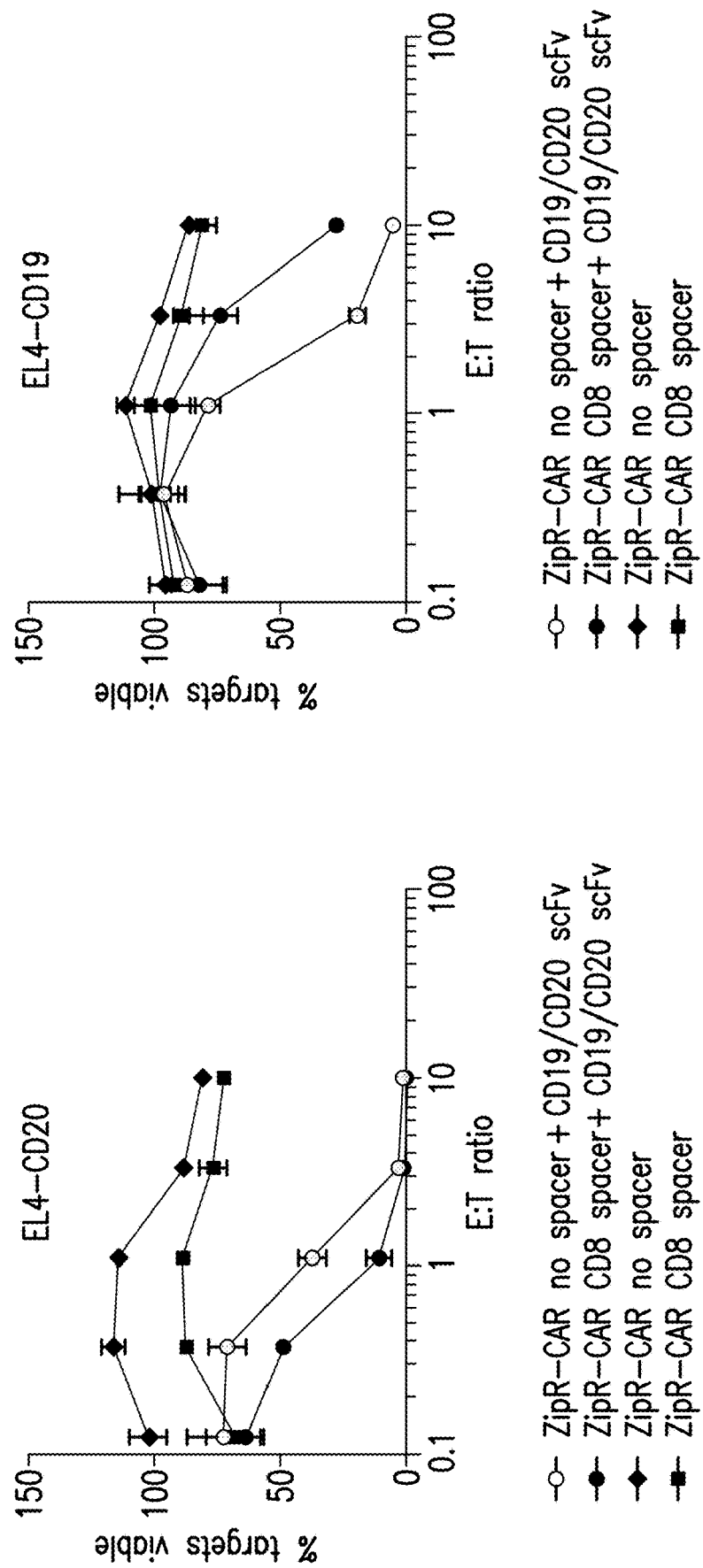
FIG. 6 depicts cytotoxicity activity of leucine zipper-based constructs in accordance with certain embodiments of the presently disclosed subject matter.

A binary CAR system was developed in which a universal adaptor CAR can pair extracellularly with scFv molecules to generate functional CAR molecules capable of targeting tumor cells by genetically modified T cells. The above leucine zipper-based sorting strategy was used to engineer T cells with two vectors. Vector 1 encoded multiple scFv-affinity tag-leucine zipper (e.g., RR12EE345L) specific for multiple tumor antigens to limit tumor immune evasion by down-modulation of tumor associated antigens. Vector 2 encoded a leucine zipper-based CAR (sometime also referred to as leucine zipper receptor-based CAR, "ZipR-CAR") (e.g. EE12RR345L:CD28zeta), and other molecules including, but are not limited to: degenerate leucine-zipper based CCR (described below), cytokines, and suicide genes (FIGS. 1 and 2). As shown in FIG. 1, blocked leucine zipper CAR ("ZipR-CAR") construct allows sorting of cells transduced with scFv affinity-tagged leucine zippers and limits surface expression of scFv to dual transduced cells. Unblocked leucine zipper CAR allows extracellular provision of scFvs (injected into host or delivered from other cells). Leucine zipper CAR vector can encode multiple genes including cytokines, suicide genes, costimulatory molecules and more. ScFv vector can encode at least 4 antigen specificities. Certain ZipR-CARs appear to be intrinsically blocked and do not require expression of the additional linked blocking leucine zipper (right panel) in order to avoid extracellular paring pathway ("painting"). See e.g., FIGS. 3 and 6. As shown in FIG. 3, painting ZipR-CAR is able to capture soluble tagged heterodimerizing leucine zipper from media. Non-painting leucine zippers can only obtain the tagged heterodimerizing leucine zipper during production inside the T cell. Other suitable spacers include a CD28 hinge, a non-dimerizing CD8 and IgG1. Other suitable tags include Strep-tag, HA-tag, His-tag, etc. As shown in FIG. 6, CD19/CD20 scFv vector promoted killing of CD19 or CD20+ cells by EE-CARs, and Myc-tag-only spacer led to target killing effects. Mouse T cells expressing dual CD19/CD20 scFv-FLAG-RR12EE345L/EE-CAR complex were able to specifically kill target cells expressing either CD19 or CD20 (OR gate). ZipR-CAR lacking spacers promoted enhanced target killing compared to larger CD8 extracellular domain hinge spacer.

Figure 4:
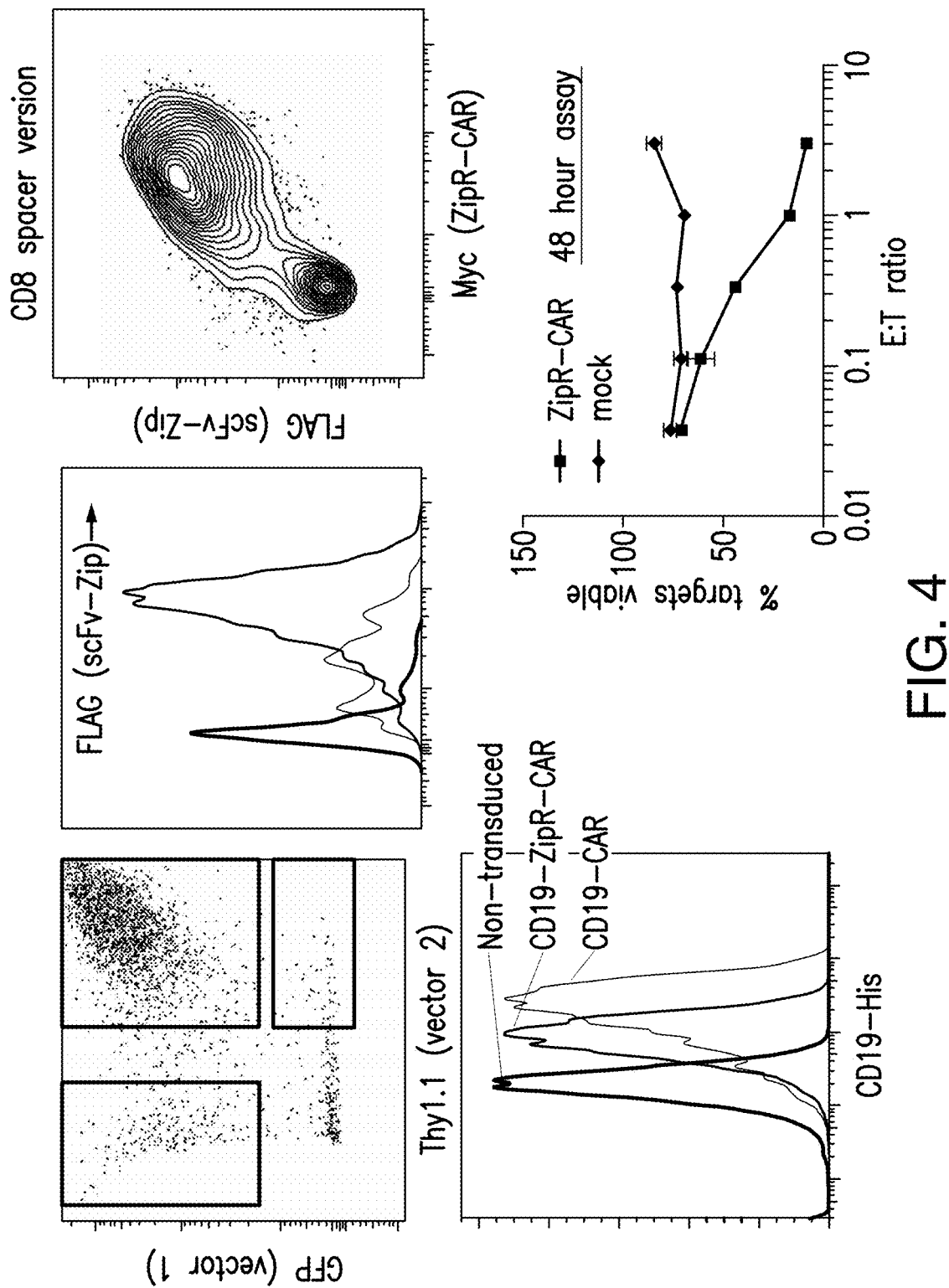
FIG. 4 depicts expression of leucine zipper-based constructs in accordance with certain embodiments of the presently disclosed subject matter in T cells.
Figure 5:
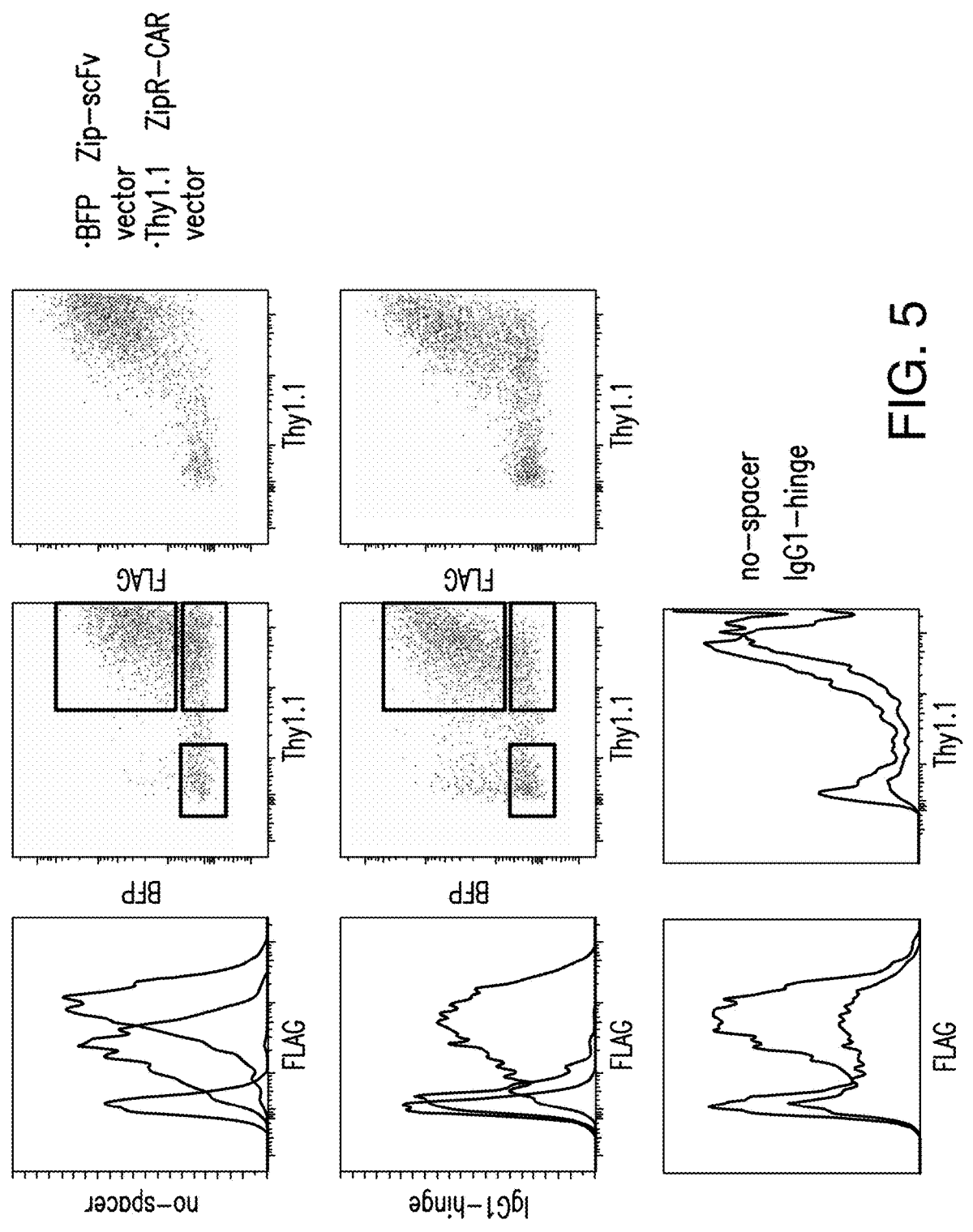
Figure 7:
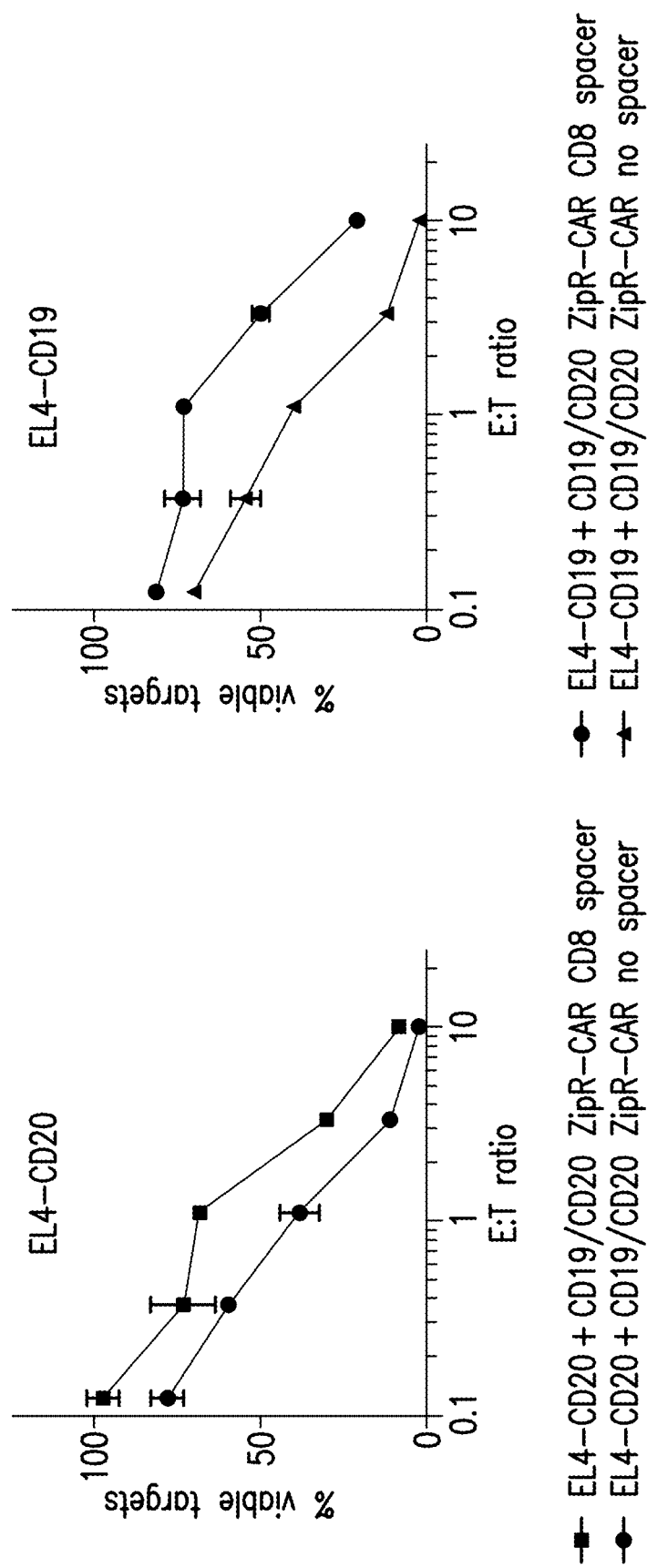
FIG. 7 depicts cytotoxicity activity of leucine zipper-based constructs in accordance with certain embodiments of the presently disclosed subject matter.
Figure 9:
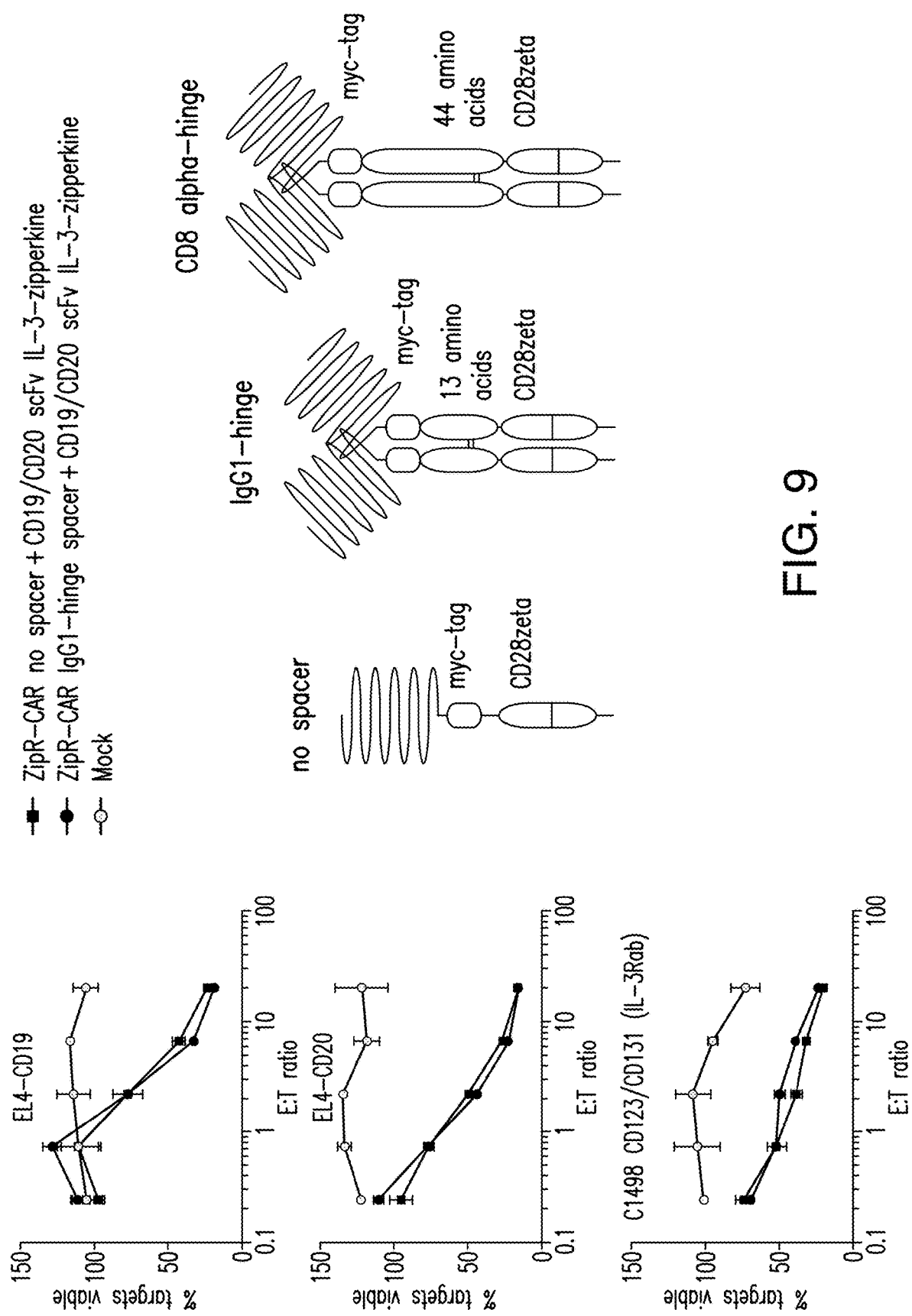
FIG. 9 depicts cytotoxicity activity of leucine zipper-based constructs in accordance with certain embodiments of the presently disclosed subject matter.

The leucine zipper-based CAR can include a "self-blocking" feature to allow selective sorting of T cells co-transduced with vector 1 and 2. Under certain circumstances, ZipR-CAR was self-blocking without addition of a linked heterodimerizing zipper (see FIGS. 1, 3, and 5). For example, as shown in FIG. 5, despite same staining intensity of FLAG tag in the BFP+ Thy1.1+ population, the FLAG tag did not bind to the IgG1 spacer ZipR-CAR via extracellular secretion (see middle left panel of FIG. 5). There were fewer absolute FLAG+ cells with IgG1 spacer due to absence of "painted" cell population (see bottom panel of FIG. 5). When co-integrated into the same T cell, vector 1 and 2 led to the expression of affinity tagged scFvs bound to the ZipR-CAR, which caused killing of targets expressing antigens bound by the scFvs (see FIGS. 4, 6, 7, and 9). As shown in FIG. 4, expressions of various tags were detected and where CD19 scFv were captured; and the T cells were able to kill CD19+ targets. The self-blocking feature permitted selective expression of a genetically defined set of Leucine zipper-scFvs in a single T cell, which could not appreciably bind exogenously secreted or infused Zipper-scFvs. Additionally, the self-blocking feature allowed sorting of T cells that had integrated both the scFv vector and the ZipR-CAR vector. As shown in FIG. 7, CD19/CD20 scFv vector promoted killing of CD19 or CD20+ cells by EE-CARs, and Myc-tag-only spacer promoted targeted killing of larger CD19 target. As shown in FIG. 9, CD19/CD20/IL-3 scFv vector promoted killing of cells expressing CD19, CD20, or CD123/CD131(IL-3R) by EE-CARs. In particular, CD19/CD20 scFv+ZipR-CAR T cells were able to kill CD19+ and CD20+ targets (targeting mouse B cells and B cell leukemia). See FIG. 9. IL-3 zipperkine+ZipR-CAR T cells were able to kill IL-3R+ targets (targeting mouse early myeloid cells and B cell and acute myeloid leukemia). See FIG. 9. No-spacer and IgG1 ZipR-CAR promoted equivalent lysis versus CD19, CD20, and IL3R+ targets. See FIG. 9.

A new design of the membrane-bound leucine zipper was developed that can inhibit the binding of soluble tagged leucine zippers secreted by other cells, but still allows binding of internally generated tagged zippers, without the self-blocking feature described in Example 1. Such a membrane-bound polypeptide comprised a very small extracellular domain, e.g., a spacer/hinge domain comprising no more than 20 amino acid residues, which precluded antibody epitopes like Thy1.1 or EGFRt. For example, a membrane-bound leucine zipper polypeptide comprising a CD8 spacer demonstrated binding of soluble scFv leucine zippers expressed both from the same cell that expressed the membrane-bound polypeptide and from other cells. However, a membrane-bound leucine zipper polypeptide comprising a truncated CD28 9 amino acid spacer or an IgG1 hinge only bound soluble scFv leucine zippers expressed in the same cell with the membrane-bound polypeptide.

FIGS. 25A-25C further demonstrate that tetracycline-inducible ZipR-CAR system enabled drug-induced ZipR-CAR expression and MACS sorting for double-transduced cells. Primary T cells dual transduced with two vectors: (1) self-inactivating retrovirus containing tetracycline response element (tre3g) driving expression of CD19 and CD20 scFvs tagged with FLAG and fused to RR12EE345L leucine zipper and (2) retrovirus encoding intrinsically-blocked IgG1-hinge ZipR-CAR, rtTA3 (tet transactivator), and Thy1.1 (FIG. 25A). Cells were MACS sorted based on FLAG to obtain high purity ZipR-CAR population (FIG. 25B). ZipR-CAR expressing T cells with CD19 and CD20 scFv leucine zippers preferentially killed CD19 and CD20 positive targets in the presence of doxycycline (scFvs induced) (FIG. 25C). At high E:T ratios, target lysis was seen for CD20 scFv in the absence of doxycycline due to basal activity of the promoter (see panel A, right). T cells were incubated with BM185 firefly luciferase transduced targets with expression of either CD19 or CD20. Target survival was assessed as residual luciferase activity after 24 hours.

Figure 10:
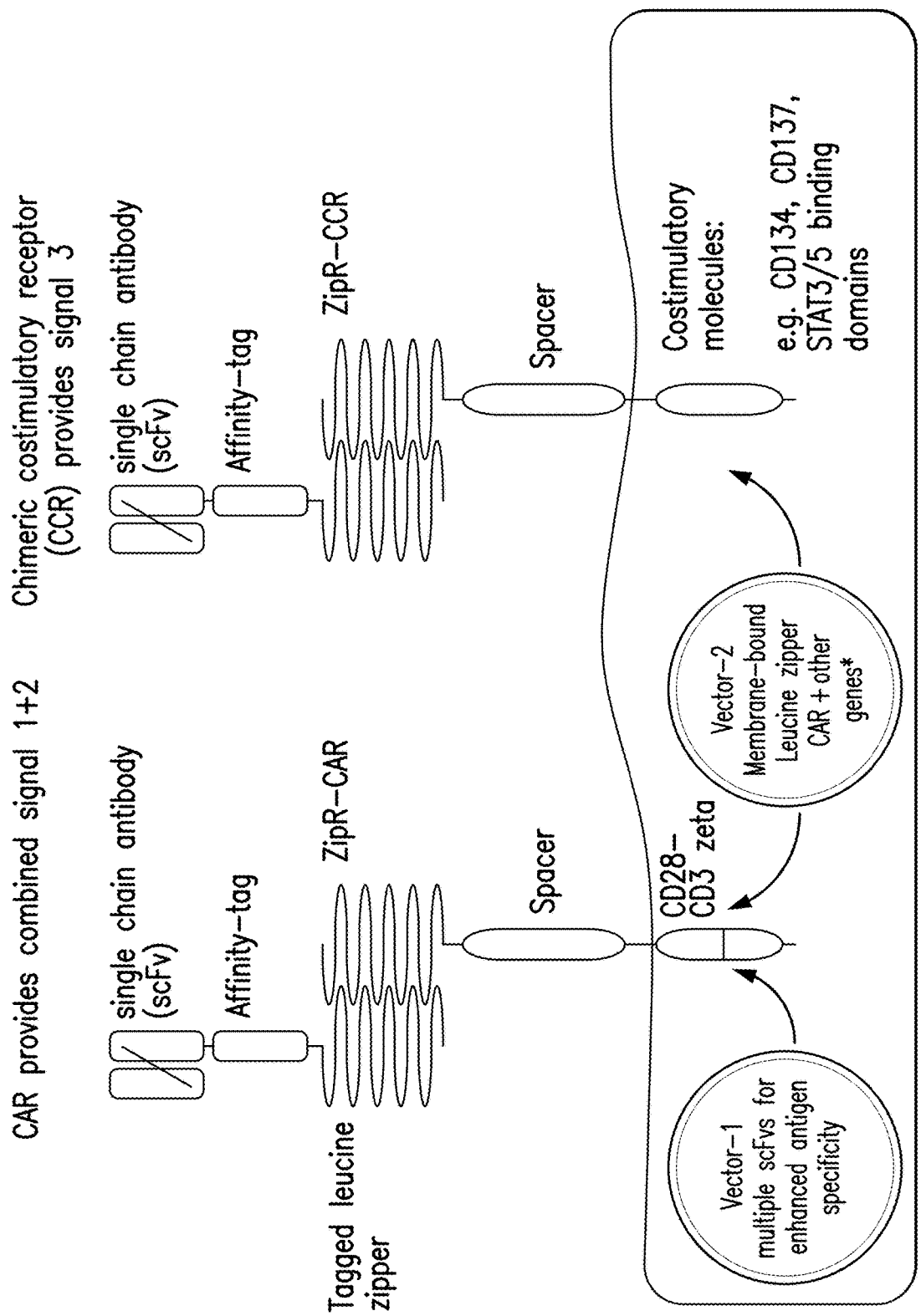
FIG. 10 depicts leucine zipper-based constructs in accordance with certain embodiments of the presently disclosed subject matter.
Figure 11:
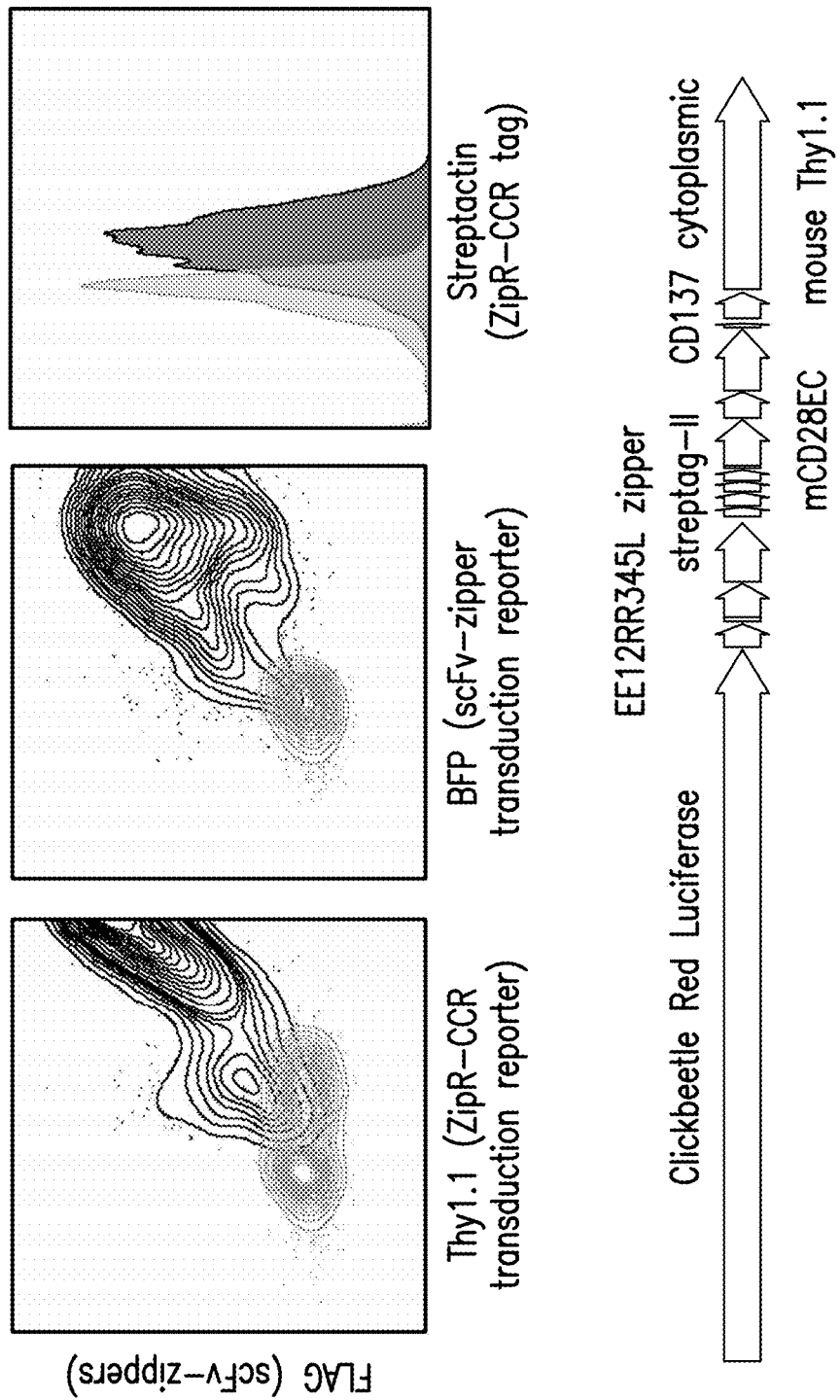
FIG. 11 depicts leucine zipper-based constructs in accordance with certain embodiments of the presently disclosed subject matter.

Example 2—Leucine Zipper-Based Chimeric Costimulatory Receptors (CCRs) Activated by Secreted Immune Checkpoint Blocking scFvs with Conjugated Leucine Zippers and Sorting Affinity Tags Chimeric costimulatory receptors (CCRs) comprises scFv and costimulatory domain but lacks a ZAP70-binding motif such as CD3 zeta. CCRs can induce antigen specific costimulation to T cells, while not sending a TCR-like signal and thus not activating T cell killing function. Traditionally, these molecules comprise a single scFv and are limited to a single target antigen. However, they can be designed using a heterodimerizing leucine zipper to bind multiple Zipper-scFvs (FIGS. 10 and 11). As shown in FIG. 10, leucine zipper based CARs and CCRs induce CD3ζ signaling and costimulatory signaling from the same panel of scFvs. T cells can be engineered to express a ZipR-CAR and ZipR-CCR to promote enhanced costimulation in response to the same antigens bound by shared scFv (i.e., both ZipR-CAR and ZipR-CCR use the same leucine zipper in this system). See FIG. 10. A different set of scFvs are bound by the ZipR-CAR and ZipR-CCR can also be used to enable AND-gate behavior, e.g., using Fos/Jun or Fos/synZip heterodimers compared to RR12EE345L and EE12RR345L. See FIG. 10. FIG. 11 shows a ZipR-CCR based on CD137 costimulatory signaling domain, and its expression in Tclip hybridoma. Other suitable costimulatory signaling domains include, but not limited to, CD28, ICOS, etc.

Antibody mediated blockade of immune regulatory checkpoint molecules such as PD-L1, CTLA-4, CD200, TIM-3, B7-H3, and B7-H4 has been shown in both preclinical and clinical studies to promote immune responses against tumors by blocking negative costimulatory signals delivered to T cells. An alternative approach to blocking these molecules with antibodies is to engineer a T cell by expressing a CCR that binds an immune regulatory checkpoint ligand and delivers a positive costimulatory signal. However, this method is limited by the number of CCR proteins that can be expressed in a single cell.

Figure 12:
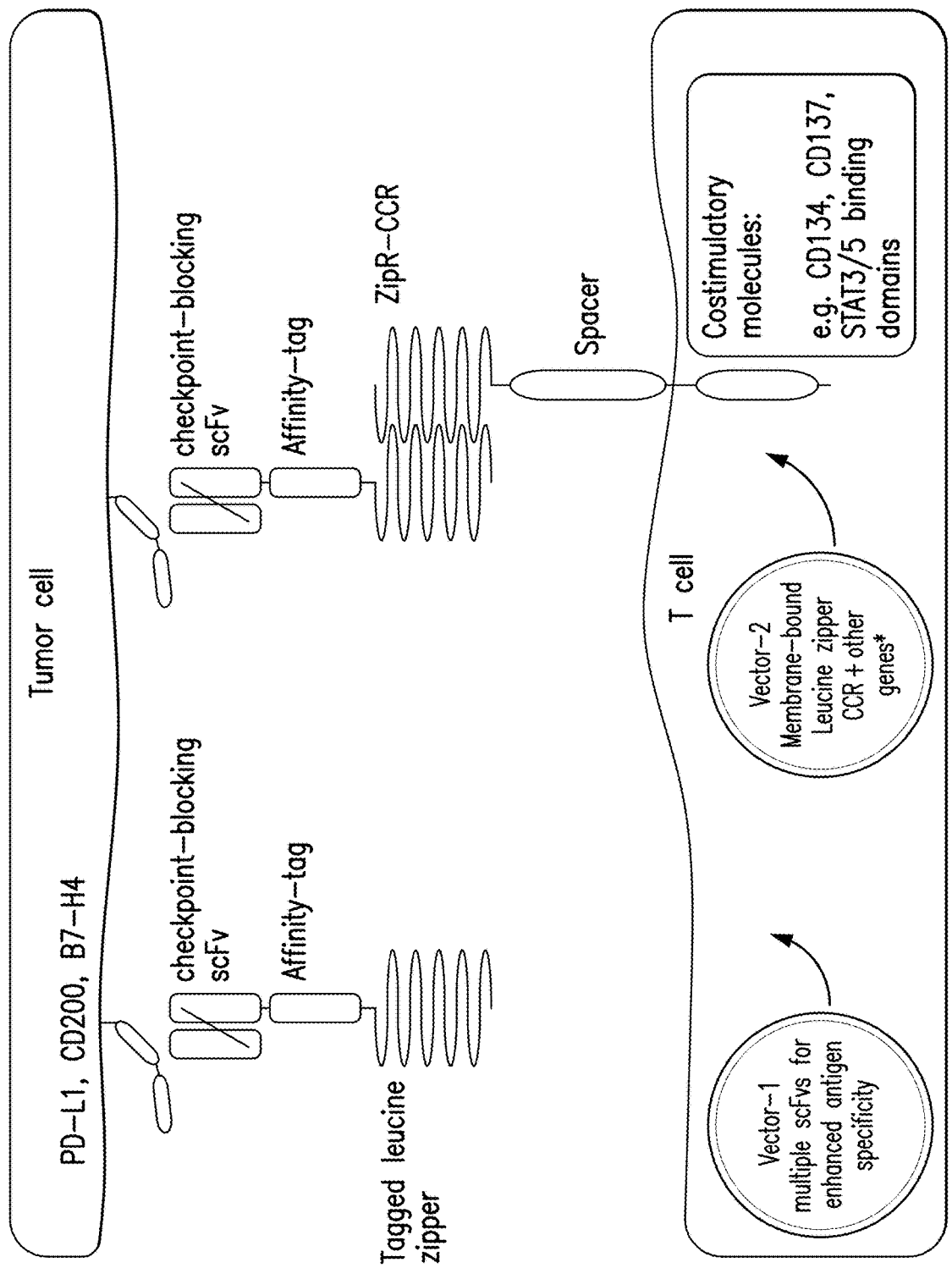
FIG. 12 depicts leucine zipper-based constructs in accordance with certain embodiments of the presently disclosed subject matter.
Figure 13:
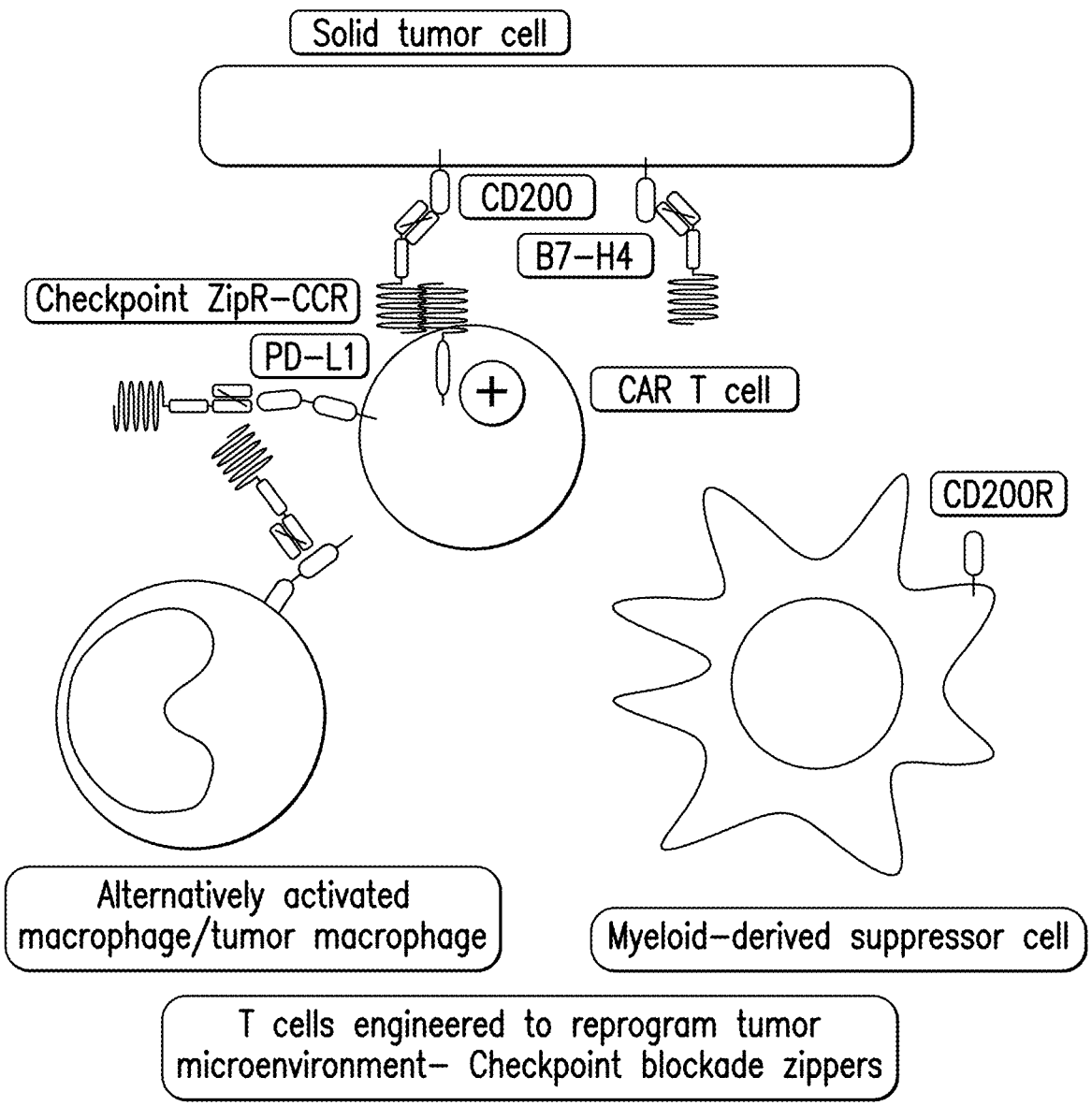
FIG. 13 depicts leucine zipper-based constructs in accordance with certain embodiments of the presently disclosed subject matter.
Figure 14:
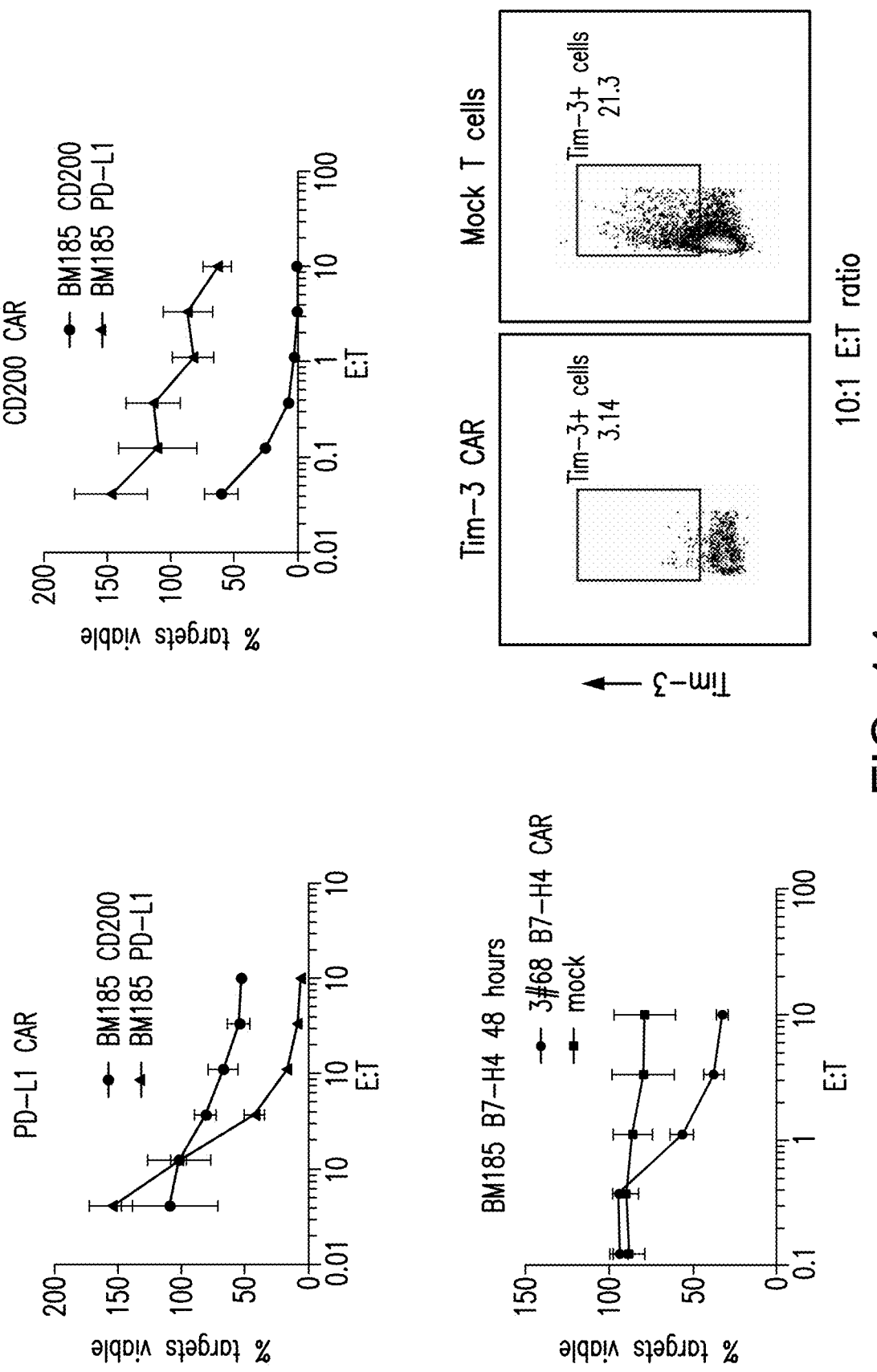
FIG. 14 depicts activity of canonical CAR—constructs in accordance with certain embodiments of the presently disclosed subject matter.

To overcome this limitation, a two-vector system was developed to modify T cells to express scFv-affinity tag-leucine zippers (e.g., RR12EE345L) specific for multiple immune regulatory checkpoint ligands (e.g., PD-L1, CD200, and B7-H4) with corresponding leucine-zipper based CCRs (e.g. EE12RR345L:CD137) (FIGS. 12-14). FIG. 12 shows ZipR based CCRs having combined checkpoint blockade and T cell costimulatory signaling. T cells can be engineered to secrete scFv-affinity tag-leucine zippers that bind to ZipR-CCRs. One method involves secretion of scFvs that can block immune regulatory checkpoints such as PD-L1 and convert the negative signal normally transduced in response to these molecules into positive costimulatory signals via a switch receptor mechanism. FIG. 13 shows combined checkpoint blockage and costimulatory switch receptor targeting multiple inhibitory ligands. Negative costimulatory ligands are blocked by secreted scFv-leucine zippers. ZipR-CCR converts negative signal to positive costimulatory signal. Multiplex ZipR-CCR platform allows multiple immune checkpoint ligands to be blocked and converted to positive signaling molecules. As shown in FIG. 14, T cells expressing canonical CARs targeting immune checkpoints were able to kill immune-checkpoint molecule-positive targets, which validated scFvs against immune checkpoints.

The advantages of this system include: (1) Allowing targeting and blockade of multiple immune checkpoint pathways, (2) converting negative signals into positive costimulatory signals in response to tumor cells or exhausted T cells, and (3) allowing high purity sorting of T cells expressing the constructs. CCR signaling domains can include multiple classes of costimulatory molecules including, but not limited to: CD28 family members (CD28, ICOS), TNF superfamily members (CD134, CD137), and STAT3/STAT5 activating sequences. This system can enhance both engineered and endogenous immune responses.

Example 3—Leucine Zipper-Based Chimeric Costimulatory Receptors (CCRs) Activated by Secreted Cytokines Fusions with Conjugated Leucine Zippers and Sorting Affinity Tags T cells can receive cytokine signals via trans-presentation, in which another cell delivers a cytokine to a T cell via surface presentation (e.g., IL-15). Additionally, artificial antigen presenting cells have been engineered that trans-present cytokines such as IL-15 and IL-21 to T cells for in vitro expansion.

Figure 8:
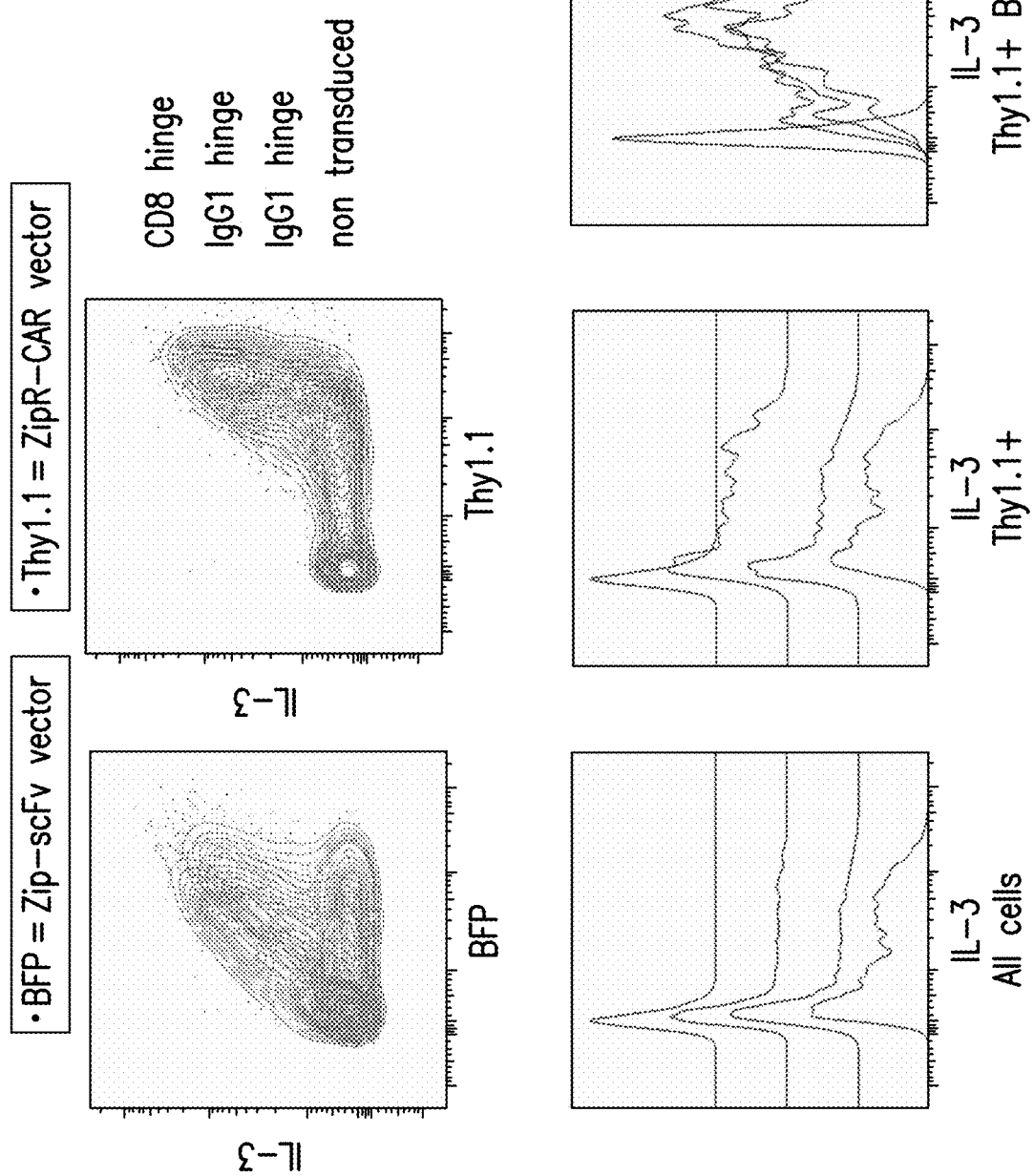
FIG. 8 depicts function of leucine zipper-based constructs in accordance with certain embodiments of the presently disclosed subject matter.
Figure 15:
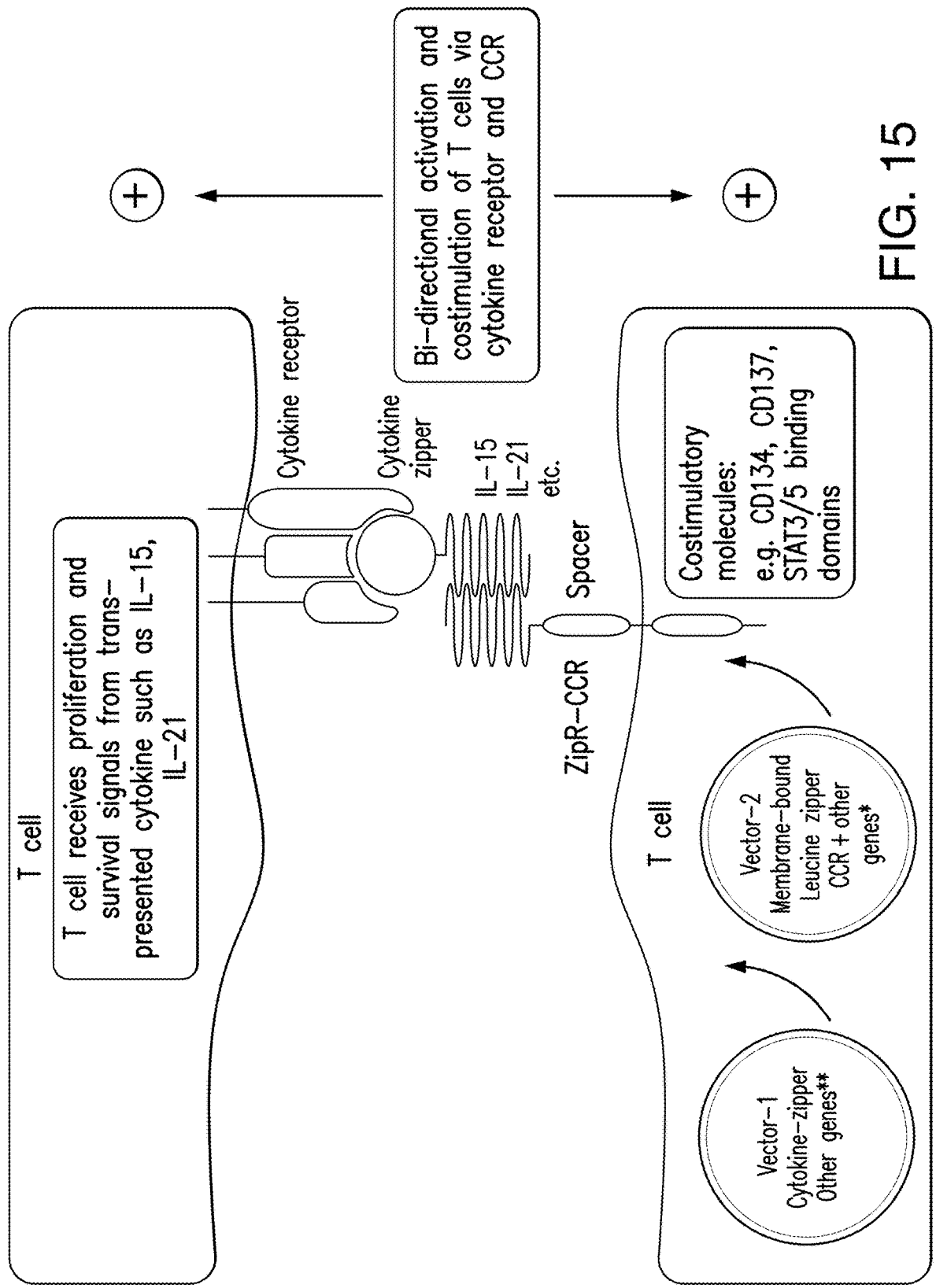
FIG. 15 depicts leucine zipper-based constructs in accordance with certain embodiments of the presently disclosed subject matter.
Figure 16:
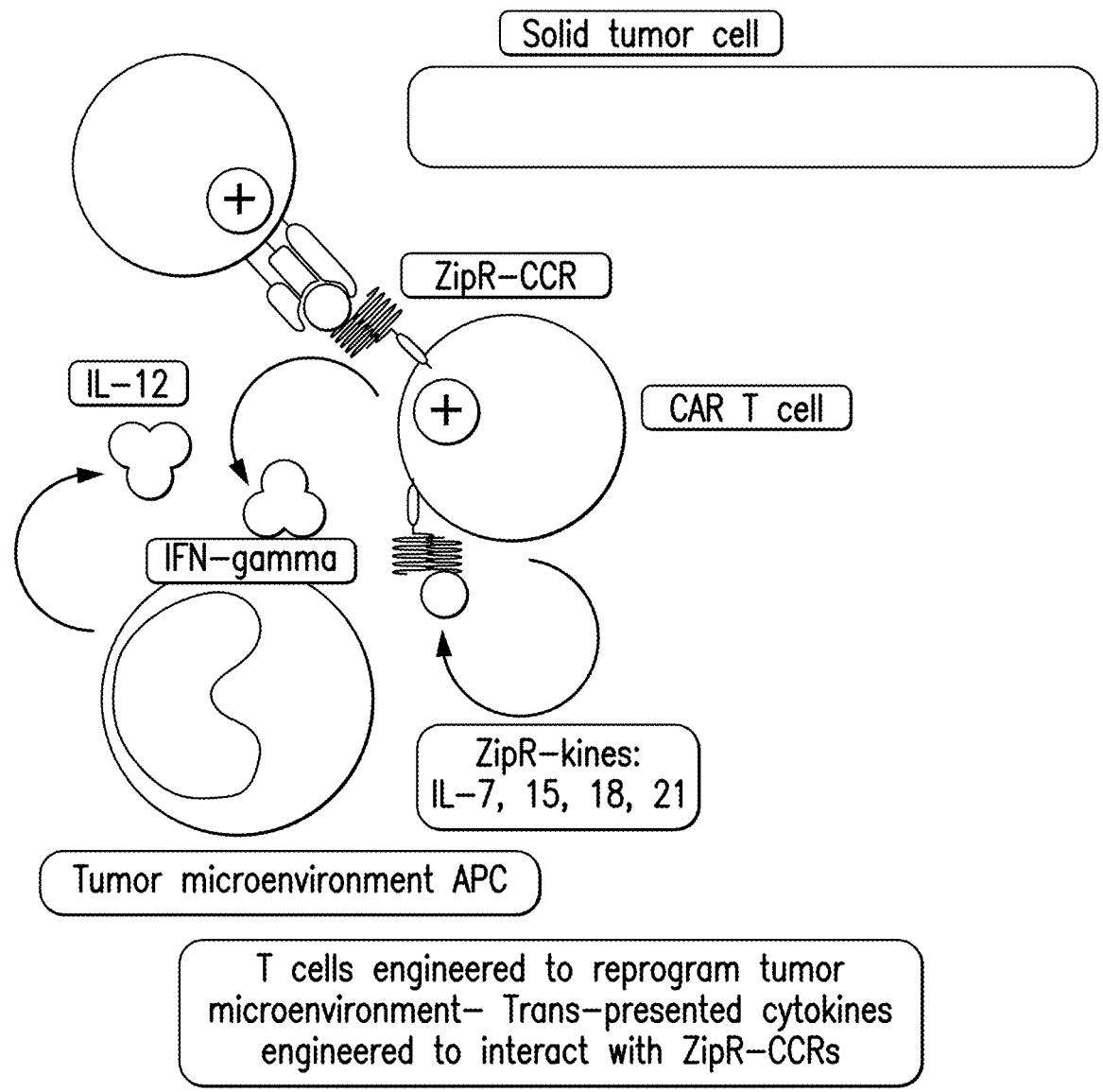
FIG. 16 depicts leucine zipper-based constructs in accordance with certain embodiments of the presently disclosed subject matter.

The presently disclosed subject matter provides leucine zippers appended to cytokines, such as IL-3, IL-7, IL-15, IL-18 or IL-21, to provide T cell-delivered cytokine stimulation locally (FIG. 8). As shown in FIG. 8, IL-3 "zipperkine" converted ZipR-CAR into IL-3-based receptor. IL-3 "zipperkine" comprises IL-3 cytokine with C-terminal FLAG-tag and RR12EE345L leucine zipper. The IL-3 zipperkine was captured by the ZipR-CAR and trans-presented onto the surface of the T cell to generate a receptor that can target cells expressing IL-3R complex. By activating a ZipR-CCR, the cytokine:cytokine-receptor interaction actives the CCR and leads to bi-directional activation (FIGS. 15 and 16), which activates the ZipR-CCR transduced T cells as well as endogenous T cells in the tumor microenvironment and thereby elicits endogenous T cell responses. FIG. 15 shows ZipR based CCRs with cytokine zippers induced autocrine and paracrine T cell activation. T cells can be co-transduced to express leucine-zipper based costimulatory chimeric receptor (ZipR-CCR) in combination with leucine zipper-tagged cytokines such as IL-15 and IL-21. Surface bound "trans-presented" IL-15 and IL-21 can enhance T cell proliferation and survival. This system can be combined with scFv-zippers targeting surface molecules to promote T cell proliferation, and can be combined with orthogonal ZipR-CAR system for activating T cell killing of target cells. FIG. 16 shows ZipR based CCRs with cytokine leucine zippers inducing autocrine and paracrine T cell activation. T cells can be engineered to express leucine zipper tagged cytokines, which can promote T cell proliferation, survival, and IFN-gamma production by T cells. IFN-gamma can activate APCs to secrete IL-12 and increase phagocytosis.

Example 4—Leucine Zipper-Based Chimeric Costimulatory Receptors (CCRs) Activated by Secreted scFv Leucine Zipper Sorting Affinity Tags that Also Activate Antigen Presenting Cells (APC)

Figure 17:
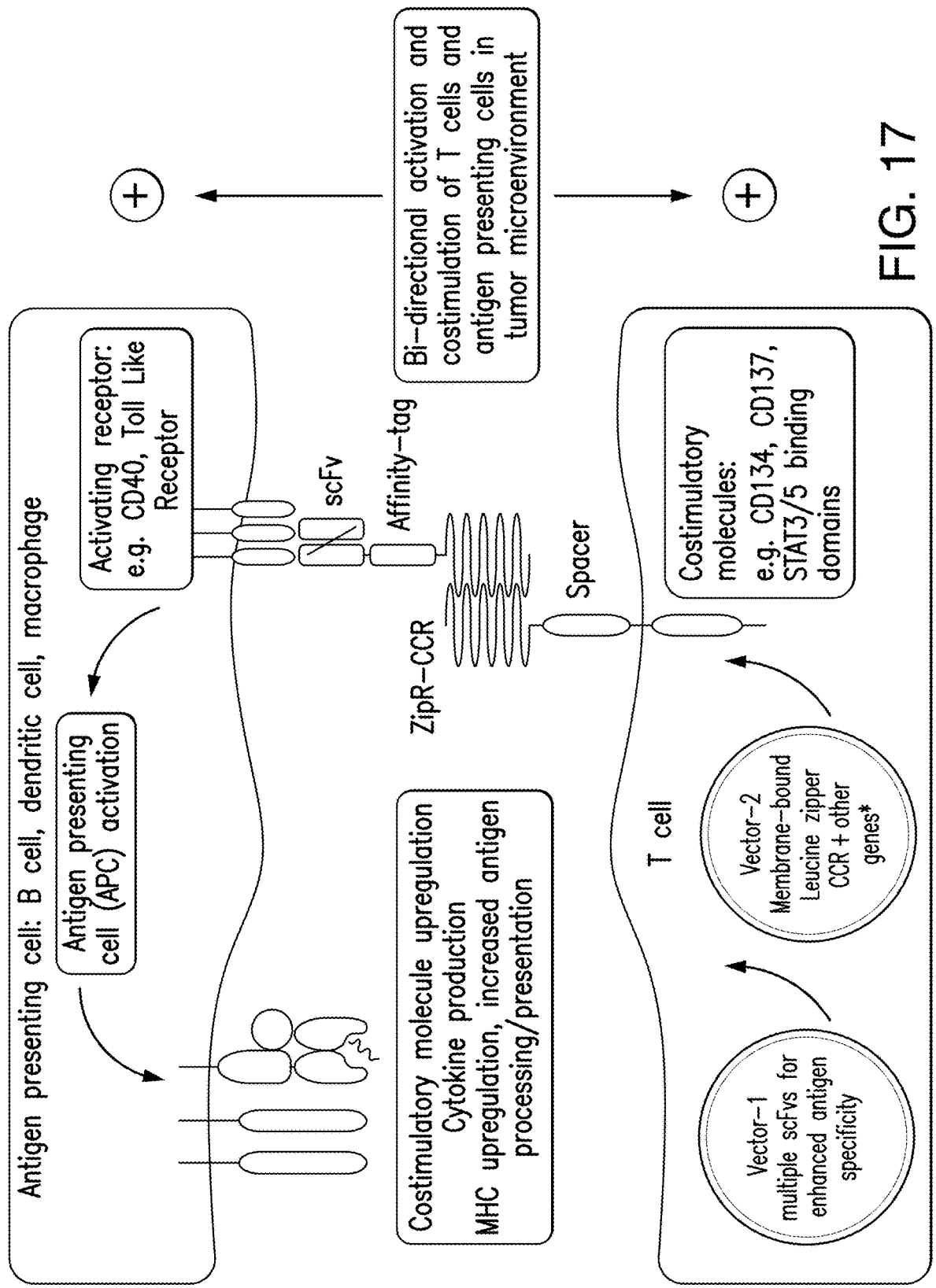
FIG. 17 depicts leucine zipper-based constructs in accordance with certain embodiments of the presently disclosed subject matter.

Resting APCs result in poor antigen presentation to and activation of T cells and can promote T cell anergy. Activation of APCs has been shown in preclinical models to promote T cell activation, abrogate the requirement for CD4 T cell help, and enhance tumor immunotherapy. As such, a two-vector system is developed to modify T cells to express scFv-affinity tag-leucine zippers specific for activating receptors of APCs (e.g. CD40, Toll Like Receptors (TLRs)) with co-expression of corresponding leucine-zipper based CCRs (e.g. EE12RR345L:CD137) (FIG. 17). As shown in FIG. 17, ZipR based CCRs can induce combined antigen presenting cell activation and T cell costimulatory signaling. The system targets costimulatory receptors on surface of antigen presenting cells with affinity tagged scFv leucine zippers, and allows sorting of T cells expressing scFv affinity tags. The scFv leucine zippers can interact with positive costimulatory receptors on antigen presenting cells. This system can promote activation of antigen presenting cells and simultaneously send positive signals to T cells via ZipR-CCRs. This system can promote T cell activation in the setting of alternatively activated macrophages. In another approach, the cells can be sorted using a ZipR-CAR and express orthogonal leucine zippers to interact with CCR. ScFvs can be expressed downstream of NFAT promoter to only express in tumor micro-environment downstream of CAR signaling.

Similar to Example 2, this vector system promotes activation and proliferation of T cells by directly delivering a positive costimulatory signal to T cells via CCRs in response to APCs. However, the method also activates APCs to upregulate positive costimulatory molecules (CD80, CD86), enhance peptide presentation, and enhance pro-inflammatory cytokine secretion. This system can be engineered such that the scFv-affinity tag-leucine zippers are expressed only down-stream of CAR-mediated NFAT signaling to limit the activation of APCs to the tumor microenvironment. This system can enhance both engineered and endogenous immune responses.

Figure 18:
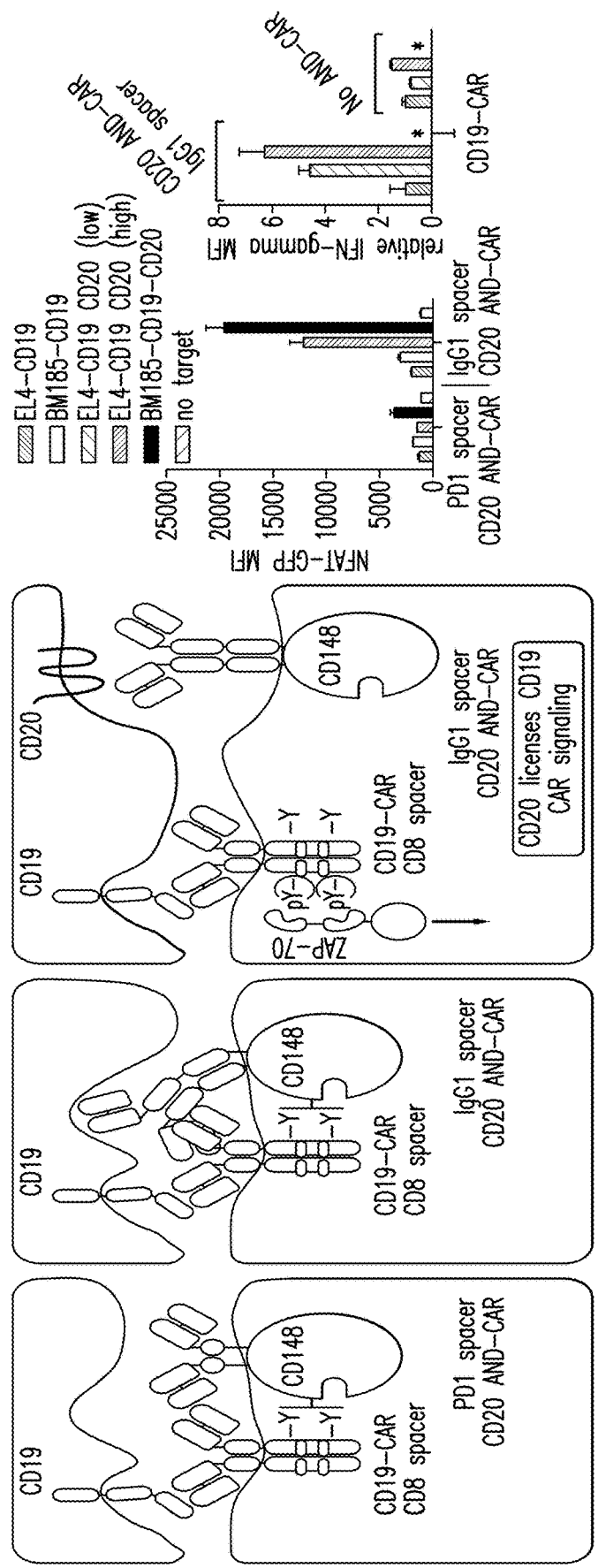
FIG. 18 depicts leucine zipper-based constructs in accordance with certain embodiments of the presently disclosed subject matter.

Example 5—Phosphatase-Based Negative Signaling Chimeric Antigen Receptors Forming AND-Logic Gates (AND-CARs) with Leucine Zipper-Based Antigen Recognition Motifs to Allow Combined OR-Logic Gates Non-tumor specificity of tumor associated antigens, with off-tumor on-target toxicity, represents a current limitation of CAR based immunotherapy. One approach to enhance the specificity of a CAR or TCR-based immune response is to limit T cell activation to targets expressing combinations of antigens (AND-gate, e.g. cells expressing HLA-A2 and CD20 in setting of HLA-mismatched allogeneic hematopoietic cell transplant). A prior system has shown that phosphatase-based receptors with large extracellular domains can be selectively activated in response to antigen, allowing T cells to be "licensed" for activity in the presence of the activating antigen, but otherwise inhibited. This system was adapted using CD19 and CD20 antigens as shown in FIG. 18. As shown in FIG. 18, phosphatase chimeric receptor based AND-gates allowed selective killing of targets by T cells. T cells can be engineered to express phosphatases linked to large extracellular domains spacers bearing scFvs (AND-CAR). If the spacers are designed at a particular size, the constructs are constitutively inhibitory to T cell signaling. However, in the presence of the cognate antigen, the antigen-receptor pair segregates away from TCRs and CARs, and positive signaling of these molecules is licensed. This generates a functional AND-gate. However, this gate is limited to a single antigen specificity conferred by the scFv of the AND-CAR.

However, a tumor cell may lose expression of the licensing antigen (e.g., CD20). As such, it is advantageous to enable a T cell to become activated in response to multiple licensing antigens. However, expressing multiple AND-CARs specific for multiple antigens in one cell increases the stringency. Additionally, AND-CAR DNA constructs are large constructs requiring multiple vectors to package all required RNA/DNA, limiting expression of multiple constructs.

Figure 19:
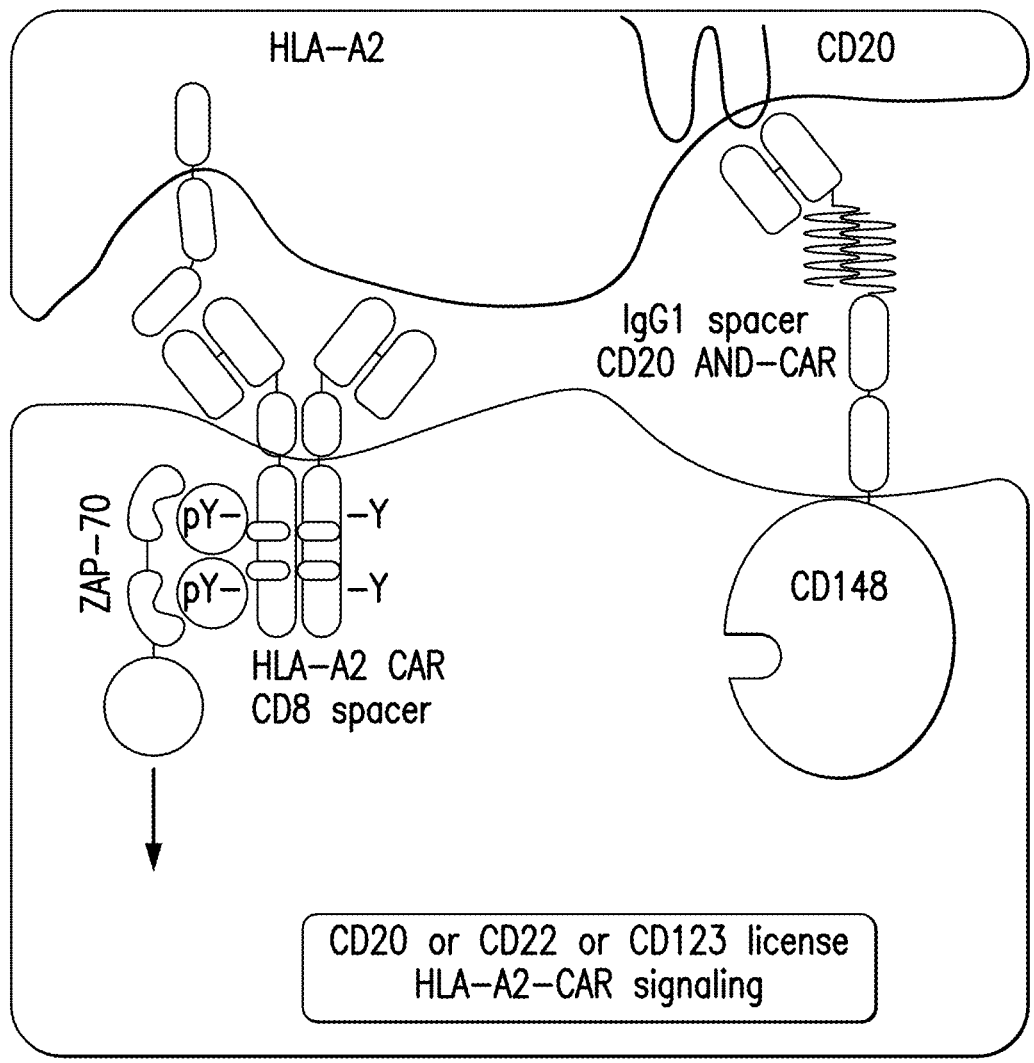
FIG. 19 depicts leucine zipper-based constructs in accordance with certain embodiments of the presently disclosed subject matter.

As such, a leucine zipper-based AND-CAR system is developed (e.g. EE12RR345L IgG1 CD148), where AND-CAR constructs are co-expressed with scFv-affinity tag-leucine leucine zippers specific for multiple licensing antigens to allow sorting and a combined AND/OR gate, e.g., licensing requires antigen HLA-A2 AND (CD20 OR CD22 OR CD123) (FIG. 19). As shown in FIG. 19, ZipR-based AND-CAR allows for multiple licensing scFvs, which increases the number of antigens capable of activating T cells. Therefore, an OR-gate is combined with the AND-gate of the AND-CAR. For example, pre-B cell ALL licensing vector containing scFvs against CD19, CD22 and CD123 can be combined with a CAR against HLA-A2 to form an AND-gate, which target cells expressing HLA-A2 and at least one of CD19, CD22 and CD123 (AND-gate+OR-gate).

Example 6—ZipR-CAR T Cells as a Chemotherapy-Free, Radiation-Free Conditioning Regimen for Hematopoietic Cell Transplant (HCT)

HCT requires a chemotherapy or radiation-based conditioning regimen to kill hematopoietic progenitor cells (HPCs), T cells, B cells, and myeloid cells to facilitate engraftment of donor HPCs and prevent rejection of donor HPCs by host T cells. T cell depleted HCT is a modification of HCT that uses CD34+ selection, myeloablative chemotherapy or radiation, and in vivo host T cell depletion using antithymocyte globulin to compensate for the relative reduction in donor T cells, which normally facilitate engraftment. These conditioning regimens can lead to transplant related mortality and late toxicities including organ dysfunction and secondary malignancies.

However, T cells can be modified to attack host T cells, HPCs, T cells, B cells, and myeloid cells to facilitate engraftment. T cells must undergo TCR or CD3 deletion to remove the CD3 antigen from the surface when using CD3 as a target. T cells can be further modified to express cytokines such as IL-12 or IL-18, which have been shown to obviate the need for a conditioning regimen in animal models of leukemia.

Figure 20:
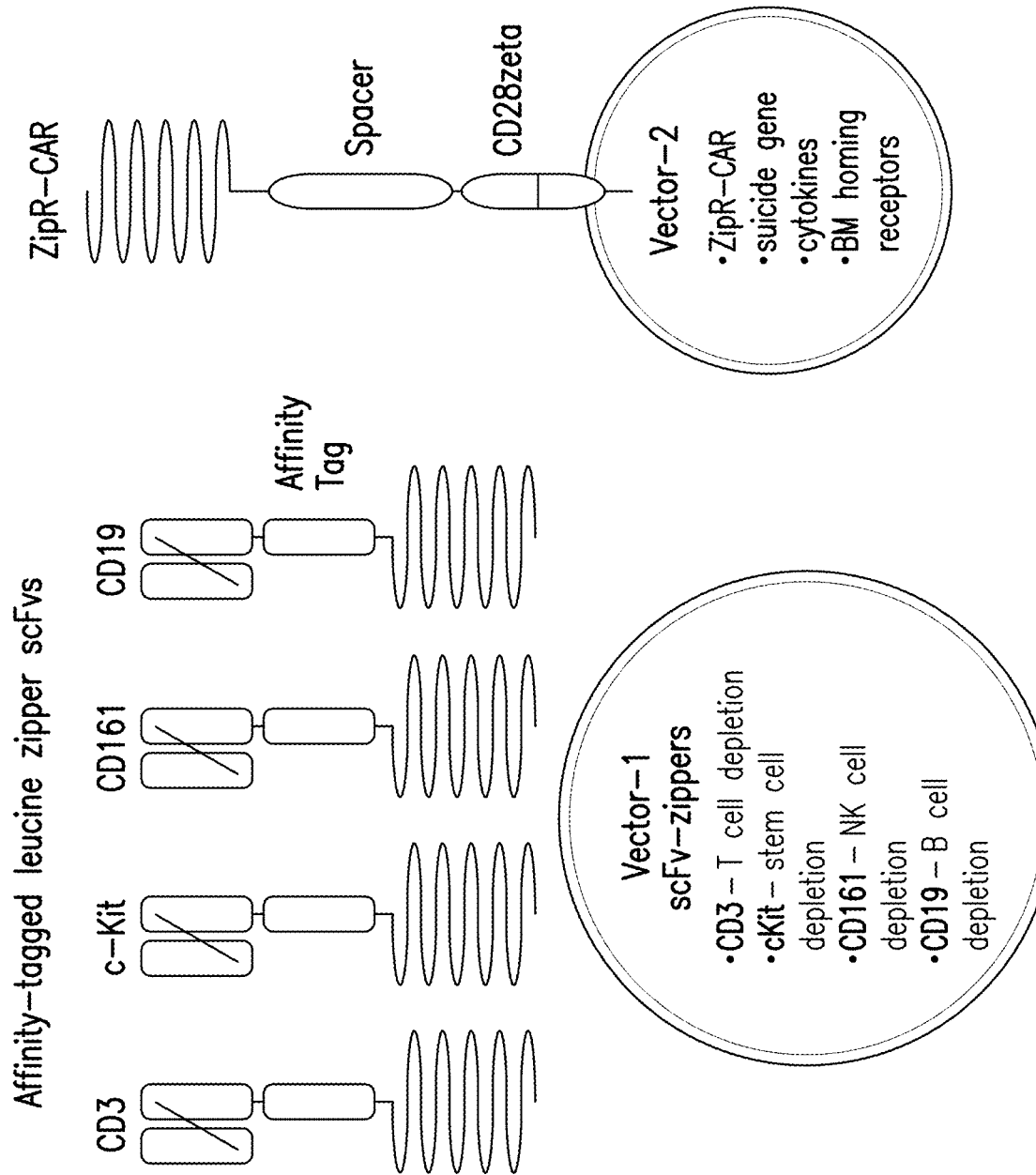
FIG. 20 depicts leucine zipper-based constructs in accordance with certain embodiments of the presently disclosed subject matter.
Figure 21:
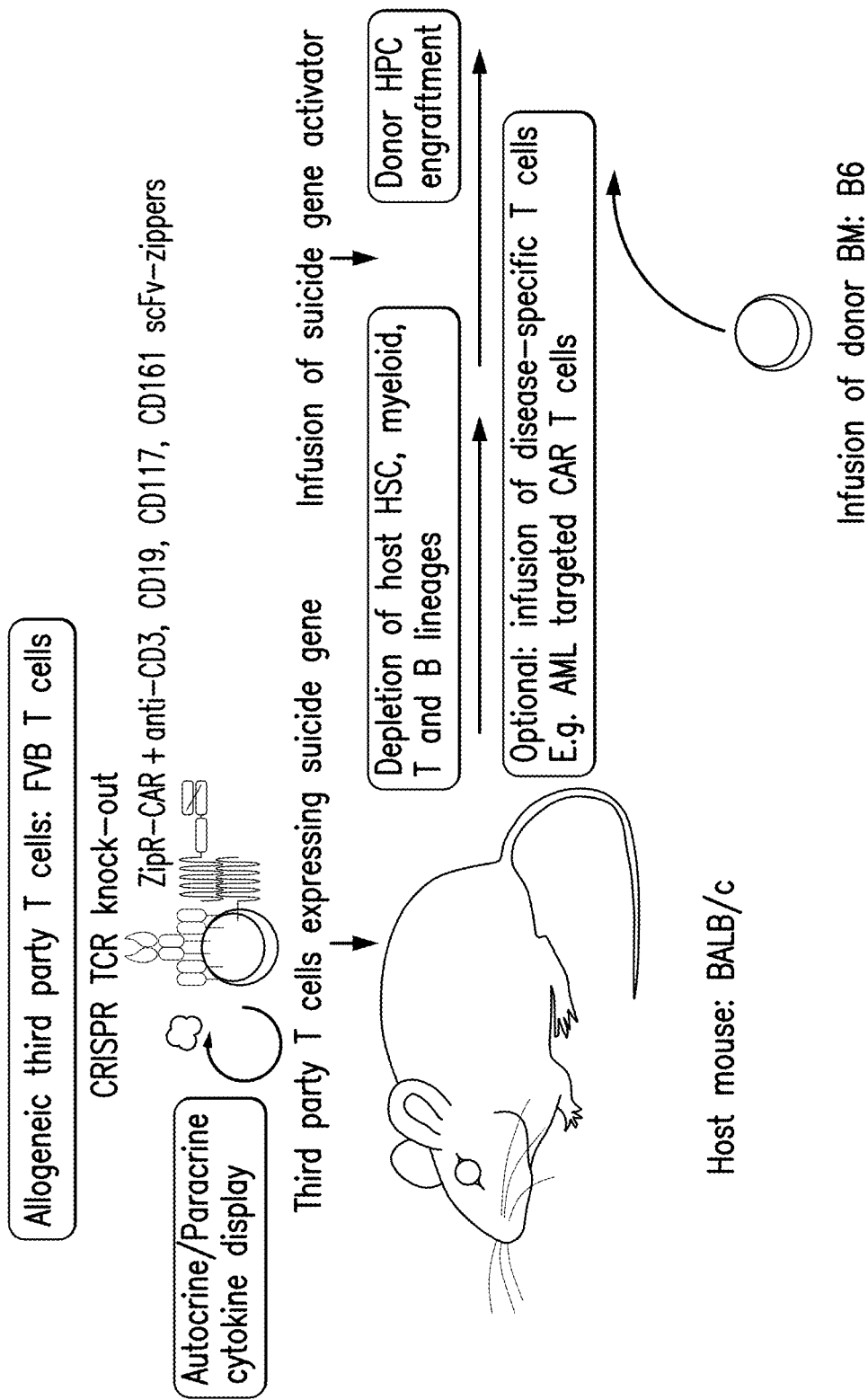
FIG. 21 depicts leucine zipper-based chemotherapy-free HCT conditioning regimen model system.

As such, TCR-deleted ZipR-CAR T cells were generated by expressing IL-18 and iCaspase9 from one vector and expressing scFvs from another vector targeting antigens to delete host hematopoietic elements including HPCs prior to donor HPC infusion (FIGS. 20 and 21). FIG. 20 and FIG. 21 show ZipR-CAR based chemotherapy-free HCT conditioning regimen. The system can be used for hematologic malignancies or non-malignant hematologic disorders (e.g., sickle cell anemia). Host T cells, B cells, and NK cells are depleted to prevent rejection of allogeneic donor bone marrow traditionally by chemotherapy and radiation, which are associated with acute and chronic toxicity and risk of secondary malignancies. ZipR-CAR T cells can deplete multiple host hematopoietic cell lineages. ZipR-CAR vector can encode suicide gene to allow T cell depletion and engraftment of donor HPCs. The system can further include scFv targeting CLL-1/CLEC12A to target mature myeloid cells, and can include IL-3 zipperkine or CD123 scFv to target early myeloid cells. T cells can be engineered to secret IL-18 or other cytokines to promote eradication of host cells. In certain embodiments, TCR is deleted (e.g., by CRISPR, PEBL, or TALEN, etc.) from cell surface to prevent fratricide, e.g., for CD3 CAR.

This cell product can be obtained from a universal third-party donor and can be frozen as a cell bank to be infused into any patient as the TCR is deleted, removing the capacity for graft-versus-host disease (GVHD). After the recipient hematopoietic system has been deleted by the ZipR-CAR T cells, the suicide gene can be activated by infusion of a chemical dimerizer of iCaspase9 resulting in deletion of the ZipR-CAR T cells. Donor HPCs can then be infused (FIG. 21).

Figure 22:
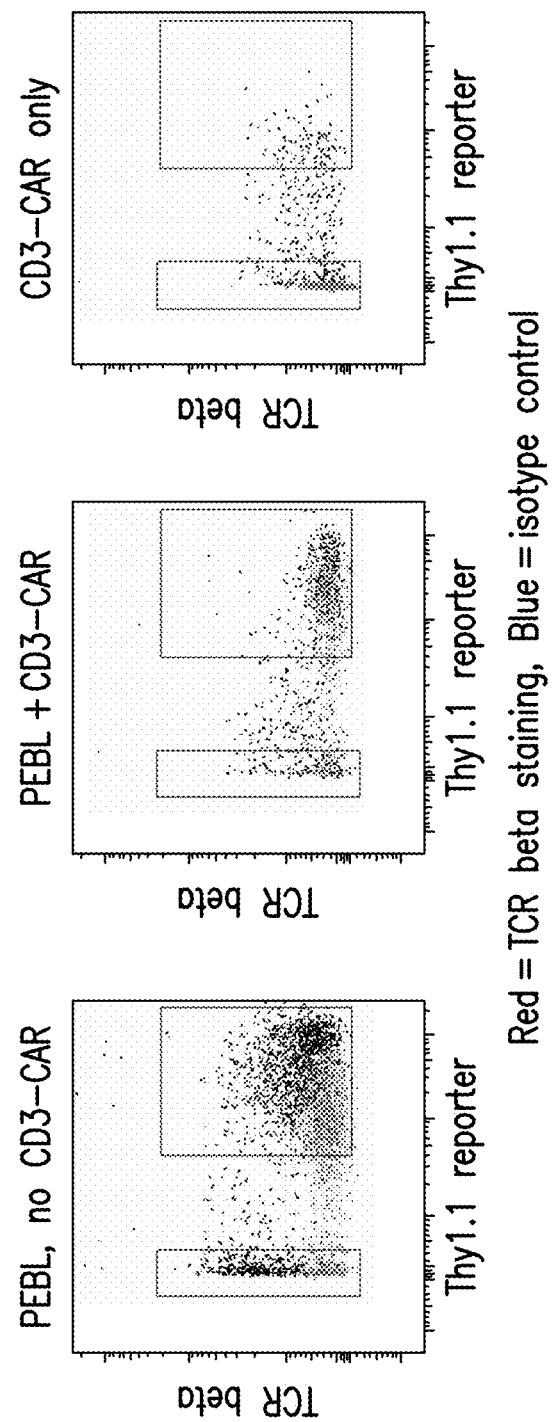
FIG. 22 depicts that promotion of fratricide by T cells expressing CD3 CAR.
Figure 23:
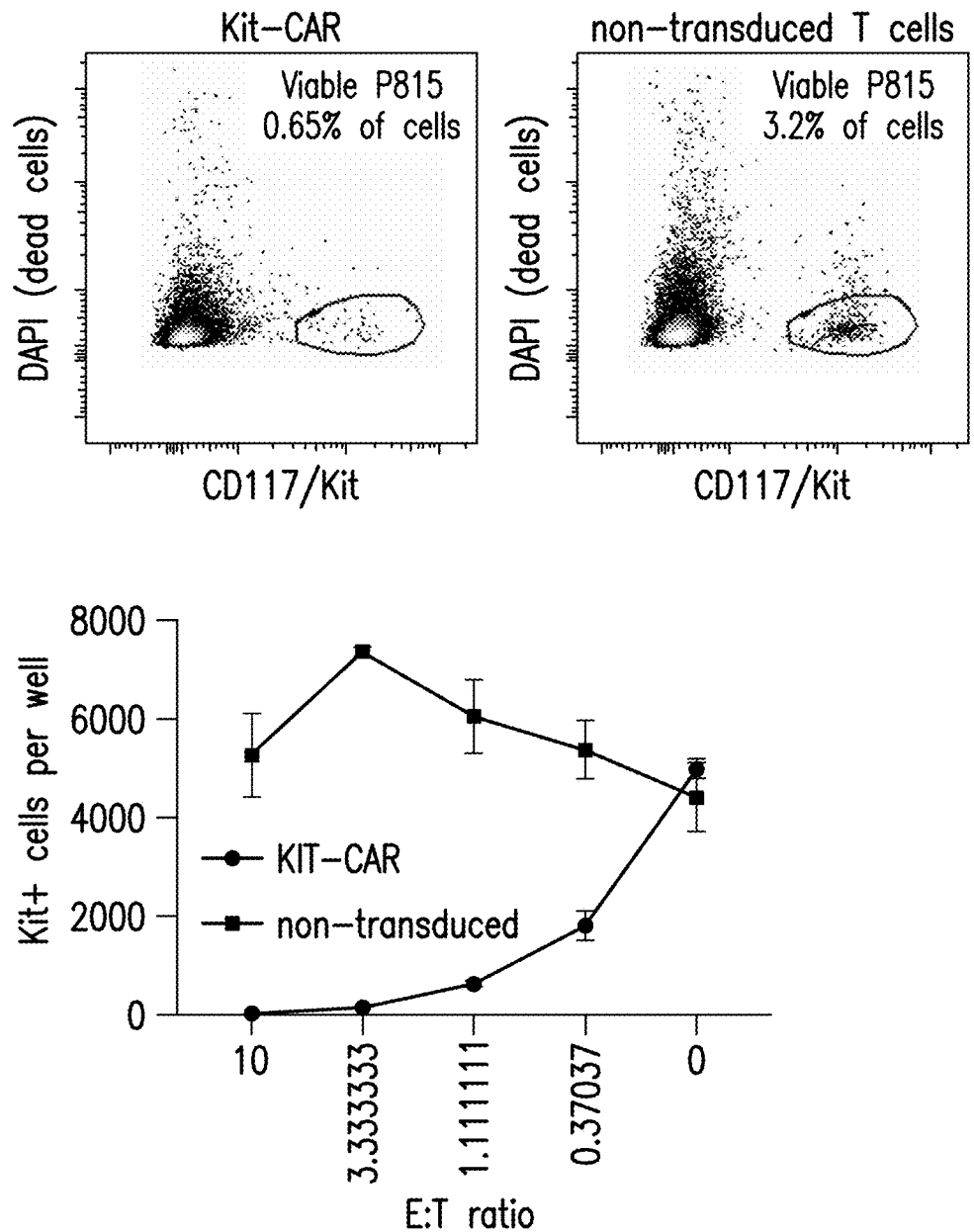
FIG. 23 depicts activity of T cells expressing Kit-CAR targeting CD117/Kit.
Figure 24:
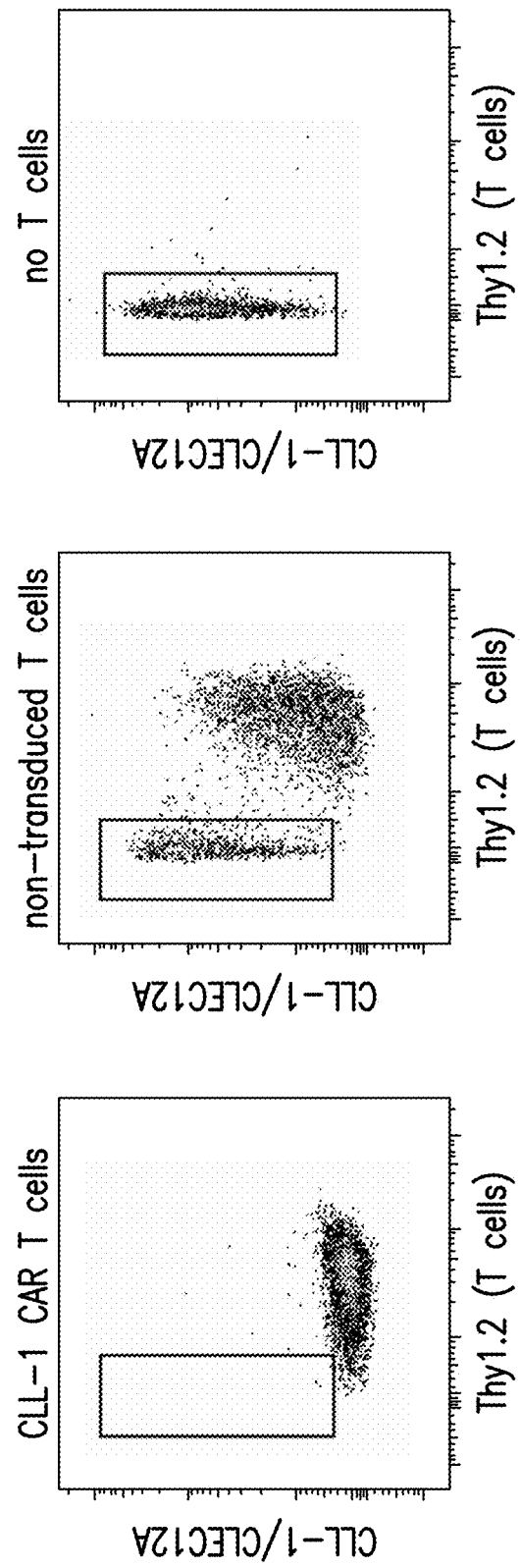
FIG. 24 depicts activity of CLL-1/CLEC12A CAR.

The TCR-deleted ZipR-CAR T cells' ability to kill target cell expressing the following antigen was demonstrated: CD3 (FIG. 22), CD117/kit (FIG. 23), CD19, CD20, IL-3R (FIG. 9), CLL-1/CLEC12A (FIG. 24). As shown in FIG. 22, T cells expressing CD3 CAR promoted fratricide. T cells transduced to express CD3-PEBL (protein construct that knocks-down CD3/TCR expression) demonstrated reduced TCR expression as function of Thy1.1 reporter expression (left panel). CD3-CAR expression led to fratricide (loss of TCR-beta+ population, right panel). Combined CD3-CAR+CD3-PEBL transduction (middle panel) promoted loss of TCR-beta+ population with protection of Thy1.1+CD3-CAR T cells. PEBL, CRISPR, or TALEN can be used to eliminate CD3 or TCR expression from T cell surface and allow CD3-CAR to target CD3+ recipient/host T cells without causing fratricide. As shown in FIG. 23, T cells expressing Kit-CAR targeting CD117/Kit successfully killed Kit+ tumor cells and mouse bone marrow Kit+ cells. P815 mastocytoma express Kit and was killed by Kit-CAR+ T cells. Mouse LSK bone marrow progenitor cells express Kit and were killed by Kit-CAR+ T cells. As shown in FIG. 24, CLL-1/CLEC12A CAR eliminated mouse primary acute myeloid leukemia. Mouse AML cell line was derived from mouse bone marrow transduced with MLL-AF9 translocation, which constitutively expressed CLL-1. Overnight incubation with CLL-1 CAR T cells eliminated AML cells CLL-1 was expressed on mature myeloid cells and CLL-1 CAR T cells can facilitate elimination of host myeloid cells in addition to leukemia.

A malignancy specific T cell population can be co-infused as a third-party T cell product at the same time of administering the conditioning-regiment T cell product. The advantages of this approach include targeting multiple antigens using the ZipR-CAR system, using IL-18 to facilitate donor HPC engraftment, and including a suicide gene in the ZipR-CAR vector to permit elimination of the ZipR-CAR T cells to prevent donor HPC graft rejection or long-term cellular aplasias.

Example 7—Chemokine-Appended Leucine Zipper Constructs

Figure 26A:
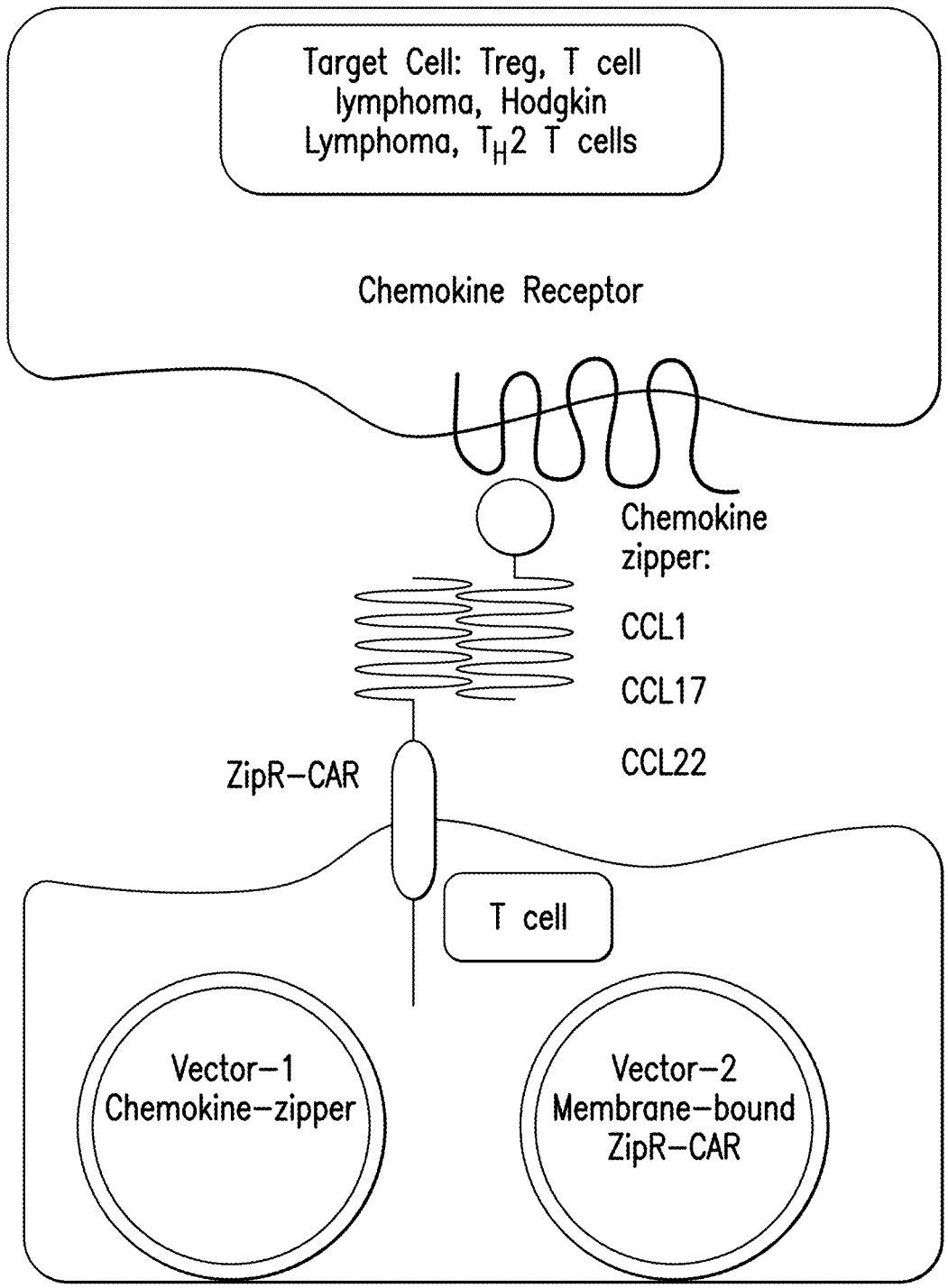
FIGS. 26A and 26B depict systems comprising chemokine-appended leucine zipper construct and their activities.
Figure 26B:
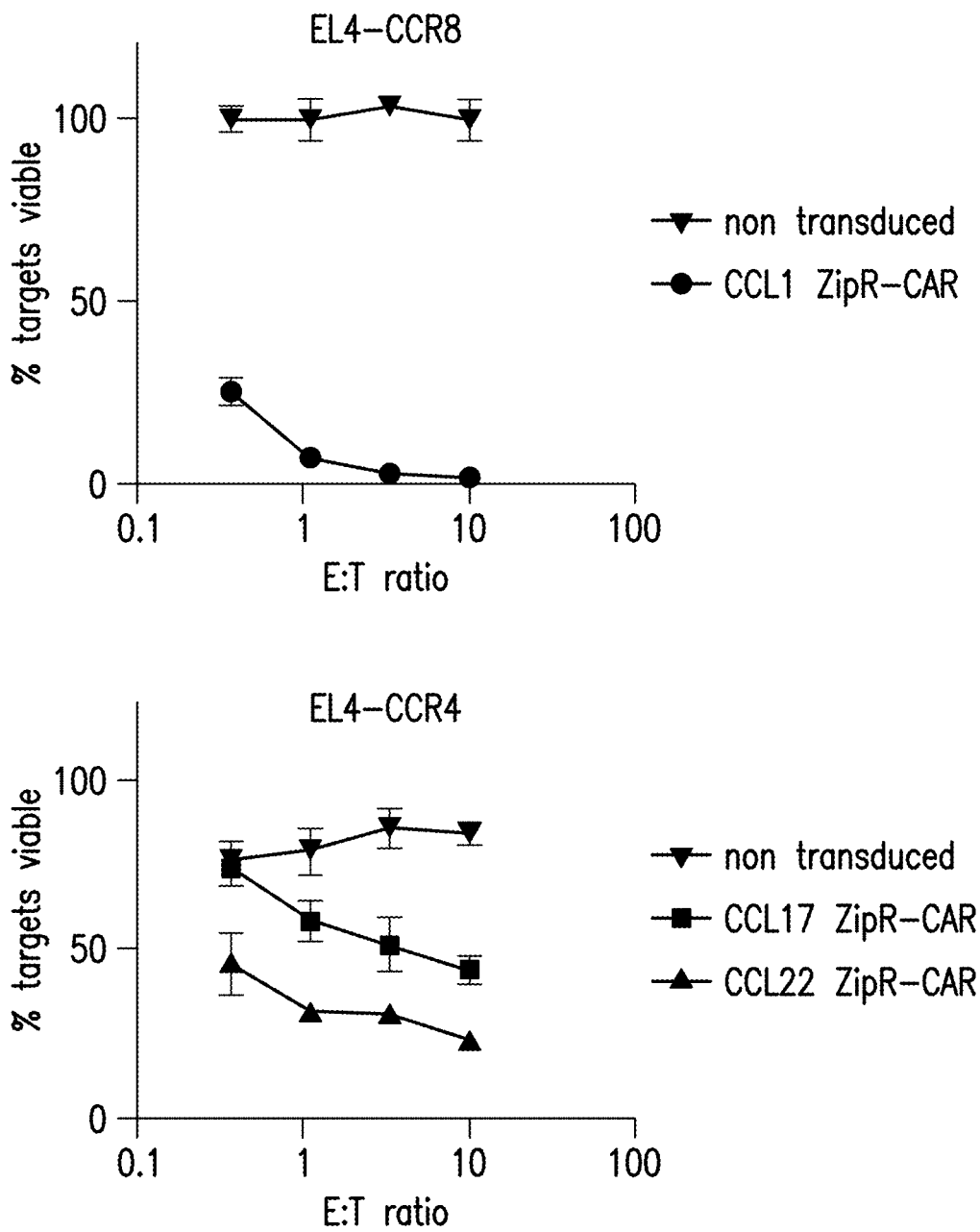

T cells are co-transduced with separate vectors encoding (a) chemokine-appended RR12EE345L leucine zipper and (b) EE12RR345L 28z leucine zipper-based ZipR-CAR, as shown in FIG. 26A. As shown in FIG. 26A, CCL17 and CCL22 interact with CCR4; and CCL1 interacts with CCR8. As shown in FIG. 26B, T cells co-expressing ZipR-CARs and chemokine zippers (zipperkines) mediated target lysis against EL4 expressing CCR4 or CCR8.

EMBODIMENTS OF THE PRESENTLY DISCLOSED SUBJECT MATTER

From the foregoing description, it will be apparent that variations and modifications may be made to the presently disclosed subject matter to adopt it to various usages and conditions. Such embodiments are also within the scope of the following claims.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or fragments thereof.

All patents and publications mentioned in this specification are herein incorporated by reference to the same extent as if each independent patent and publication was specifically and individually indicated to be incorporated by reference.

What is claimed is:

1. A system, comprising:
   a) a membrane-bound polypeptide comprising:
      i) a transmembrane domain,
      ii) an intracellular domain, and
      iii) an extracellular domain that comprises a first dimerization domain and a second dimerization domain that is capable of dimerizing with the first dimerization domain, and
   b) a soluble polypeptide comprising:
      i) a third dimerization domain that is capable of dimerizing with the first dimerization domain, and
      ii) an antigen binding domain that binds to an antigen,
   wherein each of the first dimerization domain, the second dimerization domain, and the third dimerization domain comprises a leucine zipper domain, the first dimerization domain and the second dimerization domain are an orthogonal pair, and the first dimerization domain and the third dimerization domain are an orthogonal pair.

2. The system of claim 1, wherein the antigen is selected from the group consisting of a tumor antigen, a pathogen antigen, an immune checkpoint molecule, an activating receptor, and a biomarker of a hematopoietic lineage cell.

3. The system of claim 2, wherein the antigen is a tumor antigen.

4. The system of claim 3, wherein the tumor antigen is selected from the group consisting of CD2, CD3, CD4, CD5, CD7, CD8, CD19, CD20, CD22, VpreB, CD30, CD33, CD38, CD40, CD44v6, CD70, CD79a, CD70b, CLL-1/CLEC12A, CD123, IL-3R complex, TIM-3, BCMA, TACI, SLAMF7, CD244, Epcam, E-cadherin, B7-H3, and B7-H4.

5. The system of claim 2, wherein the antigen is an immune checkpoint molecule.

6. The system of claim 5, wherein binding of the antigen binding domain to the immune checkpoint molecule is capable of blocking an immune checkpoint signal in an immunoresponsive cell.

7. The system of claim 2, wherein the antigen is a biomarker of a hematopoietic lineage cell.

8. The system of claim 7, wherein the biomarker of a hematopoietic lineage cell is selected from the group consisting of CD3, CD16, CD33, c-Kit, CD161, CD19, CD20, VpreB, luteinizing hormone receptor (LHCGR), CD123, IL-3R complex, and CLEC12A/CLL-1.

9. The system of claim 7, comprising at least four soluble polypeptides, wherein the antigen binding domain of each soluble polypeptide binds to a different biomarker of a hematopoietic lineage cell.

10. The system of claim 9, comprising a first soluble polypeptide that binds to CD3, a second soluble polypeptide that binds to CD19, a third soluble polypeptide that binds to CD161 and a fourth soluble polypeptide that binds to c-Kit.

11. The system of claim 1, wherein the antigen is an activating receptor.

12. The system of claim 11, wherein binding of the antigen binding domain to the activating receptor is capable of activating an antigen presenting cell (APC), or the activating receptor is selected from the group consisting of CD40, Toll Like Receptors (TLRs), FLT3, RANK, and GM-CSF receptor.

13. The system of claim 12, wherein the APC is a professional APC, a non-professional APC, or a cell of the myeloid lineage.

14. The system of claim 13, wherein
   a) the professional APC is selected from the group consisting of dendritic cells, macrophages, and B cells; or
   b) the cell of myeloid lineage is selected from the group consisting of dendritic cells, macrophages, and monocytes.

15. The system of claim 1, wherein the extracellular domain of the membrane-bound polypeptide further comprises:
   a) a linker between the first dimerization domain and the second dimerization domain;
   b) a spacer/hinge domain between the first dimerization domain and the transmembrane domain;
   c) a co-stimulatory ligand; or
   d) a dominant negative form of a molecule.

16. The system of claim 15, wherein
a) the linker comprises the amino acid sequence set forth in SEQ ID NO: 3;
b) the spacer/hinge domain comprises:
   i) an epitope recognized by an antibody, wherein binding of the antibody to the epitope mediates depletion of a cell comprising the membrane-bound polypeptide; or
   ii) a Thy1.1 molecule, a CD20 mimotope, or a truncated EGFR molecule (EGFRt);
c) the co-stimulatory ligand is selected from the group consisting of a tumor necrosis factor (TNF) family member and an immunoglobulin (Ig) superfamily member; or
d) the molecule is selected from the group consisting of an inhibitor of an immune checkpoint molecule, a tumor necrosis factor receptor superfamily (TNFRSF) member, and a transforming growth factor beta (TGFβ) receptor.

17. The system of claim 16, wherein
a) the TNF family member is selected from the group consisting of 4-1BBL, OX40L, CD70, GITRL, CD40L, and CD30L;
b) the Ig superfamily member is selected from the group consisting of CD80, CD86, and ICOSLG;
c) the immune checkpoint molecule is selected from the group consisting of PD-1, CTLA-4, B7-H3, B7-H4, BTLA, TIM-3, LAG-3, TIGIT, LAIR1, CD200, CD200R, HVEM, 2B4, CD160, and Galectin9; or
d) the TNFRSF member is selected from the group consisting of Fas, a Tumor necrosis factor receptor, OX40, CD40, CD27, CD30, and 4-1BB.

18. The system of claim 1, wherein the intracellular domain of the membrane-bound polypeptide comprises one or more immune activating molecules.

19. The system of claim 1, wherein the intracellular domain of the membrane-bound polypeptide does not comprise one or more immune activating molecules.

20. The system of claim 1, wherein the soluble polypeptide and the membrane-bound polypeptide are:
a) capable of forming a dimer when expressed from the same cell, and
b) are not capable of forming a dimer when expressed from different cells due to the dimerization between the first dimerization domain and the second dimerization domain of the membrane-bound polypeptide.

21. The system of claim 1, wherein the intracellular domain of the membrane-bound polypeptide comprises a CD3-ζ domain or a costimulatory domain.

22. The system of claim 1, further comprising a suicide molecule.

23. The system of claim 22, wherein the suicide molecule is an inducible Caspase 9 polypeptide (iCasp9).

24. The system of claim 1, wherein the membrane-bound polypeptide and/or the soluble polypeptide further comprises a tag or a mimotope recognized by an antibody, wherein binding of the antibody to the mimotope mediates depletion of a cell comprising the membrane-bound polypeptide.

25. The system of claim 24, wherein
a) the tag comprises an epitope tag that is recognized by a first antibody or an affinity tag that binds to a substrate; or
b) the mimotope is CD20.

26. The system of claim 25, wherein
a) the epitope tag is selected from the group consisting of a Myc-tag, a HA-tag, a Flag-tag, a V5-tag, and a T7-tag; or
b) the affinity tag is selected from the group consisting of a His-tag, a Strep-tag, an E-tag, and a streptavidin binding protein tag (SBP-tag).

27. The system of claim 1, wherein the antigen binding domain comprises a single-chain variable fragment (scFv), a soluble ligand, a cytokine, and a non-scFv-based antigen recognition motif.

28. The system of claim 6, wherein the immune checkpoint molecule is selected from the group consisting of PD-L1, CD200, B7-H3, B7-H4, HVEM, Galectin9, PD-1, CTLA-4, CD200R, TIM-3, Lag-3, and TIGIT.

* * * * *

SEQUENCE LISTING

```
<160> NUMBER OF SEQ ID NOS: 98

<210> SEQ ID NO 1
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Leu Glu Ile Arg Ala Ala Phe Leu Arg Gln Arg Asn Thr Ala Leu Arg
1               5                   10                  15

Thr Glu Val Ala Glu Leu Glu Gln Glu Val Gln Arg Leu Glu Asn Glu
            20                  25                  30

Val Ser Gln Tyr Glu Thr Arg Tyr Gly Pro Leu Gly Gly Gly Lys
        35                  40                  45

<210> SEQ ID NO 2
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Leu Glu Ile Glu Ala Ala Phe Leu Glu Arg Glu Asn Thr Ala Leu Glu
1               5                   10                  15

Thr Arg Val Ala Glu Leu Arg Gln Arg Val Gln Arg Leu Arg Asn Arg
            20                  25                  30

Val Ser Gln Tyr Arg Thr Arg Tyr Gly Pro Leu Gly Gly Gly Lys
        35                  40                  45

<210> SEQ ID NO 3
<211> LENGTH: 19
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 3

Gly Gly Gly Gly Ser Gly Gly Gly Ser Gly Gly Gly Gly Ser Gly
1               5                   10                  15

Gly Gly Ser

<210> SEQ ID NO 4
<211> LENGTH: 38
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 4

Gly Ser Gln Lys Val Glu Ser Leu Lys Gln Lys Ile Glu Glu Leu Lys
1               5                   10                  15

Gln Arg Lys Ala Gln Leu Lys Asn Asp Ile Ala Asn Leu Glu Lys Glu
            20                  25                  30

Ile Ala Tyr Ala Glu Thr
        35

<210> SEQ ID NO 5
<211> LENGTH: 44
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

Gly Ser Glu Leu Thr Asp Thr Leu Gln Ala Glu Thr Asp Gln Leu Glu
1               5                   10                  15

Asp Glu Lys Ser Ala Leu Gln Thr Glu Ile Ala Asn Leu Leu Lys Glu
            20                  25                  30

Lys Glu Lys Leu Glu Phe Ile Leu Ala Ala His Arg
        35                  40

<210> SEQ ID NO 6
<211> LENGTH: 44
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Glu Arg Ile Ser Arg Leu Glu Glu Lys Val Lys Thr Leu Lys Ser Gln
1               5                   10                  15

Asn Thr Glu Leu Ala Ser Thr Ala Ser Leu Leu Arg Glu Gln Val Ala
            20                  25                  30

Gln Leu Lys Gln Lys Val Leu Ser His Val Leu Glu
        35                  40

<210> SEQ ID NO 7
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 7

Cys His Thr Gln Ser Ser Pro Lys Leu
1               5

<210> SEQ ID NO 8
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Val Pro Arg Asp Cys Gly Cys Lys Pro Cys Ile Cys Thr
1               5                   10

<210> SEQ ID NO 9
<211> LENGTH: 235
<212> TYPE: PRT
<213> ORGANISM: Homo sapiens

<400> SEQUENCE: 9

Met Ala Leu Pro Val Thr Ala Leu Leu Leu Pro Leu Ala Leu Leu Leu
1               5                   10                  15

His Ala Ala Arg Pro Ser Gln Phe Arg Val Ser Pro Leu Asp Arg Thr
            20                  25                  30

Trp Asn Leu Gly Glu Thr Val Glu Leu Lys Cys Gln Val Leu Leu Ser
        35                  40                  45

Asn Pro Thr Ser Gly Cys Ser Trp Leu Phe Gln Pro Arg Gly Ala Ala
    50                  55                  60

Ala Ser Pro Thr Phe Leu Leu Tyr Leu Ser Gln Asn Lys Pro Lys Ala
65                  70                  75                  80

Ala Glu Gly Leu Asp Thr Gln Arg Phe Ser Gly Lys Arg Leu Gly Asp
                85                  90                  95

Thr Phe Val Leu Thr Leu Ser Asp Phe Arg Arg Glu Asn Glu Gly Tyr
            100                 105                 110

Tyr Phe Cys Ser Ala Leu Ser Asn Ser Ile Met Tyr Phe Ser His Phe
        115                 120                 125

Val Pro Val Phe Leu Pro Ala Lys Pro Thr Thr Thr Pro Ala Pro Arg
    130                 135                 140

Pro Pro Thr Pro Ala Pro Thr Ile Ala Ser Gln Pro Leu Ser Leu Arg
145                 150                 155                 160

Pro Glu Ala Cys Arg Pro Ala Ala Gly Gly Ala Val His Thr Arg Gly
                165                 170                 175

Leu Asp Phe Ala Cys Asp Ile Tyr Ile Trp Ala Pro Leu Ala Gly Thr
            180                 185                 190

Cys Gly Val Leu Leu Leu Ser Leu Val Ile Thr Leu Tyr Cys Asn His
        195                 200                 205

Arg Asn Arg Arg Arg Val Cys Lys Cys Pro Arg Pro Val Val Lys Ser
    210                 215                 220

Gly Asp Lys Pro Ser Leu Ser Ala Arg Tyr Val
225                 230                 235

<210> SEQ ID NO 10
<211> LENGTH: 247
<212> TYPE: PRT
<213> ORGANISM: Mus musculus

<400> SEQUENCE: 10
```

Met Ala Ser Pro Leu Thr Arg Phe Leu Ser Leu Asn Leu Leu Leu Met
1               5                   10                  15

Gly Glu Ser Ile Ile Leu Gly Ser Gly Glu Ala Lys Pro Gln Ala Pro
                20                  25                  30

Glu Leu Arg Ile Phe Pro Lys Lys Met Asp Ala Glu Leu Gly Gln Lys
            35                  40                  45

Val Asp Leu Val Cys Glu Val Leu Gly Ser Val Ser Gln Gly Cys Ser
50                  55                  60

Trp Leu Phe Gln Asn Ser Ser Lys Leu Pro Gln Pro Thr Phe Val
65                  70                  75                  80

Val Tyr Met Ala Ser Ser His Asn Lys Ile Thr Trp Asp Glu Lys Leu
                85                  90                  95

Asn Ser Ser Lys Leu Phe Ser Ala Val Arg Asp Thr Asn Asn Lys Tyr
            100                 105                 110

Val Leu Thr Leu Asn Lys Phe Ser Lys Glu Asn Glu Gly Tyr Tyr Phe
        115                 120                 125

Cys Ser Val Ile Ser Asn Ser Val Met Tyr Phe Ser Ser Val Val Pro
    130                 135                 140

Val Leu Gln Lys Val Asn Ser Thr Thr Thr Lys Pro Val Leu Arg Thr
145                 150                 155                 160

Pro Ser Pro Val His Pro Thr Gly Thr Ser Gln Pro Gln Arg Pro Glu
                165                 170                 175

Asp Cys Arg Pro Arg Gly Ser Val Lys Gly Thr Gly Leu Asp Phe Ala
            180                 185                 190

Cys Asp Ile Tyr Ile Trp Ala Pro Leu Ala Gly Ile Cys Val Ala Pro
        195                 200                 205

Leu Leu Ser Leu Ile Ile Thr Leu Ile Cys Tyr His Arg Ser Arg Lys
    210                 215                 220

Arg Val Cys Lys Cys Pro Arg Pro Leu Val Arg Gln Glu Gly Lys Pro
225                 230                 235                 240

Arg Pro Ser Glu Lys Ile Val
                245

<210> SEQ ID NO 11
<211> LENGTH: 25
<212> TYPE: PRT
<213> ORGANISM: Unknown
<220> FEATURE:
<223> OTHER INFORMATION: Description of Unknown:
      CD8 sequence

<400> SEQUENCE: 11

Ile Tyr Ile Trp Ala Pro Leu Ala Gly Ile Cys Val Ala Leu Leu Leu
1               5                   10                  15

Ser Leu Ile Ile Thr Leu Ile Cys Tyr
                20                  25

<210> SEQ ID NO 12
<211> LENGTH: 21
<212> TYPE: PRT
<213> ORGANISM: Unknown
<220> FEATURE:
<223> OTHER INFORMATION: Description of Unknown:
      CD8 sequence

<400> SEQUENCE: 12

Ile Tyr Ile Trp Ala Pro Leu Ala Gly Thr Cys Gly Val Leu Leu Leu
1               5                   10                  15

Ser Leu Val Ile Thr
            20

<210> SEQ ID NO 13
<211> LENGTH: 188
<212> TYPE: PRT
<213> ORGANISM: Mus musculus

<400> SEQUENCE: 13

Met Lys Trp Lys Val Ser Val Leu Ala Cys Ile Leu His Val Arg Phe
1               5                   10                  15

Pro Gly Ala Glu Ala Gln Ser Phe Gly Leu Leu Asp Pro Lys Leu Cys
            20                  25                  30

Tyr Leu Leu Asp Gly Ile Leu Phe Ile Tyr Gly Val Ile Ile Thr Ala
        35                  40                  45

Leu Tyr Leu Arg Ala Lys Phe Ser Arg Ser Ala Glu Thr Ala Ala Asn
    50                  55                  60

Leu Gln Asp Pro Asn Gln Leu Tyr Asn Glu Leu Asn Leu Gly Arg Arg
65                  70                  75                  80

Glu Glu Tyr Asp Val Leu Glu Lys Lys Arg Ala Arg Asp Pro Glu Met
                85                  90                  95

Gly Gly Lys Gln Arg Arg Asn Pro Gln Glu Gly Val Tyr Asn Ala
            100                 105                 110

Leu Gln Lys Asp Lys Met Ala Glu Ala Tyr Ser Glu Ile Gly Thr Lys
        115                 120                 125

Gly Glu Arg Arg Arg Gly Lys Gly His Asp Gly Leu Tyr Gln Asp Ser
    130                 135                 140

His Phe Gln Ala Val Gln Phe Gly Asn Arg Arg Glu Arg Glu Gly Ser
145                 150                 155                 160

Glu Leu Thr Arg Thr Leu Gly Leu Arg Ala Arg Pro Lys Ala Cys Arg
                165                 170                 175

His Lys Lys Pro Leu Ser Leu Pro Ala Ala Val Ser
            180                 185

<210> SEQ ID NO 14
<211> LENGTH: 220
<212> TYPE: PRT
<213> ORGANISM: Homo sapiens

<400> SEQUENCE: 14

Met Leu Arg Leu Leu Leu Ala Leu Asn Leu Phe Pro Ser Ile Gln Val
1               5                   10                  15

Thr Gly Asn Lys Ile Leu Val Lys Gln Ser Pro Met Leu Val Ala Tyr
            20                  25                  30

Asp Asn Ala Val Asn Leu Ser Cys Lys Tyr Ser Tyr Asn Leu Phe Ser
        35                  40                  45

Arg Glu Phe Arg Ala Ser Leu His Lys Gly Leu Asp Ser Ala Val Glu
    50                  55                  60

Val Cys Val Val Tyr Gly Asn Tyr Ser Gln Gln Leu Gln Val Tyr Ser
65                  70                  75                  80

Lys Thr Gly Phe Asn Cys Asp Gly Lys Leu Gly Asn Glu Ser Val Thr
                85                  90                  95

Phe Tyr Leu Gln Asn Leu Tyr Val Asn Gln Thr Asp Ile Tyr Phe Cys
            100                 105                 110

Lys Ile Glu Val Met Tyr Pro Pro Pro Tyr Leu Asp Asn Glu Lys Ser
        115                 120                 125

Asn Gly Thr Ile Ile His Val Lys Gly Lys His Leu Cys Pro Ser Pro
                130                 135                 140

Leu Phe Pro Gly Pro Ser Lys Pro Phe Trp Val Leu Val Val Val Gly
145                 150                 155                 160

Gly Val Leu Ala Cys Tyr Ser Leu Leu Val Thr Val Ala Phe Ile Ile
                165                 170                 175

Phe Trp Val Arg Ser Lys Arg Ser Arg Leu Leu His Ser Asp Tyr Met
                180                 185                 190

Asn Met Thr Pro Arg Arg Pro Gly Pro Thr Arg Lys His Tyr Gln Pro
                195                 200                 205

Tyr Ala Pro Pro Arg Asp Phe Ala Ala Tyr Arg Ser
210                 215                 220

<210> SEQ ID NO 15
<211> LENGTH: 164
<212> TYPE: PRT
<213> ORGANISM: Homo sapiens

<400> SEQUENCE: 15

Met Lys Trp Lys Ala Leu Phe Thr Ala Ala Ile Leu Gln Ala Gln Leu
1               5                   10                  15

Pro Ile Thr Glu Ala Gln Ser Phe Gly Leu Leu Asp Pro Lys Leu Cys
                20                  25                  30

Tyr Leu Leu Asp Gly Ile Leu Phe Ile Tyr Gly Val Ile Leu Thr Ala
                35                  40                  45

Leu Phe Leu Arg Val Lys Phe Ser Arg Ser Ala Asp Ala Pro Ala Tyr
50                  55                  60

Gln Gln Gly Gln Asn Gln Leu Tyr Asn Glu Leu Asn Leu Gly Arg Arg
65                  70                  75                  80

Glu Glu Tyr Asp Val Leu Asp Lys Arg Arg Gly Arg Asp Pro Glu Met
                85                  90                  95

Gly Gly Lys Pro Gln Arg Arg Lys Asn Pro Gln Glu Gly Leu Tyr Asn
                100                 105                 110

Glu Leu Gln Lys Asp Lys Met Ala Glu Ala Tyr Ser Glu Ile Gly Met
                115                 120                 125

Lys Gly Glu Arg Arg Arg Gly Lys Gly His Asp Gly Leu Tyr Gln Gly
                130                 135                 140

Leu Ser Thr Ala Thr Lys Asp Thr Tyr Asp Ala Leu His Met Gln Ala
145                 150                 155                 160

Leu Pro Pro Arg

<210> SEQ ID NO 16
<211> LENGTH: 218
<212> TYPE: PRT
<213> ORGANISM: Mus musculus

<400> SEQUENCE: 16

Met Thr Leu Arg Leu Leu Phe Leu Ala Leu Asn Phe Phe Ser Val Gln
1               5                   10                  15

Val Thr Glu Asn Lys Ile Leu Val Lys Gln Ser Pro Leu Leu Val Val
                20                  25                  30

Asp Ser Asn Glu Val Ser Leu Ser Cys Arg Tyr Ser Tyr Asn Leu Leu
                35                  40                  45

Ala Lys Glu Phe Arg Ala Ser Leu Tyr Lys Gly Val Asn Ser Asp Val
50                  55                  60

Glu Val Cys Val Gly Asn Gly Asn Phe Thr Tyr Gln Pro Gln Phe Arg
65                  70                  75                  80

Ser Asn Ala Glu Phe Asn Cys Asp Gly Asp Phe Asp Asn Glu Thr Val
            85                  90                  95

Thr Phe Arg Leu Trp Asn Leu His Val Asn His Thr Asp Ile Tyr Phe
            100                 105                 110

Cys Lys Ile Glu Phe Met Tyr Pro Pro Tyr Leu Asp Asn Glu Arg
            115                 120                 125

Ser Asn Gly Thr Ile Ile His Ile Lys Glu Lys His Leu Cys His Thr
130                 135                 140

Gln Ser Ser Pro Lys Leu Phe Trp Ala Leu Val Val Ala Gly Val
145             150                 155                 160

Leu Phe Cys Tyr Gly Leu Leu Val Thr Val Ala Leu Cys Val Ile Trp
                165                 170                 175

Thr Asn Ser Arg Arg Asn Arg Leu Leu Gln Ser Asp Tyr Met Asn Met
                180                 185                 190

Thr Pro Arg Arg Pro Gly Leu Thr Arg Lys Pro Tyr Gln Pro Tyr Ala
            195                 200                 205

Pro Ala Arg Asp Phe Ala Ala Tyr Arg Pro
            210                 215

<210> SEQ ID NO 17
<211> LENGTH: 113
<212> TYPE: PRT
<213> ORGANISM: Unknown
<220> FEATURE:
<223> OTHER INFORMATION: Description of Unknown:
      CD3-zeta sequence

<400> SEQUENCE: 17

Arg Ala Lys Phe Ser Arg Ser Ala Glu Thr Ala Ala Asn Leu Gln Asp
1               5                   10                  15

Pro Asn Gln Leu Tyr Asn Glu Leu Asn Leu Gly Arg Arg Glu Glu Tyr
            20                  25                  30

Asp Val Leu Glu Lys Lys Arg Ala Arg Asp Pro Glu Met Gly Gly Lys
            35                  40                  45

Gln Gln Arg Arg Arg Asn Pro Gln Glu Gly Val Tyr Asn Ala Leu Gln
50                  55                  60

Lys Asp Lys Met Ala Glu Ala Tyr Ser Glu Ile Gly Thr Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Thr Leu Ala Pro
            100                 105                 110

Arg

<210> SEQ ID NO 18
<211> LENGTH: 277
<212> TYPE: PRT
<213> ORGANISM: Homo sapiens

<400> SEQUENCE: 18

Met Cys Val Gly Ala Arg Arg Leu Gly Arg Gly Pro Cys Ala Ala Leu
1               5                   10                  15

Leu Leu Leu Gly Leu Gly Leu Ser Thr Val Thr Gly Leu His Cys Val
            20                  25                  30

Gly Asp Thr Tyr Pro Ser Asn Asp Arg Cys Cys His Glu Cys Arg Pro

|   |   |   | 35  |   |   |   | 40  |   |   |   | 45  |   |   |
|---|---|---|---|---|---|---|---|---|---|---|---|---|---|

Gly Asn Gly Met Val Ser Arg Cys Ser Arg Ser Gln Asn Thr Val Cys
 50                  55                  60

Arg Pro Cys Gly Pro Gly Phe Tyr Asn Asp Val Val Ser Ser Lys Pro
65                   70                  75                  80

Cys Lys Pro Cys Thr Trp Cys Asn Leu Arg Ser Gly Ser Glu Arg Lys
                 85                  90                  95

Gln Leu Cys Thr Ala Thr Gln Asp Thr Val Cys Arg Cys Arg Ala Gly
             100                 105                 110

Thr Gln Pro Leu Asp Ser Tyr Lys Pro Gly Val Asp Cys Ala Pro Cys
         115                 120                 125

Pro Pro Gly His Phe Ser Pro Gly Asp Asn Gln Ala Cys Lys Pro Trp
     130                 135                 140

Thr Asn Cys Thr Leu Ala Gly Lys His Thr Leu Gln Pro Ala Ser Asn
145                 150                 155                 160

Ser Ser Asp Ala Ile Cys Glu Asp Arg Asp Pro Pro Ala Thr Gln Pro
                165                 170                 175

Gln Glu Thr Gln Gly Pro Pro Ala Arg Pro Ile Thr Val Gln Pro Thr
            180                 185                 190

Glu Ala Trp Pro Arg Thr Ser Gln Gly Pro Ser Thr Arg Pro Val Glu
        195                 200                 205

Val Pro Gly Gly Arg Ala Val Ala Ala Ile Leu Gly Leu Gly Leu Val
    210                 215                 220

Leu Gly Leu Leu Gly Pro Leu Ala Ile Leu Leu Ala Leu Tyr Leu Leu
225                 230                 235                 240

Arg Arg Asp Gln Arg Leu Pro Pro Asp Ala His Lys Pro Pro Gly Gly
                245                 250                 255

Gly Ser Phe Arg Thr Pro Ile Gln Glu Glu Gln Ala Asp Ala His Ser
            260                 265                 270

Thr Leu Ala Lys Ile
        275

<210> SEQ ID NO 19
<211> LENGTH: 199
<212> TYPE: PRT
<213> ORGANISM: Homo sapiens

<400> SEQUENCE: 19

Met Lys Ser Gly Leu Trp Tyr Phe Phe Leu Phe Cys Leu Arg Ile Lys
1               5                   10                  15

Val Leu Thr Gly Glu Ile Asn Gly Ser Ala Asn Tyr Glu Met Phe Ile
            20                  25                  30

Phe His Asn Gly Gly Val Gln Ile Leu Cys Lys Tyr Pro Asp Ile Val
        35                  40                  45

Gln Gln Phe Lys Met Gln Leu Leu Lys Gly Gly Gln Ile Leu Cys Asp
    50                  55                  60

Leu Thr Lys Thr Lys Gly Ser Gly Asn Thr Val Ser Ile Lys Ser Leu
65                  70                  75                  80

Lys Phe Cys His Ser Gln Leu Ser Asn Asn Ser Val Ser Phe Phe Leu
                85                  90                  95

Tyr Asn Leu Asp His Ser His Ala Asn Tyr Tyr Phe Cys Asn Leu Ser
            100                 105                 110

Ile Phe Asp Pro Pro Pro Phe Lys Val Thr Leu Thr Gly Gly Tyr Leu
        115                 120                 125

His Ile Tyr Glu Ser Gln Leu Cys Cys Gln Leu Lys Phe Trp Leu Pro
            130                 135                 140
Ile Gly Cys Ala Ala Phe Val Val Cys Ile Leu Gly Cys Ile Leu
145                 150                 155                 160
Ile Cys Trp Leu Thr Lys Lys Lys Tyr Ser Ser Val His Asp Pro
                165                 170                 175
Asn Gly Glu Tyr Met Phe Met Arg Ala Val Asn Thr Ala Lys Lys Ser
            180                 185                 190
Arg Leu Thr Asp Val Thr Leu
        195

<210> SEQ ID NO 20
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Gly Gly Gly Gly Ser Gly Gly Gly Gly Ser Gly Gly Gly Gly Ser
1               5                   10                  15

<210> SEQ ID NO 21
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Cys Pro Ser Pro Leu Phe Pro Gly Pro Ser Lys Pro
1               5                   10

<210> SEQ ID NO 22
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Glu Pro Lys Ser Cys Asp Lys Thr His Thr Cys Pro Pro Cys
1               5                   10

<210> SEQ ID NO 23
<211> LENGTH: 27
<212> TYPE: PRT
<213> ORGANISM: Unknown
<220> FEATURE:
<223> OTHER INFORMATION: Description of Unknown:
      CD28 sequence

<400> SEQUENCE: 23

Phe Trp Ala Leu Val Val Val Ala Gly Val Leu Phe Cys Tyr Gly Leu
1               5                   10                  15
Leu Val Thr Val Ala Leu Cys Val Ile Trp Thr
            20                  25

<210> SEQ ID NO 24
<211> LENGTH: 453
<212> TYPE: PRT
<213> ORGANISM: Artificial Sequence
<220> FEATURE:
<223> OTHER INFORMATION: Description of Artificial Sequence: Synthetic
       polypeptide

<400> SEQUENCE: 24

```
Met Glu Thr Asp Thr Leu Leu Leu Trp Val Leu Leu Trp Val Pro
1               5                   10                  15

Gly Ser Thr Gly Leu Glu Ile Glu Ala Ala Phe Leu Glu Arg Glu Asn
            20                  25                  30

Thr Ala Leu Glu Thr Arg Val Ala Glu Leu Arg Gln Arg Val Gln Arg
                35                  40                  45

Leu Arg Asn Arg Val Ser Gln Tyr Arg Thr Arg Tyr Gly Pro Leu Gly
50                  55                  60

Gly Gly Lys Gly Ser Gly Glu Gln Lys Leu Ile Ser Glu Glu Asp Leu
65                  70                  75                  80

Ala Ala Ala Ser Gly Ser Leu Ile Tyr Ile Trp Ala Pro Leu Ala Gly
                85                  90                  95

Ile Cys Val Ala Leu Leu Leu Ser Leu Ile Ile Thr Leu Ile Cys Tyr
                100                 105                 110

Asn Ser Arg Arg Asn Arg Leu Leu Gln Ser Asp Tyr Met Asn Met Thr
                115                 120                 125

Pro Arg Arg Pro Gly Leu Thr Arg Lys Pro Tyr Gln Pro Tyr Ala Pro
130                 135                 140

Ala Arg Asp Phe Ala Ala Tyr Arg Pro Arg Ala Lys Phe Ser Arg Ser
145                 150                 155                 160

Ala Glu Thr Ala Ala Asn Leu Gln Asp Pro Asn Gln Leu Tyr Asn Glu
                165                 170                 175

Leu Asn Leu Gly Arg Arg Glu Glu Tyr Asp Val Leu Glu Lys Lys Arg
                180                 185                 190

Ala Arg Asp Pro Glu Met Gly Gly Lys Gln Gln Arg Arg Arg Asn Pro
            195                 200                 205

Gln Glu Gly Val Tyr Asn Ala Leu Gln Lys Asp Lys Met Ala Glu Ala
210                 215                 220

Tyr Ser Glu Ile Gly Thr Lys Gly Glu Arg Arg Arg Gly Lys Gly His
225                 230                 235                 240

Asp Gly Leu Tyr Gln Gly Leu Ser Thr Ala Thr Lys Asp Thr Tyr Asp
                245                 250                 255

Ala Leu His Met Gln Thr Leu Ala Pro Arg Gly Thr Gly Gln Cys Thr
            260                 265                 270

Asn Tyr Ala Leu Leu Lys Leu Ala Gly Asp Val Glu Ser Asn Pro Gly
                275                 280                 285

Pro Gly Ser Met Asn Pro Ala Ile Ser Val Ala Leu Leu Leu Ser Val
            290                 295                 300

Leu Gln Val Ser Arg Gly Gln Lys Val Thr Ser Leu Thr Ala Cys Leu
305                 310                 315                 320

Val Asn Gln Asn Leu Arg Leu Asp Cys Arg His Glu Asn Asn Thr Lys
                325                 330                 335

Asp Asn Ser Ile Gln His Glu Phe Ser Leu Thr Arg Glu Lys Arg Lys
            340                 345                 350

His Val Leu Ser Gly Thr Leu Gly Ile Pro Glu His Thr Tyr Arg Ser
            355                 360                 365

Arg Val Thr Leu Ser Asn Gln Pro Tyr Ile Lys Val Leu Thr Leu Ala
370                 375                 380

Asn Phe Thr Thr Lys Asp Glu Gly Asp Tyr Phe Cys Glu Leu Arg Val
```

-continued

```
                385                 390                 395                 400
Ser Gly Ala Asn Pro Met Ser Ser Asn Lys Ser Ile Ser Val Tyr Arg
                405                 410                 415

Asp Lys Leu Val Lys Cys Gly Gly Ile Ser Leu Leu Val Gln Asn Thr
                420                 425                 430

Ser Trp Met Leu Leu Leu Leu Ser Leu Ser Leu Leu Gln Ala Leu
                435                 440                 445

Asp Phe Ile Ser Leu
                450

<210> SEQ ID NO 25
<211> LENGTH: 461
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Met Glu Thr Asp Thr Leu Leu Leu Trp Val Leu Leu Leu Trp Val Pro
1               5                   10                  15

Gly Ser Thr Gly Leu Glu Ile Glu Ala Ala Phe Leu Glu Arg Glu Asn
                20                  25                  30

Thr Ala Leu Glu Thr Arg Val Ala Glu Leu Arg Gln Arg Val Gln Arg
            35                  40                  45

Leu Arg Asn Arg Val Ser Gln Tyr Arg Thr Arg Tyr Gly Pro Leu Gly
        50                  55                  60

Gly Gly Lys Gly Ser Gly Glu Gln Lys Leu Ile Ser Glu Glu Asp Leu
65                  70                  75                  80

Ala Ala Ala Cys His Thr Gln Ser Ser Pro Lys Leu Gly Ser Leu Ile
                85                  90                  95

Tyr Ile Trp Ala Pro Leu Ala Gly Ile Cys Val Ala Leu Leu Leu Ser
                100                 105                 110

Leu Ile Ile Thr Leu Ile Cys Tyr Asn Ser Arg Arg Asn Arg Leu Leu
            115                 120                 125

Gln Ser Asp Tyr Met Asn Met Thr Pro Arg Arg Pro Gly Leu Thr Arg
        130                 135                 140

Lys Pro Tyr Gln Pro Tyr Ala Pro Ala Arg Asp Phe Ala Ala Tyr Arg
145                 150                 155                 160

Pro Arg Ala Lys Phe Ser Arg Ser Ala Glu Thr Ala Ala Asn Leu Gln
                165                 170                 175

Asp Pro Asn Gln Leu Tyr Asn Glu Leu Asn Leu Gly Arg Arg Glu Glu
                180                 185                 190

Tyr Asp Val Leu Glu Lys Lys Arg Ala Arg Asp Pro Glu Met Gly Gly
            195                 200                 205

Lys Gln Gln Arg Arg Arg Asn Pro Gln Glu Gly Val Tyr Asn Ala Leu
        210                 215                 220

Gln Lys Asp Lys Met Ala Glu Ala Tyr Ser Glu Ile Gly Thr Lys Gly
225                 230                 235                 240

Glu Arg Arg Arg Gly Lys Gly His Asp Gly Leu Tyr Gln Gly Leu Ser
                245                 250                 255

Thr Ala Thr Lys Asp Thr Tyr Asp Ala Leu His Met Gln Thr Leu Ala
                260                 265                 270

Pro Arg Gly Thr Gly Gln Cys Thr Asn Tyr Ala Leu Leu Lys Leu Ala
            275                 280                 285
```

```
Gly Asp Val Glu Ser Asn Pro Gly Pro Gly Ser Met Asn Pro Ala Ile
            290                 295                 300

Ser Val Ala Leu Leu Ser Val Leu Gln Val Ser Arg Gly Gln Lys
305                 310                 315                 320

Val Thr Ser Leu Thr Ala Cys Leu Val Asn Gln Asn Leu Arg Leu Asp
                    325                 330                 335

Cys Arg His Glu Asn Asn Thr Lys Asp Asn Ser Ile Gln His Glu Phe
                340                 345                 350

Ser Leu Thr Arg Glu Lys Arg Lys His Val Leu Ser Gly Thr Leu Gly
            355                 360                 365

Ile Pro Glu His Thr Tyr Arg Ser Arg Val Thr Leu Ser Asn Gln Pro
370                 375                 380

Tyr Ile Lys Val Leu Thr Leu Ala Asn Phe Thr Thr Lys Asp Glu Gly
385                 390                 395                 400

Asp Tyr Phe Cys Glu Leu Arg Val Ser Gly Ala Asn Pro Met Ser Ser
                405                 410                 415

Asn Lys Ser Ile Ser Val Tyr Arg Asp Lys Leu Val Lys Cys Gly Gly
                420                 425                 430

Ile Ser Leu Leu Val Gln Asn Thr Ser Trp Met Leu Leu Leu Leu Leu
                435                 440                 445

Ser Leu Ser Leu Leu Gln Ala Leu Asp Phe Ile Ser Leu
450                 455                 460

<210> SEQ ID NO 26
<211> LENGTH: 478
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Met Glu Thr Asp Thr Leu Leu Leu Trp Val Leu Leu Leu Trp Val Pro
1               5                   10                  15

Gly Ser Thr Gly Gly Ser Gly Gly Lys Pro Ile Pro Asn Pro Leu Leu
                20                  25                  30

Gly Leu Asp Ser Thr Gly Gly Gly Gly Ser Gly Gly Gly Ser Leu Glu
            35                  40                  45

Ile Glu Ala Ala Phe Leu Glu Arg Glu Asn Thr Ala Leu Glu Thr Arg
50                  55                  60

Val Ala Glu Leu Arg Gln Arg Val Gln Arg Leu Arg Asn Arg Val Ser
65                  70                  75                  80

Gln Tyr Arg Thr Arg Tyr Gly Pro Leu Gly Gly Gly Lys Ala Ala Ala
                85                  90                  95

Val Pro Arg Asp Cys Gly Cys Lys Pro Cys Ile Cys Thr Gly Ser Leu
                100                 105                 110

Ile Tyr Ile Trp Ala Pro Leu Ala Gly Ile Cys Val Ala Leu Leu Leu
            115                 120                 125

Ser Leu Ile Ile Thr Leu Ile Cys Tyr Asn Ser Arg Arg Asn Arg Leu
130                 135                 140

Leu Gln Ser Asp Tyr Met Asn Met Thr Pro Arg Arg Pro Gly Leu Thr
145                 150                 155                 160

Arg Lys Pro Tyr Gln Pro Tyr Ala Pro Ala Arg Asp Phe Ala Ala Tyr
                165                 170                 175

Arg Pro Arg Ala Lys Phe Ser Arg Ser Ala Glu Thr Ala Ala Asn Leu
            180                 185                 190
```

Gln Asp Pro Asn Gln Leu Tyr Asn Glu Leu Asn Leu Gly Arg Arg Glu
            195                 200                 205

Glu Tyr Asp Val Leu Glu Lys Lys Arg Ala Arg Asp Pro Glu Met Gly
        210                 215                 220

Gly Lys Gln Gln Arg Arg Arg Asn Pro Gln Glu Gly Val Tyr Asn Ala
225                 230                 235                 240

Leu Gln Lys Asp Lys Met Ala Glu Ala Tyr Ser Glu Ile Gly Thr Lys
            245                 250                 255

Gly Glu Arg Arg Arg Gly Lys Gly His Asp Gly Leu Tyr Gln Gly Leu
        260                 265                 270

Ser Thr Ala Thr Lys Asp Thr Tyr Asp Ala Leu His Met Gln Thr Leu
            275                 280                 285

Ala Pro Arg Gly Thr Gly Gln Cys Thr Asn Tyr Ala Leu Leu Lys Leu
        290                 295                 300

Ala Gly Asp Val Glu Ser Asn Pro Gly Pro Gly Ser Met Asn Pro Ala
305                 310                 315                 320

Ile Ser Val Ala Leu Leu Leu Ser Val Leu Gln Val Ser Arg Gly Gln
            325                 330                 335

Lys Val Thr Ser Leu Thr Ala Cys Leu Val Asn Gln Asn Leu Arg Leu
        340                 345                 350

Asp Cys Arg His Glu Asn Asn Thr Lys Asp Asn Ser Ile Gln His Glu
            355                 360                 365

Phe Ser Leu Thr Arg Glu Lys Arg Lys His Val Leu Ser Gly Thr Leu
        370                 375                 380

Gly Ile Pro Glu His Thr Tyr Arg Ser Arg Val Thr Leu Ser Asn Gln
385                 390                 395                 400

Pro Tyr Ile Lys Val Leu Thr Leu Ala Asn Phe Thr Thr Lys Asp Glu
            405                 410                 415

Gly Asp Tyr Phe Cys Glu Leu Arg Val Ser Gly Ala Asn Pro Met Ser
        420                 425                 430

Ser Asn Lys Ser Ile Ser Val Tyr Arg Asp Lys Leu Val Lys Cys Gly
            435                 440                 445

Gly Ile Ser Leu Leu Val Gln Asn Thr Ser Trp Met Leu Leu Leu Leu
        450                 455                 460

Leu Ser Leu Ser Leu Leu Gln Ala Leu Asp Phe Ile Ser Leu
465                 470                 475

<210> SEQ ID NO 27
<211> LENGTH: 738
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Met Ser Arg Leu Asp Lys Ser Lys Val Ile Asn Gly Ala Leu Glu Leu
1               5                   10                  15

Leu Asn Gly Val Gly Ile Glu Gly Leu Thr Thr Arg Lys Leu Ala Gln
            20                  25                  30

Lys Leu Gly Val Glu Gln Pro Thr Leu Tyr Trp His Val Lys Asn Lys
        35                  40                  45

Arg Ala Leu Leu Asp Ala Leu Pro Ile Glu Met Leu Asp Arg His His
    50                  55                  60

Thr His Phe Cys Pro Leu Glu Gly Glu Ser Trp Gln Asp Phe Leu Arg

```
            65                  70                  75                  80
Asn Asn Ala Lys Ser Tyr Arg Cys Ala Leu Leu Ser His Arg Asp Gly
                85                  90                  95
Ala Lys Val His Leu Gly Thr Arg Pro Thr Glu Lys Gln Tyr Glu Thr
                100                 105                 110
Leu Glu Asn Gln Leu Ala Phe Leu Cys Gln Gln Gly Phe Ser Leu Glu
                115                 120                 125
Asn Ala Leu Tyr Ala Leu Ser Ala Val Gly His Phe Thr Leu Gly Cys
                130                 135                 140
Val Leu Glu Glu Gln Glu His Gln Val Ala Lys Glu Glu Arg Glu Thr
145                 150                 155                 160
Pro Thr Thr Asp Ser Met Pro Pro Leu Leu Arg Gln Ala Ile Glu Leu
                165                 170                 175
Phe Asp Arg Gln Gly Ala Glu Pro Ala Phe Leu Phe Gly Leu Glu Leu
                180                 185                 190
Ile Ile Cys Gly Leu Glu Lys Gln Leu Lys Cys Glu Ser Gly Gly Pro
                195                 200                 205
Thr Asp Ala Leu Asp Asp Phe Asp Leu Asp Met Leu Pro Ala Asp Ala
                210                 215                 220
Leu Asp Asp Phe Asp Leu Asp Met Leu Pro Gly Ser Gly Ala Thr
225                 230                 235                 240
Asn Phe Ser Leu Leu Lys Gln Ala Gly Asp Val Glu Glu Asn Pro Gly
                245                 250                 255
Pro Glu Phe Thr Met Glu Thr Asp Thr Leu Leu Leu Trp Val Leu Leu
                260                 265                 270
Leu Trp Val Pro Gly Ser Thr Gly Gly Ser Gly Gly Lys Pro Ile Pro
                275                 280                 285
Asn Pro Leu Leu Gly Leu Asp Ser Thr Gly Gly Gly Ser Gly Gly
                290                 295                 300
Gly Ser Leu Glu Ile Glu Ala Ala Phe Leu Glu Arg Glu Asn Thr Ala
305                 310                 315                 320
Leu Glu Thr Arg Val Ala Glu Leu Arg Gln Arg Val Gln Arg Leu Arg
                325                 330                 335
Asn Arg Val Ser Gln Tyr Arg Thr Arg Tyr Gly Pro Leu Gly Gly Gly
                340                 345                 350
Lys Ala Ala Val Pro Arg Asp Cys Gly Cys Lys Pro Cys Ile Cys
                355                 360                 365
Thr Gly Ser Leu Ile Tyr Ile Trp Ala Pro Leu Ala Gly Ile Cys Val
                370                 375                 380
Ala Leu Leu Leu Ser Leu Ile Ile Thr Leu Ile Cys Tyr Asn Ser Arg
385                 390                 395                 400
Arg Asn Arg Leu Leu Gln Ser Asp Tyr Met Asn Met Thr Pro Arg Arg
                405                 410                 415
Pro Gly Leu Thr Arg Lys Pro Tyr Gln Pro Tyr Ala Pro Ala Arg Asp
                420                 425                 430
Phe Ala Ala Tyr Arg Pro Arg Ala Lys Phe Ser Arg Ser Ala Glu Thr
                435                 440                 445
Ala Ala Asn Leu Gln Asp Pro Asn Gln Leu Tyr Asn Glu Leu Asn Leu
                450                 455                 460
Gly Arg Arg Glu Glu Tyr Asp Val Leu Glu Lys Lys Arg Ala Arg Asp
465                 470                 475                 480
Pro Glu Met Gly Gly Lys Gln Gln Arg Arg Asn Pro Gln Glu Gly
                485                 490                 495
```

Val Tyr Asn Ala Leu Gln Lys Asp Lys Met Ala Glu Ala Tyr Ser Glu
                500                 505                 510

Ile Gly Thr Lys Gly Glu Arg Arg Gly Lys Gly His Asp Gly Leu
            515                 520                 525

Tyr Gln Gly Leu Ser Thr Ala Thr Lys Asp Thr Tyr Asp Ala Leu His
        530                 535                 540

Met Gln Thr Leu Ala Pro Arg Gly Thr Gly Gln Cys Thr Asn Tyr Ala
545                 550                 555                 560

Leu Leu Lys Leu Ala Gly Asp Val Glu Ser Asn Pro Gly Pro Gly Ser
                565                 570                 575

Met Asn Pro Ala Ile Ser Val Ala Leu Leu Leu Ser Val Leu Gln Val
            580                 585                 590

Ser Arg Gly Gln Lys Val Thr Ser Leu Thr Ala Cys Leu Val Asn Gln
        595                 600                 605

Asn Leu Arg Leu Asp Cys Arg His Glu Asn Asn Thr Lys Asp Asn Ser
    610                 615                 620

Ile Gln His Glu Phe Ser Leu Thr Arg Glu Lys Arg Lys His Val Leu
625                 630                 635                 640

Ser Gly Thr Leu Gly Ile Pro Glu His Thr Tyr Arg Ser Arg Val Thr
                645                 650                 655

Leu Ser Asn Gln Pro Tyr Ile Lys Val Leu Thr Leu Ala Asn Phe Thr
            660                 665                 670

Thr Lys Asp Glu Gly Asp Tyr Phe Cys Glu Leu Arg Val Ser Gly Ala
        675                 680                 685

Asn Pro Met Ser Ser Asn Lys Ser Ile Ser Val Tyr Arg Asp Lys Leu
    690                 695                 700

Val Lys Cys Gly Gly Ile Ser Leu Leu Val Gln Asn Thr Ser Trp Met
705                 710                 715                 720

Leu Leu Leu Leu Leu Ser Leu Ser Leu Leu Gln Ala Leu Asp Phe Ile
                725                 730                 735

Ser Leu

<210> SEQ ID NO 28
<211> LENGTH: 493
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Met Glu Thr Asp Thr Leu Leu Leu Trp Val Leu Leu Leu Trp Val Pro
1               5                   10                  15

Gly Ser Thr Gly Leu Glu Ile Glu Ala Ala Phe Leu Glu Arg Glu Asn
            20                  25                  30

Thr Ala Leu Glu Thr Arg Val Ala Glu Leu Arg Gln Arg Val Gln Arg
        35                  40                  45

Leu Arg Asn Arg Val Ser Gln Tyr Arg Thr Arg Tyr Gly Pro Leu Gly
    50                  55                  60

Gly Gly Lys Gly Ser Gly Glu Gln Lys Leu Ile Ser Glu Glu Asp Leu
65                  70                  75                  80

Ala Ala Ala Ser Thr Thr Thr Lys Pro Val Leu Arg Thr Pro Ser Pro
                85                  90                  95

Val His Pro Thr Gly Thr Ser Gln Pro Gln Arg Pro Glu Asp Cys Arg
            100                 105                 110

Pro Arg Gly Ser Val Lys Gly Thr Gly Leu Asp Phe Ala Cys Asp Ile
           115                 120                 125

Tyr Ile Trp Ala Pro Leu Ala Gly Ile Cys Val Ala Leu Leu Leu Ser
        130                 135                 140

Leu Ile Ile Thr Leu Ile Cys Tyr Asn Ser Arg Arg Asn Arg Leu Leu
145                 150                 155                 160

Gln Ser Asp Tyr Met Asn Met Thr Pro Arg Arg Pro Gly Leu Thr Arg
                165                 170                 175

Lys Pro Tyr Gln Pro Tyr Ala Pro Ala Arg Asp Phe Ala Ala Tyr Arg
            180                 185                 190

Pro Arg Ala Lys Phe Ser Arg Ser Ala Glu Thr Ala Ala Asn Leu Gln
        195                 200                 205

Asp Pro Asn Gln Leu Tyr Asn Glu Leu Asn Leu Gly Arg Arg Glu Glu
    210                 215                 220

Tyr Asp Val Leu Glu Lys Lys Arg Ala Arg Asp Pro Glu Met Gly Gly
225                 230                 235                 240

Lys Gln Gln Arg Arg Arg Asn Pro Gln Glu Gly Val Tyr Asn Ala Leu
                245                 250                 255

Gln Lys Asp Lys Met Ala Glu Ala Tyr Ser Glu Ile Gly Thr Lys Gly
            260                 265                 270

Glu Arg Arg Arg Gly Lys Gly His Asp Gly Leu Tyr Gln Gly Leu Ser
        275                 280                 285

Thr Ala Thr Lys Asp Thr Tyr Asp Ala Leu His Met Gln Thr Leu Ala
    290                 295                 300

Pro Arg Gly Thr Gly Gln Cys Thr Asn Tyr Ala Leu Leu Lys Leu Ala
305                 310                 315                 320

Gly Asp Val Glu Ser Asn Pro Gly Pro Gly Ser Met Asn Pro Ala Ile
                325                 330                 335

Ser Val Ala Leu Leu Leu Ser Val Leu Gln Val Ser Arg Gly Gln Lys
            340                 345                 350

Val Thr Ser Leu Thr Ala Cys Leu Val Asn Gln Asn Leu Arg Leu Asp
        355                 360                 365

Cys Arg His Glu Asn Asn Thr Lys Asp Asn Ser Ile Gln His Glu Phe
    370                 375                 380

Ser Leu Thr Arg Glu Lys Arg Lys His Val Leu Ser Gly Thr Leu Gly
385                 390                 395                 400

Ile Pro Glu His Thr Tyr Arg Ser Arg Val Thr Leu Ser Asn Gln Pro
                405                 410                 415

Tyr Ile Lys Val Leu Thr Leu Ala Asn Phe Thr Thr Lys Asp Glu Gly
            420                 425                 430

Asp Tyr Phe Cys Glu Leu Arg Val Ser Gly Ala Asn Pro Met Ser Ser
        435                 440                 445

Asn Lys Ser Ile Ser Val Tyr Arg Asp Lys Leu Val Lys Cys Gly Gly
    450                 455                 460

Ile Ser Leu Leu Val Gln Asn Thr Ser Trp Met Leu Leu Leu Leu Leu
465                 470                 475                 480

Ser Leu Ser Leu Leu Gln Ala Leu Asp Phe Ile Ser Leu
                485                 490

<210> SEQ ID NO 29
<211> LENGTH: 324
<212> TYPE: PRT
<213> ORGANISM: Artificial Sequence
<220> FEATURE:

<223> OTHER INFORMATION: Description of Artificial Sequence: Synthetic
      polypeptide

<400> SEQUENCE: 29

Glu Phe Thr Asp Tyr Lys Asp Asp Asp Lys Leu Glu Ile Arg Ala
1               5                   10                  15

Ala Phe Leu Arg Gln Arg Asn Thr Ala Leu Arg Thr Glu Val Ala Glu
            20                  25                  30

Leu Glu Gln Glu Val Gln Arg Leu Glu Asn Glu Val Ser Gln Tyr Glu
        35                  40                  45

Thr Arg Tyr Gly Pro Leu Gly Gly Gly Lys Gly Ser Gly Arg Ala Lys
    50                  55                  60

Arg Ala Thr Asn Phe Ser Leu Leu Lys Gln Ala Gly Asp Val Glu Glu
65                  70                  75                  80

Asn Pro Gly Pro Thr Arg Thr Gly Leu Glu Ser Met Ser Glu Leu Ile
                85                  90                  95

Lys Glu Asn Met His Met Lys Leu Tyr Met Glu Gly Thr Val Asp Asn
            100                 105                 110

His His Phe Lys Cys Thr Ser Glu Gly Glu Gly Lys Pro Tyr Glu Gly
        115                 120                 125

Thr Gln Thr Met Arg Ile Lys Val Val Glu Gly Gly Pro Leu Pro Phe
    130                 135                 140

Ala Phe Asp Ile Leu Ala Thr Ser Phe Leu Tyr Gly Ser Lys Thr Phe
145                 150                 155                 160

Ile Asn His Thr Gln Gly Ile Pro Asp Phe Phe Lys Gln Ser Phe Pro
                165                 170                 175

Glu Gly Phe Thr Trp Glu Arg Val Thr Thr Tyr Glu Asp Gly Gly Val
            180                 185                 190

Leu Thr Ala Thr Gln Asp Thr Ser Leu Gln Asp Gly Cys Leu Ile Tyr
        195                 200                 205

Asn Val Lys Ile Arg Gly Val Asn Phe Thr Ser Asn Gly Pro Val Met
    210                 215                 220

Gln Lys Lys Thr Leu Gly Trp Glu Ala Phe Thr Glu Thr Leu Tyr Pro
225                 230                 235                 240

Ala Asp Gly Gly Leu Glu Gly Arg Asn Asp Met Ala Leu Lys Leu Val
                245                 250                 255

Gly Gly Ser His Leu Ile Ala Asn Ile Lys Thr Thr Tyr Arg Ser Lys
            260                 265                 270

Lys Pro Ala Lys Asn Leu Lys Met Pro Gly Val Tyr Tyr Val Asp Tyr
        275                 280                 285

Arg Leu Glu Arg Ile Lys Glu Ala Asn Asn Glu Thr Tyr Val Glu Gln
    290                 295                 300

His Glu Val Ala Val Ala Arg Tyr Cys Asp Leu Pro Ser Lys Leu Gly
305                 310                 315                 320

His Lys Leu Asn

<210> SEQ ID NO 30
<211> LENGTH: 87
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Glu Phe Thr Asp Tyr Lys Asp Asp Asp Lys Leu Glu Ile Arg Ala

-continued

```
               1               5                  10                 15
Ala Phe Leu Arg Gln Arg Asn Thr Ala Leu Arg Thr Glu Val Ala Glu
                20                 25                 30

Leu Glu Gln Glu Val Gln Arg Leu Glu Asn Glu Val Ser Gln Tyr Glu
                35                 40                 45

Thr Arg Tyr Gly Pro Leu Gly Gly Lys Gly Ser Gly Arg Ala Lys
         50                 55                 60

Arg Ala Thr Asn Phe Ser Leu Leu Lys Gln Ala Gly Asp Val Glu Glu
 65                 70                 75                 80

Asn Pro Gly Pro Thr Arg Thr
                 85
```

<210> SEQ ID NO 31
<211> LENGTH: 330
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

```
Arg Ser Gly Asp Tyr Lys Asp Asp Asp Lys Leu Glu Ile Arg Ala
 1               5                  10                 15

Ala Phe Leu Arg Gln Arg Asn Thr Ala Leu Arg Thr Glu Val Ala Glu
                20                 25                 30

Leu Glu Gln Glu Val Gln Arg Leu Glu Asn Glu Val Ser Gln Tyr Glu
                35                 40                 45

Thr Arg Tyr Gly Pro Leu Gly Gly Lys Gly Ser Gly Ser Gly
         50                 55                 60

Arg Ala Lys Arg Gln Cys Thr Asn Tyr Ala Leu Leu Lys Leu Ala Gly
 65                 70                 75                 80

Asp Val Glu Ser Asn Pro Gly Pro Gly Ser Leu Gly Ser Gly Leu Glu
                85                 90                 95

Ser Met Ser Glu Leu Ile Lys Glu Asn Met His Met Lys Leu Tyr Met
                100                105                110

Glu Gly Thr Val Asp Asn His His Phe Lys Cys Thr Ser Glu Gly Glu
                115                120                125

Gly Lys Pro Tyr Glu Gly Thr Gln Thr Met Arg Ile Lys Val Val Glu
        130                135                140

Gly Gly Pro Leu Pro Phe Ala Phe Asp Ile Leu Ala Thr Ser Phe Leu
145                 150                155                160

Tyr Gly Ser Lys Thr Phe Ile Asn His Thr Gln Gly Ile Pro Asp Phe
                165                170                175

Phe Lys Gln Ser Phe Pro Glu Gly Phe Thr Trp Glu Arg Val Thr Thr
                180                185                190

Tyr Glu Asp Gly Gly Val Leu Thr Ala Thr Gln Asp Thr Ser Leu Gln
                195                200                205

Asp Gly Cys Leu Ile Tyr Asn Val Lys Ile Arg Gly Val Asn Phe Thr
        210                215                220

Ser Asn Gly Pro Val Met Gln Lys Lys Thr Leu Gly Trp Glu Ala Phe
225                 230                235                240

Thr Glu Thr Leu Tyr Pro Ala Asp Gly Gly Leu Glu Gly Arg Asn Asp
                245                250                255

Met Ala Leu Lys Leu Val Gly Gly Ser His Leu Ile Ala Asn Ile Lys
                260                265                270
```

```
Thr Thr Tyr Arg Ser Lys Lys Pro Ala Lys Asn Leu Lys Met Pro Gly
            275                 280                 285

Val Tyr Tyr Val Asp Tyr Arg Leu Glu Arg Ile Lys Glu Ala Asn Asn
    290                 295                 300

Glu Thr Tyr Val Glu Gln His Glu Val Ala Val Ala Arg Tyr Cys Asp
305                 310                 315                 320

Leu Pro Ser Lys Leu Gly His Lys Leu Asn
                325                 330

<210> SEQ ID NO 32
<211> LENGTH: 87
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Glu Phe Thr Asp Tyr Lys Asp Asp Asp Lys Leu Glu Ile Arg Ala
1               5                   10                  15

Ala Phe Leu Arg Gln Arg Asn Thr Ala Leu Arg Thr Glu Val Ala Glu
            20                  25                  30

Leu Glu Gln Glu Val Gln Arg Leu Glu Asn Glu Val Ser Gln Tyr Glu
        35                  40                  45

Thr Arg Tyr Gly Pro Leu Gly Gly Gly Lys Gly Ser Gly Arg Ala Lys
    50                  55                  60

Arg Ala Thr Asn Phe Ser Leu Leu Lys Gln Ala Gly Asp Val Glu Glu
65                  70                  75                  80

Asn Pro Gly Pro Thr Arg Thr
                85

<210> SEQ ID NO 33
<211> LENGTH: 576
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Arg Ser Gly Asp Tyr Lys Asp Asp Asp Lys Leu Glu Ile Arg Ala
1               5                   10                  15

Ala Phe Leu Arg Gln Arg Asn Thr Ala Leu Arg Thr Glu Val Ala Glu
            20                  25                  30

Leu Glu Gln Glu Val Gln Arg Leu Glu Asn Glu Val Ser Gln Tyr Glu
        35                  40                  45

Thr Arg Tyr Gly Pro Leu Gly Gly Gly Lys Gly Ser Gly Ser Gly
    50                  55                  60

Arg Ala Lys Arg Gln Cys Thr Asn Tyr Ala Leu Leu Lys Leu Ala Gly
65                  70                  75                  80

Asp Val Glu Ser Asn Pro Gly Pro Gly Ser Leu Met Val Leu Ala Ser
                85                  90                  95

Ser Thr Thr Ser Ile His Thr Met Leu Leu Leu Leu Met Leu Phe
            100                 105                 110

His Leu Gly Leu Gln Ala Ser Ile Ser Gly Arg Asp Thr His Arg Leu
        115                 120                 125

Thr Arg Thr Leu Asn Cys Ser Ser Ile Val Lys Glu Ile Ile Gly Lys
    130                 135                 140
```

```
Leu Pro Glu Pro Glu Leu Lys Thr Asp Asp Glu Gly Pro Ser Leu Arg
145                 150                 155                 160

Asn Lys Ser Phe Arg Arg Val Asn Leu Ser Lys Phe Val Glu Ser Gln
                165                 170                 175

Gly Glu Val Asp Pro Glu Asp Arg Tyr Val Ile Lys Ser Asn Leu Gln
            180                 185                 190

Lys Leu Asn Cys Cys Leu Pro Thr Ser Ala Asn Asp Ser Ala Leu Pro
            195                 200                 205

Gly Val Phe Ile Arg Asp Leu Asp Asp Phe Arg Lys Lys Leu Arg Phe
        210                 215                 220

Tyr Met Val His Leu Asn Asp Leu Glu Thr Val Leu Thr Ser Arg Pro
225                 230                 235                 240

Pro Gln Pro Ala Ser Gly Ser Val Ser Pro Asn Arg Gly Thr Val Glu
                245                 250                 255

Cys Gly Ser Gly Asp Tyr Lys Asp Asp Asp Lys Leu Glu Ile Arg
            260                 265                 270

Ala Ala Phe Leu Arg Gln Arg Asn Thr Ala Leu Arg Thr Glu Val Ala
        275                 280                 285

Glu Leu Glu Gln Glu Val Gln Arg Leu Glu Asn Glu Val Ser Gln Tyr
290                 295                 300

Glu Thr Arg Tyr Gly Pro Leu Gly Gly Gly Lys Gly Ser Gly Arg Ala
305                 310                 315                 320

Lys Arg Glu Gly Arg Gly Ser Leu Leu Thr Cys Gly Asp Val Glu Glu
                325                 330                 335

Asn Pro Gly Pro Leu Glu Ser Met Ser Glu Leu Ile Lys Glu Asn Met
            340                 345                 350

His Met Lys Leu Tyr Met Glu Gly Thr Val Asp Asn His His Phe Lys
        355                 360                 365

Cys Thr Ser Glu Gly Glu Gly Lys Pro Tyr Glu Gly Thr Gln Thr Met
370                 375                 380

Arg Ile Lys Val Val Glu Gly Gly Pro Leu Pro Phe Ala Phe Asp Ile
385                 390                 395                 400

Leu Ala Thr Ser Phe Leu Tyr Gly Ser Lys Thr Phe Ile Asn His Thr
                405                 410                 415

Gln Gly Ile Pro Asp Phe Phe Lys Gln Ser Phe Pro Glu Gly Phe Thr
            420                 425                 430

Trp Glu Arg Val Thr Thr Tyr Glu Asp Gly Gly Val Leu Thr Ala Thr
        435                 440                 445

Gln Asp Thr Ser Leu Gln Asp Gly Cys Leu Ile Tyr Asn Val Lys Ile
450                 455                 460

Arg Gly Val Asn Phe Thr Ser Asn Gly Pro Val Met Gln Lys Lys Thr
465                 470                 475                 480

Leu Gly Trp Glu Ala Phe Thr Glu Thr Leu Tyr Pro Ala Asp Gly Gly
                485                 490                 495

Leu Glu Gly Arg Asn Asp Met Ala Leu Lys Leu Val Gly Gly Ser His
            500                 505                 510

Leu Ile Ala Asn Ile Lys Thr Thr Tyr Arg Ser Lys Lys Pro Ala Lys
        515                 520                 525

Asn Leu Lys Met Pro Gly Val Tyr Tyr Val Asp Tyr Arg Leu Glu Arg
530                 535                 540

Ile Lys Glu Ala Asn Asn Glu Thr Tyr Val Glu Gln His Glu Val Ala
545                 550                 555                 560

Val Ala Arg Tyr Cys Asp Leu Pro Ser Lys Leu Gly His Lys Leu Asn
```

-continued

<210> SEQ ID NO 34
<211> LENGTH: 478
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

Met Phe His Val Ser Phe Arg Tyr Ile Phe Gly Ile Pro Pro Leu Ile
1               5                   10                  15

Leu Val Leu Leu Pro Val Thr Ser Ser Glu Cys His Ile Lys Asp Lys
                20                  25                  30

Glu Gly Lys Ala Tyr Glu Ser Val Leu Met Ile Ser Ile Asp Glu Leu
            35                  40                  45

Asp Lys Met Thr Gly Thr Asp Ser Asn Cys Pro Asn Asn Glu Pro Asn
        50                  55                  60

Phe Phe Arg Lys His Val Cys Asp Asp Thr Lys Glu Ala Ala Phe Leu
65                  70                  75                  80

Asn Arg Ala Ala Arg Lys Leu Lys Gln Phe Leu Lys Met Asn Ile Ser
                85                  90                  95

Glu Glu Phe Asn Val His Leu Leu Thr Val Ser Gln Gly Thr Gln Thr
            100                 105                 110

Leu Val Asn Cys Thr Ser Lys Glu Glu Lys Asn Val Lys Glu Gln Lys
        115                 120                 125

Lys Asn Asp Ala Cys Phe Leu Lys Arg Leu Leu Arg Glu Ile Lys Thr
130                 135                 140

Cys Trp Asn Lys Ile Leu Lys Gly Ser Ile Glu Phe Thr Asp Tyr Lys
145                 150                 155                 160

Asp Asp Asp Asp Lys Leu Glu Ile Arg Ala Ala Phe Leu Arg Gln Arg
                165                 170                 175

Asn Thr Ala Leu Arg Thr Glu Val Ala Glu Leu Glu Gln Glu Val Gln
            180                 185                 190

Arg Leu Glu Asn Glu Val Ser Gln Tyr Glu Thr Arg Tyr Gly Pro Leu
        195                 200                 205

Gly Gly Gly Lys Gly Ser Gly Arg Ala Lys Arg Ala Thr Asn Phe Ser
    210                 215                 220

Leu Leu Lys Gln Ala Gly Asp Val Glu Glu Asn Pro Gly Pro Thr Arg
225                 230                 235                 240

Thr Gly Leu Glu Ser Met Ser Glu Leu Ile Lys Glu Asn Met His Met
                245                 250                 255

Lys Leu Tyr Met Glu Gly Thr Val Asp Asn His His Phe Lys Cys Thr
            260                 265                 270

Ser Glu Gly Glu Gly Lys Pro Tyr Glu Gly Thr Gln Thr Met Arg Ile
        275                 280                 285

Lys Val Val Glu Gly Gly Pro Leu Pro Phe Ala Phe Asp Ile Leu Ala
    290                 295                 300

Thr Ser Phe Leu Tyr Gly Ser Lys Thr Phe Ile Asn His Thr Gln Gly
305                 310                 315                 320

Ile Pro Asp Phe Phe Lys Gln Ser Phe Pro Glu Gly Phe Thr Trp Glu
                325                 330                 335

Arg Val Thr Thr Tyr Glu Asp Gly Gly Val Leu Thr Ala Thr Gln Asp
            340                 345                 350

```
Thr Ser Leu Gln Asp Gly Cys Leu Ile Tyr Asn Val Lys Ile Arg Gly
        355                 360                 365

Val Asn Phe Thr Ser Asn Gly Pro Val Met Gln Lys Lys Thr Leu Gly
    370                 375                 380

Trp Glu Ala Phe Thr Glu Thr Leu Tyr Pro Ala Asp Gly Gly Leu Glu
385                 390                 395                 400

Gly Arg Asn Asp Met Ala Leu Lys Leu Val Gly Gly Ser His Leu Ile
                405                 410                 415

Ala Asn Ile Lys Thr Thr Tyr Arg Ser Lys Lys Pro Ala Lys Asn Leu
                420                 425                 430

Lys Met Pro Gly Val Tyr Tyr Val Asp Tyr Arg Leu Glu Arg Ile Lys
            435                 440                 445

Glu Ala Asn Asn Glu Thr Tyr Val Glu Gln His Glu Val Ala Val Ala
        450                 455                 460

Arg Tyr Cys Asp Leu Pro Ser Lys Leu Gly His Lys Leu Asn
465                 470                 475

<210> SEQ ID NO 35
<211> LENGTH: 464
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

Met Tyr Ser Met Gln Leu Ala Ser Cys Val Thr Leu Thr Leu Val Leu
1               5                   10                  15

Leu Val Asn Ser Asn Trp Ile Asp Val Arg Tyr Asp Leu Glu Lys Ile
                20                  25                  30

Glu Ser Leu Ile Gln Ser Ile His Ile Asp Thr Thr Leu Tyr Thr Asp
            35                  40                  45

Ser Asp Phe His Pro Ser Cys Lys Val Thr Ala Met Asn Cys Phe Leu
        50                  55                  60

Leu Glu Leu Gln Val Ile Leu His Glu Tyr Ser Asn Met Thr Leu Asn
65                  70                  75                  80

Glu Thr Val Arg Asn Val Leu Tyr Leu Ala Asn Ser Thr Leu Ser Ser
                85                  90                  95

Asn Lys Asn Val Ala Glu Ser Gly Cys Lys Glu Cys Glu Glu Leu Glu
                100                 105                 110

Glu Lys Thr Phe Thr Glu Phe Leu Gln Ser Phe Ile Arg Ile Val Gln
            115                 120                 125

Met Phe Ile Asn Thr Ser Arg Ser Gly Asp Tyr Lys Asp Asp Asp Asp
        130                 135                 140

Lys Leu Glu Ile Arg Ala Ala Phe Leu Arg Gln Arg Asn Thr Ala Leu
145                 150                 155                 160

Arg Thr Glu Val Ala Glu Leu Glu Gln Glu Val Gln Arg Leu Glu Asn
                165                 170                 175

Glu Val Ser Gln Tyr Glu Thr Arg Tyr Gly Pro Leu Gly Gly Gly Lys
                180                 185                 190

Gly Ser Gly Gly Ser Gly Arg Ala Lys Arg Gln Cys Thr Asn Tyr Ala
            195                 200                 205

Leu Leu Lys Leu Ala Gly Asp Val Glu Ser Asn Pro Gly Pro Gly Ser
        210                 215                 220

Leu Gly Ser Gly Leu Glu Ser Met Ser Glu Leu Ile Lys Glu Asn Met
225                 230                 235                 240
```

His Met Lys Leu Tyr Met Glu Gly Thr Val Asp Asn His His Phe Lys
                245                 250                 255

Cys Thr Ser Glu Gly Glu Gly Lys Pro Tyr Glu Gly Thr Gln Thr Met
            260                 265                 270

Arg Ile Lys Val Val Glu Gly Gly Pro Leu Pro Phe Ala Phe Asp Ile
        275                 280                 285

Leu Ala Thr Ser Phe Leu Tyr Gly Ser Lys Thr Phe Ile Asn His Thr
    290                 295                 300

Gln Gly Ile Pro Asp Phe Phe Lys Gln Ser Phe Pro Glu Gly Phe Thr
305                 310                 315                 320

Trp Glu Arg Val Thr Thr Tyr Glu Asp Gly Gly Val Leu Thr Ala Thr
                325                 330                 335

Gln Asp Thr Ser Leu Gln Asp Gly Cys Leu Ile Tyr Asn Val Lys Ile
            340                 345                 350

Arg Gly Val Asn Phe Thr Ser Asn Gly Pro Val Met Gln Lys Lys Thr
        355                 360                 365

Leu Gly Trp Glu Ala Phe Thr Glu Thr Leu Tyr Pro Ala Asp Gly Gly
    370                 375                 380

Leu Glu Gly Arg Asn Asp Met Ala Leu Lys Leu Val Gly Gly Ser His
385                 390                 395                 400

Leu Ile Ala Asn Ile Lys Thr Thr Tyr Arg Ser Lys Lys Pro Ala Lys
                405                 410                 415

Asn Leu Lys Met Pro Gly Val Tyr Tyr Val Asp Tyr Arg Leu Glu Arg
            420                 425                 430

Ile Lys Glu Ala Asn Asn Glu Thr Tyr Val Glu Gln His Glu Val Ala
        435                 440                 445

Val Ala Arg Tyr Cys Asp Leu Pro Ser Lys Leu Gly His Lys Leu Asn
    450                 455                 460

<210> SEQ ID NO 36
<211> LENGTH: 470
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Met Glu Arg Thr Leu Val Cys Leu Val Val Ile Phe Leu Gly Thr Val
1               5                   10                  15

Ala His Lys Ser Ser Pro Gln Gly Pro Asp Arg Leu Leu Ile Arg Leu
            20                  25                  30

Arg His Leu Ile Asp Ile Val Glu Gln Leu Lys Ile Tyr Glu Asn Asp
        35                  40                  45

Leu Asp Pro Glu Leu Leu Ser Ala Pro Gln Asp Val Lys Gly His Cys
    50                  55                  60

Glu His Ala Ala Phe Ala Cys Phe Gln Lys Ala Lys Leu Lys Pro Ser
65                  70                  75                  80

Asn Pro Gly Asn Asn Lys Thr Phe Ile Ile Asp Leu Val Ala Gln Leu
                85                  90                  95

Arg Arg Arg Leu Pro Ala Arg Gly Gly Lys Gln Lys His Ile
            100                 105                 110

Ala Lys Cys Pro Ser Cys Asp Ser Tyr Glu Lys Arg Thr Pro Lys Glu
        115                 120                 125

Phe Leu Glu Arg Leu Lys Trp Leu Leu Gln Lys Met Ile His Gln His

```
                130             135                 140
Leu Ser Glu Phe Thr Asp Tyr Lys Asp Asp Asp Lys Leu Glu Ile
145                 150                 155                 160

Arg Ala Ala Phe Leu Arg Gln Arg Asn Thr Ala Leu Arg Thr Glu Val
                165                 170                 175

Ala Glu Leu Glu Gln Glu Val Gln Arg Leu Glu Asn Glu Val Ser Gln
            180                 185                 190

Tyr Glu Thr Arg Tyr Gly Pro Leu Gly Gly Gly Lys Gly Ser Gly Arg
            195                 200                 205

Ala Lys Arg Ala Thr Asn Phe Ser Leu Leu Lys Gln Ala Gly Asp Val
            210                 215                 220

Glu Glu Asn Pro Gly Pro Thr Arg Thr Gly Leu Glu Ser Met Ser Glu
225                 230                 235                 240

Leu Ile Lys Glu Asn Met His Met Lys Leu Tyr Met Glu Gly Thr Val
                245                 250                 255

Asp Asn His His Phe Lys Cys Thr Ser Glu Gly Glu Gly Lys Pro Tyr
                260                 265                 270

Glu Gly Thr Gln Thr Met Arg Ile Lys Val Val Glu Gly Gly Pro Leu
            275                 280                 285

Pro Phe Ala Phe Asp Ile Leu Ala Thr Ser Phe Leu Tyr Gly Ser Lys
            290                 295                 300

Thr Phe Ile Asn His Thr Gln Gly Ile Pro Asp Phe Phe Lys Gln Ser
305                 310                 315                 320

Phe Pro Glu Gly Phe Thr Trp Glu Arg Val Thr Thr Tyr Glu Asp Gly
                325                 330                 335

Gly Val Leu Thr Ala Thr Gln Asp Thr Ser Leu Gln Asp Gly Cys Leu
            340                 345                 350

Ile Tyr Asn Val Lys Ile Arg Gly Val Asn Phe Thr Ser Asn Gly Pro
            355                 360                 365

Val Met Gln Lys Lys Thr Leu Gly Trp Glu Ala Phe Thr Glu Thr Leu
370                 375                 380

Tyr Pro Ala Asp Gly Gly Leu Glu Gly Arg Asn Asp Met Ala Leu Lys
385                 390                 395                 400

Leu Val Gly Gly Ser His Leu Ile Ala Asn Ile Lys Thr Thr Tyr Arg
                405                 410                 415

Ser Lys Lys Pro Ala Lys Asn Leu Lys Met Pro Gly Val Tyr Tyr Val
                420                 425                 430

Asp Tyr Arg Leu Glu Arg Ile Lys Glu Ala Asn Asn Glu Thr Tyr Val
            435                 440                 445

Glu Gln His Glu Val Ala Val Ala Arg Tyr Cys Asp Leu Pro Ser Lys
            450                 455                 460

Leu Gly His Lys Leu Asn
465                 470

<210> SEQ ID NO 37
<211> LENGTH: 482
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Met Tyr Ser Met Gln Leu Ala Ser Cys Val Thr Leu Thr Leu Val Leu
1               5                   10                  15
```

-continued

```
Leu Val Asn Ser His Lys Ser Ser Pro Gln Gly Pro Asp Arg Leu Leu
            20                  25                  30
Ile Arg Leu Arg His Leu Ile Asp Ile Val Glu Gln Leu Lys Ile Tyr
        35                  40                  45
Glu Asn Asp Leu Asp Pro Glu Leu Leu Ser Ala Pro Gln Asp Val Lys
    50                  55                  60
Gly His Cys Glu His Ala Ala Phe Ala Cys Phe Gln Lys Ala Lys Leu
65                  70                  75                  80
Lys Pro Ser Asn Pro Gly Asn Asn Lys Thr Phe Ile Ile Asp Leu Val
            85                  90                  95
Ala Gln Leu Arg Arg Arg Leu Pro Ala Arg Arg Gly Lys Lys Gln
        100                 105                 110
Lys His Ile Ala Lys Cys Pro Ser Cys Asp Ser Tyr Glu Lys Arg Thr
        115                 120                 125
Pro Lys Glu Phe Leu Glu Arg Leu Lys Trp Leu Leu Gln Lys Met Ile
        130                 135                 140
His Gln His Leu Ser Gly Gly Gly Ser Gly Gly Gly Ser Glu Phe
145                 150                 155                 160
Thr Asp Tyr Lys Asp Asp Asp Lys Leu Glu Ile Arg Ala Ala Phe
            165                 170                 175
Leu Arg Gln Arg Asn Thr Ala Leu Arg Thr Glu Val Ala Glu Leu Glu
        180                 185                 190
Gln Glu Val Gln Arg Leu Glu Asn Glu Val Ser Gln Tyr Glu Thr Arg
        195                 200                 205
Tyr Gly Pro Leu Gly Gly Gly Lys Gly Ser Gly Arg Ala Lys Arg Ala
210                 215                 220
Thr Asn Phe Ser Leu Leu Lys Gln Ala Gly Asp Val Glu Glu Asn Pro
225                 230                 235                 240
Gly Pro Thr Arg Thr Gly Leu Glu Ser Met Ser Glu Leu Ile Lys Glu
            245                 250                 255
Asn Met His Met Lys Leu Tyr Met Glu Gly Thr Val Asp Asn His His
        260                 265                 270
Phe Lys Cys Thr Ser Glu Gly Glu Gly Lys Pro Tyr Glu Gly Thr Gln
        275                 280                 285
Thr Met Arg Ile Lys Val Val Glu Gly Gly Pro Leu Pro Phe Ala Phe
        290                 295                 300
Asp Ile Leu Ala Thr Ser Phe Leu Tyr Gly Ser Lys Thr Phe Ile Asn
305                 310                 315                 320
His Thr Gln Gly Ile Pro Asp Phe Phe Lys Gln Ser Phe Pro Glu Gly
            325                 330                 335
Phe Thr Trp Glu Arg Val Thr Thr Tyr Glu Asp Gly Gly Val Leu Thr
        340                 345                 350
Ala Thr Gln Asp Thr Ser Leu Gln Asp Gly Cys Leu Ile Tyr Asn Val
        355                 360                 365
Lys Ile Arg Gly Val Asn Phe Thr Ser Asn Gly Pro Val Met Gln Lys
        370                 375                 380
Lys Thr Leu Gly Trp Glu Ala Phe Thr Glu Thr Leu Tyr Pro Ala Asp
385                 390                 395                 400
Gly Gly Leu Glu Gly Arg Asn Asp Met Ala Leu Lys Leu Val Gly Gly
            405                 410                 415
Ser His Leu Ile Ala Asn Ile Lys Thr Thr Tyr Arg Ser Lys Lys Pro
        420                 425                 430
Ala Lys Asn Leu Lys Met Pro Gly Val Tyr Tyr Val Asp Tyr Arg Leu
```

```
                    435                 440                 445
Glu Arg Ile Lys Glu Ala Asn Asn Glu Thr Tyr Val Glu Gln His Glu
                450                 455                 460
Val Ala Val Ala Arg Tyr Cys Asp Leu Pro Ser Lys Leu Gly His Lys
465                 470                 475                 480
Leu Asn

<210> SEQ ID NO 38
<211> LENGTH: 705
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

Met Phe His Val Ser Phe Arg Tyr Ile Phe Gly Ile Pro Pro Leu Ile
1               5                   10                  15
Leu Val Leu Leu Pro Val Thr Ser Ser Glu Cys His Ile Lys Asp Lys
                20                  25                  30
Glu Gly Lys Ala Tyr Glu Ser Val Leu Met Ile Ser Ile Asp Glu Leu
            35                  40                  45
Asp Lys Met Thr Gly Thr Asp Ser Asn Cys Pro Asn Asn Glu Pro Asn
        50                  55                  60
Phe Phe Arg Lys His Val Cys Asp Asp Thr Lys Glu Ala Ala Phe Leu
65                  70                  75                  80
Asn Arg Ala Ala Arg Lys Leu Lys Gln Phe Leu Lys Met Asn Ile Ser
                85                  90                  95
Glu Glu Phe Asn Val His Leu Leu Thr Val Ser Gln Gly Thr Gln Thr
                100                 105                 110
Leu Val Asn Cys Thr Ser Lys Glu Glu Lys Asn Val Lys Glu Gln Lys
            115                 120                 125
Lys Asn Asp Ala Cys Phe Leu Lys Arg Leu Leu Arg Glu Ile Lys Thr
        130                 135                 140
Cys Trp Asn Lys Ile Leu Lys Gly Ser Ile Glu Phe Thr Asp Tyr Lys
145                 150                 155                 160
Asp Asp Asp Asp Lys Leu Glu Ile Arg Ala Ala Phe Leu Arg Gln Arg
                165                 170                 175
Asn Thr Ala Leu Arg Thr Glu Val Ala Glu Leu Glu Gln Glu Val Gln
            180                 185                 190
Arg Leu Glu Asn Glu Val Ser Gln Tyr Glu Thr Arg Tyr Gly Pro Leu
        195                 200                 205
Gly Gly Gly Lys Gly Ser Gly Arg Ala Lys Arg Ala Thr Asn Phe Ser
    210                 215                 220
Leu Leu Lys Gln Ala Gly Asp Val Glu Glu Asn Pro Gly Pro Thr Arg
225                 230                 235                 240
Thr Met Tyr Ser Met Gln Leu Ala Ser Cys Val Thr Leu Thr Leu Val
                245                 250                 255
Leu Leu Val Asn Ser Asn Trp Ile Asp Val Arg Tyr Asp Leu Glu Lys
            260                 265                 270
Ile Glu Ser Leu Ile Gln Ser Ile His Ile Asp Thr Thr Leu Tyr Thr
        275                 280                 285
Asp Ser Asp Phe His Pro Ser Cys Lys Val Thr Ala Met Asn Cys Phe
    290                 295                 300
Leu Leu Glu Leu Gln Val Ile Leu His Glu Tyr Ser Asn Met Thr Leu
```

```
            305                 310                 315                 320
        Asn Glu Thr Val Arg Asn Val Leu Tyr Leu Ala Asn Ser Thr Leu Ser
                        325                 330                 335

Ser Asn Lys Asn Val Ala Glu Ser Gly Cys Lys Glu Cys Glu Glu Leu
                        340                 345                 350

Glu Glu Lys Thr Phe Thr Glu Phe Leu Gln Ser Phe Ile Arg Ile Val
                        355                 360                 365

Gln Met Phe Ile Asn Thr Ser Arg Ser Gly Asp Tyr Lys Asp Asp Asp
                        370                 375                 380

Asp Lys Leu Glu Ile Arg Ala Ala Phe Leu Arg Gln Arg Asn Thr Ala
        385                 390                 395                 400

Leu Arg Thr Glu Val Ala Glu Leu Glu Gln Glu Val Gln Arg Leu Glu
                        405                 410                 415

Asn Glu Val Ser Gln Tyr Glu Thr Arg Tyr Gly Pro Leu Gly Gly Gly
                        420                 425                 430

Lys Gly Ser Gly Gly Ser Gly Arg Ala Lys Arg Gln Cys Thr Asn Tyr
                        435                 440                 445

Ala Leu Leu Lys Leu Ala Gly Asp Val Glu Ser Asn Pro Gly Pro Gly
                        450                 455                 460

Ser Leu Gly Ser Gly Leu Glu Ser Met Ser Glu Leu Ile Lys Glu Asn
        465                 470                 475                 480

Met His Met Lys Leu Tyr Met Glu Gly Thr Val Asp Asn His His Phe
                        485                 490                 495

Lys Cys Thr Ser Glu Gly Glu Gly Lys Pro Tyr Glu Gly Thr Gln Thr
                        500                 505                 510

Met Arg Ile Lys Val Val Glu Gly Gly Pro Leu Pro Phe Ala Phe Asp
                        515                 520                 525

Ile Leu Ala Thr Ser Phe Leu Tyr Gly Ser Lys Thr Phe Ile Asn His
                        530                 535                 540

Thr Gln Gly Ile Pro Asp Phe Phe Lys Gln Ser Phe Pro Glu Gly Phe
        545                 550                 555                 560

Thr Trp Glu Arg Val Thr Thr Tyr Glu Asp Gly Gly Val Leu Thr Ala
                        565                 570                 575

Thr Gln Asp Thr Ser Leu Gln Asp Gly Cys Leu Ile Tyr Asn Val Lys
                        580                 585                 590

Ile Arg Gly Val Asn Phe Thr Ser Asn Gly Pro Val Met Gln Lys Lys
                        595                 600                 605

Thr Leu Gly Trp Glu Ala Phe Thr Glu Thr Leu Tyr Pro Ala Asp Gly
                        610                 615                 620

Gly Leu Glu Gly Arg Asn Asp Met Ala Leu Lys Leu Val Gly Gly Ser
        625                 630                 635                 640

His Leu Ile Ala Asn Ile Lys Thr Thr Tyr Arg Ser Lys Lys Pro Ala
                        645                 650                 655

Lys Asn Leu Lys Met Pro Gly Val Tyr Tyr Val Asp Tyr Arg Leu Glu
                        660                 665                 670

Arg Ile Lys Glu Ala Asn Asn Glu Thr Tyr Val Glu Gln His Glu Val
                        675                 680                 685

Ala Val Ala Arg Tyr Cys Asp Leu Pro Ser Lys Leu Gly His Lys Leu
                        690                 695                 700

Asn
        705

<210> SEQ ID NO 39
```

```
<211> LENGTH: 20
<212> TYPE: PRT
<213> ORGANISM: Equine rhinitis A virus

<400> SEQUENCE: 39

Gln Cys Thr Asn Tyr Ala Leu Leu Lys Leu Ala Gly Asp Val Glu Ser
1               5                   10                  15

Asn Pro Gly Pro
            20

<210> SEQ ID NO 40
<211> LENGTH: 22
<212> TYPE: PRT
<213> ORGANISM: Foot-and-mouth disease virus

<400> SEQUENCE: 40

Val Lys Gln Thr Leu Asn Phe Asp Leu Leu Lys Leu Ala Gly Asp Val
1               5                   10                  15

Glu Ser Asn Pro Gly Pro
            20

<210> SEQ ID NO 41
<211> LENGTH: 19
<212> TYPE: PRT
<213> ORGANISM: Porcine teschovirus 1

<400> SEQUENCE: 41

Ala Thr Asn Phe Ser Leu Leu Lys Gln Ala Gly Asp Val Glu Glu Asn
1               5                   10                  15

Pro Gly Pro

<210> SEQ ID NO 42
<211> LENGTH: 18
<212> TYPE: PRT
<213> ORGANISM: Thosea asigna virus

<400> SEQUENCE: 42

Glu Gly Arg Gly Ser Leu Leu Thr Cys Gly Asp Val Glu Glu Asn Pro
1               5                   10                  15

Gly Pro

<210> SEQ ID NO 43
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 43

Asp Tyr Lys Asp Asp Asp Asp Lys
1               5

<210> SEQ ID NO 44
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 44

Glu Gln Lys Leu Ile Ser Glu Glu Asp Leu
1               5                   10
```

<210> SEQ ID NO 45
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 45

Gly Lys Pro Ile Pro Asn Pro Leu Leu Gly Leu Asp Ser Thr Gly Gly
1               5                   10                  15

Gly Gly Ser Gly Gly Gly Ser
            20

<210> SEQ ID NO 46
<211> LENGTH: 20
<212> TYPE: PRT
<213> ORGANISM: Mus musculus

<400> SEQUENCE: 46

Met Glu Thr Asp Thr Leu Leu Leu Trp Val Leu Leu Leu Trp Val Pro
1               5                   10                  15

Gly Ser Thr Gly
            20

<210> SEQ ID NO 47
<211> LENGTH: 27
<212> TYPE: PRT
<213> ORGANISM: Mus musculus

<400> SEQUENCE: 47

Met Ala Ser Pro Leu Thr Arg Phe Leu Ser Leu Asn Leu Leu Leu Leu
1               5                   10                  15

Gly Glu Ser Ile Ile Leu Gly Ser Gly Glu Ala
            20                  25

<210> SEQ ID NO 48
<211> LENGTH: 20
<212> TYPE: PRT
<213> ORGANISM: Mus musculus

<400> SEQUENCE: 48

Met Tyr Ser Met Gln Leu Ala Ser Cys Val Thr Leu Thr Leu Val Leu
1               5                   10                  15

Leu Val Asn Ser
            20

<210> SEQ ID NO 49
<211> LENGTH: 26
<212> TYPE: PRT
<213> ORGANISM: Mus musculus

<400> SEQUENCE: 49

Met Val Leu Ala Ser Ser Thr Thr Ser Ile His Thr Met Leu Leu Leu
1               5                   10                  15

Leu Leu Met Leu Phe His Leu Gly Leu Gln
            20                  25

<210> SEQ ID NO 50
<211> LENGTH: 25
<212> TYPE: PRT
<213> ORGANISM: Mus musculus

<400> SEQUENCE: 50

Met Phe His Val Ser Phe Arg Tyr Ile Phe Gly Ile Pro Pro Leu Ile
1               5                   10                  15

Leu Val Leu Leu Pro Val Thr Ser Ser
            20                  25

<210> SEQ ID NO 51
<211> LENGTH: 17
<212> TYPE: PRT
<213> ORGANISM: Mus musculus

<400> SEQUENCE: 51

Met Glu Arg Thr Leu Val Cys Leu Val Val Ile Phe Leu Gly Thr Val
1               5                   10                  15

Ala

<210> SEQ ID NO 52
<211> LENGTH: 233
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Met Ser Glu Leu Ile Lys Glu Asn Met His Met Lys Leu Tyr Met Glu
1               5                   10                  15

Gly Thr Val Asp Asn His His Phe Lys Cys Thr Ser Glu Gly Glu Gly
            20                  25                  30

Lys Pro Tyr Glu Gly Thr Gln Thr Met Arg Ile Lys Val Val Glu Gly
        35                  40                  45

Gly Pro Leu Pro Phe Ala Phe Asp Ile Leu Ala Thr Ser Phe Leu Tyr
    50                  55                  60

Gly Ser Lys Thr Phe Ile Asn His Thr Gln Gly Ile Pro Asp Phe Phe
65                  70                  75                  80

Lys Gln Ser Phe Pro Glu Gly Phe Thr Trp Glu Arg Val Thr Thr Tyr
                85                  90                  95

Glu Asp Gly Gly Val Leu Thr Ala Thr Gln Asp Thr Ser Leu Gln Asp
            100                 105                 110

Gly Cys Leu Ile Tyr Asn Val Lys Ile Arg Gly Val Asn Phe Thr Ser
        115                 120                 125

Asn Gly Pro Val Met Gln Lys Lys Thr Leu Gly Trp Glu Ala Phe Thr
    130                 135                 140

Glu Thr Leu Tyr Pro Ala Asp Gly Gly Leu Glu Gly Arg Asn Asp Met
145                 150                 155                 160

Ala Leu Lys Leu Val Gly Gly Ser His Leu Ile Ala Asn Ile Lys Thr
                165                 170                 175

Thr Tyr Arg Ser Lys Lys Pro Ala Lys Asn Leu Lys Met Pro Gly Val
            180                 185                 190

Tyr Tyr Val Asp Tyr Arg Leu Glu Arg Ile Lys Glu Ala Asn Asn Glu
        195                 200                 205

Thr Tyr Val Glu Gln His Glu Val Ala Val Ala Arg Tyr Cys Asp Leu
    210                 215                 220

Pro Ser Lys Leu Gly His Lys Leu Asn
225                 230

<210> SEQ ID NO 53
<211> LENGTH: 235
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 53

```
Met Ser Arg Leu Asp Lys Ser Lys Val Ile Asn Gly Ala Leu Glu Leu
1               5                   10                  15

Leu Asn Gly Val Gly Ile Glu Gly Leu Thr Thr Arg Lys Leu Ala Gln
                20                  25                  30

Lys Leu Gly Val Glu Gln Pro Thr Leu Tyr Trp His Val Lys Asn Lys
            35                  40                  45

Arg Ala Leu Leu Asp Ala Leu Pro Ile Glu Met Leu Asp Arg His His
        50                  55                  60

Thr His Phe Cys Pro Leu Glu Gly Glu Ser Trp Gln Asp Phe Leu Arg
65                  70                  75                  80

Asn Asn Ala Lys Ser Tyr Arg Cys Ala Leu Leu Ser His Arg Asp Gly
                85                  90                  95

Ala Lys Val His Leu Gly Thr Arg Pro Thr Glu Lys Gln Tyr Glu Thr
            100                 105                 110

Leu Glu Asn Gln Leu Ala Phe Leu Cys Gln Gln Gly Phe Ser Leu Glu
        115                 120                 125

Asn Ala Leu Tyr Ala Leu Ser Ala Val Gly His Phe Thr Leu Gly Cys
    130                 135                 140

Val Leu Glu Glu Gln Glu His Gln Val Ala Lys Glu Glu Arg Glu Thr
145                 150                 155                 160

Pro Thr Thr Asp Ser Met Pro Pro Leu Leu Arg Gln Ala Ile Glu Leu
                165                 170                 175

Phe Asp Arg Gln Gly Ala Glu Pro Ala Phe Leu Phe Gly Leu Glu Leu
            180                 185                 190

Ile Ile Cys Gly Leu Glu Lys Gln Leu Lys Cys Glu Ser Gly Gly Pro
        195                 200                 205

Thr Asp Ala Leu Asp Asp Phe Asp Leu Asp Met Leu Pro Ala Asp Ala
    210                 215                 220

Leu Asp Asp Phe Asp Leu Asp Met Leu Pro Gly
225                 230                 235
```

<210> SEQ ID NO 54
<211> LENGTH: 166
<212> TYPE: PRT
<213> ORGANISM: Mus musculus

<400> SEQUENCE: 54

```
Met Val Leu Ala Ser Ser Thr Thr Ser Ile His Thr Met Leu Leu Leu
1               5                   10                  15

Leu Leu Met Leu Phe His Leu Gly Leu Gln Ala Ser Ile Ser Gly Arg
                20                  25                  30

Asp Thr His Arg Leu Thr Arg Thr Leu Asn Cys Ser Ser Ile Val Lys
            35                  40                  45

Glu Ile Ile Gly Lys Leu Pro Glu Pro Glu Leu Lys Thr Asp Asp Glu
        50                  55                  60

Gly Pro Ser Leu Arg Asn Lys Ser Phe Arg Arg Val Asn Leu Ser Lys
65                  70                  75                  80

Phe Val Glu Ser Gln Gly Glu Val Asp Pro Glu Asp Arg Tyr Val Ile
```

-continued

```
                    85                  90                  95
Lys Ser Asn Leu Gln Lys Leu Asn Cys Cys Leu Pro Thr Ser Ala Asn
                100                 105                 110

Asp Ser Ala Leu Pro Gly Val Phe Ile Arg Asp Leu Asp Asp Phe Arg
            115                 120                 125

Lys Lys Leu Arg Phe Tyr Met Val His Leu Asn Asp Leu Glu Thr Val
130                 135                 140

Leu Thr Ser Arg Pro Pro Gln Pro Ala Ser Gly Ser Val Ser Pro Asn
145                 150                 155                 160

Arg Gly Thr Val Glu Cys
                165

<210> SEQ ID NO 55
<211> LENGTH: 154
<212> TYPE: PRT
<213> ORGANISM: Mus musculus

<400> SEQUENCE: 55

Met Phe His Val Ser Phe Arg Tyr Ile Phe Gly Ile Pro Pro Leu Ile
1               5                   10                  15

Leu Val Leu Leu Pro Val Thr Ser Ser Glu Cys His Ile Lys Asp Lys
                20                  25                  30

Glu Gly Lys Ala Tyr Glu Ser Val Leu Met Ile Ser Ile Asp Glu Leu
            35                  40                  45

Asp Lys Met Thr Gly Thr Asp Ser Asn Cys Pro Asn Asn Glu Pro Asn
        50                  55                  60

Phe Phe Arg Lys His Val Cys Asp Thr Lys Glu Ala Ala Phe Leu
65                  70                  75                  80

Asn Arg Ala Ala Arg Lys Leu Lys Gln Phe Leu Lys Met Asn Ile Ser
                85                  90                  95

Glu Glu Phe Asn Val His Leu Leu Thr Val Ser Gln Gly Thr Gln Thr
                100                 105                 110

Leu Val Asn Cys Thr Ser Lys Glu Glu Lys Asn Val Lys Glu Gln Lys
            115                 120                 125

Lys Asn Asp Ala Cys Phe Leu Lys Arg Leu Leu Arg Glu Ile Lys Thr
        130                 135                 140

Cys Trp Asn Lys Ile Leu Lys Gly Ser Ile
145                 150

<210> SEQ ID NO 56
<211> LENGTH: 162
<212> TYPE: PRT
<213> ORGANISM: Mus musculus

<400> SEQUENCE: 56

Met Lys Ile Leu Lys Pro Tyr Met Arg Asn Thr Ser Ile Ser Cys Tyr
1               5                   10                  15

Leu Cys Phe Leu Leu Asn Ser His Phe Leu Thr Glu Ala Gly Ile His
                20                  25                  30

Val Phe Ile Leu Gly Cys Val Ser Val Gly Leu Pro Lys Thr Glu Ala
            35                  40                  45

Asn Trp Ile Asp Val Arg Tyr Asp Leu Glu Lys Ile Glu Ser Leu Ile
        50                  55                  60

Gln Ser Ile His Ile Asp Thr Thr Leu Tyr Thr Asp Ser Asp Phe His
65                  70                  75                  80

Pro Ser Cys Lys Val Thr Ala Met Asn Cys Phe Leu Leu Glu Leu Gln
```

```
                    85                  90                  95
Val Ile Leu His Glu Tyr Ser Asn Met Thr Leu Asn Glu Thr Val Arg
            100                 105                 110

Asn Val Leu Tyr Leu Ala Asn Ser Thr Leu Ser Ser Asn Lys Asn Val
        115                 120                 125

Ala Glu Ser Gly Cys Lys Glu Cys Glu Leu Glu Glu Lys Thr Phe
    130                 135                 140

Thr Glu Phe Leu Gln Ser Phe Ile Arg Ile Val Gln Met Phe Ile Asn
145                 150                 155                 160

Thr Ser

<210> SEQ ID NO 57
<211> LENGTH: 146
<212> TYPE: PRT
<213> ORGANISM: Mus musculus

<400> SEQUENCE: 57

Met Glu Arg Thr Leu Val Cys Leu Val Val Ile Phe Leu Gly Thr Val
1               5                   10                  15

Ala His Lys Ser Ser Pro Gln Gly Pro Asp Arg Leu Leu Ile Arg Leu
            20                  25                  30

Arg His Leu Ile Asp Ile Val Glu Gln Leu Lys Ile Tyr Glu Asn Asp
        35                  40                  45

Leu Asp Pro Glu Leu Leu Ser Ala Pro Gln Asp Val Lys Gly His Cys
    50                  55                  60

Glu His Ala Ala Phe Ala Cys Phe Gln Lys Ala Lys Leu Lys Pro Ser
65                  70                  75                  80

Asn Pro Gly Asn Asn Lys Thr Phe Ile Ile Asp Leu Val Ala Gln Leu
                85                  90                  95

Arg Arg Arg Leu Pro Ala Arg Arg Gly Gly Lys Lys Gln Lys His Ile
            100                 105                 110

Ala Lys Cys Pro Ser Cys Asp Ser Tyr Glu Lys Arg Thr Pro Lys Glu
        115                 120                 125

Phe Leu Glu Arg Leu Lys Trp Leu Leu Gln Lys Met Ile His Gln His
    130                 135                 140

Leu Ser
145

<210> SEQ ID NO 58
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 58
ctggagatcc gcgctgcatt tttgcgacaa agaaataccg ctttgcgaac cgaagtggcc      60
gagttggagc aggaagtaca acgcctggaa aatgaagtca gccaatacga aactcgatat     120
ggacctctcg gaggtggaaa g                                                141

<210> SEQ ID NO 59
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 59

Leu Glu Ile Glu Ala Ala Phe Leu Arg Gln Arg Asn Thr Ala Leu Arg
1               5                   10                  15

Thr Glu Val Ala Glu Leu Glu Gln Glu Val Gln Arg Leu Glu Asn Glu
            20                  25                  30

Val Ser Gln Tyr Glu Thr Arg Tyr Gly Pro Leu Gly Gly Gly Lys
        35                  40                  45

<210> SEQ ID NO 60
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 60

Leu Glu Ile Arg Ala Ala Phe Leu Arg Gln Arg Asn Thr Ala Leu Arg
1               5                   10                  15

Thr Arg Val Ala Glu Leu Glu Gln Glu Val Gln Arg Leu Glu Asn Glu
            20                  25                  30

Val Ser Gln Tyr Glu Thr Arg Tyr Gly Pro Leu Gly Gly Gly Lys
        35                  40                  45

<210> SEQ ID NO 61
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 61
ctggagatcg aagctgcatt tttgcgacaa agaaataccg ctttgcgaac cgaagtggcc      60
gagttggagc aggaagtaca acgcctggaa aatgaagtca gccaatacga aactcgatat    120
ggacctctcg gaggtggaaa g                                              141

<210> SEQ ID NO 62
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 62
ctggagatcc gcgctgcatt tttgcgacaa agaaataccg ctttgcgaac ccgcgtggcc      60
gagttggagc aggaagtaca acgcctggaa aatgaagtca gccaatacga aactcgatat    120
ggacctctcg gaggtggaaa g                                              141

<210> SEQ ID NO 63
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 63

Leu Glu Ile Glu Ala Ala Phe Leu Arg Gln Glu Asn Thr Ala Leu Arg
1               5                   10                  15

Thr Glu Val Ala Glu Leu Glu Gln Glu Val Gln Arg Leu Glu Asn Glu
            20                  25                  30

Val Ser Gln Tyr Glu Thr Arg Tyr Gly Pro Leu Gly Gly Gly Lys
        35                  40                  45

<210> SEQ ID NO 64
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 64

Leu Glu Ile Arg Ala Ala Phe Leu Arg Gln Arg Asn Thr Ala Leu Arg
1               5                   10                  15

Thr Arg Val Ala Glu Leu Glu Gln Arg Val Gln Arg Leu Glu Asn Glu
            20                  25                  30

Val Ser Gln Tyr Glu Thr Arg Tyr Gly Pro Leu Gly Gly Gly Lys
        35                  40                  45

<210> SEQ ID NO 65
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 65
ctggagatcg aagctgcatt tttgcgacaa gaaaataccg ctttgcgaac cgaagtggcc        60
gagttggagc aggaagtaca acgcctggaa aatgaagtca gccaatacga aactcgatat       120
ggacctctcg gaggtggaaa g                                                 141

<210> SEQ ID NO 66
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 66
ctggagatcc gcgctgcatt tttgcgacaa agaaataccg ctttgcgaac ccgcgtggcc        60
gagttggagc agcgcgtaca acgcctggaa aatgaagtca gccaatacga aactcgatat       120
ggacctctcg gaggtggaaa g                                                 141

<210> SEQ ID NO 67
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

Leu Glu Ile Glu Ala Ala Phe Leu Arg Gln Glu Asn Thr Ala Leu Arg
1               5                   10                  15

Thr Arg Val Ala Glu Leu Glu Gln Glu Val Gln Arg Leu Glu Asn Glu
            20                  25                  30

Val Ser Gln Tyr Glu Thr Arg Tyr Gly Pro Leu Gly Gly Gly Lys

<210> SEQ ID NO 68
<211> LENGTH: 47
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 68

Leu Glu Ile Arg Ala Ala Phe Leu Arg Gln Arg Asn Thr Ala Leu Arg
1               5                   10                  15

Thr Arg Val Ala Glu Leu Glu Gln Arg Val Gln Arg Leu Glu Asn Arg
            20                  25                  30

Val Ser Gln Tyr Glu Thr Arg Tyr Gly Pro Leu Gly Gly Gly Lys
        35                  40                  45

<210> SEQ ID NO 69
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 69
ctggagatcg aagctgcatt tttgcgacaa gaaaataccg ctttgcgaac ccgagtggcc      60
gagttggagc aggaagtaca acgcctggaa aatgaagtca gccaatacga aactcgatat     120
ggacctctcg gaggtggaaa g                                               141

<210> SEQ ID NO 70
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 70
ctggagatcc gcgctgcatt tttgcgacaa agaaataccg ctttgcgaac ccgagtggcc      60
gagttggagc agcgagtaca acgcctggaa aatcgagtca gccaatacga aactcgatat     120
ggacctctcg gaggtggaaa g                                               141

<210> SEQ ID NO 71
<211> LENGTH: 141
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 71
ctggagattg aggctgcatt tcttgaaaga gaaaacactg ctcttgagac aagagtcgcc      60
gaactgaggc agcgcgttca gcgcctgcgg aaccgagtat ctcaatacag gactcggtac     120
ggaccactgg ggggcggtaa g                                               141

<210> SEQ ID NO 72
<211> LENGTH: 269
<212> TYPE: PRT
<213> ORGANISM: Mus musculus

<400> SEQUENCE: 72

Val Asp Glu Gln Leu Ser Lys Ser Val Lys Asp Lys Val Leu Leu Pro
1               5                   10                  15

Cys Arg Tyr Asn Ser Pro His Glu Asp Glu Ser Glu Asp Arg Ile Tyr
            20                  25                  30

Trp Gln Lys His Asp Lys Val Val Leu Ser Val Ile Ala Gly Lys Leu
        35                  40                  45

Lys Val Trp Pro Glu Tyr Lys Asn Arg Thr Leu Tyr Asp Asn Thr Thr
50                  55                  60

Tyr Ser Leu Ile Ile Leu Gly Leu Val Leu Ser Asp Arg Gly Thr Tyr
65                  70                  75                  80

Ser Cys Val Val Gln Lys Lys Glu Arg Gly Thr Tyr Glu Val Lys His
                85                  90                  95

Leu Ala Leu Val Lys Leu Ser Ile Lys Ala Asp Phe Ser Thr Pro Asn
            100                 105                 110

Ile Thr Glu Ser Gly Asn Pro Ser Ala Asp Thr Lys Arg Ile Thr Cys
        115                 120                 125

Phe Ala Ser Gly Gly Phe Pro Lys Pro Arg Phe Ser Trp Leu Glu Asn
130                 135                 140

Gly Arg Glu Leu Pro Gly Ile Asn Thr Thr Ile Ser Gln Asp Pro Glu
145                 150                 155                 160

Ser Glu Leu Tyr Thr Ile Ser Ser Gln Leu Asp Phe Asn Thr Thr Arg
                165                 170                 175

Asn His Thr Ile Lys Cys Leu Ile Lys Tyr Gly Asp Ala His Val Ser
            180                 185                 190

Glu Asp Phe Thr Trp Glu Lys Pro Pro Glu Asp Pro Pro Asp Ser Lys
        195                 200                 205

Asn Thr Leu Val Leu Phe Gly Ala Gly Phe Gly Ala Val Ile Thr Val
210                 215                 220

Val Val Ile Val Val Ile Ile Lys Cys Phe Cys Lys His Arg Ser Cys
225                 230                 235                 240

Phe Arg Arg Asn Glu Ala Ser Arg Glu Thr Asn Asn Ser Leu Thr Phe
                245                 250                 255

Gly Pro Glu Glu Ala Leu Ala Glu Gln Thr Val Phe Leu
            260                 265

<210> SEQ ID NO 73
<211> LENGTH: 254
<212> TYPE: PRT
<213> ORGANISM: Homo sapiens

<400> SEQUENCE: 73

Val Ile His Val Thr Lys Glu Val Lys Glu Val Ala Thr Leu Ser Cys
1               5                   10                  15

Gly His Asn Val Ser Val Glu Glu Leu Ala Gln Thr Arg Ile Tyr Trp
            20                  25                  30

Gln Lys Glu Lys Lys Met Val Leu Thr Met Met Ser Gly Asp Met Asn
        35                  40                  45

Ile Trp Pro Glu Tyr Lys Asn Arg Thr Ile Phe Asp Ile Thr Asn Asn
50                  55                  60

Leu Ser Ile Val Ile Leu Ala Leu Arg Pro Ser Asp Glu Gly Thr Tyr
65                  70                  75                  80

Glu Cys Val Val Leu Lys Tyr Glu Lys Asp Ala Phe Lys Arg Glu His
                85                  90                  95

-continued

```
Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
            115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
            180                 185                 190

Gln Thr Phe Asn Trp Asn Thr Thr Lys Gln Glu His Phe Pro Asp Asn
            195                 200                 205

Leu Leu Pro Ser Trp Ala Ile Thr Leu Ile Ser Val Asn Gly Ile Phe
210                 215                 220

Val Ile Cys Cys Leu Thr Tyr Cys Phe Ala Pro Arg Cys Arg Glu Arg
225                 230                 235                 240

Arg Arg Asn Glu Arg Leu Arg Arg Glu Ser Val Arg Pro Val
                245                 250
```

<210> SEQ ID NO 74
<211> LENGTH: 309
<212> TYPE: PRT
<213> ORGANISM: Mus musculus

<400> SEQUENCE: 74

```
Met Asp Gln His Thr Leu Asp Val Glu Asp Thr Ala Asp Ala Arg His
1               5                   10                  15

Pro Ala Gly Thr Ser Cys Pro Ser Asp Ala Ala Leu Leu Arg Asp Thr
            20                  25                  30

Gly Leu Leu Ala Asp Ala Ala Leu Leu Ser Asp Thr Val Arg Pro Thr
        35                  40                  45

Asn Ala Ala Leu Pro Thr Asp Ala Ala Tyr Pro Ala Val Asn Val Arg
50                  55                  60

Asp Arg Glu Ala Ala Trp Pro Pro Ala Leu Asn Phe Cys Ser Arg His
65                  70                  75                  80

Pro Lys Leu Tyr Gly Leu Val Ala Leu Val Leu Leu Leu Ile Ala
                85                  90                  95

Ala Cys Val Pro Ile Phe Thr Arg Thr Glu Pro Arg Pro Ala Leu Thr
            100                 105                 110

Ile Thr Thr Ser Pro Asn Leu Gly Thr Arg Glu Asn Asn Ala Asp Gln
            115                 120                 125

Val Thr Pro Val Ser His Ile Gly Cys Pro Asn Thr Thr Gln Gln Gly
130                 135                 140

Ser Pro Val Phe Ala Lys Leu Leu Ala Lys Asn Gln Ala Ser Leu Cys
145                 150                 155                 160

Asn Thr Thr Leu Asn Trp His Ser Gln Asp Gly Ala Gly Ser Ser Tyr
                165                 170                 175

Leu Ser Gln Gly Leu Arg Tyr Glu Glu Asp Lys Lys Glu Leu Val Val
            180                 185                 190

Asp Ser Pro Gly Leu Tyr Tyr Val Phe Leu Glu Leu Lys Leu Ser Pro
            195                 200                 205

Thr Phe Thr Asn Thr Gly His Lys Val Gln Gly Trp Val Ser Leu Val
210                 215                 220
```

-continued

Leu Gln Ala Lys Pro Gln Val Asp Asp Phe Asp Asn Leu Ala Leu Thr
225                 230                 235                 240

Val Glu Leu Phe Pro Cys Ser Met Glu Asn Lys Leu Val Asp Arg Ser
            245                 250                 255

Trp Ser Gln Leu Leu Leu Lys Ala Gly His Arg Leu Ser Val Gly
        260                 265                 270

Leu Arg Ala Tyr Leu His Gly Ala Gln Asp Ala Tyr Arg Asp Trp Glu
        275                 280                 285

Leu Ser Tyr Pro Asn Thr Thr Ser Phe Gly Leu Phe Leu Val Lys Pro
        290                 295                 300

Asp Asn Pro Trp Glu
305

<210> SEQ ID NO 75
<211> LENGTH: 254
<212> TYPE: PRT
<213> ORGANISM: Homo sapiens

<400> SEQUENCE: 75

Met Glu Tyr Ala Ser Asp Ala Ser Leu Asp Pro Glu Ala Pro Trp Pro
1               5                   10                  15

Pro Ala Pro Arg Ala Arg Ala Cys Arg Val Leu Pro Trp Ala Leu Val
            20                  25                  30

Ala Gly Leu Leu Leu Leu Leu Ala Ala Cys Ala Val Phe
        35                  40                  45

Leu Ala Cys Pro Trp Ala Val Ser Gly Ala Arg Ala Ser Pro Gly Ser
    50                  55                  60

Ala Ala Ser Pro Arg Leu Arg Glu Gly Pro Glu Leu Ser Pro Asp Asp
65                  70                  75                  80

Pro Ala Gly Leu Leu Asp Leu Arg Gln Gly Met Phe Ala Gln Leu Val
                85                  90                  95

Ala Gln Asn Val Leu Leu Ile Asp Gly Pro Leu Ser Trp Tyr Ser Asp
            100                 105                 110

Pro Gly Leu Ala Gly Val Ser Leu Thr Gly Gly Leu Ser Tyr Lys Glu
        115                 120                 125

Asp Thr Lys Glu Leu Val Val Ala Lys Ala Gly Val Tyr Tyr Val Phe
130                 135                 140

Phe Gln Leu Glu Leu Arg Arg Val Val Ala Gly Glu Gly Ser Gly Ser
145                 150                 155                 160

Val Ser Leu Ala Leu His Leu Gln Pro Leu Arg Ser Ala Ala Gly Ala
                165                 170                 175

Ala Ala Leu Ala Leu Thr Val Asp Leu Pro Pro Ala Ser Ser Glu Ala
            180                 185                 190

Arg Asn Ser Ala Phe Gly Phe Gln Gly Arg Leu Leu His Leu Ser Ala
        195                 200                 205

Gly Gln Arg Leu Gly Val His Leu His Thr Glu Ala Arg Ala Arg His
    210                 215                 220

Ala Trp Gln Leu Thr Gln Gly Ala Thr Val Leu Gly Leu Phe Arg Val
225                 230                 235                 240

Thr Pro Glu Ile Pro Ala Gly Leu Pro Ser Pro Arg Ser Glu
                245                 250

<210> SEQ ID NO 76
<211> LENGTH: 145
<212> TYPE: PRT

-continued

<213> ORGANISM: Mus musculus

<400> SEQUENCE: 76

```
Leu Glu Val Pro Asn Gly Pro Trp Arg Ser Leu Thr Phe Tyr Pro Ala
1               5                   10                  15

Trp Leu Thr Val Ser Glu Gly Ala Asn Ala Thr Phe Thr Cys Ser Leu
            20                  25                  30

Ser Asn Trp Ser Glu Asp Leu Met Leu Asn Trp Asn Arg Leu Ser Pro
        35                  40                  45

Ser Asn Gln Thr Glu Lys Gln Ala Ala Phe Cys Asn Gly Leu Ser Gln
    50                  55                  60

Pro Val Gln Asp Ala Arg Phe Gln Ile Ile Gln Leu Pro Asn Arg His
65                  70                  75                  80

Asp Phe His Met Asn Ile Leu Asp Thr Arg Arg Asn Asp Ser Gly Ile
                85                  90                  95

Tyr Leu Cys Gly Ala Ile Ser Leu His Pro Lys Ala Lys Ile Glu Glu
            100                 105                 110

Ser Pro Gly Ala Glu Leu Val Val Thr Glu Arg Ile Leu Glu Thr Ser
        115                 120                 125

Thr Arg Tyr Pro Ser Pro Ser Pro Lys Pro Glu Gly Arg Phe Gln Gly
    130                 135                 140

Met
145
```

<210> SEQ ID NO 77
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 77

```
Cys Pro Tyr Ser Asn Pro Ser Leu Cys
1               5
```

<210> SEQ ID NO 78
<211> LENGTH: 457
<212> TYPE: PRT
<213> ORGANISM: Mus musculus

<400> SEQUENCE: 78

```
Met Cys Arg Ala Ile Ser Leu Arg Arg Leu Leu Leu Leu Leu Leu Gln
1               5                   10                  15

Leu Ser Gln Leu Leu Ala Val Thr Gln Gly Lys Thr Leu Val Leu Gly
            20                  25                  30

Lys Glu Gly Glu Ser Ala Glu Leu Pro Cys Glu Ser Ser Gln Lys Lys
        35                  40                  45

Ile Thr Val Phe Thr Trp Lys Phe Ser Asp Gln Arg Lys Ile Leu Gly
    50                  55                  60

Gln His Gly Lys Gly Val Leu Ile Arg Gly Gly Ser Pro Ser Gln Phe
65                  70                  75                  80

Asp Arg Phe Asp Ser Lys Lys Gly Ala Trp Glu Lys Gly Ser Phe Pro
                85                  90                  95

Leu Ile Ile Asn Lys Leu Lys Met Glu Asp Ser Gln Thr Tyr Ile Cys
            100                 105                 110

Glu Leu Glu Asn Arg Lys Glu Glu Val Glu Leu Trp Val Phe Lys Val
        115                 120                 125
```

Thr Phe Ser Pro Gly Thr Ser Leu Leu Gln Gly Gln Ser Leu Thr Leu
130                 135                 140

Thr Leu Asp Ser Asn Ser Lys Val Ser Asn Pro Leu Thr Glu Cys Lys
145                 150                 155                 160

His Lys Lys Gly Lys Val Val Ser Gly Ser Lys Val Leu Ser Met Ser
                165                 170                 175

Asn Leu Arg Val Gln Asp Ser Asp Phe Trp Asn Cys Thr Val Thr Leu
            180                 185                 190

Asp Gln Lys Lys Asn Trp Phe Gly Met Thr Leu Ser Val Leu Gly Phe
        195                 200                 205

Gln Ser Thr Ala Ile Thr Ala Tyr Lys Ser Glu Gly Glu Ser Ala Glu
210                 215                 220

Phe Ser Phe Pro Leu Asn Phe Ala Glu Glu Asn Gly Trp Gly Glu Leu
225                 230                 235                 240

Met Trp Lys Ala Glu Lys Asp Ser Phe Phe Gln Pro Trp Ile Ser Phe
                245                 250                 255

Ser Ile Lys Asn Lys Glu Val Ser Val Gln Lys Ser Thr Lys Asp Leu
            260                 265                 270

Lys Leu Gln Leu Lys Glu Thr Leu Pro Leu Thr Leu Lys Ile Pro Gln
        275                 280                 285

Val Ser Leu Gln Phe Ala Gly Ser Gly Asn Leu Thr Leu Thr Leu Asp
290                 295                 300

Lys Gly Thr Leu His Gln Glu Val Asn Leu Val Val Met Lys Val Ala
305                 310                 315                 320

Gln Leu Asn Asn Thr Leu Thr Cys Glu Val Met Gly Pro Thr Ser Pro
                325                 330                 335

Lys Met Arg Leu Thr Leu Lys Gln Glu Asn Gln Glu Ala Arg Val Ser
            340                 345                 350

Glu Glu Gln Lys Val Val Gln Val Val Ala Pro Glu Thr Gly Leu Trp
        355                 360                 365

Gln Cys Leu Leu Ser Glu Gly Asp Lys Val Lys Met Asp Ser Arg Ile
370                 375                 380

Gln Val Leu Ser Arg Gly Val Asn Gln Thr Val Phe Leu Ala Cys Val
385                 390                 395                 400

Leu Gly Gly Ser Phe Gly Phe Leu Gly Phe Leu Gly Leu Cys Ile Leu
                405                 410                 415

Cys Cys Val Arg Cys Arg His Gln Gln Arg Gln Ala Ala Arg Met Ser
            420                 425                 430

Gln Ile Lys Arg Leu Leu Ser Glu Lys Lys Thr Cys Gln Cys Pro His
        435                 440                 445

Arg Met Gln Lys Ser His Asn Leu Ile
450                 455

<210> SEQ ID NO 79
<211> LENGTH: 458
<212> TYPE: PRT
<213> ORGANISM: Homo sapiens

<400> SEQUENCE: 79

Met Asn Arg Gly Val Pro Phe Arg His Leu Leu Leu Val Leu Gln Leu
1               5                   10                  15

Ala Leu Leu Pro Ala Ala Thr Gln Gly Lys Lys Val Val Leu Gly Lys
            20                  25                  30

Lys Gly Asp Thr Val Glu Leu Thr Cys Thr Ala Ser Gln Lys Lys Ser

```
                  35                  40                  45
Ile Gln Phe His Trp Lys Asn Ser Asn Gln Ile Lys Ile Leu Gly Asn
 50                  55                  60

Gln Gly Ser Phe Leu Thr Lys Gly Pro Ser Lys Leu Asn Asp Arg Ala
 65                  70                  75                  80

Asp Ser Arg Arg Ser Leu Trp Asp Gln Gly Asn Phe Pro Leu Ile Ile
                 85                  90                  95

Lys Asn Leu Lys Ile Glu Asp Ser Asp Thr Tyr Ile Cys Glu Val Glu
                100                 105                 110

Asp Gln Lys Glu Glu Val Gln Leu Leu Val Phe Gly Leu Thr Ala Asn
                115                 120                 125

Ser Asp Thr His Leu Leu Gln Gly Gln Ser Leu Thr Leu Thr Leu Glu
                130                 135                 140

Ser Pro Pro Gly Ser Ser Pro Ser Val Gln Cys Arg Ser Pro Arg Gly
145                 150                 155                 160

Lys Asn Ile Gln Gly Gly Lys Thr Leu Ser Val Ser Gln Leu Glu Leu
                    165                 170                 175

Gln Asp Ser Gly Thr Trp Thr Cys Thr Val Leu Gln Asn Gln Lys Lys
                180                 185                 190

Val Glu Phe Lys Ile Asp Ile Val Leu Ala Phe Gln Lys Ala Ser
                195                 200                 205

Ser Ile Val Tyr Lys Lys Glu Gly Glu Gln Val Glu Phe Ser Phe Pro
                210                 215                 220

Leu Ala Phe Thr Val Glu Lys Leu Thr Gly Ser Gly Glu Leu Trp Trp
225                 230                 235                 240

Gln Ala Glu Arg Ala Ser Ser Lys Ser Trp Ile Thr Phe Asp Leu
                    245                 250                 255

Lys Asn Lys Glu Val Ser Val Lys Arg Val Thr Gln Asp Pro Lys Leu
                260                 265                 270

Gln Met Gly Lys Lys Leu Pro Leu His Leu Thr Leu Pro Gln Ala Leu
                275                 280                 285

Pro Gln Tyr Ala Gly Ser Gly Asn Leu Thr Leu Ala Leu Glu Ala Lys
                290                 295                 300

Thr Gly Lys Leu His Gln Glu Val Asn Leu Val Val Met Arg Ala Thr
305                 310                 315                 320

Gln Leu Gln Lys Asn Leu Thr Cys Glu Val Trp Gly Pro Thr Ser Pro
                325                 330                 335

Lys Leu Met Leu Ser Leu Lys Leu Glu Asn Lys Glu Ala Lys Val Ser
                340                 345                 350

Lys Arg Glu Lys Ala Val Trp Val Leu Asn Pro Glu Ala Gly Met Trp
                355                 360                 365

Gln Cys Leu Leu Ser Asp Ser Gly Gln Val Leu Leu Glu Ser Asn Ile
                370                 375                 380

Lys Val Leu Pro Thr Trp Ser Thr Pro Val Gln Pro Met Ala Leu Ile
385                 390                 395                 400

Val Leu Gly Gly Val Ala Gly Leu Leu Leu Phe Ile Gly Leu Gly Ile
                    405                 410                 415

Phe Phe Cys Val Arg Cys Arg His Arg Arg Gln Ala Glu Arg Met
                420                 425                 430

Ser Gln Ile Lys Arg Leu Leu Ser Glu Lys Lys Thr Cys Gln Cys Pro
                435                 440                 445

His Arg Phe Gln Lys Thr Cys Ser Pro Ile
                450                 455
```

<210> SEQ ID NO 80
<211> LENGTH: 69
<212> TYPE: PRT
<213> ORGANISM: Mus musculus

<400> SEQUENCE: 80

Lys Ser Met Leu Thr Val Ser Asn Ser Cys Cys Leu Asn Thr Leu Lys
1               5                   10                  15

Lys Glu Leu Pro Leu Lys Phe Ile Gln Cys Tyr Arg Lys Met Gly Ser
            20                  25                  30

Ser Cys Pro Asp Pro Pro Ala Val Val Phe Arg Leu Asn Lys Gly Arg
        35                  40                  45

Glu Ser Cys Ala Ser Thr Asn Lys Thr Trp Val Gln Asn His Leu Lys
    50                  55                  60

Lys Val Asn Pro Cys
65

<210> SEQ ID NO 81
<211> LENGTH: 73
<212> TYPE: PRT
<213> ORGANISM: Homo sapiens

<400> SEQUENCE: 81

Lys Ser Met Gln Val Pro Phe Ser Arg Cys Cys Phe Ser Phe Ala Glu
1               5                   10                  15

Gln Glu Ile Pro Leu Arg Ala Ile Leu Cys Tyr Arg Asn Thr Ser Ser
            20                  25                  30

Ile Cys Ser Asn Glu Gly Leu Ile Phe Lys Leu Lys Arg Gly Lys Glu
        35                  40                  45

Ala Cys Ala Leu Asp Thr Val Gly Trp Val Gln Arg His Arg Lys Met
    50                  55                  60

Leu Arg His Cys Pro Ser Lys Arg Lys
65                  70

<210> SEQ ID NO 82
<211> LENGTH: 70
<212> TYPE: PRT
<213> ORGANISM: Mus musculus

<400> SEQUENCE: 82

Ala Arg Ala Thr Asn Val Gly Arg Glu Cys Cys Leu Asp Tyr Phe Lys
1               5                   10                  15

Gly Ala Ile Pro Ile Arg Lys Leu Val Ser Trp Tyr Lys Thr Ser Val
            20                  25                  30

Glu Cys Ser Arg Asp Ala Ile Val Phe Leu Thr Val Gln Gly Lys Leu
        35                  40                  45

Ile Cys Ala Asp Pro Lys Asp Lys His Val Lys Ala Ile Arg Leu
    50                  55                  60

Val Lys Asn Pro Arg Pro
65              70

<210> SEQ ID NO 83
<211> LENGTH: 71
<212> TYPE: PRT
<213> ORGANISM: Homo sapiens

<400> SEQUENCE: 83

Ala Arg Gly Thr Asn Val Gly Arg Glu Cys Cys Leu Glu Tyr Phe Lys

```
                1               5                      10                     15
Gly Ala Ile Pro Leu Arg Lys Leu Lys Thr Trp Tyr Gln Thr Ser Glu
                        20                     25                     30

Asp Cys Ser Arg Asp Ala Ile Val Phe Val Thr Val Gln Gly Arg Ala
                35                     40                     45

Ile Cys Ser Asp Pro Asn Asn Lys Arg Val Lys Asn Ala Val Lys Tyr
         50                     55                     60

Leu Gln Ser Leu Glu Arg Ser
65                      70
```

<210> SEQ ID NO 84
<211> LENGTH: 69
<212> TYPE: PRT
<213> ORGANISM: Homo sapiens

<400> SEQUENCE: 84

```
Ala Gln Val Gly Thr Asn Lys Glu Leu Cys Cys Leu Val Tyr Thr Ser
1               5                      10                     15

Trp Gln Ile Pro Gln Lys Phe Ile Val Asp Tyr Ser Glu Thr Ser Pro
                        20                     25                     30

Gln Cys Pro Lys Pro Gly Val Ile Leu Leu Thr Lys Arg Gly Arg Gln
                35                     40                     45

Ile Cys Ala Asp Pro Asn Lys Lys Trp Val Gln Lys Tyr Ile Ser Asp
         50                     55                     60

Leu Lys Leu Asn Ala
65
```

<210> SEQ ID NO 85
<211> LENGTH: 68
<212> TYPE: PRT
<213> ORGANISM: Mus musculus

<400> SEQUENCE: 85

```
Gly Pro Tyr Gly Ala Asn Val Glu Asp Ser Ile Cys Cys Gln Asp Tyr
1               5                      10                     15

Ile Arg His Pro Leu Pro Ser Arg Leu Val Lys Glu Phe Phe Trp Thr
                        20                     25                     30

Ser Lys Ser Cys Arg Lys Pro Gly Val Val Leu Ile Thr Val Lys Asn
                35                     40                     45

Arg Asp Ile Cys Ala Asp Pro Arg Gln Val Trp Val Lys Lys Leu Leu
         50                     55                     60

His Lys Leu Ser
65
```

<210> SEQ ID NO 86
<211> LENGTH: 69
<212> TYPE: PRT
<213> ORGANISM: Homo sapiens

<400> SEQUENCE: 86

```
Gly Pro Tyr Gly Ala Asn Met Glu Asp Ser Val Cys Cys Arg Asp Tyr
1               5                      10                     15

Val Arg Tyr Arg Leu Pro Leu Arg Val Val Lys His Phe Tyr Trp Thr
                        20                     25                     30

Ser Asp Ser Cys Pro Arg Pro Gly Val Val Leu Leu Thr Phe Arg Asp
                35                     40                     45

Lys Glu Ile Cys Ala Asp Pro Arg Val Pro Trp Val Lys Met Ile Leu
         50                     55                     60
```

Asn Lys Leu Ser Gln
65

<210> SEQ ID NO 87
<211> LENGTH: 162
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 87

Met Ala Ser Pro Leu Thr Arg Phe Leu Ser Leu Asn Leu Leu Leu
1               5                   10                  15

Gly Glu Ser Ile Ile Leu Gly Ser Gly Glu Ala Lys Ser Met Leu Thr
                20                  25                  30

Val Ser Asn Ser Cys Cys Leu Asn Thr Leu Lys Lys Glu Leu Pro Leu
            35                  40                  45

Lys Phe Ile Gln Cys Tyr Arg Lys Met Gly Ser Ser Cys Pro Asp Pro
50                  55                  60

Pro Ala Val Val Phe Arg Leu Asn Lys Gly Arg Glu Ser Cys Ala Ser
65                  70                  75                  80

Thr Asn Lys Thr Trp Val Gln Asn His Leu Lys Lys Val Asn Pro Cys
                85                  90                  95

Ser Gly Gly Gly Gly Ser Asp Pro Glu Phe Thr Asp Tyr Lys Asp Asp
                100                 105                 110

Asp Asp Lys Leu Glu Ile Arg Ala Ala Phe Leu Arg Gln Arg Asn Thr
            115                 120                 125

Ala Leu Arg Thr Glu Val Ala Glu Leu Glu Gln Glu Val Gln Arg Leu
        130                 135                 140

Glu Asn Glu Val Ser Gln Tyr Glu Thr Arg Tyr Gly Pro Leu Gly Gly
145                 150                 155                 160

Gly Lys

<210> SEQ ID NO 88
<211> LENGTH: 486
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 88
atggcctcac cgttgacccg ctttctgtcg ctgaacctgc tgctgctggg tgagtcgatt      60
atcctgggga gtggagaagc taagagcatg cttacggtct ccaatagctg ctgcttgaac     120
accttgaaga aagagcttcc cctgaagttt atccagtgtt acagaaagat gggctcctcc     180
tgtcctgatc ccccagctgt ggtattcagg ctgaacaaag gtagagaaag ctgcgcctca     240
actaacaaaa cgtgggttca aaatcacctg aagaaggtga acccctgcag cggcgggggt     300
ggcagcgacc ccgaattcac cgattacaag gacgacgatg acaagctgga gatccgcgct     360
gcatttttgc gacaaagaaa taccgctttg cgaaccgaag tggccgagtt ggagcaggaa     420
gtacaacgcc tggaaaatga agtcagccaa tacgaaactc gatatggacc tctcggaggt     480
ggaaag                                                                486

<210> SEQ ID NO 89
<211> LENGTH: 163

<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 89

Met Ala Ser Pro Leu Thr Arg Phe Leu Ser Leu Asn Leu Leu Leu Leu
1               5                   10                  15

Gly Glu Ser Ile Ile Leu Gly Ser Gly Glu Ala Ala Arg Ala Thr Asn
            20                  25                  30

Val Gly Arg Glu Cys Cys Leu Asp Tyr Phe Lys Gly Ala Ile Pro Ile
        35                  40                  45

Arg Lys Leu Val Ser Trp Tyr Lys Thr Ser Val Glu Cys Ser Arg Asp
    50                  55                  60

Ala Ile Val Phe Leu Thr Val Gln Gly Lys Leu Ile Cys Ala Asp Pro
65                  70                  75                  80

Lys Asp Lys His Val Lys Lys Ala Ile Arg Leu Val Lys Asn Pro Arg
                85                  90                  95

Pro Ser Gly Gly Gly Gly Ser Asp Pro Glu Phe Thr Asp Tyr Lys Asp
            100                 105                 110

Asp Asp Asp Lys Leu Glu Ile Arg Ala Ala Phe Leu Arg Gln Arg Asn
            115                 120                 125

Thr Ala Leu Arg Thr Glu Val Ala Glu Leu Gln Glu Val Gln Arg
        130                 135                 140

Leu Glu Asn Glu Val Ser Gln Tyr Glu Thr Arg Tyr Gly Pro Leu Gly
145                 150                 155                 160

Gly Gly Lys

<210> SEQ ID NO 90
<211> LENGTH: 489
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 90
atggcctcac cgttgacccg ctttctgtcg ctgaacctgc tgctgctggg tgagtcgatt      60
atcctgggga gtggagaagc cgcccgagcc accaatgtag gccgagagtg ctgcctggat     120
tacttcaaag gggccattcc tatcaggaag ttggtgagct ggtataagac ctcagtggag     180
tgttccaggg atgccatcgt gtttctgact gtccagggca agctcatctg tgcagacccc     240
aaagacaaac atgtgaagaa ggccatcaga ttggtgaaaa acccaaggcc aagcggcggg     300
ggtggcagcg accccgaatt caccgattac aaggacgacg atgacaagct ggagatccgc     360
gctgcatttt tgcgacaaag aaataccgct ttgcgaaccg aagtggccga gttggagcag     420
gaagtacaac gcctggaaaa tgaagtcagc caatacgaaa ctcgatatgg acctctcgga     480
ggtggaaag                                                              489

<210> SEQ ID NO 91
<211> LENGTH: 161
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 91

Met Ala Ser Pro Leu Thr Arg Phe Leu Ser Leu Asn Leu Leu Leu Leu
1               5                   10                  15

Gly Glu Ser Ile Ile Leu Gly Ser Glu Ala Gly Pro Tyr Gly Ala
            20                  25                  30

Asn Val Glu Asp Ser Ile Cys Cys Gln Asp Tyr Ile Arg His Pro Leu
            35                  40                  45

Pro Ser Arg Leu Val Lys Glu Phe Phe Trp Thr Ser Lys Ser Cys Arg
50                  55                  60

Lys Pro Gly Val Val Leu Ile Thr Val Lys Asn Arg Asp Ile Cys Ala
65                  70                  75                  80

Asp Pro Arg Gln Val Trp Val Lys Lys Leu Leu His Lys Leu Ser Ser
                85                  90                  95

Gly Gly Gly Gly Ser Asp Pro Glu Phe Thr Asp Tyr Lys Asp Asp Asp
                100                 105                 110

Asp Lys Leu Glu Ile Arg Ala Ala Phe Leu Arg Gln Arg Asn Thr Ala
            115                 120                 125

Leu Arg Thr Glu Val Ala Glu Leu Glu Gln Glu Val Gln Arg Leu Glu
        130                 135                 140

Asn Glu Val Ser Gln Tyr Glu Thr Arg Tyr Gly Pro Leu Gly Gly Gly
145                 150                 155                 160

Lys

<210> SEQ ID NO 92
<211> LENGTH: 483
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 92
atggcctcac cgttgacccg ctttctgtcg ctgaacctgc tgctgctggg tgagtcgatt      60
atcctgggga gtggagaagc cggtccctat ggtgccaatg tggaagacag tatctgctgc     120
caggactaca tccgtcaccc tctgccatca cgtttagtga aggagttctt ctggacctca     180
aaatcctgcc gcaagcctgg cgttgttttg ataaccgtca agaaccgaga tatctgtgcc     240
gatcccaggc aggtctgggt gaagaagcta ctccataaac tgtccagcgg cgggggtggc     300
agcgaccccg aattcaccga ttacaaggac gacgatgaca agctggagat ccgcgctgca     360 ttttgcgac aaagaaatac cgctttgcga accgaagtgg ccgagttgga gcaggaagta     420
caacgcctgg aaaatgaagt cagccaatac gaaactcgat atggacctct cggaggtgga     480
aag                                                                 483

<210> SEQ ID NO 93
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 93

Ser Gly Gly Gly Gly Ser Asp Pro Glu Phe Thr
1               5                   10

<210> SEQ ID NO 94
<211> LENGTH: 7

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 94

Ala Ala Ala Ser Gly Ser Leu
1               5

<210> SEQ ID NO 95
<211> LENGTH: 111
<212> TYPE: PRT
<213> ORGANISM: Unknown
<220> FEATURE:
<223> OTHER INFORMATION: Description of Unknown:
      Thy1.1 molecule sequence

<400> SEQUENCE: 95

Gln Lys Val Thr Ser Leu Thr Ala Cys Leu Val Asp Gln Ser Leu Arg
1               5                   10                  15

Leu Asp Cys Arg His Glu Asn Thr Ser Ser Pro Ile Gln Tyr Glu
            20                  25                  30

Phe Ser Leu Thr Arg Glu Thr Lys Lys His Val Leu Phe Gly Thr Val
        35                  40                  45

Gly Val Pro Glu His Thr Tyr Arg Ser Arg Thr Asn Phe Thr Ser Lys
50                  55                  60

Tyr Asn Met Lys Val Leu Tyr Leu Ser Ala Phe Thr Ser Lys Asp Glu
65                  70                  75                  80

Gly Thr Tyr Thr Cys Ala Leu His His Ser Gly His Ser Pro Pro Ile
                85                  90                  95

Ser Ser Gln Asn Val Thr Val Leu Arg Asp Lys Leu Val Lys Cys
            100                 105                 110

<210> SEQ ID NO 96
<211> LENGTH: 312
<212> TYPE: PRT
<213> ORGANISM: Unknown
<220> FEATURE:
<223> OTHER INFORMATION: Description of Unknown:
      EGFRt sequence

<400> SEQUENCE: 96

Arg Lys Val Cys Asn Gly Ile Gly Ile Gly Glu Phe Lys Asp Ser Leu
1               5                   10                  15

Ser Ile Asn Ala Thr Asn Ile Lys His Phe Lys Asn Cys Thr Ser Ile
            20                  25                  30

Ser Gly Asp Leu His Ile Leu Pro Val Ala Phe Arg Gly Asp Ser Phe
        35                  40                  45

Thr His Thr Pro Pro Leu Asp Pro Gln Glu Leu Asp Ile Leu Lys Thr
    50                  55                  60

Val Lys Glu Ile Thr Gly Phe Leu Leu Ile Gln Ala Trp Pro Glu Asn
65                  70                  75                  80

Arg Thr Asp Leu His Ala Phe Glu Asn Leu Glu Ile Ile Arg Gly Arg
                85                  90                  95

Thr Lys Gln His Gly Gln Phe Ser Leu Ala Val Val Ser Leu Asn Ile
            100                 105                 110

Thr Ser Leu Gly Leu Arg Ser Leu Lys Glu Ile Ser Asp Gly Asp Val
        115                 120                 125

Ile Ile Ser Gly Asn Lys Asn Leu Cys Tyr Ala Asn Thr Ile Asn Trp
```

```
            130                 135                 140
Lys Lys Leu Phe Gly Thr Ser Gly Gln Lys Thr Lys Ile Ile Ser Asn
145                 150                 155                 160

Arg Gly Glu Asn Ser Cys Lys Ala Thr Gly Gln Val Cys His Ala Leu
                165                 170                 175

Cys Ser Pro Glu Gly Cys Trp Gly Pro Glu Pro Arg Asp Cys Val Ser
            180                 185                 190

Cys Arg Asn Val Ser Arg Gly Arg Glu Cys Val Asp Lys Cys Asn Leu
        195                 200                 205

Leu Glu Gly Glu Pro Arg Glu Phe Val Glu Asn Ser Glu Cys Ile Gln
    210                 215                 220

Cys His Pro Glu Cys Leu Pro Gln Ala Met Asn Ile Thr Cys Thr Gly
225                 230                 235                 240

Arg Gly Pro Asp Asn Cys Ile Gln Cys Ala His Tyr Ile Asp Gly Pro
                245                 250                 255

His Cys Val Lys Thr Cys Pro Ala Gly Val Met Gly Glu Asn Asn Thr
            260                 265                 270

Leu Val Trp Lys Tyr Ala Asp Ala Gly His Val Cys His Leu Cys His
        275                 280                 285

Pro Asn Cys Thr Tyr Gly Cys Thr Gly Pro Gly Leu Glu Gly Cys Pro
    290                 295                 300

Thr Asn Gly Pro Lys Ile Pro Ser
305                 310

<210> SEQ ID NO 97
<211> LENGTH: 255
<212> TYPE: PRT
<213> ORGANISM: Homo sapiens

<400> SEQUENCE: 97

Met Gly Asn Ser Cys Tyr Asn Ile Val Ala Thr Leu Leu Leu Val Leu
1               5                   10                  15

Asn Phe Glu Arg Thr Arg Ser Leu Gln Asp Pro Cys Ser Asn Cys Pro
                20                  25                  30

Ala Gly Thr Phe Cys Asp Asn Asn Arg Asn Gln Ile Cys Ser Pro Cys
            35                  40                  45

Pro Pro Asn Ser Phe Ser Ser Ala Gly Gly Gln Arg Thr Cys Asp Ile
        50                  55                  60

Cys Arg Gln Cys Lys Gly Val Phe Arg Thr Arg Lys Glu Cys Ser Ser
65                  70                  75                  80

Thr Ser Asn Ala Glu Cys Asp Cys Thr Pro Gly Phe His Cys Leu Gly
                85                  90                  95

Ala Gly Cys Ser Met Cys Glu Gln Asp Cys Lys Gln Gly Gln Glu Leu
            100                 105                 110

Thr Lys Lys Gly Cys Lys Asp Cys Cys Phe Gly Thr Phe Asn Asp Gln
        115                 120                 125

Lys Arg Gly Ile Cys Arg Pro Trp Thr Asn Cys Ser Leu Asp Gly Lys
    130                 135                 140

Ser Val Leu Val Asn Gly Thr Lys Glu Arg Asp Val Val Cys Gly Pro
145                 150                 155                 160

Ser Pro Ala Asp Leu Ser Pro Gly Ala Ser Ser Val Thr Pro Pro Ala
                165                 170                 175

Pro Ala Arg Glu Pro Gly His Ser Pro Gln Ile Ile Ser Phe Phe Leu
            180                 185                 190
```

```
Ala Leu Thr Ser Thr Ala Leu Leu Phe Leu Leu Phe Phe Leu Thr Leu
            195                 200                 205

Arg Phe Ser Val Val Lys Arg Gly Arg Lys Lys Leu Leu Tyr Ile Phe
    210                 215                 220

Lys Gln Pro Phe Met Arg Pro Val Gln Thr Thr Gln Glu Glu Asp Gly
225                 230                 235                 240

Cys Ser Cys Arg Phe Pro Glu Glu Glu Glu Gly Gly Cys Glu Leu
                245                 250                 255

<210> SEQ ID NO 98
<211> LENGTH: 27
<212> TYPE: PRT
<213> ORGANISM: Unknown
<220> FEATURE:
<223> OTHER INFORMATION: Description of Unknown:
      CD28 sequence

<400> SEQUENCE: 98

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25
```